US012416878B2

(12) United States Patent
Takahashi et al.

(10) Patent No.: US 12,416,878 B2
(45) Date of Patent: Sep. 16, 2025

(54) INFORMATION STORAGE SYSTEM INCLUDING A PLURALITY OF TERMINALS

(71) Applicant: Ricoh Company, Ltd., Tokyo (JP)

(72) Inventors: Yasufumi Takahashi, Tokyo (JP); Kunihiro Ohyama, Tokyo (JP); Masayuki Yamane, Kanagawa (JP); Takeshi Uchitani, Kanagawa (JP); Tadashi Hayakawa, Kanagawa (JP); Takuji Takahashi, Kanagawa (JP); Shouji Okabe, Kanagawa (JP); Akira Shinshi, Tokyo (JP); Yuichiro Ueda, Kanagawa (JP); Masaki Takahashi, Kanagawa (JP); Yuuki Satoh, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 18/243,109

(22) Filed: Sep. 7, 2023

(65) Prior Publication Data

US 2023/0418181 A1 Dec. 28, 2023

Related U.S. Application Data

(60) Continuation of application No. 17/869,795, filed on Jul. 21, 2022, now Pat. No. 11,768,448, which is a
(Continued)

(30) Foreign Application Priority Data

Jun. 11, 2010 (JP) ................................ 2010-134560
Mar. 22, 2011 (JP) ................................ 2011-062216
(Continued)

(51) Int. Cl.
*G03G 21/16* (2006.01)
*B41J 2/175* (2006.01)
(Continued)

(52) U.S. Cl.
CPC ...... *G03G 15/0863* (2013.01); *B41J 2/17526* (2013.01); *B41J 2/1753* (2013.01);
(Continued)

(58) Field of Classification Search
CPC .......... G03G 15/0863; G03G 15/0865; G03G 15/0872; G03G 15/0875; G03G 15/0886
(Continued)

(56) References Cited

U.S. PATENT DOCUMENTS 1,179,728 A 4/1916 Knapp
2,508,085 A 5/1950 Andrew
(Continued)

FOREIGN PATENT DOCUMENTS

CN 1444113 A 9/2003
CN 101046661 A 10/2007
CN 101639650 A 2/2010
CN 102667640 B 2/2015
(Continued)

OTHER PUBLICATIONS

Office Action issued Dec. 1, 2020 in Japanese Patent Application No. 2019-231553, 2 pages.
(Continued)

*Primary Examiner* — Hoan H Tran
(74) *Attorney, Agent, or Firm* — XSENSUS LLP

(57) ABSTRACT

A toner container includes a container body, an opening, a cover, a toner discharge port, a shutter, a cylindrical structure, protrusions, and an identifier. The shutter is attached to the cover and includes a main shutter covering the toner discharge port. The main shutter moves between a closed position to close the toner discharge port and an open position to open the toner discharge port. The protrusions are
(Continued)

on both sides of the cover and protrude in a direction orthogonal to a toner container mounting direction. The identifier is on the cover to indicate a toner color. The cylindrical structure's leading end is downstream of leading ends of the protrusions in the mounting direction. The main shutter's leading end is downstream of the protrusions' leading ends in the mounting direction when the main shutter is in the closed position. The protrusions are downstream of the identifier in the mounting direction.

15 Claims, 58 Drawing Sheets

Related U.S. Application Data continuation of application No. 17/110,348, filed on Dec. 3, 2020, now Pat. No. 11,429,036, which is a continuation of application No. 16/929,446, filed on Jul. 15, 2020, now Pat. No. 11,188,007, which is a continuation of application No. 16/584,982, filed on Sep. 27, 2019, now Pat. No. 10,725,398, which is a continuation of application No. 15/970,427, filed on May 3, 2018, now Pat. No. 10,754,275, which is a continuation of application No. 15/430,261, filed on Feb. 10, 2017, now Pat. No. 9,989,887, which is a continuation of application No. 14/750,679, filed on Jun. 25, 2015, now Pat. No. 9,599,927, which is a continuation of application No. 14/047,755, filed on Oct. 7, 2013, now Pat. No. 9,110,402, which is a division of application No. 13/691,023, filed on Nov. 30, 2012, now Pat. No. 8,660,441, which is a continuation of application No. 13/448,987, filed on Apr. 17, 2012, now Pat. No. 8,346,105, which is a continuation of application No. PCT/JP2011/063993, filed on Jun. 13, 2011.

(30) Foreign Application Priority Data

Mar. 22, 2011 (JP) ................................ 2011-062283
Apr. 6, 2011 (JP) ................................ 2011-084820
Apr. 11, 2011 (JP) ................................ 2011-087786

(51) Int. Cl.
*G03G 15/00* (2006.01)
*G03G 15/08* (2006.01)
*G03G 21/00* (2006.01)
*G03G 21/18* (2006.01)

(52) U.S. Cl.
CPC ...... *B41J 2/17546* (2013.01); *G03G 15/0865* (2013.01); *G03G 15/0872* (2013.01); *G03G 15/0875* (2013.01); *G03G 15/0886* (2013.01); *G03G 15/0891* (2013.01); *G03G 15/50* (2013.01); *G03G 15/5066* (2013.01); *G03G 15/55* (2013.01); *G03G 15/553* (2013.01); *G03G 21/00* (2013.01); *G03G 21/16* (2013.01); *G03G 21/1652* (2013.01); *G03G 21/1661* (2013.01); *G03G 21/1676* (2013.01); *G03G 21/1875* (2013.01); *G03G 21/1885* (2013.01); *G03G 2215/0697* (2013.01); *G03G 2221/166* (2013.01); *G03G 2221/1823* (2013.01); *Y10T 29/49002* (2015.01)

(58) Field of Classification Search
USPC ........................................ 399/252, 262, 269
See application file for complete search history.

(56) References Cited

U.S. PATENT DOCUMENTS 2,617,033 A 11/1952 Klaas
3,732,514 A 5/1973 Sato
3,785,046 A 1/1974 Jennings
3,798,059 A 3/1974 Astle et al.
3,832,661 A 8/1974 Sato
3,956,751 A 5/1976 Herman
4,063,176 A 12/1977 Milligan et al.
4,063,246 A 12/1977 Greiser
4,084,778 A 4/1978 Dominguez
4,193,048 A 3/1980 Nyhus
4,322,698 A 3/1982 Takahashi et al.
4,518,965 A 5/1985 Hidaka
D283,032 S 3/1986 Quesnel
4,616,205 A 10/1986 Praught et al.
4,731,297 A 3/1988 Takaya
4,769,625 A 9/1988 Meindl
4,857,869 A 8/1989 Terakawa et al.
D305,887 S 2/1990 Nishimura
4,992,769 A 2/1991 Oppelt
5,005,019 A 4/1991 Zaghloul et al.
5,061,910 A 10/1991 Bouny
5,061,943 A 10/1991 Rammos
5,075,724 A 12/1991 Wada et al.
D324,990 S 3/1992 Gary
5,155,663 A 10/1992 Harase
5,179,365 A 1/1993 Raggi
5,345,670 A 9/1994 Pitzele et al.
5,359,313 A 10/1994 Watanabe et al.
5,404,118 A 4/1995 Okamura et al.
D359,756 S 6/1995 Ely
5,479,146 A 12/1995 Herbert
5,521,573 A 5/1996 Inoh et al.
5,559,487 A 9/1996 Butcher et al.
D374,739 S 10/1996 Blanton
5,572,180 A 11/1996 Huang et al.
D379,006 S 4/1997 Gaumet
5,631,822 A 5/1997 Silberkleit et al.
D385,545 S 10/1997 Levin
D395,923 S 7/1998 Ely
5,777,539 A 7/1998 Folker et al.
5,805,219 A 9/1998 Ejima et al.
5,844,461 A 12/1998 Faulk et al.
D410,968 S 6/1999 Swan et al.
5,917,386 A 6/1999 Oobrovolny
5,926,666 A 7/1999 Miura et al.
5,944,563 A 8/1999 Nagafuji
5,946,531 A 8/1999 Miura et al.
5,950,047 A 9/1999 Miyabe et al.
5,970,291 A 10/1999 Miller
5,973,644 A 10/1999 Haneishi et al.
5,974,286 A 10/1999 Ban et al.
5,988,510 A 11/1999 Tuttle et al.
5,988,801 A 11/1999 Coiner
5,990,776 A 11/1999 Jitaru
6,046,662 A 4/2000 Schroter et al.
D423,774 S 5/2000 Peterson
6,060,974 A 5/2000 Schroter et al.
6,061,538 A 5/2000 Arimitsu et al.
6,097,345 A 8/2000 Walton
6,114,932 A 9/2000 Wester et al.
D434,418 S 11/2000 Shinada
6,154,111 A 11/2000 Rehm et al.
6,167,219 A 12/2000 Miyamoto et al.
6,208,528 B1 3/2001 Soto et al.
6,216,883 B1 4/2001 Kobayashi et al.
6,239,683 B1 5/2001 Roessler et al.
D444,706 S 7/2001 Giancaspro
6,292,644 B1 * 9/2001 Goto .................. G03G 15/0875
222/DIG. 1
6,329,950 B1 12/2001 Harrell et al.
6,339,385 B1 1/2002 Tuttle
6,346,919 B1 2/2002 Wang et al.
6,380,834 B1 4/2002 Canzano et al.
D456,603 S 5/2002 Phetthaweebancha
6,386,913 B1 5/2002 Mohammad et al.

(56) References Cited

U.S. PATENT DOCUMENTS 6,409,453 B1 6/2002 Brodine et al.
6,420,953 B1 7/2002 Dadafshar
6,429,763 B1 8/2002 Patel et al.
6,445,272 B1 9/2002 Mercado et al.
6,497,477 B1 12/2002 Nakamura et al.
6,502,917 B1 1/2003 Shinada et al.
D473,238 S 4/2003 Cockerill
6,557,967 B1 5/2003 Lee
6,628,531 B2 9/2003 Dadafshar
6,654,568 B2 11/2003 Matsuguma
6,655,768 B1 12/2003 Takagi
6,665,508 B2 12/2003 Sudo et al.
6,675,005 B2 1/2004 Dobrovolny
6,702,427 B2 3/2004 Shimizu et al.
6,710,689 B2 3/2004 Wohlfarth
6,713,399 B1 3/2004 Kao
D489,695 S 5/2004 Komoto
6,765,469 B2 7/2004 Sortor
6,766,133 B1 7/2004 Ban et al.
D498,357 S 11/2004 Smith
6,813,460 B2 11/2004 Sudo et al.
6,826,373 B2 11/2004 Nomura
6,826,380 B2 11/2004 Karakama et al.
6,837,565 B2 1/2005 Studholme et al.
6,863,387 B2 3/2005 Thielman et al.
6,879,235 B2 4/2005 Ichikawa
D505,416 S 5/2005 Ma
6,917,254 B2 7/2005 Kaehs
6,991,419 B2 1/2006 Kim
6,992,630 B2 1/2006 Parsche
D517,373 S 3/2006 Cappellino et al.
7,018,017 B2 3/2006 Song et al.
7,072,636 B2 7/2006 Oobrovolny
7,079,080 B2 7/2006 Mizuno et al.
7,082,276 B2 7/2006 Karakama et al.
7,098,856 B2 8/2006 Okado
D529,000 S 9/2006 Ishii
7,101,021 B2 9/2006 Aruga
7,102,527 B2 9/2006 Shieh et al.
7,110,704 B2 9/2006 Sudo et al.
7,130,567 B2 10/2006 Sudo et al.
D534,134 S 12/2006 Lai
7,148,850 B2 12/2006 Baliarda et al.
7,158,742 B2 1/2007 Sudo et al.
7,162,188 B2 1/2007 Sudo et al.
7,203,449 B2 4/2007 Ban et al.
7,209,687 B2 4/2007 Sudo et al.
7,212,750 B2 5/2007 Kawai
7,218,866 B2 5/2007 Hayashi et al.
7,277,664 B2 10/2007 Katsuyama et al.
7,292,811 B2 11/2007 Ban et al.
7,321,744 B2 1/2008 Hosokawa et al.
7,327,486 B2 2/2008 Renda
7,332,993 B1 2/2008 Ussbaum
7,375,737 B2 5/2008 Botten et al.
7,412,191 B2 8/2008 Sudo et al.
7,425,151 B2 9/2008 Baba et al.
7,430,390 B2 9/2008 Ban et al.
7,433,622 B2 10/2008 Chadani et al.
7,439,838 B2 10/2008 Chen et al.
7,439,839 B2 10/2008 Podlisk et al.
7,447,469 B2 11/2008 Uchiyama et al.
7,471,246 B2 12/2008 Soler et al.
7,480,476 B2 1/2009 Hosokawa et al.
D589,474 S 3/2009 Ogasawara et al.
7,510,251 B2 3/2009 Wanibe et al.
D589,912 S 4/2009 Ogasawara et al.
7,519,317 B2 4/2009 Hosokawa et al.
7,522,054 B2 4/2009 Takei
D591,733 S 5/2009 Karakama
D591,734 S 5/2009 Karakama
D592,162 S 5/2009 Sugimoto et al.
D592,615 S 5/2009 Imai et al.
7,562,958 B2 7/2009 Asauchi
7,577,385 B2 8/2009 Ban et al.
D599,307 S 9/2009 Blumberg et al.
D599,308 S 9/2009 Blumberg et al.
7,598,837 B2 10/2009 Gilmartin et al.
7,599,084 B2 10/2009 Mitani
D603,812 S 11/2009 Jehnson et al.
7,653,990 B2 2/2010 Lee et al.
7,656,247 B2 2/2010 Kaehs
7,659,468 B1 2/2010 Gottlieb
7,672,609 B2 3/2010 Koyama et al.
7,676,183 B2 3/2010 Kimura et al.
7,697,870 B2 4/2010 Hosokawa et al.
7,702,262 B2 4/2010 Taguchi et al.
7,706,899 B2 4/2010 Taguchi et al.
7,720,417 B2 5/2010 Taguchi et al.
7,742,717 B2 6/2010 Kim
D621,803 S 8/2010 Maruyama et al.
7,813,666 B2 10/2010 Sato
7,822,369 B2 10/2010 Koyama
7,822,371 B2 10/2010 Taguchi et al.
D626,404 S 11/2010 Koehn
D628,170 S 11/2010 Maruyama et al.
7,826,780 B2 11/2010 Deguchi
7,835,673 B2 11/2010 Hosokawa et al.
7,840,154 B2 11/2010 Ishii et al.
7,853,184 B2 12/2010 Taguchi et al.
7,860,427 B2 12/2010 Hayashi et al.
7,885,554 B2 2/2011 Shirokoshi et al.
7,945,184 B2 5/2011 Takagi
7,953,339 B2 5/2011 Fukamachi et al.
D640,645 S 6/2011 Andrews et al.
7,962,064 B2 6/2011 Asai
7,971,792 B2 7/2011 Seriu et al.
7,982,576 B2 7/2011 Feng et al.
D643,708 S 8/2011 Hecht
7,991,334 B2 8/2011 Taguchi et al.
8,005,406 B2 8/2011 Hosokawa et al.
D652,409 S 1/2012 Hernandez et al.
8,089,331 B2 1/2012 Jacobson et al.
8,126,375 B2 2/2012 Taguchi et al.
D656,147 S 3/2012 Schlossstein
D656,909 S 4/2012 Taniguchi et al.
D656,910 S 4/2012 Taniguchi et al.
D659,684 S 5/2012 Karakama et al.
8,195,070 B2 6/2012 Hosokawa et al.
D664,511 S 7/2012 Taniguchi et al.
D664,512 S 7/2012 Taniguchi et al.
8,213,842 B2 7/2012 Usui
8,295,742 B2 10/2012 Yamaguchi et al.
8,299,869 B2 10/2012 Laporte et al.
D671,511 S 11/2012 Amano et al.
8,311,447 B2 11/2012 Mitsuishi et al.
D673,141 S 12/2012 Lolli
D674,365 S 1/2013 Kajiwara
8,346,105 B2 1/2013 Takahashi et al.
D675,582 S 2/2013 Segler et al.
D678,227 S 3/2013 Takahashi et al.
8,391,748 B2 3/2013 Miyabe et al.
8,396,398 B2 3/2013 Taguchi et al.
D682,042 S 5/2013 Sanders
8,448,874 B2 5/2013 Koskelainen
D686,666 S 7/2013 Lee et al.
8,532,542 B2 9/2013 Mitsuishi et al.
D695,240 S 12/2013 Iida et al.
8,649,713 B2 * 2/2014 Hori .................. G03G 15/0886 399/119
D701,498 S 3/2014 Iida et al.
D704,171 S 5/2014 Forster
D706,246 S 6/2014 Forster
8,743,007 B2 6/2014 Kaneko et al.
8,789,762 B2 7/2014 Finn et al.
D720,359 S 12/2014 Bauermeister
8,928,449 B2 1/2015 Silva et al.
8,929,779 B2 * 1/2015 Takami .............. G03G 15/0879 399/262
8,941,457 B2 1/2015 Yan et al.
8,988,179 B2 3/2015 Kim et al.
8,991,712 B2 3/2015 Finn et al.
D727,928 S 4/2015 Allison et al.
D730,329 S 5/2015 Man

(56) References Cited

U.S. PATENT DOCUMENTS

| | | | |
|---|---|---|---|
| 9,054,094 B2 | 6/2015 | Anthony et al. | |
| 9,057,983 B2 | 6/2015 | Takahashi et al. | |
| 9,083,327 B2 | 7/2015 | Takahashi et al. | |
| 2001/0051088 A1 | 12/2001 | Park et al. | |
| 2002/0025725 A1 | 2/2002 | Ushio et al. | |
| 2002/0067315 A1 | 6/2002 | Kunysz | |
| 2002/0071399 A1 | 6/2002 | Smith | |
| 2002/0112878 A1 | 8/2002 | Ishizawa et al. | |
| 2003/0170042 A1 | 9/2003 | Okamoto et al. | |
| 2003/0179067 A1 | 9/2003 | Gamou et al. | |
| 2004/0070914 A1 | 4/2004 | Ferreres | |
| 2004/0075616 A1 | 4/2004 | Endo et al. | |
| 2004/0079857 A1 | 4/2004 | Andrews et al. | |
| 2004/0100523 A1 | 5/2004 | Silverbrook et al. | |
| 2004/0238416 A1 | 12/2004 | Burbank et al. | |
| 2006/0133831 A1 | 6/2006 | Rommelmann et al. | |
| 2006/0170557 A1 | 8/2006 | Berson | |
| 2007/0086809 A1 | 4/2007 | Yamane | |
| 2007/0104505 A1* | 5/2007 | Murakami | G03G 15/0872 399/258 |
| 2007/0122202 A1 | 5/2007 | Taguma et al. | |
| 2007/0122205 A1 | 5/2007 | Taguchi et al. | |
| 2007/0147901 A1 | 6/2007 | Kimura et al. | |
| 2007/0147902 A1 | 6/2007 | Taguchi et al. | |
| 2007/0149044 A1 | 6/2007 | Asauchi | |
| 2007/0154244 A1 | 7/2007 | Taguchi et al. | |
| 2007/0160394 A1 | 7/2007 | Taguchi et al. | |
| 2007/0172252 A1 | 7/2007 | Koyama et al. | |
| 2007/0177886 A1 | 8/2007 | Taguchi et al. | |
| 2007/0217826 A1 | 9/2007 | Koyama | |
| 2007/0230999 A1 | 10/2007 | Shimomura | |
| 2008/0001160 A1 | 1/2008 | Andrew | |
| 2008/0024241 A1 | 1/2008 | Hata et al. | |
| 2008/0054286 A1 | 3/2008 | Loh et al. | |
| 2008/0075506 A1 | 3/2008 | Sato | |
| 2008/0102674 A1 | 5/2008 | Dawson et al. | |
| 2008/0124105 A1 | 5/2008 | Okamoto et al. | |
| 2008/0240771 A1* | 10/2008 | Kurita | G03G 15/0886 399/106 |
| 2009/0040276 A1 | 2/2009 | North et al. | |
| 2009/0289977 A1 | 11/2009 | Asauchi | |
| 2010/0008693 A1 | 1/2010 | Hayashi et al. | |
| 2010/0060687 A1 | 3/2010 | Kim | |
| 2010/0091070 A1 | 4/2010 | Kimura | |
| 2010/0098458 A1 | 4/2010 | Murase et al. | |
| 2010/0201748 A1 | 8/2010 | Kishikawa et al. | |
| 2010/0226690 A1 | 9/2010 | Kadota et al. | |
| 2011/0002713 A1 | 1/2011 | Taguchi et al. | |
| 2011/0243614 A1 | 10/2011 | Sato | |
| 2011/0286771 A1 | 11/2011 | Taguchi et al. | |
| 2012/0096383 A1 | 4/2012 | Sakamoto et al. | |
| 2012/0113197 A1 | 5/2012 | Kashu et al. | |
| 2013/0050342 A1 | 2/2013 | Price | |
| 2013/0330106 A1 | 12/2013 | Mitsuishi et al. | |
| 2014/0139584 A1 | 5/2014 | Chen et al. | |
| 2014/0153974 A1 | 6/2014 | Jimba et al. | |
| 2014/0218437 A1 | 8/2014 | Ciampini et al. | |
| 2014/0232792 A1 | 8/2014 | Munakata | |
| 2014/0240404 A1 | 8/2014 | Li et al. | |
| 2014/0340450 A1 | 11/2014 | Kunnavakkam et al. | |
| 2014/0354735 A1 | 12/2014 | Robinson et al. | |
| 2015/0049141 A1 | 2/2015 | Taff et al. | |
| 2015/0063875 A1 | 3/2015 | Ohshima et al. | |
| 2018/0101127 A1 | 4/2018 | Jimba et al. | |
| 2018/0101128 A1 | 4/2018 | Jimba et al. | |
| 2018/0101129 A1 | 4/2018 | Jimba et al. | |
| 2018/0101130 A1 | 4/2018 | Jimba et al. | |
| 2018/0107151 A1 | 4/2018 | Jimba et al. | |

FOREIGN PATENT DOCUMENTS

| | | | |
|---|---|---|---|
| EP | 0827048 B1 | | 8/1997 |
| EP | 0827049 B1 | | 8/1997 |
| EP | 0827050 B1 | | 8/1997 |
| EP | 997297 | A1 | 5/2000 |
| EP | 1232871 | A1 | 8/2002 |
| EP | 1363168 | A2 | 11/2003 |
| EP | 1791035 | A1 | 11/2006 |
| EP | 1927897 | A2 | 9/2007 |
| EP | 1892102 | A2 | 2/2008 |
| EP | 1936631 | A1 | 6/2008 |
| EP | 2037327 | A2 | 3/2009 |
| EP | 2720088 | A1 | 4/2014 |
| JP | 62-80672 | U | 5/1987 |
| JP | 3-57074 | U | 5/1991 |
| JP | 3-60774 | U | 6/1991 |
| JP | 4-30784 | U | 3/1992 |
| JP | 6-250486 | A | 9/1994 |
| JP | 8-221525 | A | 8/1996 |
| JP | 9-120205 | A | 5/1997 |
| JP | 09-280288 | A | 10/1997 |
| JP | 10-49032 | A | 2/1998 |
| JP | 11-348375 | A | 12/1999 |
| JP | 2001-106351 | A | 4/2001 |
| JP | 2001-296708 | A | 10/2001 |
| JP | 2001-305827 | A | 11/2001 |
| JP | 2002-196629 | A | 7/2002 |
| JP | 2002-198627 | A | 7/2002 |
| JP | 2002214983 | A | 7/2002 |
| JP | 2003-11389 | A | 1/2003 |
| JP | 2003-330335 | A | 11/2003 |
| JP | 2004-061596 | A | 2/2004 |
| JP | 2004-212872 | A * | 7/2004 |
| JP | 2005007893 | A | 1/2005 |
| JP | 12005107141 | A | 4/2005 |
| JP | 2006-058743 | A | 3/2006 |
| JP | 2006-65267 | A | 3/2006 |
| JP | 2006-119467 | A | 5/2006 |
| JP | 2006-145960 | A | 6/2006 |
| JP | 2006-184850 | A | 7/2006 |
| JP | 2006-209060 | A | 8/2006 |
| JP | 2006-267992 | A | 10/2006 |
| JP | 2007-10774 | A | 1/2007 |
| JP | 2007-047392 | A | 2/2007 |
| JP | 2007-047397 | A | 2/2007 |
| JP | 2007102133 | A | 4/2007 |
| JP | 2007-196664 | A | 8/2007 |
| JP | 2007-199505 | A | 8/2007 |
| JP | 2007-249019 | A | 9/2007 |
| JP | 2008-20605 | A | 1/2008 |
| JP | 2008-112198 | A | 5/2008 |
| JP | 2008-185825 | A | 8/2008 |
| JP | 2008-224966 | A | 9/2008 |
| JP | 2008-257124 | A | 10/2008 |
| JP | 2008-298907 | A | 12/2008 |
| JP | 2009-54627 | A1 | 3/2009 |
| JP | 2009-69417 | A | 4/2009 |
| JP | 2009-210615 | A | 9/2009 |
| JP | 2009-211038 | A | 9/2009 |
| JP | 2009-283179 | A | 12/2009 |
| JP | 2009-294477 | A | 12/2009 |
| JP | 2010-020219 | A | 1/2010 |
| JP | 2010-026501 | A | 2/2010 |
| JP | 2010-033991 | A | 2/2010 |
| JP | 2010-66638 | A | 3/2010 |
| JP | 2010-94924 | A | 4/2010 |
| JP | 201079073 | A | 4/2010 |
| JP | 2010-111116 | A | 5/2010 |
| KR | 1998-0003920 | | 3/1998 |
| KR | 10-2000-0023385 | A | 4/2000 |
| KR | 10-2007-0085096 | A1 | 8/2007 |
| KR | 10-2010-0012895 | | 2/2010 |
| TW | 390979 | B | 5/2000 |
| TW | 517645 | U | 1/2003 |
| TW | I253549 | | 4/2006 |
| WO | 2008004566 | A1 | 1/2008 |
| WO | 2009/052702 | A1 | 4/2009 |

OTHER PUBLICATIONS

Office Action issued Apr. 14, 2021 in Korean Patent Application No. 10-2021-7001810, 14 pages.

(56) References Cited

OTHER PUBLICATIONS

Takahide Sugiyama Tee Co., Ltd, "Printed Board Support", Toshiba Technical publications collection, vol. 13-44, Issue No. 95-4519, Jun. 29, 1995, 6pp.
NEMA Standards Publication ANSI/NEMA WD Jun. 2002 (R2008), "Wiring Devices—Dimensional Specifications" Excerpt: Non-Locking Plugs and Receptacles, 2008, 3pp.
Office Action issued Dec. 30, 2021 in Korean Patent Application No. 10-2021-7030577, 11 pages.
Korean Office Action dated Dec. 18, 2018 for corresponding Korean Patent Application No. 10-2017-7026700 and an English translation thereof.
Combined Office Action and Search Report issued Jun. 28, 2018 in Taiwanese Patent Application No. 106126093,4 pages.
Decision of a Patent Grant mailed Nov. 29, 2011, in Japanese Patent Application No. 2011-121688.
Decision of a Patent Grant mailed Sep. 6, 2011, in Japanese Patent Application No. 2011-121692.
European Office Action dated Jun. 3, 2019, issued in corresponding European Application No. 15184363.8, 7 pages.
Extended European Search Report dated Aug. 12, 2014 for European Patent Application No. 14162692.9.
Extended European Search Report dated Dec. 18, 2015 for European Application No. 15184363.8.
Indian Office Action dated Oct. 18, 2018, issued in Indian Patent Application No. 1339/KOLNP/2012.
Japanese Office Action issued Mar. 31, 2015 in Japanese Patent Application No. 2011-220226.
Japanese Office Action mailed Aug. 19, 2014 for Japanese Patent Application No. 2011-220226.
Japanese Office Action mailed Sep. 29, 2015 for Japanese Application No. 2011-264251.
Korean Office Action issued Dec. 18, 2017, in Korean Application No. 10-2017-7026700, 15 pages.
Korean Office Action issued Feb. 5, 2016 in Patent Application No. 10-2014-7024545.
Korean Office Action mailed Aug. 29, 2014 for Korean Application No. 10-2012-7012751.
Notice of Allowance issued Jul. 22, 2015 in co-pending U.S. Appl. No. 29/501,858.
Notice of Allowance of Patent dated Feb. 20, 2019 for corresponding Taiwanese Patent Application No. 107126744.
Office Action dated Aug. 22, 2017 for corresponding Chinese Application No. 20140374095.3.
Ofice Action dated Mar. 21, 2016 for corresponding Taiwan application No. 103120837.
Office Action for Korean Patent Application No. 10-2014-7024545 mailed Aug. 30, 2016.
Office Action issued Feb. 17, 2015 in Canadian Patent Application No. 2,782,610.
Office Action issued Jun. 23, 2015 in Japanese Patent Application No. 2015-100338.
Office Action issued Jun. 28, 2018 in Korean Patent Application No. 10-2017-7026700,15 pages.
Office Action issued Mar. 20, 2017, in Taiwan Patent Application No. 105124142.
Office Action mailed Sep. 6, 2011, in Japanese Patent Application No. 2011-121688.
Singapore Office Action dated Jan. 21, 2016 for Singapore Application No. 10201504616T.
Taiwanese Office Action mailed Jul. 28, 2014 for corresponding Taiwanese Patent Application No. 100120554.
U.S. Notice of Allowance mailed Sep. 24, 2015, corresponding U.S. Appl. No. 14/322,754.
U.S. Office Action dated Aug. 18, 2014 for U.S. Appl. No. 13/413,116.
U.S. Ofice Action dated Dec. 5, 2014 for U.S. Appl. No. 14/322,754.
U.S. Office Action dated Nov. 17, 2014 for U.S. Appl. No. 13/413,116.
U.S. Office Action dated Sep. 25, 2014 in U.S. Appl. No. 14/447,241.
U.S. Office Action mailed Aug. 18, 2014 for U.S. Appl. No. 14/298,601.
Universal Serial Bus Specification Compaq Computer Corporation, Revision 1.1, Sep. 1998, 327 pages.
Written Opinion of the International Searching authority mailed Aug. 23, 2011, in PCT/JP2011/063993.
Office Action dated Jan. 2, 2020 issued in corresponding Chinese Patent Application No. 201410354002.0 with English Translation, 12 pages.
Office Action dated Sep. 18, 2019, issued in corresponding Korean Patent Application No. 10-2019-7018102, with English Translation, 11 pages.
Notice of Allowance dated Nov. 25, 2019 for corresponding Taiwanese Patent Application No. 108110042, 4 pages.
Office Action dated Oct. 15, 2019 for corresponding Brazilian Patent Application No. 112012014076-0 and English Translation, 8 pages.
Office Action issued Apr. 2, 2024 in Japanese Patent Application No. 2023-138178, 7 pages.

* cited by examiner

INFORMATION STORAGE SYSTEM INCLUDING A PLURALITY OF TERMINALS

CROSS-REFERENCE TO RELATED APPLICATIONS

This application is a continuation of U.S. application Ser. No. 17/869,795, filed Jul. 21, 2022, which is a continuation of U.S. application Ser. No. 17/110,348, filed Dec. 3, 2020 (now U.S. Pat. No. 11,429,036), which is a continuation of U.S. application Ser. No. 16/929,446, filed Jul. 15, 2020 (now U.S. Pat. No. 11,188,007), which is a continuation of Ser. No. 16/584,982, filed Sep. 27, 2019 (now U.S. Pat. No. 10,725,398), which is a continuation of U.S. application Ser. No. 15/970,427, filed May 3, 2018 (now U.S. Pat. No. 10,754,275), which is a continuation of U.S. application Ser. No. 15/430,261, filed Feb. 10, 2017 (now U.S. Pat. No. 9,989,887), which is a continuation of U.S. application Ser. No. 14/750,679, filed Jun. 25, 2015 (now U.S. Pat. No. 9,599,927), which is a continuation of U.S. application Ser. No. 14/047,755, filed Oct. 7, 2013 (now U.S. Pat. No. 9,110,402), which is divisional of U.S. application Ser. No. 13/691,023, filed Nov. 30, 2012 (now U.S. Pat. No. 8,660, 441), which is a continuation of U.S. application Ser. No. 13/448,987, filed on Apr. 17, 2012 (now U.S. Pat. No. 8,346,105), which is a continuation of PCT International Application No. PCT/JP2011/063993, filed Jun. 13, 2011 which designates the United States, and which claims the benefit of priority from Japanese Patent Application No. 2010-134560, filed Jun. 11, 2010, Japanese Patent Application No. 2011-062216, filed Mar. 22, 2011, Japanese Patent Application No. 2011-062283, filed Mar. 22, 2011, Japanese Patent Application No. 2011-084820, filed Apr. 6, 2011, and Japanese Patent Application No. 2011-087786, filed Apr. 11, 2011; the entire contents of each of which are incorporated herein by reference.

BACKGROUND OF THE INVENTION

1. Field of the Invention

The present invention relates to an image forming apparatus such as a copying machine, a printer, a facsimile, or a multi-function peripheral (MFP), a removable device and a developer container that are removably installed therein, and an information storage device installed therein.

2. Description of the Related Art

Conventionally, in an image forming apparatus such as a copying machine, a technique of removably installing a removable device such as a developer container (a toner bottle, a toner storage container, or an ink cartridge) or a process cartridge on an image forming apparatus body has been usually used (for example, Patent Literature 1: Japanese Patent Application Laid-open No. 2009-69417, Patent Literature 2: Japanese Patent Application Laid-open No. 2006-209060, and Patent Literature 3: Japanese Patent Application Laid-open No. 2002-196629).

In the removable device, an information storage device (an information recording unit or a non-volatile memory) such as an ID chip storing information to be exchanged with the image forming apparatus body is installed. In a state in which the removable device is set to the image forming apparatus body, information (for example, information such as manufacturing year, month, and date of the removable device, a manufacturing lot number, or a color of toner, or a kind of toner) stored in the information storage device is transmitted to a control unit of the image forming apparatus body, or information (information such as a use history of the image forming apparatus) is transmitted from the image forming apparatus body to the information storage device, so that fulfilling quality control of the image forming apparatus body and the removable device is performed.

Patent Literature 1 discloses a contact-type information storage device (an information recording unit). Specifically, in the contact-type information storage device (an ID chip), when the removable device (a toner storage container) is set to the image forming apparatus body, a metal pad (a terminal) comes in contact with a body side terminal of a connector installed in the image forming apparatus body. As a result, information can be exchanged between the information storage device of the removable device and the control unit (the body side information recording unit) of the image forming apparatus.

Further, a feeding opening for allowing the stored toner to flow out to the outside is installed in the developer container. The opening needs remain closed until it is loaded onto a developing device so as to prevent the toner from being scattered or leaking.

As a configuration for achieving the above desire, there has been suggested a configuration in which a shutter for opening/closing the opening installed in the developer container is installed. Further, as a configuration of the shutter, there has been suggested a configuration in which a flat plate-like shutter that is movable in a direction traversing the toner and an outlet is installed (For example, Patent Literature 4: Japanese Patent Application Laid-open No. 2010-066638).

However, the conventional techniques described above have the following problems.

As a first problem, the conventional contact-type information storage device may electrically get damaged since an electric circuit of the information storage device is not sufficiently earthed and so becomes an electrically floating state when the removable device is attached to or removed from the device body.

There is a need to solve the first problem described above and provides an information storage device, a removable device, a developer container, and an image forming apparatus in which electrical damage is difficult to occur in the information storage device even when the contact-type information storage device is installed in the removable device removably installed in the image forming apparatus body.

As a second problem, in the conventional contact-type information storage device, there may occur a problem in that contact sections thereof are misaligned (a contact failure) due to wrong positioning of the terminal (metal pad) installed in the information storage device and the terminal of the image forming apparatus body. Particularly, when the terminal of the information storage device is small, the problem becomes important.

There is a need to solve the second problem described above and provides a removable device, a developer container, and an image forming apparatus in which a contact failure caused by a positioning failure with the body side terminal of the connector of the image forming apparatus body is difficult to occur even when the contact-type information storage device is installed in the removable device removably installed in the image forming apparatus body.

A third problem is as follows. In recent years, toner having a small particle diameter has been used so as to improve the resolution. Improving a filter function so as to cope with using the toner may increase the material or processing cost. That is, when a foamable material is used, it is necessary to prescribe mesh fineness that does not let the toner through, a so-call foaming degree, but as mesh fineness increases, flexibility tends to decrease. This tendency may be difficult to go along with movement of the shutter, and a sealing characteristic may get worse.

There is a need to improve a shutter mechanism of the conventional toner feeding device to provide a developer storage container and an image forming apparatus which have a configuration capable of reliably preventing the toner from leaking from the developer storage container that is replaced by an attaching/detaching operation at a low cost.

SUMMARY OF THE INVENTION

It is an object of the present invention to at least partially solve the problems in the conventional technology.

An information storage device installed in a removable device configured to be removably installed in an image forming apparatus body, includes: an information storage unit that stores information communicated between the image forming apparatus body and the removable device; a terminal that comes in contact with a body side terminal installed in the image forming apparatus body and communicates the information with the image forming apparatus body; and a substrate that holds the information storage unit and the terminal and includes a hole configured to be engaged with a protruding section installed in the image forming apparatus body. The terminal includes a plurality of terminals each including one of a plurality of metallic plates arranged in a transverse direction thereof with a clearance therebetween. An earth terminal, which comes in contact with a body side earth terminal formed in the protruding section of the image forming apparatus body, is formed in the hole in the substrate. The hole in the substrate is disposed at a position sandwiched between two metallic plates among the plurality of metallic plates.

A removable device that is installed removably in an image forming apparatus body and is any one of a toner cartridge inside which toner is contained, a process cartridge inside which toner is contained, and an ink cartridge inside which ink is contained, includes the foregoing information storage device.

A developer container that is installed removably in an image forming apparatus body in a state in which a longitudinal direction of the developer container is horizontal, and that stores a developer thereinside, includes: a cylindrical container body that includes an opening formed at one end in the longitudinal direction and is configured such that the developer stored thereinside is conveyed toward the opening; a cap in which the opening of the container body is inserted and that includes a discharge opening used to discharge the developer, which has been discharged from the opening of the container body, outside the developer container; and a shutter that is held in the cap and moves to open/close the toner discharge opening in conjunction movement of the developer container when the developer container is attached to/detached from the image forming apparatus body. The cap includes the foregoing information storage device installed in an end section in the longitudinal direction and a positioning hole engaged with a positioning pin installed in the image forming apparatus body.

The above and other objects, features, advantages and technical and industrial significance of this invention will be better understood by reading the following detailed description of presently preferred embodiments of the invention, when considered in connection with the accompanying drawings.

In the present invention, a "process cartridge" is defined as a removable device that is configured such that at least one of a charging unit for charging an image carrier, a developing unit (a developing device) for developing a latent image formed on the image carrier, and a cleaning unit for cleaning the surface of the image carrier is integrally formed with the image carrier and that is installed removably on the image forming apparatus body.

Further, in the present invention, a "nearly rectangular metallic plate" is defined to include a nearly rectangular one as well as a rectangular one. Thus, one in which all or part of an angular section of the rectangular metallic plate is chamfered and an R-shaped one are also included in the "nearly rectangular metallic plate."

BRIEF DESCRIPTION OF THE DRAWINGS

FIG. 51A is a cross sectional view, and FIG. 51B is a bottom view;

DETAILED DESCRIPTION OF THE PREFERRED EMBODIMENTS

Figure 1:
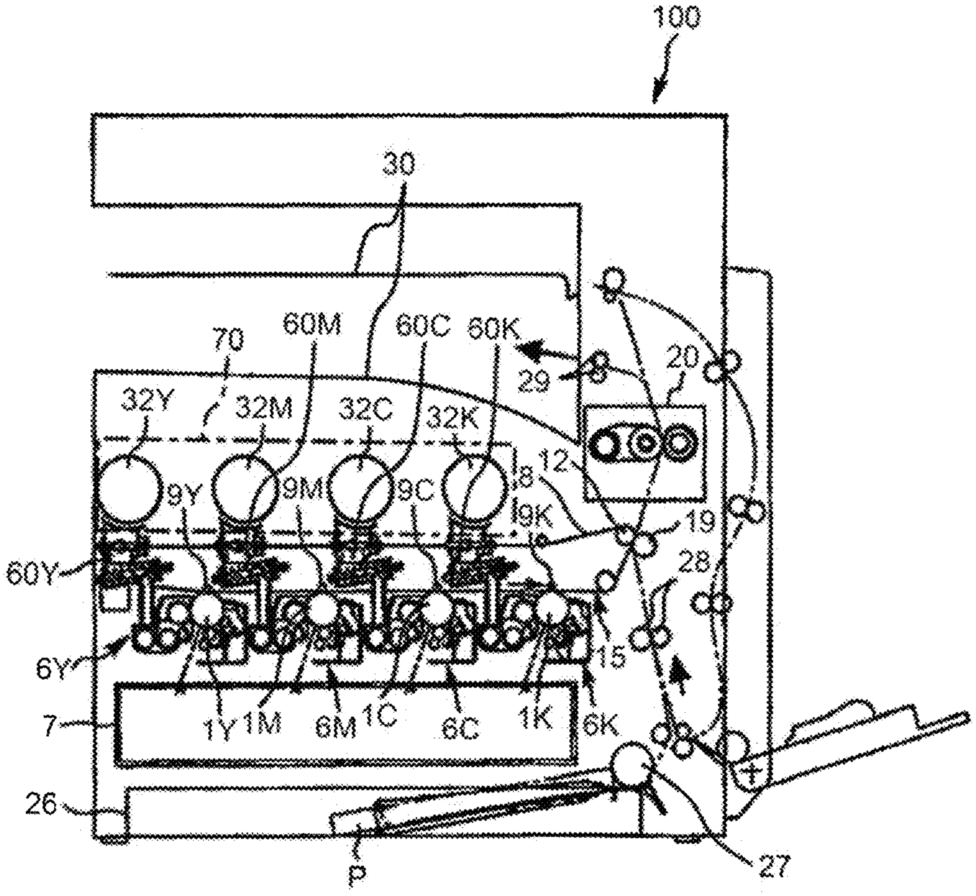
FIG. 1 is an overall configuration view illustrating an image forming apparatus according to an embodiment.

Hereinafter, embodiments of the present invention will be described in detail with reference to the accompanying drawings. In the drawings, the same or corresponding parts are denoted by the same reference numerals, and thus a duplicated description thereof will be appropriately simplified or omitted.

First Embodiment

A first embodiment of the present invention will be described in detail with reference to FIGS. 1 to 30.

First, a configuration and operation of the entire image forming apparatus will be described.

Figure 3:
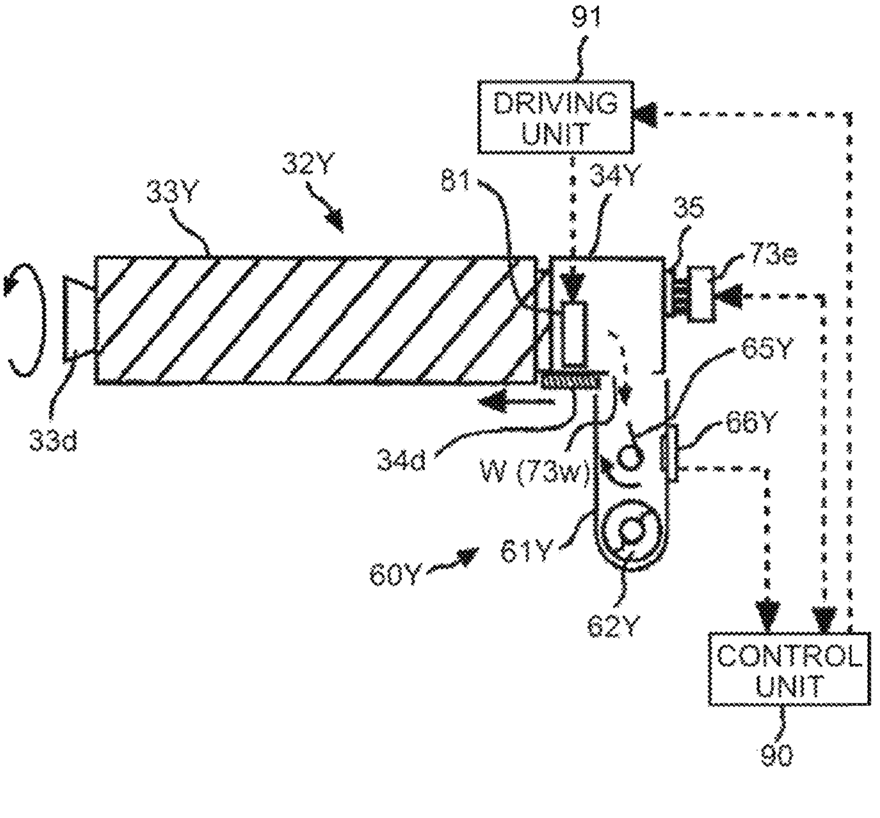
FIG. 3 is a schematic view illustrating a state in which a toner container is installed in a toner feeding device.
Figure 4:
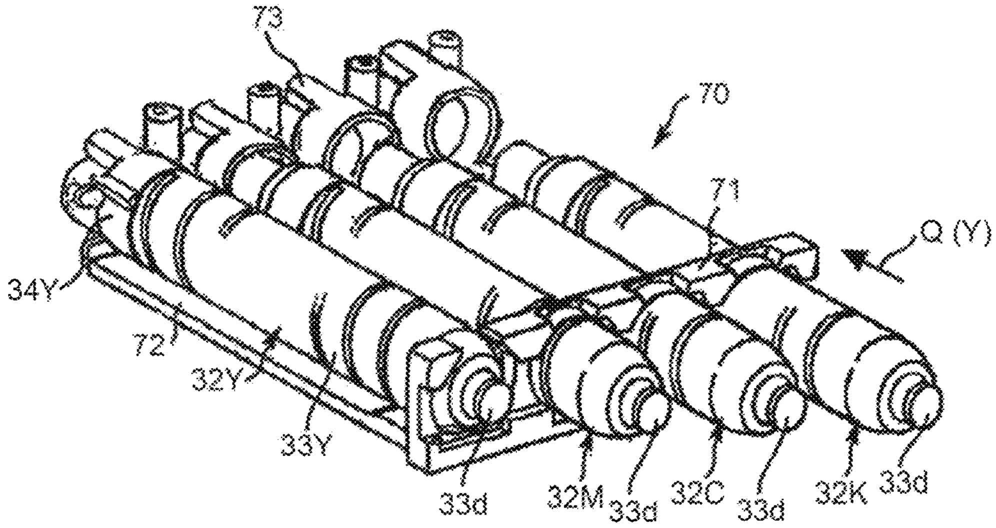
FIG. 4 is a schematic perspective view illustrating a state in which four toner containers are installed in a toner container storage unit.
Figure 5:
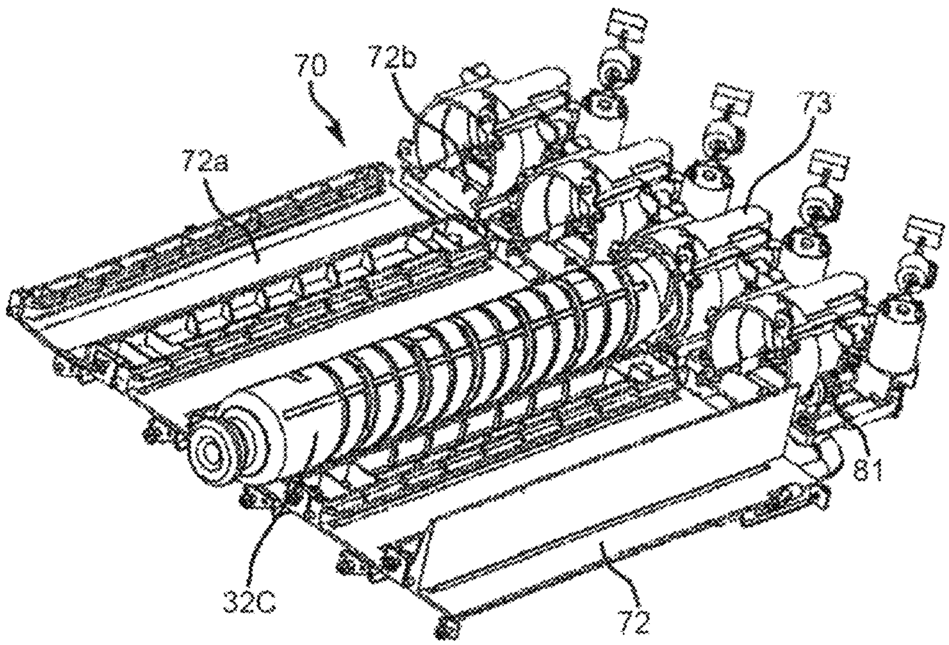
FIG. 5 is a schematic perspective view illustrating a state in which one toner container is installed in a toner container storage unit.

As illustrated in FIG. 1, in a toner container storage unit 70 above an image forming apparatus body 100, toner containers 32Y, 32M, 32C, and 32K (developer containers) are removably (replaceably) installed as four removable devices corresponding to respective colors (yellow, magenta, cyan, and black) (also see FIGS. 3 to 5).

An intermediate transfer unit 15 is disposed below the toner container storage unit 70. Image forming units 6Y, 6M, 6C, and 6K corresponding to respective colors (yellow, magenta, cyan, and black) are disposed in line to face an intermediate transfer belt 8 of the intermediate transfer unit 15.

Toner feeding devices 60Y, 60M, 60C, and 60K are disposed below the toner containers 32Y, 32M, 32C, and 32K as the removable devices (developer containers), respectively. The toners stored in the toner containers 32Y, 32M, 32C, and 32K are supplied (fed) to the inside of the developing devices of the image forming units 6Y, 6M, 6C, and 6K by the toner feeding devices 60Y, 60M, 60C, and 60K, respectively.

Figure 2:
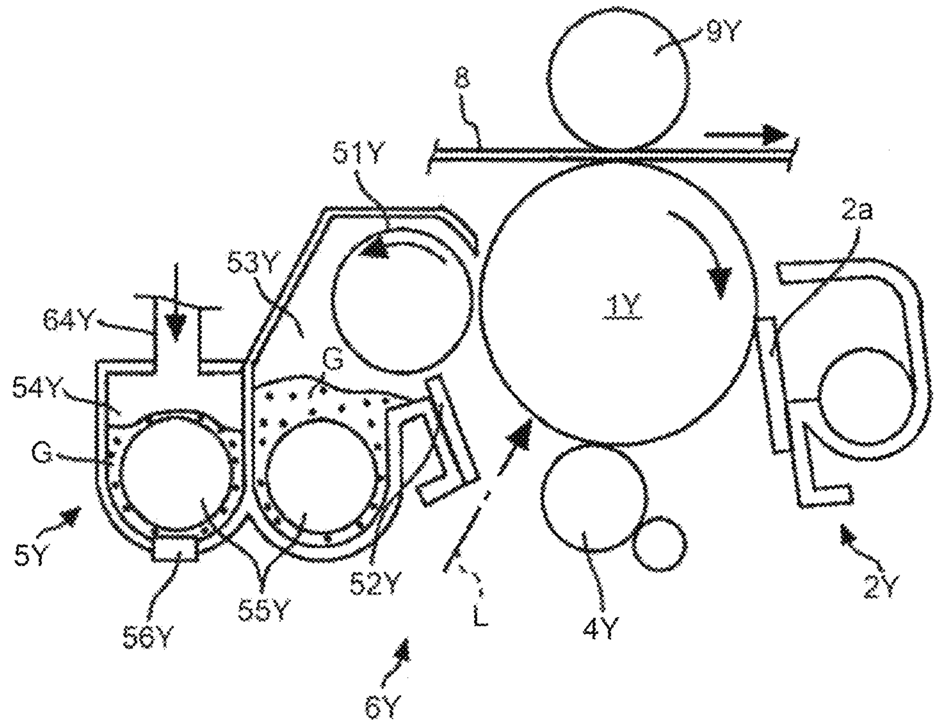
FIG. 2 is a cross sectional view illustrating an image forming unit.

Referring to FIG. 2, the image forming unit 6Y corresponding to yellow includes a photosensitive drum 1Y, a charging unit 4Y disposed around the photosensitive drum 1Y, a developing device 5Y (a developing section), a cleaning unit 2Y, a neutralizing unit (not shown), or the like. An image forming process (a charging process, an exposure process, a developing process, a transfer process, and a cleaning process) is performed on the photosensitive drum 1Y, and so a yellow image is formed on the photosensitive drum 1Y.

The remaining three image forming units 6M, 6C, and 6K have almost the same configuration as the image forming unit 6Y corresponding to yellow except that colors of used toner are different. Hereinafter, a description of the remaining three image forming units 6M, 6C, and 6K will be appropriately omitted, and a description will be made in connection with the image forming unit 6Y corresponding to yellow.

Referring to FIG. 2, the photosensitive drum 1Y is rotationally driven clockwise in FIG. 2 by a driving motor (not shown). The surface of the photosensitive drum 1Y is uniformly charged at the position of the charging unit 4Y (the charging process).

Thereafter, the surface of the photosensitive drum 1Y reaches an irradiation position of laser light L emitted from an exposure unit 7 (see FIG. 1), and an electrostatic latent image corresponding to yellow is formed by exposure scanning at this position (the exposure process).

Then, the surface of the photosensitive drum 1Y reaches the position facing the developing device 5Y, and the electrostatic latent image is developed at this position, so that a yellow toner image is formed (the developing process).

Next, the surface of the photosensitive drum 1Y reaches the position facing the intermediate transfer belt 8 and a primary transfer bias roller 9Y, and the toner image on the photosensitive drum 1Y is transferred onto the intermediate transfer belt 8 at this position (a primary transfer process). At this time, a slight amount of non-transfer toner remains on the photosensitive drum 1Y.

Thereafter, the surface of the photosensitive drum 1Y reaches the position facing the cleaning unit 2Y, and the non-transfer toner remaining on the photosensitive drum 1Y is mechanically collected by a cleaning blade 2*a* at this position (the cleaning process).

Finally, the surface of the photosensitive drum 1Y reaches the position facing the neutralizing unit (not shown), and residual potential on the photosensitive drum 1Y is removed at this position.

Thus, a series of image forming processes performed on the photosensitive drum 1Y are finished.

The above described image forming process is performed even in the other image forming units 6M, 6C, and 6K in the same manner as in the yellow image forming unit 6Y. That is, the laser light L based on image information is irradiated from the exposure unit 7 disposed below the image forming units onto the photosensitive drums of the image forming units 6M, 6C, and 6K. Specifically, the exposure unit 7 emits the laser light L from a light source and irradiates the laser light L onto the photosensitive drum through a plurality of optical elements while scanning the laser light L by a polygon mirror that is rotationally driven.

Thereafter, toner images of respective colors formed on the respective photosensitive drums through the developing process are transferred onto the intermediate transfer belt 8 in a superimposed manner. As a result, a color image is formed on the intermediate transfer belt 8.

Referring to FIG. 1, the intermediate transfer unit 15 includes the intermediate transfer belt 8, four primary transfer bias rollers 9Y, 9M, 9C, and 9K, a secondary transfer bias roller 12, a plurality of tension rollers, an intermediate transfer cleaning unit, and the like. The intermediate transfer belt 8 is stretched over and supported by a plurality of roller members and endlessly moves in a direction of an arrow in FIG. 1 as one roller member 12 is rotationally driven.

The four primary transfer bias rollers 9Y, 9M, 9C, and 9K sandwich the intermediate transfer belt 8 together with the photosensitive drums 1Y, 1M, 1C, and 1K, respectively, to form primary transfer nips. A transfer bias reverse to a polarity of the toner is applied to the primary transfer bias rollers 9Y, 9M, 9C, and 9K.

The intermediate transfer belt 8 moves in a direction of an arrow and sequentially passes through the primary transfer nips of the primary transfer bias rollers 9Y, 9M, 9C, and 9K. The toner images of respective colors on the photosensitive drums 1Y, 1M, 1C, and 1K are primary-transferred onto the intermediate transfer belt 8 in a superimposed manner.

Thereafter, the intermediate transfer belt 8 onto which the toner images of respective colors are transferred in a superimposed manner reaches the position facing a secondary transfer roller 19. At this position, the secondary transfer bias roller 12 sandwiches the intermediate transfer belt 8 together with the secondary transfer roller 19 to form a secondary transfer nip. The toner images of four colors formed on the intermediate transfer belt 8 are transferred onto a recording medium P such as a transfer sheet conveyed to the position of the secondary transfer nip. At this time, the non-transfer toner that has not been transferred onto the recording medium P remains on the intermediate transfer belt 8.

Thereafter, the intermediate transfer belt 8 reaches the position of the intermediate transfer cleaning unit (not shown). At this position, the non-transfer toner on the intermediate transfer belt 8 is collected.

As a result, a series of transfer processes performed on the intermediate transfer belt 8 are finished.

The recording medium P conveyed to the position of the secondary transfer nip is conveyed through a paper feeding roller 27, a pair of resist rollers 28, and the like from a paper feeding unit 26 disposed below the apparatus body 100.

Specifically, a plurality of recording media P such as transfer sheets are stored in a superimposed manner in the paper feeding unit 26. If the paper feeding roller 27 is rotationally driven counterclockwise in FIG. 1, the top recording medium P is fed toward between the rollers of the pair of resist rollers 28.

The recording medium P fed to the pair of resist rollers 28 stops at the position of a roller nip of the pair of resist rollers 28 that has stopped rotational driving. In synchronization with timing of the color image on the intermediate transfer belt 8, the pair of resist rollers 28 is rotationally driven, and the recording medium P is conveyed toward the secondary transfer nip. Thus, a desired color image is transferred onto the recording medium P.

Thereafter, the recording medium P onto which the color image has been transferred at the position of the secondary transfer nip is conveyed to the position of a fixing device 20. At this position, the color image transferred onto the surface is fixed to the recording medium P by heat and pressure by a fixing belt and a pressing roller.

Thereafter, the recording medium P passes through between rollers of a pair of ejecting rollers 29 and then is ejected to the outside of the apparatus. A recording medium P ejected to the outside of the apparatus by the pair of ejecting rollers 29 is sequentially stacked on a stack unit 30 as an output image.

Thus, in the image forming apparatus, a series of image forming processes are finished.

Next, a configuration and operation of the developing device in the image forming unit will be described in further detail with reference to FIG. 2.

The developing device 5Y includes a developing roller 51Y facing the photosensitive drum 1Y, a doctor blade 52Y facing the developing roller 51Y, two conveying screws disposed in developer storage units 53Y and 54Y, a density detecting sensor 56Y for detecting the density of the toner contained in the developer, and the like. The developing roller 51Y is configured with a magnet fixedly disposed to the inside thereof, a sleeve rotating around the magnet, and the like. A two-component developer G composed of a carrier and a toner is stored in the developer storage units 53Y and 54Y. The developer storage unit 54Y is communicated with a toner falling conveying path 64Y through an opening formed thereabove.

The developing device 5Y having the above described configuration operates as follows.

The sleeve of the developing roller 51Y rotates in a direction of an arrow in FIG. 2. The developer G supported on the developing roller 51Y by a magnetic field formed by the magnet moves on the developing roller 51Y as the sleeve rotates.

The developer G inside the developing device 5Y is adjusted so that a ratio of toner (toner density) contained in the developer can be within a predetermined range. Specifically, as the toner inside the developing device 5Y is consumed, the toner stored in the toner container 32Y is fed to the inside of the developer storage unit 54Y through the toner feeding device 60Y (for example, see FIG. 3). A configuration and operation of the toner feeding device will be described later in detail.

Thereafter, the toner fed to the inside of the developer storage unit 54Y circulates through the two developer storage units 53Y and 54Y while being mixed and agitated together with the developer G by the two conveying screws 55Y (movement in a direction vertical to a paper plane of FIG. 2). The toner in the developer G is absorbed into the carrier by frictional electrification with the carrier and supported on the developing roller 51Y together with the carrier by magnetic force formed on the developing roller 51Y.

The developer G supported on the developing roller 51Y is conveyed in a direction of an arrow in FIG. 2 and then reaches the position of the doctor blade 52Y. The developer G on the developing roller 51Y is adjusted to an appropriate developer amount at this position and then conveyed up to the position (a developing area) facing the photosensitive drum 1Y. The toner is absorbed into a latent image formed on the photosensitive drum 1Y by a magnetic field formed on the developing area. Thereafter, as the sleeve rotates, the developer G remaining on the developing roller 51Y reaches above the developer storage unit 53Y and leaves the developing roller 51Y at this position.

Next, the toner feeding devices 60Y, 60M, 60C, and 60K will be described in detail with reference to FIGS. 3 to 5.

Referring to FIG. 3, the toners inside the toner containers 32Y, 32M, 32C, and 32K installed in the toner container storage unit 70 of the apparatus body 100 are appropriately fed to the inside of the developing devices by the toner feeding devices 60Y, 60M, 60C, and 60K respectively installed for toner colors as the toners inside the developing devices of respective colors are consumed.

The four toner feeding devices 60Y, 60M, 60C, and 60K and the toner containers 32Y, 32M, 32C, and 32K (the developer containers) have almost the same configuration except that the toner colors used in the image forming process are different. Thus, a description will be made focusing on the toner feeding devices 60Y and the toner container 32Y corresponding to yellow, and a description of the toner feeding devices 60M, 60C, and 60K and the toner containers 32M, 32C, and 32K corresponding to the remaining three colors will be appropriately omitted.

Referring to FIG. 1, if a body cover (not shown) installed on the front side of the apparatus body 100 (the front side in a direction vertical to the paper plane in FIG. 1) is opened, the toner container storage unit 70 (an insertion opening 71) is exposed. In the state in which a longitudinal direction of the toner containers 32Y, 32M, 32C, and 32K (the developer containers) is a horizontal direction, performed is an attaching/detaching operation of the toner containers 32Y, 32M, 32C, and 32K to/from the front side of the apparatus body 100 (an attaching/detaching operation in which the longitudinal direction of the toner container is an attaching/detaching direction).

As illustrated in FIG. 4, when the toner containers 32Y, 32M, 32C, and 32K are mounted on the toner container storage unit 70 of the apparatus body 100 (movement in a direction of an arrow Q), in conjunction with the mounting operation, a shutter member 34*d* of the toner containers 32Y, 32M, 32C, and 32K moves, and so a toner discharge opening W (a discharging opening) is opened, so that toner feeding openings 73*w* (for example, see FIG. 3) of the toner feeding devices 60Y, 60M, 60C, and 60K are communicated with the toner discharge opening W. The toner stored in the toner containers 32Y, 32M, 32C, and 32K is discharged from the toner discharge opening W and stored in a toner tank unit 61Y through the toner feeding opening 73*w* of the toner feeding devices 60Y, 60M, 60C, and 60K.

Referring to the schematic view of FIG. 3, the toner container 32Y includes a cap section 34Y that is a nearly cylindrical-shaped toner bottle and is usually non-rotatably held on the toner container storage unit 70 and a container body 33Y (a bottle body) in which a gear 33*c* is integrally formed. The container body 33Y is relatively rotatably held on the cap section 34Y and is rotationally driven in a direction of an arrow in FIG. 3 by a driving unit 91 (including a driving motor, a driving gear 81, and the like). As the container body 33Y rotates, the toner stored inside the toner container 32Y (the container body 33Y) is conveyed in a longitudinal direction (conveyance from the left to the right in FIG. 3) by a protrusion 33*b* formed on an inner peripheral surface of the container body 33Y in a helical form, and the toner is discharged from the toner discharge opening W of the cap section 34Y. That is, as the container body 33Y of the toner container 32Y is appropriately rotationally driven by the driving unit 91, the toner is appropriately supplied to the toner tank unit 61Y. Further, when each of the toner containers 32Y, 32M, 32C, and 32K reaches the end of its life (when the stored toner is almost consumed and becomes empty), it is replaced with a new one.

Referring to FIG. 3, the toner feeding devices 60Y, 60M, 60C, and 60K include the toner container storage unit 70, the toner tank unit 61Y, a toner conveying screw 62Y, an agitating member 65Y, a toner end sensor 66Y, the driving unit 91, and the like.

The toner tank unit 61Y is disposed below the toner discharge opening W of the toner container 32Y and stores the toner discharged from the toner discharge opening W of the toner container 32Y. The bottom of the toner tank unit 61Y is connected with an upstream section of the toner conveying screw 62Y.

The toner end sensor 66Y that detects that the toner stored in the toner tank unit 61Y has become smaller than a predetermined amount is installed on the wall surface of the toner tank unit 61Y (at the position of a predetermined height from the bottom). A piezoelectric sensor or the like may be used as the toner end sensor 66Y. When the control unit 90 detects that the toner stored in the toner tank unit 61Y has become smaller than a predetermined amount (toner end detection) through the toner end sensor 66Y, the driving unit 91 rotationally drives the container body 33Y the toner container 32Y during a predetermined time under control of the control unit 90, so that the toner is fed to the toner tank unit 61Y. Further, when toner end detection by the toner end sensor 66Y is not released even if such control is repeated, it is recognized that there is no toner in the toner container 32Y, and a message for encouraging the replacement of the toner container 32Y is displayed on a display unit (not shown) of the apparatus body 100.

Further, the agitating member 65Y that prevents the toner stored in the toner tank unit 61Y from being agglomerated is installed on the central section of the toner tank unit 61Y (near the toner end sensor 66Y). The agitating member 65Y has a flexible member installed on a shaft section and rotates clockwise in FIG. 3 to agitate the toner inside the toner tank unit 61Y. Further, the leading end of the flexible member of the agitating member 65Y comes in sliding contact with the detection surface of the toner end sensor 66Y at a rotation period, thereby preventing a problem in that the toner is fixed to the detection surface of the toner end sensor 66Y and so a degree of detection accuracy decreases.

Even though not shown, the toner conveying screw 62Y conveys the toner stored in the toner tank unit 61Y obliquely upward. Specifically, the toner conveying screw 62Y linearly conveys the toner from the bottom of the toner tank unit 61Y (the lowest point) toward the top of the developing device 5Y. The toner conveyed by the toner conveying screw 62Y falls through the toner falling conveying path 64Y (for example, see FIG. 2) by its own weight and is fed to the inside of the developing device 5Y (the developer storage unit 54Y).

Referring to FIG. 4, the toner container storage unit 70 mainly includes a cap receiving section 73 for holding the cap section 34Y of the toner container 32Y, a bottle receiving section 72 (a container body bearing) for holding the container body 33Y of the toner container 32Y, and an insertion opening 71 that functions as an insertion opening at the time of the mounting operation of the toner container 32Y.

Next, the toner container storage unit 70 (the bottle receiving section 72 and the cap receiving section 73) will be described in detail with reference to FIGS. 6 to 17.

Figure 6:
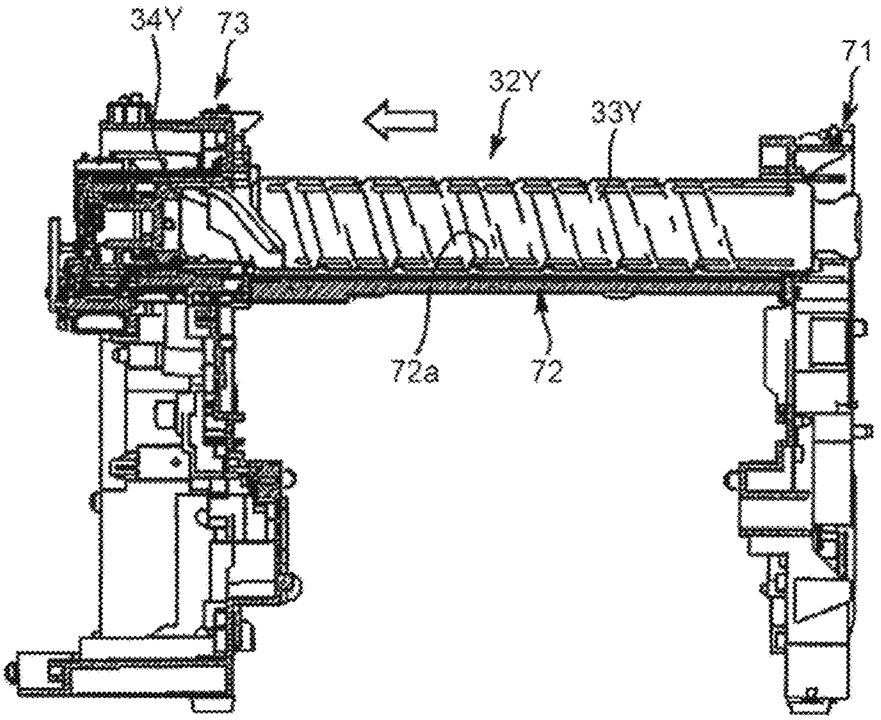
FIG. 6 is a side view illustrating a state in which a toner container is installed in a toner container storage unit.

First, as described above with reference to FIGS. 4 and 5, the bottle receiving section 72, the cap receiving section 73, and the insertion opening 71 (that is not shown in FIG. 5) are formed in the toner container storage unit 70. The toner container 32Y is mounted on the toner container storage unit 70 through the insertion opening 71 by a user gripping a gripping section 33*d* in a state in which the longitudinal direction is the horizontal direction and the longitudinal direction is the mounting direction in which the cap section 34Y is the head of the container body 33Y. The toner container 32Y inserted through the insertion opening 71 is pushed toward the cap receiving section 73 by the user while sliding on a bottle receiving surface 72*a* of the bottle receiving section 72 (for example, see FIGS. 5, 6, and 9). Referring to FIG. 6, in the bottle receiving section 72, the bottle receiving surface 72*a* is formed for each color, and the toner containers 32Y, 32M, 32C, and 32K corresponding to respective colors are inserted (inserted in a direction of a white allow). Further, referring to FIG. 8, even in the cap receiving section 73, bottle receiving sections 73Y, 73M, 73C, and 73K are formed for respective colors, and the toner containers 32Y, 32M, 32C, and 32K corresponding to respective colors are inserted (inserted in a direction of a white allow). At this position, the cap receiving section is non-rotatably held.

Figure 24A:
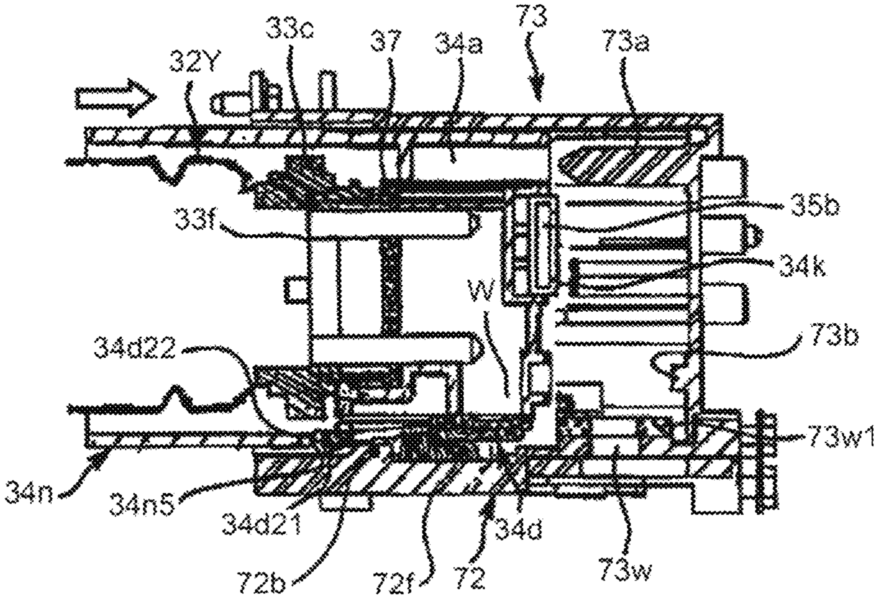
FIGS. 24A to 24C are schematic views illustrating an opening operation of a shutter member that is in conjunction with a mounting operation of a toner container on a toner container storage unit.

Referring to FIGS. 5 and 24(A), the bottle receiving surface 72*a*, a stopper release urging section 72*b*, and the like are formed in the bottle receiving section 72 of the toner container storage unit 70.

The bottle receiving surface 72*a* functions as a sliding surface of the toner container 32Y at the time of the attaching/detaching operation of the toner container 32Y and functions as a holding unit of the rotationally driven container body 33Y after the toner container 32Y has been completely set.

Referring to FIG. 5, the stopper release urging section 72*b* is a trapezoidal rib formed above the bottle receiving surface 72*a* (at the downstream side of the toner container 32Y in the mounting direction). Referring to FIG. 24, the stopper release urging section 72*b* pushes a stopper release section 34*d*21 of the shutter member 34*d* up and releases a contact state between a stopper section 34*d*22 and a contact section 34*n*5 in conjunction with the mounting operation of the toner container 32Y (allows an opening operation of the shutter member 34*d*).

Figure 14A:
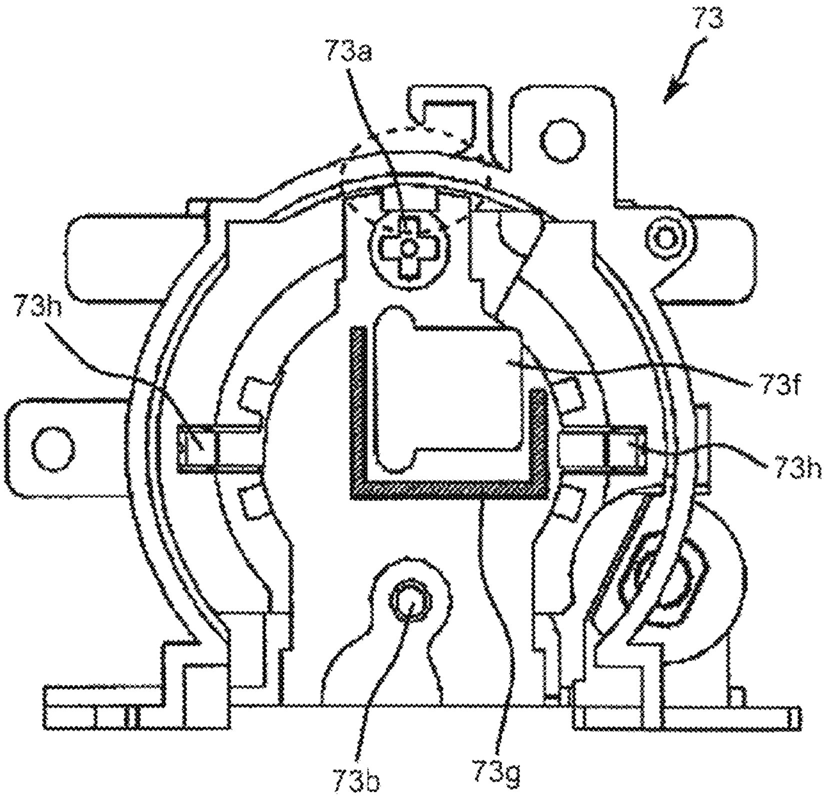
FIG. 14A is a back view illustrating a cap receiving section.
Figure 14B:
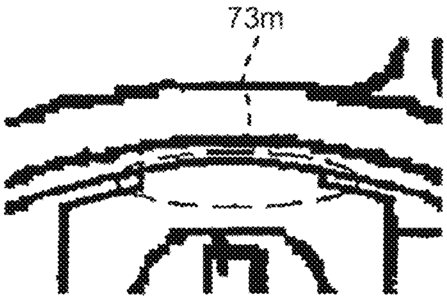
FIG. 14B is a partial enlarged view illustrating a neighborhood of a contacted groove encircled by a dotted line in a cap receiving section of FIG. 14A.
Figure 15:
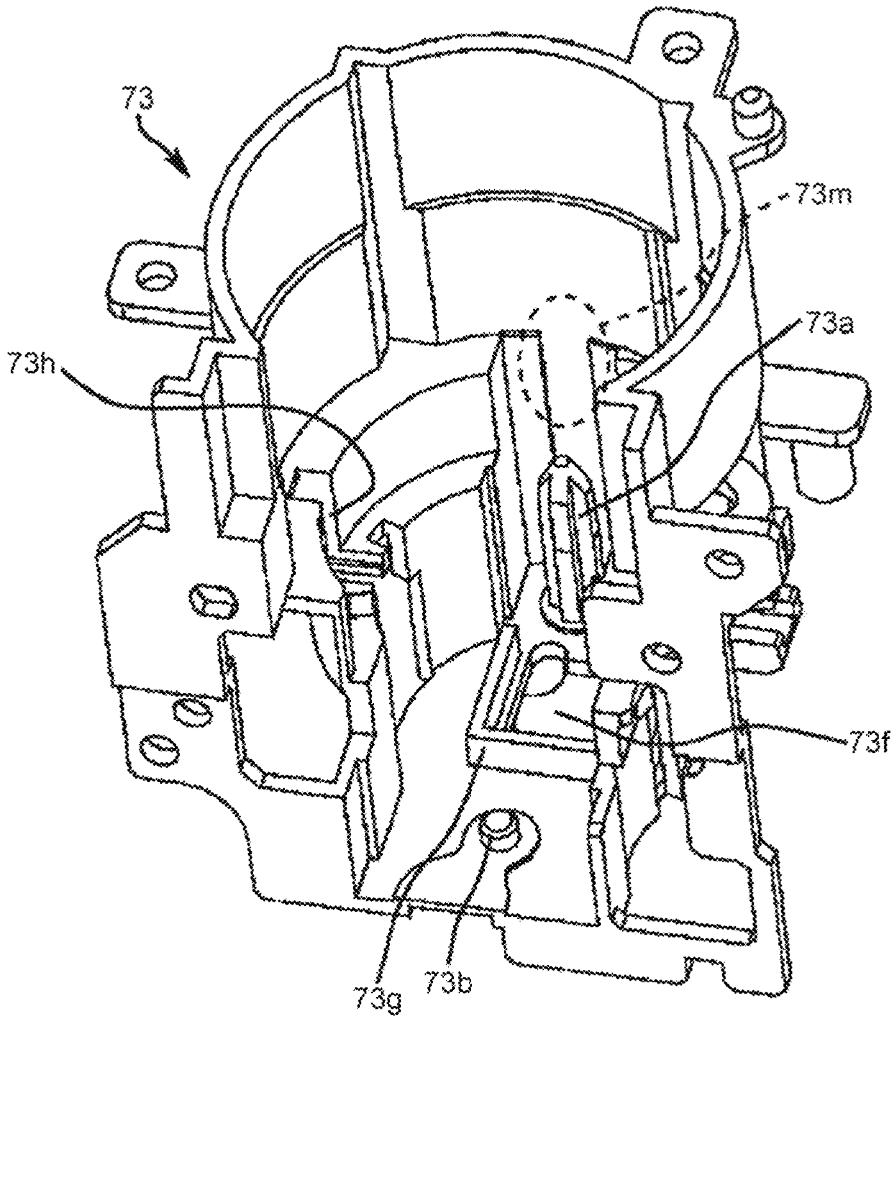
FIG. 15 is a perspective view illustrating a cap receiving section from obliquely below.

Referring to FIGS. 14A, 14B, and 15, in the cap receiving section 73 of the toner container storage unit 70, a main reference pin 73*a*, a sub reference pin 73*b*, a contacted groove 73*m*, a lateral groove 73*h*, a wall section 73*g*, a through hole 73*f*, and the like are disposed.

Figure 20:
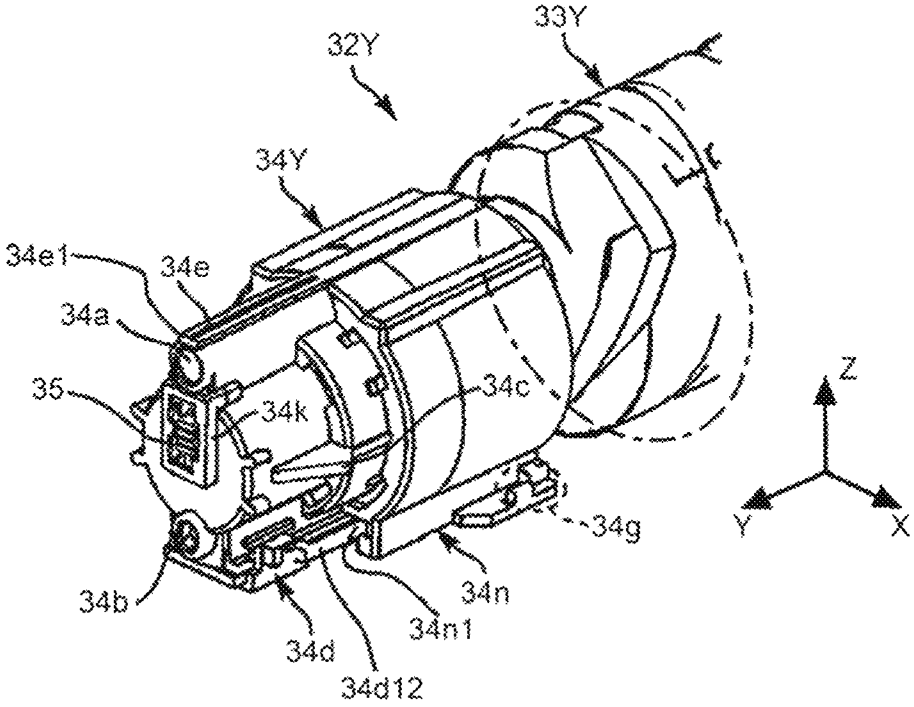
FIG. 20 is a perspective view illustrating a cap section side of a toner container from obliquely below.
Figure 21:
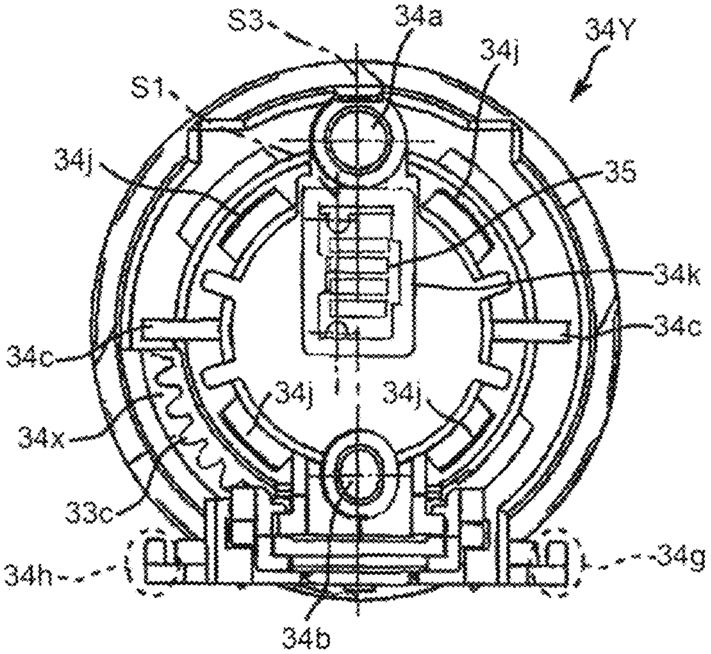
FIG. 21 is a front view illustrating a toner container from a cap section side.

The main reference pin 73*a* and the sub reference pin 73*b* as positioning pins are fitted into a first positioning hole 34*a* and a second positioning hole 34*b* of the cap section 34Y of the toner container 32Y illustrated in FIGS. 20 and 21, respectively. Positioning of the cap section 34Y is performed in the cap receiving section 73.

Figure 7:
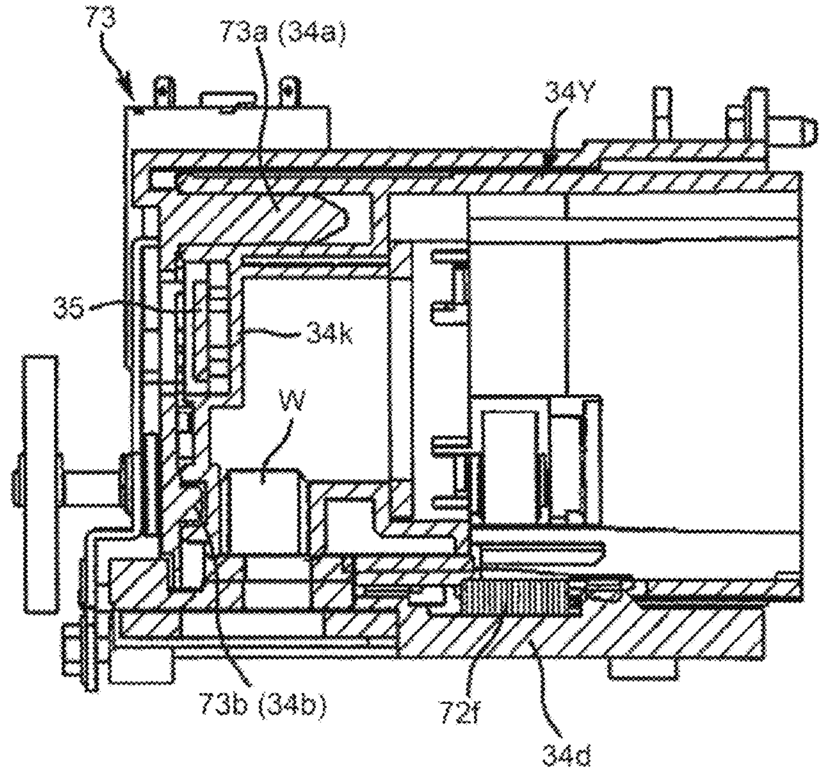
FIG. 7 is a cross sectional view illustrating a state in which a cap section is installed in a cap receiving section.

Referring to FIG. 7, the main reference pin 73*a* is formed to be longer than the sub reference pin 73*b* in the longitudinal direction (the position of the reference surface that is the base section is formed on the same plane surface). Further, the main reference pin 73*a* has a tapered leading end portion. Thus, in the attaching operation of the toner container 32Y to the cap receiving section 73 in the longitudinal direction, the toner container 32Y can be smoothly mounted on the cap receiving section 73.

Further, referring to FIGS. 14A, 14B, and 15, the contacted groove 73*m* is the inner wall of the cap receiving section 73 and is also a concave section that is formed, above the main reference pin 73*a*, in a groove shape at an upstream side in the mounting direction further than the leading end section of the main reference pin 73*a*. A guide rail section 34*e* that is formed to extend in the longitudinal direction in an upper outer circumference of the cap section 34Y of the toner container 32Y which will be described later is fitted into the contacted groove 73*m* before the main reference pin 73*a* is inserted into the positioning hole 34*a*.

Figure 12:
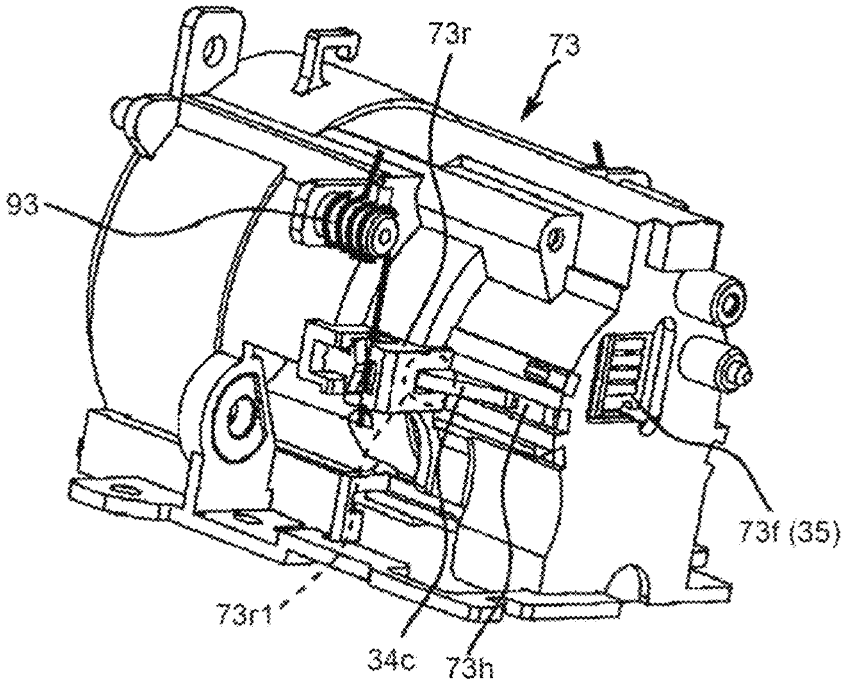
FIG. 12 is a perspective view illustrating a cap receiving section to which a cap section is set.
Figure 13:
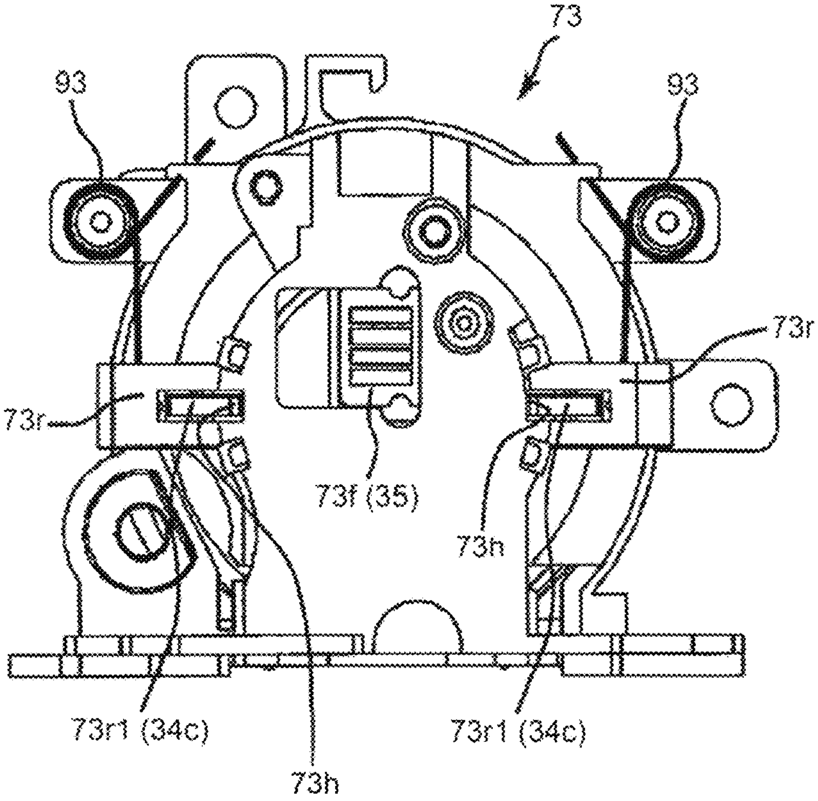
FIG. 13 is a front view illustrating a cap receiving section in a state in which a cap section is set.

Referring to FIGS. 12 and 15, the lateral groove 73*h* that is formed to extend in the longitudinal direction and is penetrated toward the outer circumferential side of the cap receiving section 73 is formed on each of both sides of the inner wall of the cap receiving section 73 in a left-right symmetrical relation. Further, referring to FIGS. 12 and 13, cap section sandwiching members 73*r* that have a nearly pentagonal shape when viewed from the top and a groove section 73*r*1 (that is formed to be connected with a lateral groove 73*h*) when viewed in the longitudinal direction are disposed on an outer circumferential side of the cap receiving section 73 in a left-right symmetrical relation.

The cap section sandwiching member 73*r* is formed of a member different from the cap receiving section 73, fitted into a dent formed on the outer circumferential surface of the cap receiving section 73, urged by a torsion coil spring 93 disposed thereabove centering on a cylindrical axis, and thus pressed against the side of the lateral groove 73*h*. As a result, the lateral groove 73*h* is connected with the groove section 73*r*1 of the cap section sandwiching member 73*r*, and a pair of deeper left and right groove sections is apparently formed.

In the case of attaching or detaching the toner container 32Y, the lateral protrusion 34*c* formed in the cap section 34Y pushes and passes through the cap section sandwiching member 73*r* urged by the torsion coil spring 93 inside the above described deeper groove section (one in which the groove section 73*r*1 is formed integrally with the lateral groove 73*h*). Thus, the user who performs the attaching/detaching operation of the toner container 32Y to/from the image forming apparatus body 100 (the cap receiving section 73) can feel a click feeling synchronized with the attaching/detaching operation and perform the attaching/detaching operation of the toner container 32Y at an optimum speed (acceleration) other than a half-hearted speed.

Referring to FIGS. 14A and 15, on the inner side wall surface of the cap receiving section 73 (the wall surface rising in a vertical direction at an apparatus direction inner side), the through hole 73*f* having a shape obtained by connecting and overlapping edge lines of an elliptical hole and a quadrate hole extending in the vertical direction is formed. A connector 73*e* (for example, see FIG. 16) which will be described later is installed to be exposed in the inner wall side of the cap receiving section 73 through the through hole 73*f* (for example, see FIG. 17). When the toner container 32Y is mounted on the cap receiving section 73 (the apparatus body 100), the connector 73*e* comes in face contact with an ID chip 35 disposed at the leading end of the cap section 34Y, and so information communication can be performed between the ID chip 35 and the apparatus body 100 (the control unit 90).

An installation form of the connector 73*e* on the cap receiving section 73 of the toner container storage unit 70 will be described below.

Figure 8:
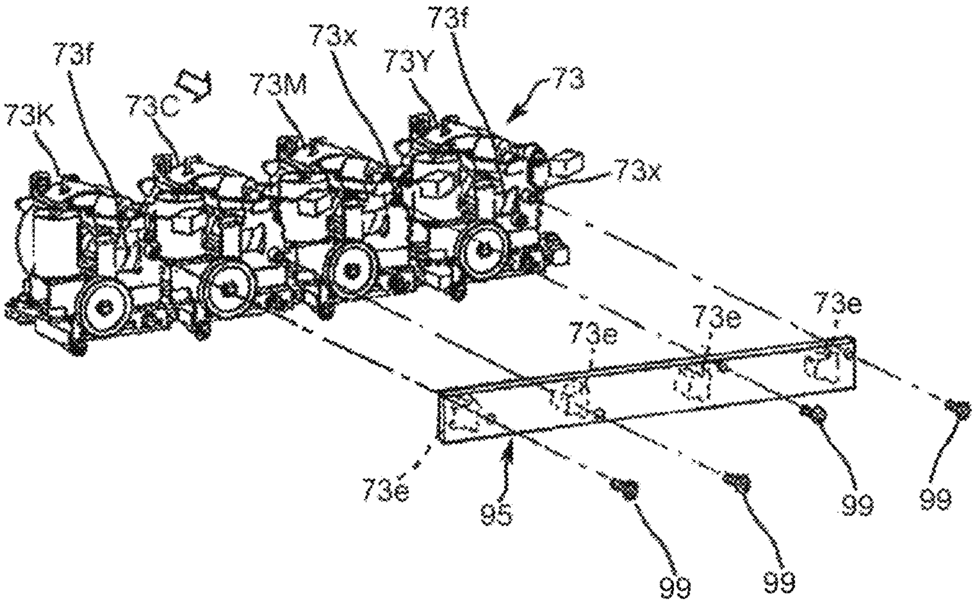
FIG. 8 is a perspective view illustrating a cap receiving section of a toner container storage unit.
Figure 9:
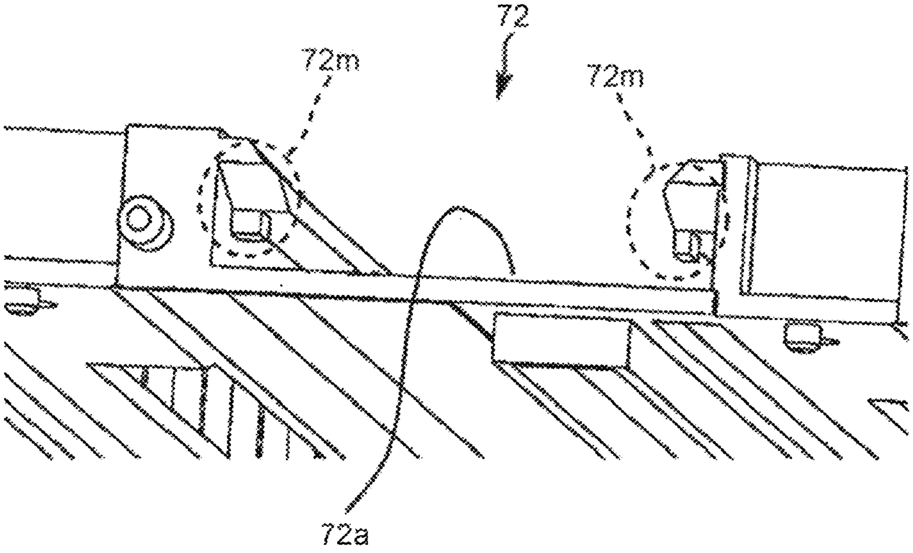
FIG. 9 is an enlarged perspective view illustrating a neighborhood of a leading end section of a bottle receiving section.

The four connectors 73*e* are disposed in the cap receiving sections 73, corresponding to the toner containers 32Y, 32M, 32C, and 32K of respective colors of yellow, magenta, cyan, and black. Referring to FIG. 8, the four connectors 73*e* are disposed in line on a single rectangular common electronic substrate 95. Specifically, by fitting a snap fit 73*e*4 formed on the bottom of the connector 73*e* into a hole (not shown) formed in the common electronic substrate 95, the connector 73*e* is fixed onto the common electronic substrate 95.

Figure 17:
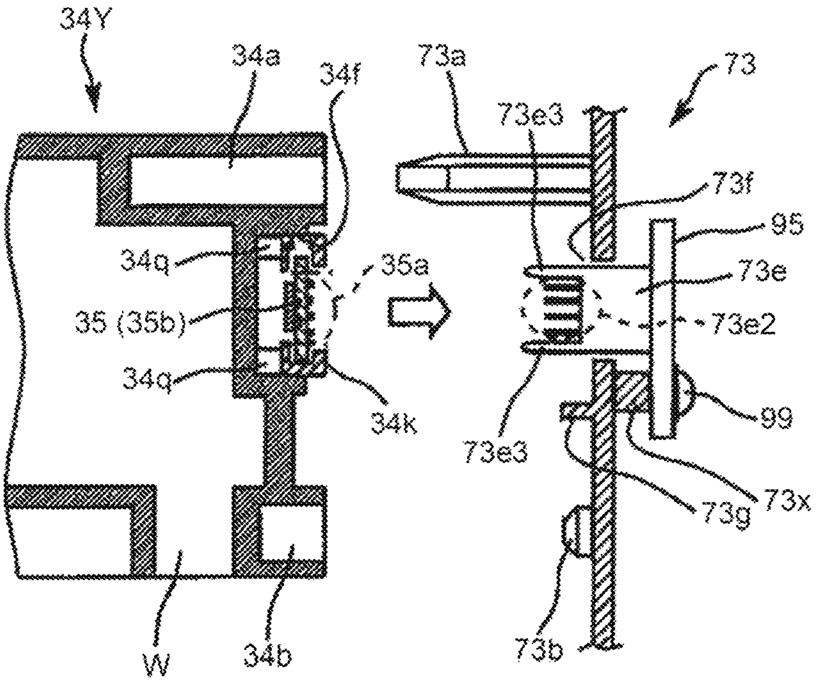
FIG. 17 is a schematic view illustrating a state in which an information storage device of a cap section is set to a connector of a cap receiving section.

Further, referring to FIGS. 8 and 17, the common electronic substrate 95 to which the four connectors 73*e* are fixed are installed and fixed along the arrangement direction of the four cap receiving sections 73K, 73C, 73M, and 73Y in the state in which the four connectors 73*e* are inserted into the inside of the cap receiving section 73 through the through holes 73*f*, respectively. Specifically, four screws 99 are screwed into female screw sections 73*x* formed below the outer wall sections of the four cap receiving sections 73K, 73C, 73M, and 73Y through holes formed in the common electronic substrate 95, and the common electronic substrate 95 is screw-coupled with the cap receiving section 73 from the outside.

A configuration and operation of the connector 73*e* will be described below.

Figure 16:
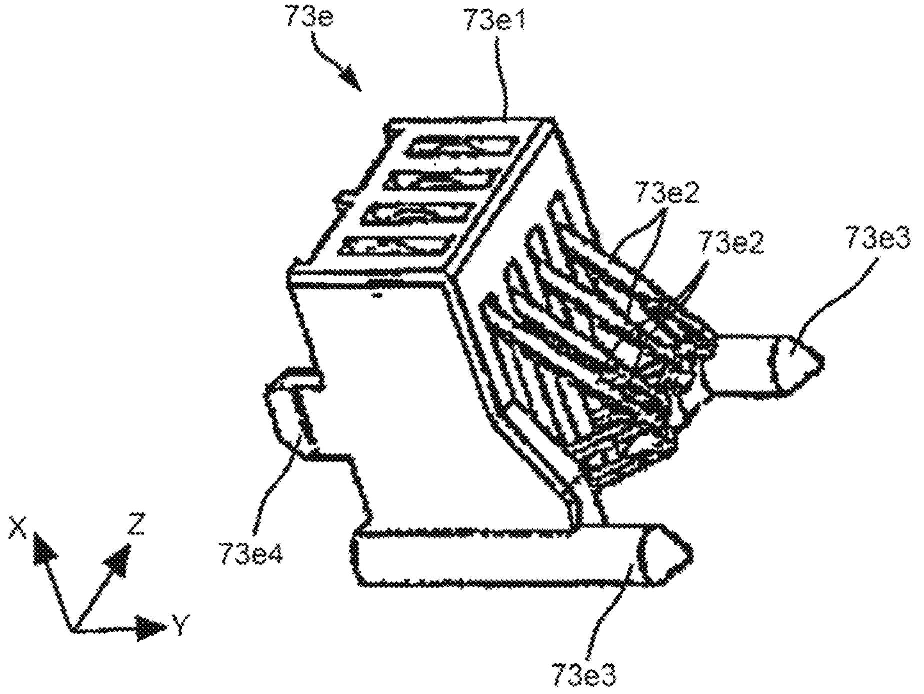
FIG. 16 is a perspective view illustrating a connector.

Referring to FIG. 16, the connector 73*e* includes a connector body 73*e*1, four body side terminals 73*e*2, two positioning pins 73*e*3 (positioning protruding sections), and the like. The four body side terminals 73*e*2 of the connector 73*e* are flat (or linear) metallic members, respectively, have one terminal side as a fixed terminal and the other terminal side as a free end, and are fixed to the connector body 73*e*1. The four body side terminals 73*e*2 have curved sections (sections that become contact points with a metallic pad 35*a* as a metallic plate) that curve toward the side of the ID chip 35 at the other end side thereof. By the mounting operation of the cap section 34Y to the cap receiving section 73, the curved section of the body side terminal 73*e*2 is displaced in a −X direction of FIG. 16 and slides toward the left in FIG. 29 (near a first virtual line S1) from a longitudinal direction central section while gradually increasing contact pressure on the metallic pad 35*a* (the metallic plate) of the ID chip 35 disposed in the cap section 34Y.

As illustrated in FIG. 16, the leading end section of the positioning pin 73*e*3 has a tapered shape so that engagement with a notch 35*b*1 of the ID chip 35 can be smoothly performed.

Referring to FIGS. 14A, 14B, 15, and 17, a wall section 73*g* is installed to surround the lower section and the side section of the through hole 73*f* in which the connector 73*e* is installed. By forming the wall section 73*g*, even if the toner is scattered from the vicinity of the toner discharge opening W of the toner container 32Y to the outside, since the scattered toner is blocked by the wall section 73*g*, the scattered toner is difficult to stick directly to the connector 73*e* and the ID chip 35. Thus, a contact failure (a communication failure) between the connector 73*e* (the body side terminal 73*e*2) and the ID chip 35 (the metallic pad 35*a*) caused by the scattered toner can be suppressed.

Necessary information is exchanged between the ID chip 35 (the information storage device) of the toner containers 32Y, 32M, 32C, and 32K and the connector 73*e* of the apparatus body 100. Information communicated between both sides includes information such as a manufacturing number, a manufacturing date, and the number of recycling times of the toner container or the ID chip, information such as capacity, a lot number, and color of a toner, and information such as a use history of the image forming apparatus body 100. In the ID chip 35 (the information storage device), the electronic information is stored in advance before it is installed in the image forming apparatus body 100 (or information received from the apparatus body 100 after it is installed is stored). The ID chip 35 (the information storage device) will be described later in further detail.

Next, the toner containers 32Y, 32M, 32C, and 32K will be described in detail with reference to FIGS. 18 to 30.

Figure 18:
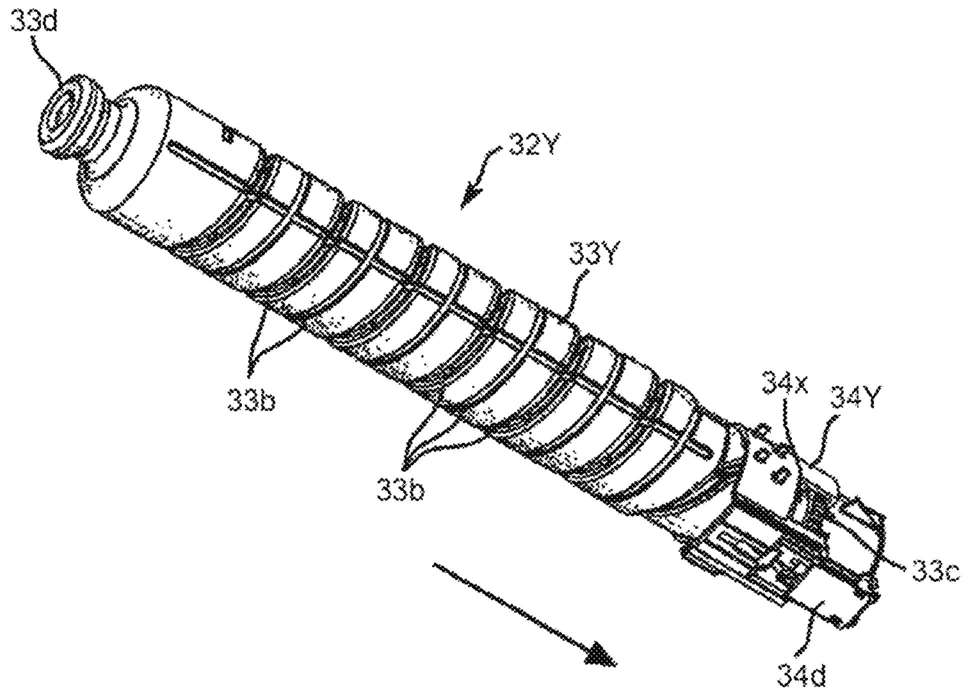
FIG. 18 is a perspective view illustrating a toner container from obliquely below.
Figure 19:
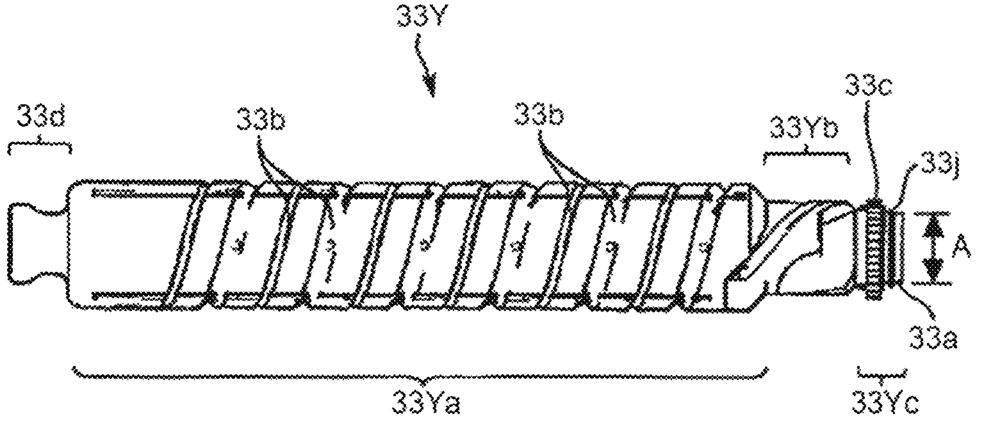
FIG. 19 is a side view illustrating a toner container.

Referring to FIGS. 18 to 20, the toner container 32Y mainly includes the container body 33Y (a bottle body) and the cap section 34Y (a bottle cap) disposed at the head thereof. Further, the ID chip 35 as the information storage device or the like is detachably installed in the cap section 34Y of the toner container 32Y.

Figure 30:
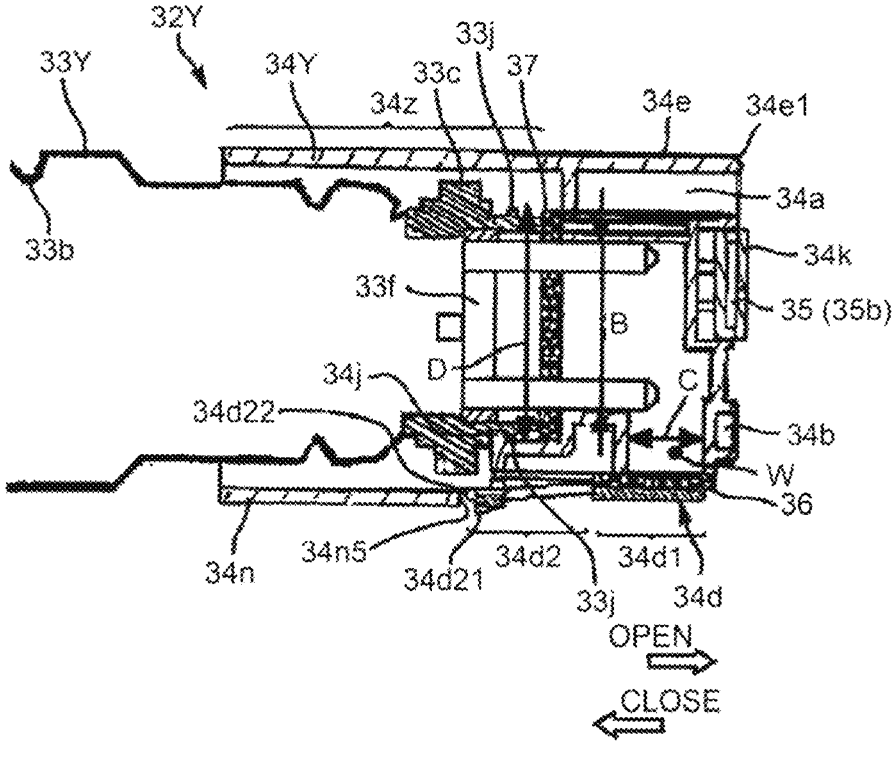
FIG. 30 is a cross sectional view illustrating a neighborhood of a cap section of a toner container.

On the head of the container body 33Y, the gear 33*c* that integrally rotates together with the container body 33Y and an opening A are disposed on one end side in the longitudinal direction (the left-right direction in FIG. 30) (for example, see FIGS. 19 and 30). The opening A is disposed on the head of the container body 33Y (the position that becomes the front side in the mounting operation) and discharges the toner stored in the container body 33Y toward the space inside the cap section 34Y (a hollow space, for example, see FIG. 30).

Further, as the toner is consumed at the image forming apparatus body side, toner conveyance from the inside of the container body 33Y to the hollow space inside the cap section 34Y (rotational driving of the container body 33Y) is appropriately performed.

The gear 33*c* meshes with a driving gear 81 disposed in the toner container storage unit 70 of the apparatus body 100 and rotationally drives the container body 33Y centering on a rotational shaft. Specifically, the gear 33*c* is exposed through a notch hole 34*x* (for example, see FIG. 18) formed on the outer circumferential surface of the cap section 34Y which will be described later and meshes with the driving gear 81 of the apparatus body 100 at the obliquely downward meshing position in FIGS. 3 and 21. Further, driving force is transferred from the driving gear 81 to the gear 33*c*, and the container body 33Y rotates clockwise in FIG. 21. In the present first embodiment, the driving gear 81 and the gear 33*c* are spur gears.

Referring to FIG. 18, on the other end side of the container body 33Y in the longitudinal direction (the rear end section in the mounting direction), the gripping section 33*d* gripped by the user when performing the attaching/detaching work of the toner container 32Y is disposed. The user mounts the toner container 32Y to the image forming apparatus body 100 while gripping the gripping section 33*d* (movement of the toner container 32Y in a direction of an arrow in FIG. 18).

Further, on the outer circumferential surface of the container body 33Y, the helical protrusion 33*b* (a helical groove when viewed from the outer circumference surface side) is disposed. The helical protrusion 33*b* rotationally drives the container body 33Y in a predetermined direction and discharges the toner through the opening A. The container body 33Y having the above described configuration may be fabricated by blow molding together with the gear 33*c* disposed on the circumferential surface thereof and the gripping section 33*d*.

Referring to FIG. 30, in the toner container 32Y according to the present first embodiment, an agitating member 33*f* that rotates together with the container body 33Y is fitted into a bottle mouth section 33*a* (the opening A) illustrated in FIG. 19. The agitating member 33*f* is a rod-like member that extends from the hollow space inside the cap section 34Y to the inside of the container body 33Y. Since the agitating member 33*f* rotates together with the opening A of the container body 33Y, discharging efficiency of the toner from the opening A is improved.

Referring to FIGS. 19 and 30, an engaged section 33*j* (a flange section), which is engaged with a claw section 34*j* (for example, see FIG. 21) of the cap section 34Y to connect both members 33Y and 34Y with each other, is formed around the opening A of the container body 33Y to make one round around the outer circumference. As described above, the container body 33Y is rotatably fitted into the cap section 34Y.

Further, referring to FIGS. 19 and 30, a head section 33Yc of the container body 33Y (near the position at which the gear 33*c* is formed) is formed to have the inner diameter smaller than the inner diameter of a storage section 33Ya storing the toner (the position at which the helical protrusion 33*b* is formed). In the container body 33Y, a pumping section 33Yb (a section encircled by an alternate long and short dash line in FIG. 20) formed to protrude from the inner circumferential surface thereof toward the inside is disposed between the head section 33Yc and the storage section 33Ya. As the container body 33Y rotates, the toner conveyed toward the opening A by the helical protrusion 33*b* is pumped to the small diameter section of the head section 33Yc by the pumping section 33Yb. Thereafter, the toner pumped to the small diameter of the head section 33Yc is discharged toward the hollow space of the cap section 34Y from the opening A while being agitated by the agitating member 33*f*.

Referring to FIGS. 20 to 23, the ID chip 35 (the information storage device), the shutter member 34*d*, a shutter seal 36, and the like are installed in the cap section 34Y of the toner container 32Y.

Figure 22:
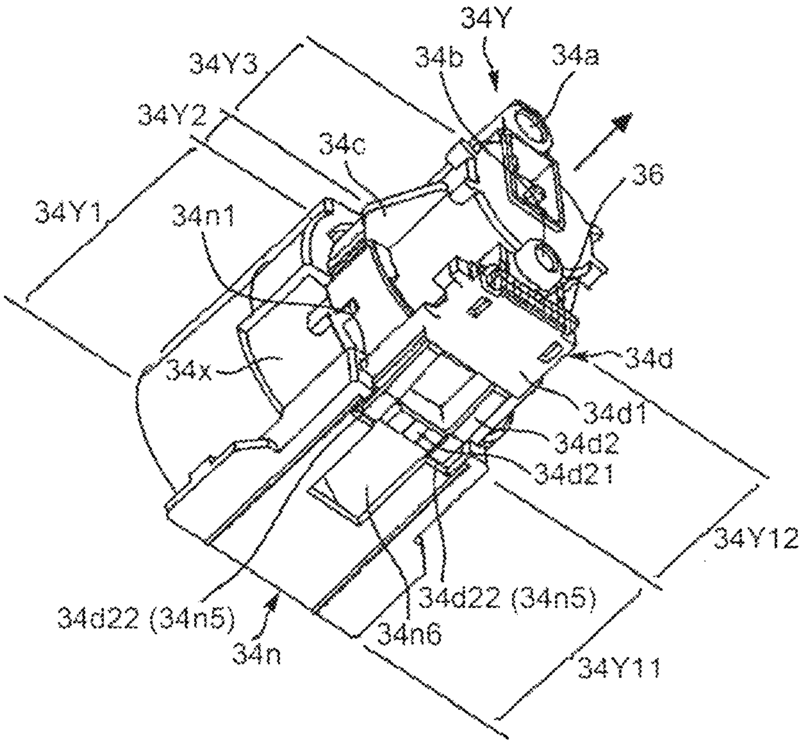
FIG. 22 is a perspective view illustrating a state in which a shutter member of a toner container closes a toner discharge opening.

Referring to FIG. 22, the cap section 34Y has a structure in which roughly a cylindrical section (a larger diameter cylindrical section 34Y1, a medium diameter cylindrical section 34Y2, and a small diameter cylindrical section 34Y3) in which the outer diameter and the inner diameter decreases from the container body 33Y side toward the shutter member 34*d* side in three stages is combined with a box section (a wide width box section 34Y11 and a narrow width box section 34Y12), disposed at the bottom, in which the width in the horizontal direction decreases in two stages are combined.

An insertion section 34*z* (for example, see FIG. 30) including the larger diameter cylindrical section 34Y1, the medium diameter cylindrical section 34Y2, the wide width box section 34Y11, and part of the narrow width box section 34Y12 is formed in the cap section 34Y. The head section 33Yc of the container body 33Y and part of the pumping section 33Yb are inserted into the insertion section 34*z*. Referring to FIG. 30, in the insertion section 34*z*, the medium diameter cylindrical section 34Y2 is formed to have the inner diameter D smaller than the tip diameter of the gear 33*c* and larger than the outer diameter of the opening A of the container body 33Y. Further, the small diameter cylindrical section 34Y3 is formed to have the inner diameter B smaller than the inner diameter D of the medium diameter cylindrical section 34Y2 and smaller than the outer diameter of the opening A.

An annular cap seal 37 (an elastic seal) in which the opening diameter becomes nearly the same as the inner diameter B is attached to an annular vertical wall surface (the surface facing the circumference of the opening A of the container body 33Y), which connects the medium diameter cylindrical section 34Y2 with the small diameter cylindrical section 34Y3, by a double-sided tape. The head section 33Yc and part of the pumping section 33Yb are inserted into the insertion section 34*z* such that an edge of the opening A of the head section 33Yc of the container body 33Y comes in contact with and bites into the cap seal 37. By the above described configuration, a functional section such as part of the gear 33*c* (a section excluding a section exposed from the notch hole 34*x*) and a connection section between the cap section 34Y and the container body 33Y are covered with the larger diameter cylindrical section 34Y1. For this reason, even when the toner container 32 is solely held by the user, the user can be prevented from touching the functional portion, and even if unexpected external force (for example, careless hitting) is applied to the toner container 32Y, toner leak from the connection section or damage of the tooth surface of the gear 33*c* can be alleviated. Further, since the annular cap seal 37 is excellent in sliding property and elasticity of the surface, even if the container body 33Y rotates while biting into the annular cap seal 37, there does not occur toner leak caused by a gap generated between the container body 33Y and the cap section 34Y. As a material of the cap seal 37, a high-density microcell urethane sheet having a structure that is high in density, fine, and uniform unlike general soft polyurethane foam (PUR) is used. As a result, compared to the case of using the general PUR, settling of the cap seal 37 is small, and the sealing property between the container body 33Y and the cap section 34Y can be maintained for a long time.

Figure 23:
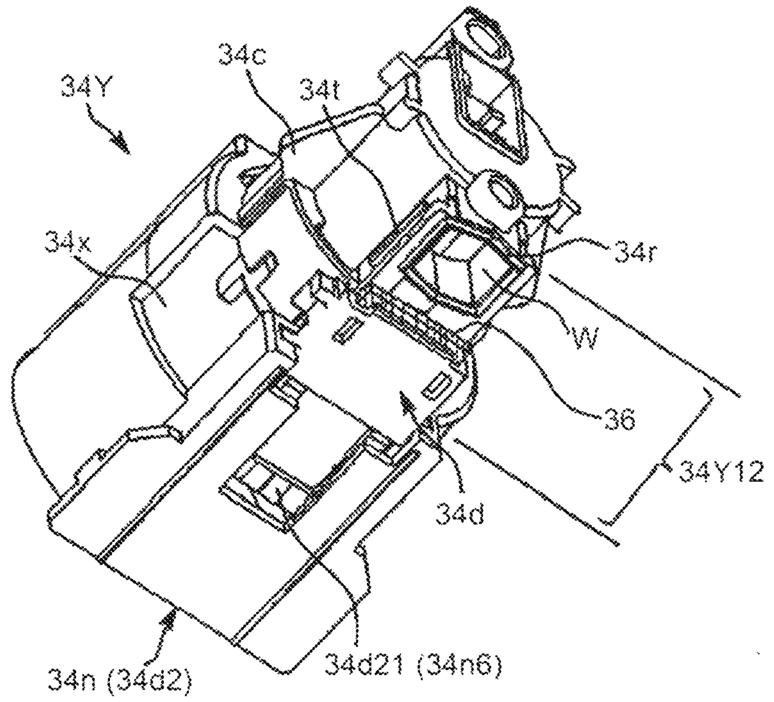
FIG. 23 is a perspective view illustrating a state in which a shutter member of a toner container opens a toner discharge opening.

Referring to FIGS. 23 and 30, inside the narrow width box section 34Y12 positioned below the small diameter cylindrical section 34Y3 of the cap section 34Y, disposed is a toner falling path C having a hole of a hexagonal cylindrical shape for discharging the toner discharged from the opening A of the container body 33Y to the container outside downward in the vertical direction (falling by its own weight). The toner falling path C has a predetermined flow passage area of a hexagonal cross section and communicates the lower side circumferential surface inside the small diameter cylindrical section 34Y3 with the toner discharge opening W (discharge opening). The toner discharged to the inside of the small diameter cylindrical section 34Y3 of the cap section 34Y from the opening area A of the container body 33Y falls through the toner falling path C of the hexagonal cylindrical shape by its own weight and then is smoothly discharged from the toner discharge opening W to the container outside (the toner tank section 61Y).

On the bottom of the narrow width box section 34Y12, part of the shutter member 34*d* (a main shutter section 34*d*1) for performing opening/closing of the toner discharge opening W in conjunction with the attaching/detaching operation of the toner container 32Y to/from the toner container storage unit 70 is held to be slidingly movable.

Figure 24B:
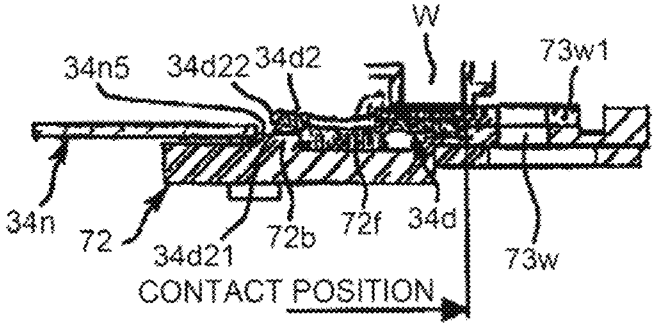
Figure 24C:
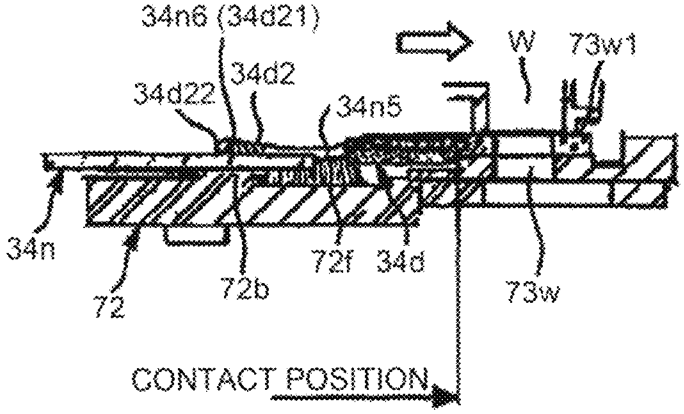
Figure 25:
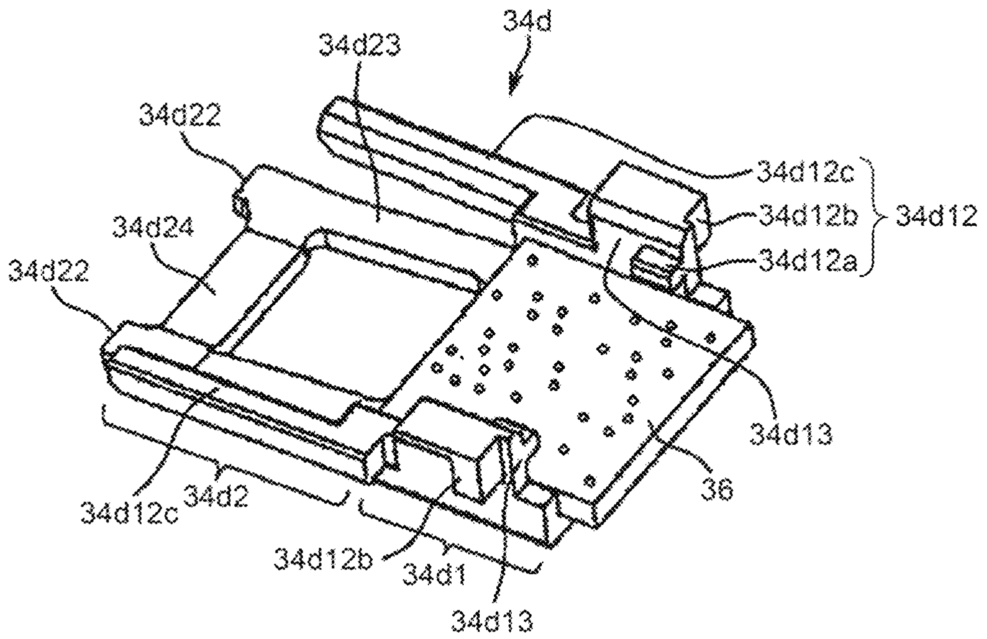
FIG. 25 is a perspective view illustrating a shutter member.
Figure 26:
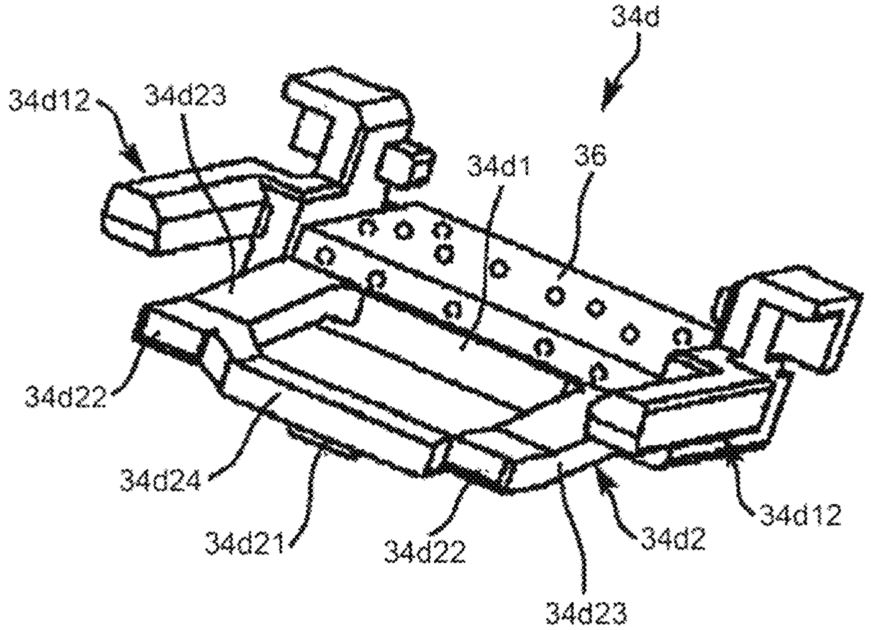
FIG. 26 is another perspective view illustrating a shutter member.

FIGS. 22 and 23 illustrate an operation in which the shutter member 34*d* starts opening of the toner discharge opening W and then completes opening. FIGS. 24(A) to 24(C) are schematic views illustrating the opening operation of the shutter member 34*d* (a shutter deforming section 34*d*2) at that time. Further, FIGS. 25 and 26 are perspective views illustrating the shutter member 34*d*. In FIGS. 24(B) and 24(C), the cap section 34Y, the cap receiving section 73, and the bottle receiving section 72 which are illustrated in FIG. 24(A) are partially omitted.

Referring to FIGS. 22 to 26, the shutter member 34*d* is formed of a resin material such as polystyrene and mainly includes a plate-like main shutter section 34*d*1 and a shutter deforming section 34*d*2 that protrudes the main shutter section 34*d*1, is thinner in thickness than the main shutter section 34*d*1, and has elasticity.

Referring to FIGS. 25 and 26, in the main shutter section 34*d*1 of the shutter member 34*d*, vertical wall 34*d*13 standing at both side end sections (vertical walls extending in parallel to the mounting direction of the toner container 32Y) and a shutter slider 34*d*12 having a plurality of protruding objects protruding from the vertical walls 34*d*13 are formed on both side end sections, respectively. The shutter slider **34*d*12 includes a slide protruding section 34*d*12*a* protruding from the inner side surface of the vertical wall 34*d*13, an L-shaped engaged protruding section 34*d*12*b* protruding from the outer side surface of the vertical wall 34*d*13, and a pair of prismatic sections 34*d*12*c* that is disposed to protrude from the same outer side surface as the engaged protruding section 34*d*12*b* and extends from the body of the main shutter section 34*d*1 to the wide width box section 34Y11. Meanwhile, in the narrow width box section 34Y12 of the cap section 34Y, a pair of slide grooves 34*t* (for example, see FIG. 23) extending in both side walls in the longitudinal direction is formed by a rib. The slide protruding section 34*d*12*a* is fitted into the slide groove 34*t*, and thus the main shutter section 34*d*1 of the shutter member 34*d* is slide-movably supported on the cap section 34**Y.

Further, a shutter seal 36 adheres to the upper surface of the main shutter section **34*d*1 (the surface facing the toner discharge opening W) as a seal member. The shutter seal 36 is a thin rectangular parallelepiped-like elastic seal, and similarly to the cap seal 37, a high density microcell urethane sheet is used as a material in view of sliding property and elasticity of the surface. For this reason, even if the opening/closing operation of the shutter member 34*d* is repeated, a sealing characteristic in the toner discharge opening W can be maintained in the state in which the shutter member 34*d*** closes the toner discharge opening W.

The slide protruding section **34*d*12*a* of the shutter slider 34*d*12 is fitted into the slide groove 34*t* of the narrow width box section 34Y12 (the cap section 34Y). Further, in this state, the shutter seal 36 is sandwiched between a protrusion 34*r* (for example, see FIG. 23) of a hexagonal ring shape protruding downward along an edge of the hexagonal toner discharge opening W of the narrow width box section 34Y12 and a main shutter section 34*d*1, and the shutter seal 36 becomes a slightly compressed state. In this state, the shutter member 34*d* moves along the slide groove 34*t*, and thus the main shutter section 34*d*1 opens or closes the toner discharge opening W while suppressing toner leak. Further, in the state in which the main shutter section 34*d*1 (the shutter member 34*d*) has closed the toner discharge opening W, the toner leak from between the main shutter section 34*d*1** and the toner discharge opening W is prevented.

Specifically, the shutter member **34*d* relatively moves in the longitudinal direction from the cap section 34Y side to the container body 33Y side (moves to the left in FIG. 30) to open the toner discharge opening W and relatively moves in the longitudinal direction from the container body 33Y side to the cap section 34Y side (moves to the right in FIG. 30) to close the toner discharge opening W. The opening/closing operation of the shutter member 34*d* (the opening/closing operation of the toner discharge opening W) is performed in conjunction with the attaching/detaching operation of the toner container 32Y to/from the toner container storage unit 70 (the apparatus body 100**) in the longitudinal direction.

Referring to FIGS. 25 and 26, the shutter deforming section **34*d*2 of the shutter member 34*d* is formed integrally with the main shutter section 34*d*1 and formed at the board thickness thinner than the board thickness of the main shutter section 34*d*1 as described above. The shutter deforming section 34*d*2 mainly includes two spindly flat plate sections 34*d*23 extending from the end surface of the main shutter section 34*d*1 at the container body 33Y and a plate-like member 34*d*24 extending in a direction orthogonal to the longitudinal direction to connect the two flat plate sections 34*d*23 with each other near the leading end sections (the free ends). The shutter deforming section 34*d*2 is formed to be elastically deformed in the vertical direction from a fixed end (a connection portion) with the main shutter section 34*d*1 as a reference point. On the leading end sections (the free ends) of the two flat plate sections 34*d*23, formed are stopper sections 34*d*22 for fixing the shutter member 34*d* so as to prevent careless opening of the toner discharge opening W as will be described later. On the bottom side of the plate-like member 34*d*24, formed is the stopper release section 34*d*21 that is an inclined protrusion (having a triangular cross section) protruding, in a mountain shape, downward in the vertical direction and that releases fixing of the shutter member 34*d* in cooperation with the stopper release urging section 72*b* of the cap receiving section 73** as will be described later.

Referring to FIGS. 22 and 23, in the wide width box section 34Y11 positioned below the larger diameter cylindrical section 34Y1 of the cap section 34Y, formed is a shutter storage section **34*n* that stores the shutter deforming section 34*d*2 thereinside at the time of shutter opening. Among the four side surfaces of the wide width box section 34Y11, the two side surfaces facing in the longitudinal direction (a direction of an arrow in FIG. 22) are opened. Particularly, in the side surface formed at the toner discharge opening W side, part of the wall surface is formed at both side ends of the bottom side, but most of it functions as an opening 34*n*1 extending in the horizontal direction. The opening 34*n*1 is formed such that two surfaces including the side surface and the bottom surface that are at the toner discharge opening W side of the wide width box section 34Y11 are cut out. Among edge sections of the opening 34*n*1, an edge section formed to stand from the bottom surface of the wide width box section 34Y11 in the vertical direction becomes the contact section 34*n*5**.

The stopper section **34*d*22 of the shutter deforming section 34*d*2 is a wall section formed at a farthest end section of the shutter deforming section 34*d*2 (the leading end of the shutter deforming section 34*d*2 away from the main shutter section 34*d*1) in the opening direction (the left direction in FIG. 24). The stopper section 34*d*22 of the shutter deforming section 34*d*2 comes in contact with the contact section 34*n*5 and thus restricts the shutter member 34*d* from moving in the direction of opening the toner discharge opening W from the state in which the toner discharge opening W is closed. That is, when the toner container 32Y is in a separated state (the state in which it is not set to the apparatus body 100 yet), since the stopper section 34*d*22 of the shutter member 34*d* comes in contact with the contact section 34*n*5, a phenomenon that the shutter member 34*d*** moves in the opening direction on its own and so opens the toner discharge opening W does not happen.

Meanwhile, the stopper release section **34*d*21 comes in contact with the stopper release urging section 72*b* (for example, see FIGS. 5 and 24) formed in the bottle receiving section 72 in conjunction with the mounting operation of the toner container 32Y to the toner container storage unit 70 and is pushed upward by the stopper release urging section 72*b* (as external force is applied upward). Then, the shutter deforming section 34*d*2 is elastically deformed upward, and the stopper section 34*d*22 is also displaced upward. As a result, the contact state between the stopper section 34*d*22 and the contact section 34*n*5 is released, so that the shutter member 34*d*** can move in the opening direction.

An operation of the shutter member **34*d* in conjunction with the mounting operation of the toner container 32Y to the toner container storage unit 70 will be described below in detail with reference to FIGS. 24(A) to 24(C). The position of the shutter member 34*d* in FIGS. 24(A) and 24(C) corresponds to the position of the shutter member 34*d* in FIGS. 22 and 23**, respectively.

As illustrated in FIG. 24, the mounting operation of the toner container 32Y to the toner container storage unit 70 (movement in the left direction in FIG. 24) starts, and when the stopper release section **34*d*21 of the shutter member 34*d* does not reach the position of the stopper release urging section 72*b* (for example, also see FIG. 5) formed in the bottle receiving section 72, the stopper section 34*d*22 of the shutter member 34*d* comes in contact with the contact section 34*n*5, and thus movement of the shutter member 34*d* in the opening direction is restricted. Further, on the upper surface of the bottle receiving section 72 at the cap receiving section 73 side near the stopper release urging section 72*b*, a bristle brush 72*f* is disposed to rub the bottom surface of the shutter member 34*d* and clean contamination. Particularly, the bristle brush 72*f* is effective in cleaning flying toner sticking to the bottom surface of the shutter member 34*d* during an operation of attaching/detaching the toner container 32**Y.

Thereafter, when the mounting operation of the toner container 32Y proceeds, as illustrated in FIG. 24(B), the stopper release section **34*d*21 is pushed up by the stopper release urging section 72*b*, and so the shutter deforming section 34*d*2 is elastically deformed from the connection position (a section encircled by an alternate long and short dash line) as the reference point. As a result, the contact state between the stopper section 34*d*22 and the contact section 34*n*5 is released, and so the shutter member 34*d*** can relatively move in the opening direction.

Thereafter, the shutter member **34*d* comes in contact with the wall section (a section indicated as "contact position" in the drawings) formed around the toner feeding opening 73*w* of the cap receiving section 73, and so movement in the toner container storage unit 70 (the cap receiving section 73) is restricted (the shutter member 34*d* does not absolutely move in the longitudinal direction). However, since movement in the mounting direction of the toner container 32Y is performed, the shutter member 34*d* moves relative to the toner discharge opening W in the opening direction. That is, as illustrated in FIG. 24(C), the shutter member 34*d* relatively moves to the container body 33Y side, and so the shutter deforming section 34*d*2 is stored in the shutter storage section 34*n*. As a result, opening of the toner discharge opening W is completely finished by movement of the shutter member 34*d* in the opening direction. Further, the toner discharge opening W matches with the toner feeding opening 73*w* of the cap receiving section 73 in a superimposed manner, and an integrated toner feeding passage leading from the toner container 32Y to the toner feeding device is formed. At this time, the stopper release section 34*d*21 of the shutter member 34*d* is stored in a notch 34*n*6 (for example, see FIGS. 22 and 23) that is an extension section of the opening 34*n*1 of the cap storage section 34*n*. Thus, it is possible to prevent a problem in that the shutter deforming section 34*d*2 stored in the shutter storage section 34*n* is held in a greatly elastically deformed state by contact between the stopper release section 34*d*21 and the shutter storage section 34*n***.

As described above, in the toner container 32Y according to the present first embodiment, the shutter deforming section **34*d*2 that is elastically deformed from the connection position with the main shutter section 34*d*1 as the reference point is disposed in the shutter member 34*d*, and the stopper section 34*d*22 that restricts movement of the shutter member 34*d* in the opening direction and the stopper release section 34*d*21 that releases the stopper section 34*d*22 are disposed in the shutter deforming section 34*d*2. Thus, the shutter member 34*d* does not open the toner discharge opening W as it pleases in the state in which the toner container 32Y is removed, and only when the toner container 32Y is set to the image forming apparatus body 100, the shutter member 34*d*** opens the toner discharge opening W in conjunction with the mounting operation thereof.

An operation of the L-shaped engaged protruding section **34*d*12*b*** related to the shutter opening/closing operation will be described below.

As illustrated in FIG. 25, the L-shaped engaged protruding sections **34*d*12*b* are formed on both side end sections of the main shutter section 34*d*1, respectively. Meanwhile, even though not shown because it is illustrated in the drawings of Japanese Patent Application No. 2011-9782, on the bottom surface inside the cap receiving section 73, a pair of urging members is installed to face a pair of engaged protruding sections 34*d*12*b*. The pair of urging members is an L-shaped lever (a spindle that becomes a rotation center is formed near an L-shaped curved portion) that forms a shape symmetrical to each other, and an arm section at one side thereof is urged by a torsion coil spring. If the toner container 32Y (the cap section 34Y) is mounted on the cap receiving section 73, an arm section of the other end side of the urging member is engaged with the engaged protruding section 34*d*12*b* and applies urging force in a direction resisting the direction in which the shutter member 34*d* is opened. The user pushes the toner container 32Y by force overcoming urging force by the above described urging member, and opening of the shutter member 34*d* is rapidly performed. As a result, a state in which the toner discharge opening W does not match with the toner feeding opening 73*w* of the cap receiving section 73 occurs only instantaneously, and toner leak from between the toner discharge opening W and the toner feeding opening 73*w*** can be suppressed.

On the other hand, when the toner container 32Y (the cap section 34Y) is removed from the cap receiving section 73, the arm section of the urging member becomes a state urged to push the engaged protruding section **34*d*12*b* in the mounting direction. The user attempts to pull out the toner container 32Y by force overcoming urging force by the urging member, and so closing of the shutter member 34*d* is rapidly performed. As a result, similarly to the time of the opening operation, toner leak from between the toner discharge opening W and the toner feeding opening 73*w*** can be suppressed.

Referring to FIGS. 20, 21, and 30, in the upper section (the ceiling portion) of the cap section 34Y, the first positioning hole **34*a* extending in the longitudinal direction from the end surface of the cap section 34Y orthogonal to the longitudinal direction is formed. The first positioning hole 34*a* becomes a main positioning reference of the cap section 34Y in the image forming apparatus body 100. Specifically, the main reference pin 73*a* (for example, see FIGS. 14A, 14B and 17) as the positioning pin of the cap receiving section 73 is fitted into the first positioning hole 34*a* of the cap section 34Y in conjunction with the mounting operation of the toner container 32Y to the toner container storage unit 70** in the longitudinal direction.

In the lower section (the bottom portion) of the cap section 34Y, the second positioning hole **34*b* extending in the longitudinal direction from the end surface of the cap section 34Y orthogonal to the longitudinal direction is formed not to reach the position of the toner discharge opening W. The second positioning hole 34*b* becomes a sub positioning reference of the cap section 34Y in the image forming apparatus body 100. Specifically, the sub reference pin 73***b* (for example, see FIGS. 14A, 14B and 17) as the positioning pin of the cap receiving section 73 is fitted into the second positioning hole 34*b* of the cap section 34Y in conjunction with the mounting operation of the toner container 32Y to the toner container storage unit 70 in the longitudinal direction. Further, the second positioning hole 34*b* as illustrated in FIG. 21 is a oblong hole in which a vertical direction is a longitudinal direction (this "longitudinal direction" has a different meaning from the "longitudinal direction" of the toner container 32Y described in the other sections).

Positioning of the cap section 34Y in the toner container storage unit 70 is performed by the two positioning holes 34*a* and 34*b* having the above described configuration.

Referring to FIG. 30, the hole depth of the first positioning hole 34*a* is set to be larger than the hole depth of the second positioning hole 34*b*. The length of the main reference pin 73*a* in the longitudinal direction is set to be larger than the length of the sub reference pin 73*b* in the longitudinal direction. In the mounting operation of the toner container 32Y to the toner container storage unit 70 (the cap receiving section 73) in the longitudinal direction, the main reference pin 73*a* starts to be fitted into the first positioning hole 34*a* that is the main positioning reference, and then the sub reference pin 73*b* starts to be fitted into the second positioning hole 34*b* that is the sub positioning reference, so that the toner container 32Y can be smoothly mounted on the toner container storage unit 70 (the cap receiving section 73). Further, since the first positioning hole 34*a* that is long in the longitudinal direction is disposed in the ceiling section of the cap section 34Y (a section that is not buried in the toner), there is no influence on a conveying property (a flow property) of the toner inside the cap section 34Y. The second positioning hole 34*b* that is short in the longitudinal direction is formed on the bottom of the cap section 34Y but sufficiently performs a function as the sub positioning reference since it can be disposed using a small space from the end surface of the cap section 34Y to the position of the toner discharge opening W.

Referring to FIG. 20, on the outer circumferential surface of the cap section 34Y above the first positioning hole 34*a* of the cap section 34Y, a guide rail section 34*e* extending in an axial direction of the first positioning hole 34*a* is formed. The guide rail section 34*e* protrudes upward in the vertical direction from the outer circumferential surface of the cap section 34Y to be line-symmetrical to a virtual vertical line passing through the hole center of the first positioning hole 34*a* when viewed in a cross section orthogonal to the longitudinal direction (a cross section parallel to a front view of FIG. 21) and extends in the longitudinal direction (a direction vertical to a paper plane of FIG. 21). Before the main reference pin 73*a* is inserted into the positioning hole 34*a*, the guide rail section 34*e* is fitted into the contacted groove 73*m* (a concave section), which is formed in a groove shape in the inner wall of the cap receiving section 73 above the main reference pin 73*a*, from the upstream side in the mounting direction further than the leading end section of the main reference pin 73*a* and restricts a posture of the cap section 34Y in the horizontal direction orthogonal to the longitudinal direction at the time of mounting movement to the image forming apparatus body 100 (the cap receiving section 73). Further, in the leading end of the guide rail section 34*e*, a protruding section 34*e*1 slightly protruding in the longitudinal direction from the end surface of the first positioning hole 34*a* is formed. The protruding section 34*e*1 is formed in a tapered shape as illustrated in FIG. 20. The guide rail section 34*e* enters the contacted grooves 73*m* formed on the cap receiving section 73, and so the cap section 34Y is guided to the inside of the cap receiving section 73. Thus, when the cap section 34Y is mounted on the cap receiving section 73, in the first positioning hole 34*a*, the tapered protruding section 34*e*1 is fitted into the contacted groove 73*m* before the first positioning hole 34*a* is fitted into the main reference pin 73*a*, and thus the cap section 34Y is smoothly mounted on the cap receiving section 73.

Referring to FIGS. 20 and 21, lateral protrusions 34*c* for restricting a posture of the cap section 34Y in the rotation direction in the image forming apparatus body 100 (the cap receiving section 73) are formed on both side sections of the cap section 34Y, respectively. The lateral protrusion 34*c* protrudes to both sides in the horizontal direction from the outer circumferential surface of the cap section 34Y to be disposed on a virtual horizontal line passing through the center of a virtual line segment connecting the hole center of the first positioning hole 34*a* with the hole center of the second positioning hole 34*b* when viewed in a cross section orthogonal to the longitudinal direction and extends in the longitudinal direction (a direction vertical to a paper plane of FIG. 21). The two lateral protrusions 34*c* are engaged with the lateral groove 73*h* and the groove section 73*r*1, for example, illustrated in FIG. 12 while being pressed to be pushed back in a direction opposite to pushing by the cap section sandwiching member 73*r* (for example, see FIG. 12) in the cap receiving section 73. Thus, the cap section 34Y is attached to or detached from the cap receiving section 73 while the posture of the cap section 34Y in the rotation direction is being restricted, and the posture of the cap section 34Y in the rotation direction is restricted in the state in which the cap section 34Y is mounted on the cap receiving section 73.

In further detail, in the lateral protrusion 34*c*, the leading end in the longitudinal direction (the mounting direction) is formed in a tapered shape as illustrated in FIG. 20. Here, when the cap section 34Y is mounted on the cap receiving section 73, the guide rail section 34*e* is first fitted into the contacted groove 73*m*, and then the two lateral protrusions 34*c* having the tapered leading end are fitted into the lateral grooves 73*h* and the groove sections 73*r*1. Thus, the cap section 34Y is smoothly mounted on the cap receiving section 73 in the state in which the posture of the cap section 34Y is restricted with a high degree of certainty.

Referring to FIGS. 20 and 21, on both ends of the bottom of the cap section 34Y, disposed are convex sections 34*g* and 34*h* for securing incompatibility of the toner container 32Y (the developer container). In detail, on the upper surface side of a flat plate-like blade member extending laterally from the bottom of the cap section 34Y, the convex sections 34*g* and 34*h* are disposed to protrude upward. The convex sections 34*g* and 34*h* are configured to be fitted into a fitting section 72*m* (that is formed in the bottle receiving section 72 of the toner container storage unit 70) illustrated in FIG. 9 when the mounting operation of the toner container 32Y to the toner container storage unit 70 is correct (when the toner container 32Y is mounted to the true position of the toner container storage unit 70).

Specifically, even though not shown, the convex sections 34*g* and 34*h* are disposed at the different positions depending on color of the toner stored in the toner container (the container body). In detail, if it is assumed that the leading end in the mounting direction when the toner container 32Y is mounted on the image forming apparatus body 100 is the front, the convex sections 34*g* and 34*h* are disposed so that the protruding positions are not superimposed when viewed from the front and are disposed at the different positions depending on the color. The convex sections 34*g* and 34*h* of the toner container corresponding to cyan are formed at the position to be fitted only into the cyan fitting section 72*m* of the toner container storage unit 70, the convex sections 34*g* and 34*h* of the toner container corresponding to magenta are formed at the position to be fitted only into the magenta fitting section 72*m* of the toner container storage unit 70, the convex sections 34*g* and 34*h* of the toner container corresponding to yellow are formed at the position to be fitted only into the yellow fitting section 72*m* of the toner container storage unit 70, and the convex sections 34*g* and 34*h* of the toner container corresponding to black are formed at the position to be fitted only into the black fitting section 72*m* of the toner container storage unit 70.

The above described configuration prevents a problem in that the toner container of a different color (for example, the toner container of yellow) is set to the toner container storage unit of a predetermined color (for example, the toner container storage unit of cyan) and thus a predetermined color image cannot be formed. That is, the toner container is prevented from being erroneously set to the toner container storage unit.

Figure 10:
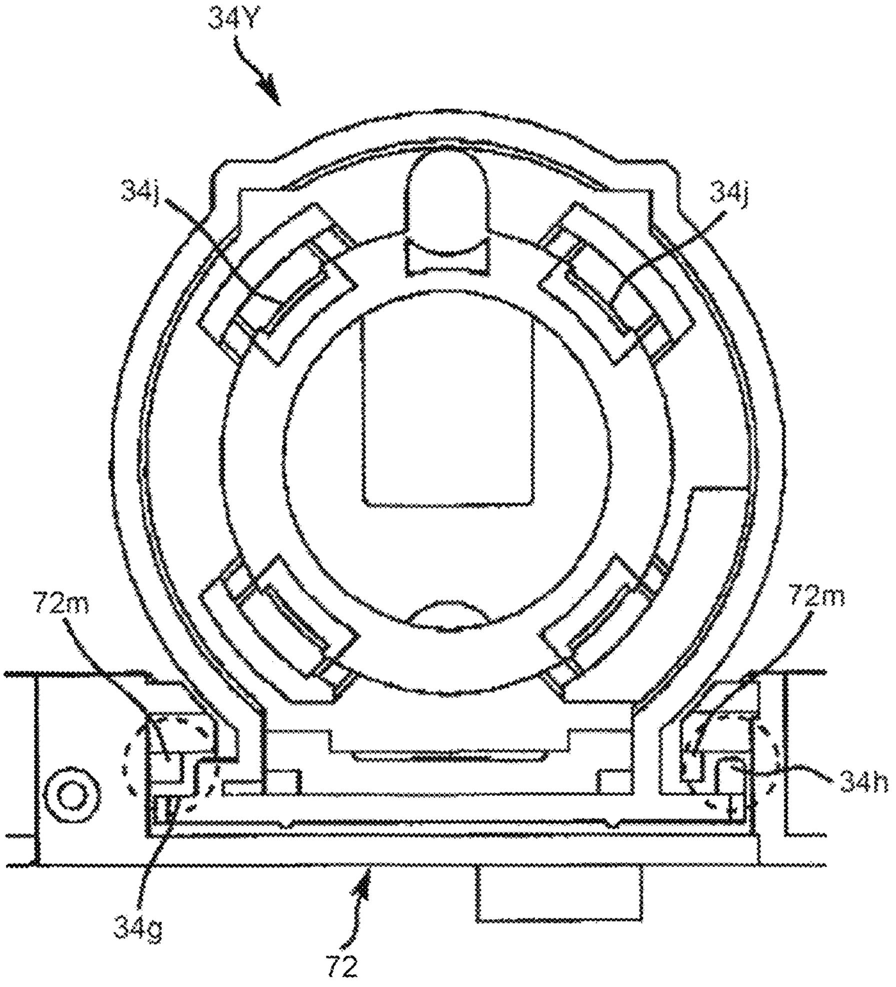
FIG. 10 is a back view illustrating a state in which a cap section is set to a bottle receiving section in a regular toner container.
Figure 11:
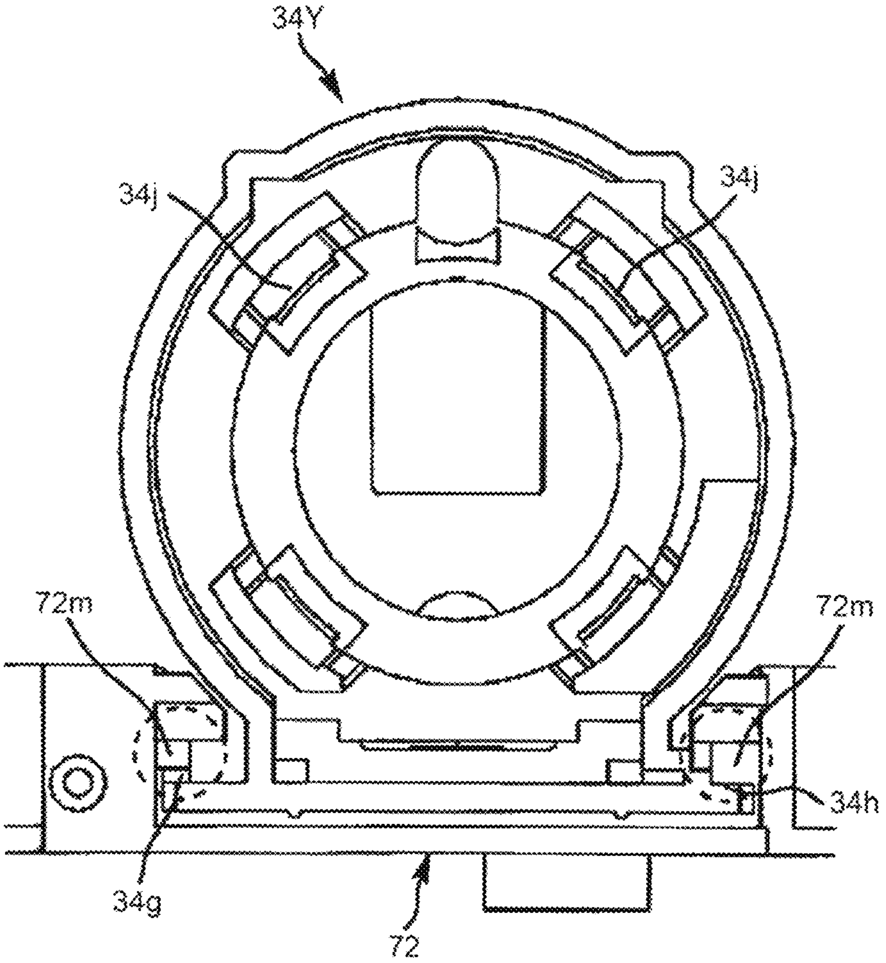
FIG. 11 is a back view illustrating a state in which a cap section is set to a bottle receiving section in a non-regular toner container.

FIG. 10 illustrates the state when the mounting operation of the toner container 32Y to the toner container storage unit 70 is correct. The convex sections 34*g* and 34*h* of the cap section 34Y do not interfere with the fitting section 72*m* of the bottle receiving section 72. On the other hand, FIG. 11 illustrates the state when the mounting operation of the toner container 32Y to the toner container storage unit 70 is not correct. The convex sections 34*g* and 34*h* of the cap section 34Y interfere with the fitting section 72*m* of the bottle receiving section 72.

The ID chip 35 (the information storage device) that is characteristic in the toner container 32Y (the removable device) according to the present first embodiment will be described below in detail.

Referring to FIG. 20, on the end surface of the cap section 34Y, the ID chip 35 as the information storage device in which various electronic information is stored is installed at the position of a holding member 34*k* installed between the first positioning hole 34*a* and the second positioning hole 34*b*. The ID chip 35 is configured to be connected to the connector 73*e* of the cap receiving section 73 in the state in which the cap section 34Y is mounted to the toner container storage unit 70 (the cap receiving section 73) (for example, see FIGS. 3 and 17). Specifically, in the state in which the cap section 34Y is mounted on the toner container storage unit 70 (the cap receiving section 73), a plurality of metallic pads 35*a* (metallic plates) of the ID chip 35 come in contact with a plurality of body side terminals 73*e*2 of the connector 73*e*. The ID chip 35 performs communication (wire line communication) with the control unit 90 through the connector 73*e* as illustrated in FIG. 3 in the state in which the cap section 34Y is held on the cap receiving section 73.

Figure 27:
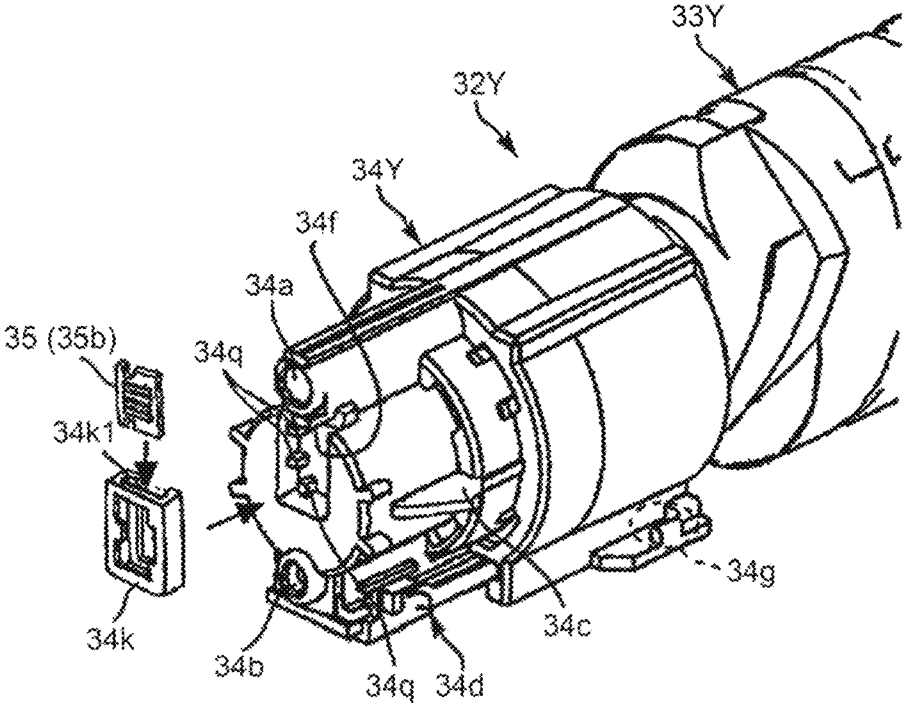
FIG. 27 is a perspective view illustrating a state in which an information storage device is extracted.
Figure 28:
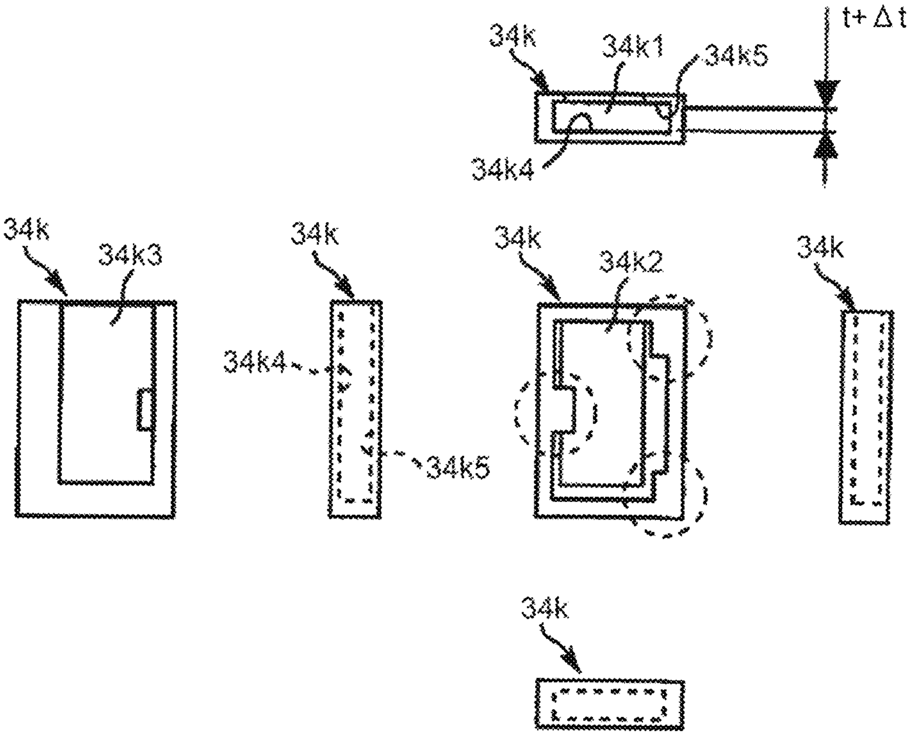
FIG. 28 is a six-plane view illustrating a holding member of an information storage device.
Figure 29:
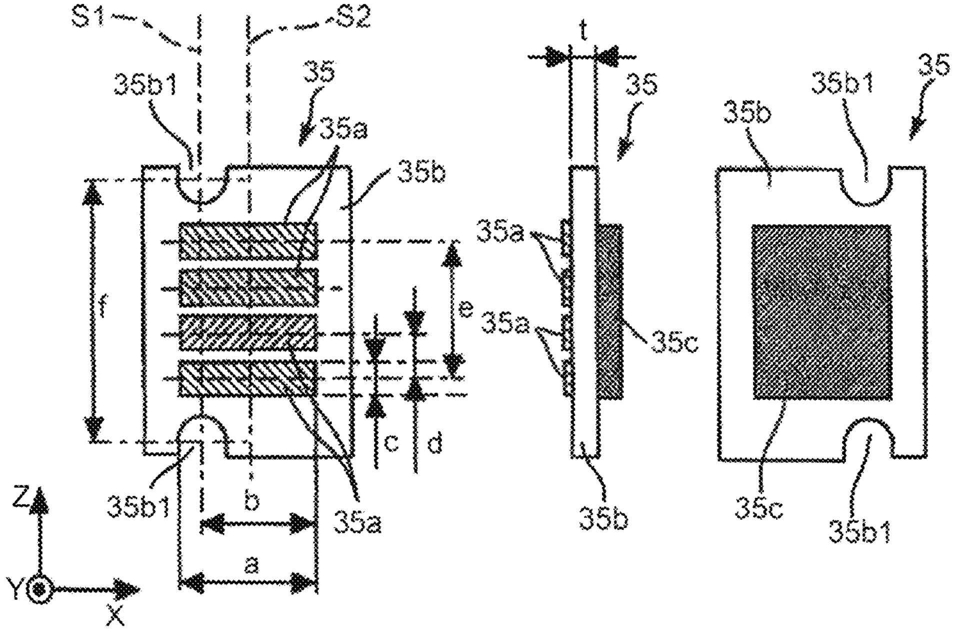
FIG. 29 is a three-plane view illustrating an information storage device.

Referring to FIGS. 27 to 29, in the present first embodiment, a holding mechanism installed in the toner container 32Y (the removable device) removably installed to the image forming apparatus body 100 includes the ID chip 35 as the information storage device, the holding member 34*k* as the holding section, and the like. The ID chip 35 as the information storage device held on the holding mechanism includes a substrate 35*b*, an information storage unit 35*c*, metallic pads 35*a* as a plurality of terminals (metallic plates), and the like.

Referring to FIG. 29, the information storage unit 35*c* is an electronic circuit in which various information exchanged between the control unit 90 of the image forming apparatus body 100 and the toner container 32Y is stored. In FIG. 29, the information storage unit 35*c* is illustrated as a box-like one by hatched lines for simplicity but corresponds to an assembly of a memory IC, a condenser for noise reduction, a resistor, and the like. The information storage unit 35*c* is disposed on the back surface side of the substrate 35*b* (the side facing the end surface of the cap section 34Y) and electrically connected to all or some of the metallic pads 35*a* as a plurality of metallic plates.

The metallic pads 35*a* as the plurality of terminals come in contact with the plurality of body side terminals 73*e*2 of the connector 73*e* installed in the cap receiving section 73 (the apparatus body 100), respectively, and exchange an electrical signal related to information with the image forming apparatus body 100 (the control unit 90). The plurality of metallic pads 35*a* are disposed at the front surface side of the substrate 35*b* (the side facing the cap receiving section 73). Further, the plurality of metallic pads 35*a* are formed in a nearly rectangular shape and arrayed in a transverse direction thereof with a clearance therebetween (a Z direction (vertical direction) in FIG. 29(A)).

On the substrate 35*b* on which the information storage unit 35*c* and the metallic pads 35*a* are disposed, positioning notches 35*b*1 (that has a shape of a half when an elliptical circumference is divided into two by a straight line) are formed on both ends in the vertical direction, respectively. The positioning notch 35*b*1 is fitted into the positioning pin 73*e*3 (for example, see FIGS. 16 and 17) as a cylindrical positioning protruding section installed in the connector 73*e* (the image forming apparatus body 100) and is used for positioning the plurality of metallic pads 35*a* on the plurality of body side terminals 73*e*2.

The ID chip 35 (the information storage device) having the above described configuration is held on the holding member 34*k* (the holding section) that is configured removably from the cap section 34Y.

The holding member 34*k* (the holding section) holds the contact type ID chip 35 (the information storage device) to be able to move on a virtual plane (a virtual plane substantially orthogonal to) intersecting with the movement direction (a direction of an arrow in FIG. 17) in which the metallic pads 35*a* (terminals) approach and come in contact with the body side terminals 73*e*2.

Specifically, in the present first embodiment, the holding member 34*k* holds the ID chip 35 (the substrate 35*b*) to be able to move on a virtual plane (an XZ plane in FIG. 20) orthogonal to the attaching/detaching direction of the toner container 32Y to/from the image forming apparatus body 100. That is, the ID chip 35 (the substrate 35*b*) is configured to be able to move (about 1 mm) on the XZ plane in FIG. 20 freely to some extent in a state held by the holding member 34*k* (the cap section 34Y) as illustrated in FIG. 20. Specifically, the ID chip 35 (the substrate 35*b*) is held loosely to some extent inside the box-like holding member 34*k* (the holding mechanism). That is, the ID chip 35 is held with a predetermined gap between the ID chip 35 and the side wall inside the holding member 34*k*. Referring to FIGS. 28 and 29, the ID chip 35 is held such that a small clearance Qt (for example, "QtQt" is about 0.85 to 1.05 mm) is formed in a DY direction on the thickness t (about 0.8 mm) of the substrate 35*b*) inside the holding member 34*k*. For this reason, it is possible to make the substrate 35*b* stand to orthogonally cross in the insertion direction of the positioning pin 73*e*3 to some extent. Thus, prevented is a problem in that the substrate 35*b* is excessively laid down in the insertion direction of the positioning pin 73*e*3, the positioning pin 73*e*3 is seized by the notch 35*b*1, and thus the positioning pin 73*e*3 fails to be fitted into the notch 35*b*1.

Through the above described configuration, even when the size of the image forming apparatus body 100 or the toner container 32Y decreases and so the plurality of metallic pads 35*a* (terminals) on the substrate 35*b* are densely arranged so as to reduce the size of the ID chip 35 installed thereon, a contact failure that is caused by a positioning failure between the plurality of metallic pads 35*a* and the body side terminal 73*e*2 of the connector 73*e* is difficult to occur regardless of whether or not a degree of dimension accuracy or a degree of assembly accuracy of an associated component is high or low.

Specifically, referring to FIG. 17, if the mounting operation of the cap section 34Y of the toner container 32Y on the cap receiving section 73 proceeds, the positioning pins 73*a* and 73*b* are inserted into the positioning holes 34*a* and 34*b*, and so the cap section 34Y is positioned in the cap receiving section 73. If the mounting operation of the cap section 34Y further proceeds, the positioning pin 73*e*3 of the connector 73*e* (for example, see FIGS. 16 and 17) is inserted into the notch 35*b*1 of the substrate 35*b* of the ID chip 35, and the substrate 35*b* (the plurality of metallic pads 35*a*) is positioned with respect to the connector 73*e* (the plurality of body side terminal 73*e*2). In further detail, the positioning pin 73*e*3 comes in contact with the edge section (or the inner surface) of the notch 35*b*1, and so movement of the substrate 35*b* is restricted. At this time, since the ID chip 35 (the substrate 35*b*) having the notch 35*b*1 formed therein is configured to be movable on the XZ plane in the holding member 34*k*, an allowable tolerance of a degree of dimension accuracy or a degree of assembly accuracy of an associated component according to mass production has to be large. Thus, when positioning between the toner container 32Y and the image forming apparatus body 100 is performed, even if the position of the notch 35*b*1 is misaligned with the positioning pin 73*e*3 from the beginning, the ID chip 35 (the substrate 35*b*) is restricted by the tapered leading end of the positioning pin 73*e*3 and moves on the XZ plane, and thus the cylindrical section of the positioning pin 73*e*3 can be fitted into the notch 35*b*1. That is, independently of positioning between the toner container 32Y and the image forming apparatus body 100, the cylindrical section of the positioning pin 73*e*3 can be fitted into the notch 35*b*1. Thus, the contact failure that is caused by the positioning failure between the plurality of metallic pads 35*a* and the body side terminals 73*e*2 of the connector 73*e* is difficult to occur.

Referring to FIG. 27, the holding member 34*k* as the holding section is removably configured on the cap section 34Y and is a box-like member having an insertion opening 34*k*1, formed in the upper side thereof, through which the ID chip 35 is inserted or separated.

In detail, when assembling the holding mechanism to the cap section 34Y, the ID chip 35 (the information storage device) is first inserted into the holding member 34*k* through the insertion opening 34*k*1 (movement in a direction of an arrow in FIG. 27). Thereafter, the holding member 34*k* (the holding section) having the ID chip 35 mounted thereon moves in the arrow direction in FIG. 27 and is press-fitted into the convex section of the cap section 34Y. At this time, the holding member 34*k* is fixed and held at the position contacting a pedestal section 34*q* (disposed at the position not contacting the substrate 35*b*) disposed in the convex section of the cap section 34Y. Further, when ejecting the ID chip 35 from the cap section 34Y, an operation is performed in a procedure reverse to the above described procedure. The pedestal section 34*q* is a rib standing in the mounting direction of the toner container 32Y (or toward the holding member 34*k*) inside the concave section of the cap section 34Y and disposed at the position other than a place into which the positioning pin 73*e*3 of the connector 73*e* is to be inserted.

In the present first embodiment, the holding member 34*k* is press-fitted into and fixed to the concave section of the cap section 34Y, but the holding member 34*k* may be mounted on and screw-fixed to the concave section of the cap section 34Y. Specifically, a flaky rib having a hole in the side wall of the holding member 34*k* protrudes to form a female screw section in the end surface of the cap section 34Y. The holding member 34*k* is mounted on the concave section of the cap section 34Y, and in the state in which the flaky rib of the holding member 34*k* comes in contact with the end surface of the cap section 34Y, a screw is screwed into the female screw section of the cap section 34Y through the hole of the rib related to the holding member 34*k*. Even in this configuration, the holding member 34*k* can be comparatively easily attached to or detached from the cap section 34Y.

As described above, since the ID chip 35 (the substrate 35*b*) is configured to be attached to or detached from the cap section 34Y, efficiency of assembling the ID chip 35 (the substrate 35*b*) to the toner container 32Y as the removable device increases, and at the same time, efficiency of a disassembly operation of the ID chip 35 (the substrate 35*b*) when recycling the toner container 32Y increases. Particularly, in the present first embodiment, the substrate 35*b* of the ID chip 35 is a small substrate having the size of about 12 mm □ 8 mm to 15 mm □ 10 mm. If data input/output (data input/output when a probe terminal comes in contact with the metallic pad 35*a*) is about to be performed in the state in which the substrate 35*b* is mounted on the cap section 34Y in the manufacturing process, it may be difficult to do a work on the cap section 34Y of a complicated shape, and a process time may increase. Thus, in the present first embodiment, the ID chip 35 (the substrate 35*b*) is removably configured, and thus there is a great effect since a data input/output operation can be performed on the ID chip 35 alone (or for each holding member 34*k*) if necessary.

Referring to FIGS. 17 and 27, in the cap section 34Y, formed is a standing member 34*f* that blocks the insertion opening 34*k*1 in the state in which the holding member 34*k* is mounted on the concave section.

Thus, prevented is a problem in that the ID chip 35 falls off from the insertion opening 34*k*1 of the holding member 34*k* after the ID chip 35 (the holding member 34*k*) is mounted on the cap section 34Y.

Referring to FIG. 28, inside the holding member 34*k* (the box-like member), formed are a first facing section 34*k*4 and a second facing section 34*k*5. The first facing section 34*k*4 faces a first plane of the substrate 35*b* (referring to FIG. 29, a surface where the plurality of metallic pads 35*a* are disposed) and is formed to come in contact only with and slide on an outer peripheral area of the first plane where the metallic pads 35*a* are not disposed so as not to interfere with the plurality of metallic pads 35*a*. The second facing section 34*k*5 faces a second plane of the substrate 35*b* (referring to FIG. 29, a surface where the information storage unit 35*c* is disposed) and is formed to slide on part of the second plane so as not to interfere with the information storage unit 35*c*. Thus, inside the holding member 34*k*, the ID chip 35 can freely move on the XZ plane (can move to slide on the facing sections **34*k*4 and 34*k*5) without falling off from the holding member 34*k*, and without the metallic pads 35*a* or the information storage unit 35*c*** getting damaged.

Further, openings **34*k*2 and 34*k*3 are formed in the front and back surfaces of the holding member 34*k*, respectively. The first opening 34*k*2 is formed to allow the plurality of metallic pads 35*a* and the positioning notch 35*b*1 to be exposed at the side facing the connector 73*e* even when the substrate 35*b* moves in the XZ plane to some extent. Thus, in accompany with movement of the substrate 35*b* in the XZ plane, the positioning pin 73*e*3 and the notch 35*b*1 can be engaged with each other, and the metallic pads 35*a* and the body side terminals 73*e*2 can be connected with (come in contact with) each other. Further, the second opening 34*k*3 to allow the information storage unit 35*c* to be exposed at the side facing the concave section of the cap section 34Y even when the substrate 35*b*** moves on the XZ plane to some extent.

Referring to FIG. 28, the opening **34*k*2 formed in the front surface of the holding member 34*k* is formed such that the left side has a convex shape and the right side has a concave shape. Thus, an area encircled by a dotted line in FIG. 28 functions as a hook (a stopper) for preventing the ID chip 35 from falling off from the opening 34*k*2**.

FIG. 29 is a three-plane view illustrating the ID chip 35.

As illustrated in FIG. 29, in the ID chip 35, the metallic pads **35*a* as four metallic plates are disposed in line in the Z direction on the first plane of the substrate 35*b*. The metallic pad 35*a* has a multi-layer structure having three layers of a copper layer, a nickel layer, and a metallic layer which are disposed in order from the substrate 35*b* side, and the metallic layer as the surface layer is comparatively expensive but disposed to prevent oxidization. The metallic pad 35*a* is formed by electric field evaporation on the substrate 35*b*** that is masked in advance.

The positioning notches **35*b*1 are formed on both end sections of the four metallic pads 35*a* in the arrangement direction (the Z direction) to sandwich the four metallic pads 35*a*. In the present first embodiment, a first virtual straight line S1 that passes through the centers of the notches 35*b*1 and is parallel to the arrangement direction of the plurality of metallic pads 35*a* is configured to be positioned not to overlap a second virtual straight line S2 that connects the centers of the plurality of metallic pads 35*a* in the longitudinal direction. Specifically, the first virtual straight line S1 that connects the two positioning notches 35*b*1 (a virtual line that connects the centers of original oblong holes in the notches 35*b*1 each of which has a shape of a half when the oblong hole is divided into two in the longitudinal direction) is configured to be positioned not to overlap the second virtual straight line S2 that connects the centers of the plurality of metallic pads 35*a* in the longitudinal direction. That is, in the notches 35*b*1, the virtual straight line S1 that connects sections that are most bitten toward the inside of the substrate 35*b* is positioned not to overlap the virtual straight line S2. Further, the virtual straight line S1 is configured to be nearly parallel to the virtual straight line S2**.

In the present first embodiment, dimensions a to f in FIG. 29 have been set to 6.2 mm, 5.2 mm, 1.5 mm, 2 mm, 6 mm, and 11.7 mm, respectively. The substrate **35*b* having the small area size is small in deflection amount even if external force is applied and comparatively large in resistance characteristic (stiffness) against shearing force. In the present first embodiment, the ID chip 35 is held to be movable inside the holding member 34*k*, and employed is a positioning method in which the positioning pin 73*e*3 is inserted into the notch 35*b*1 and is likely to be "seized" (a state in which the positioning pin 73*e*3 enters the notch 35*b*1 obliquely rather than vertically, a sliding load between the notch 35*b*1 and the positioning pin 73*e*3 increases, and so the substrate 35*b* is deflected and does not move) in the case of the ID chip 35 having the large area size. However, since the substrate 35*b* has the small area size, stiffness increases, and so the positioning method that is difficult to cause deflection that causes "seizure" is implemented. Further, an interval between the metallic pads 35*a* in the substrate 35*b* is narrow, but the contact failure between the metallic pads 35*a* and the body side terminals 73*e*2 can be prevented by high accuracy positioning in accompany with movement of the substrate 35*b* in the XZ plane, and thus the area size of the expensive metallic pads 35*a*** having the metal layer can be suppressed to a minimal area size.

FIG. 16 is a schematic perspective view illustrating the connector **73*e* at the apparatus body 100** side.

Referring to FIG. 16, the four body side terminals **73*e*2 in the connector 73*e* are plat-like (linear) metallic members, have one end as the fixed end and the other end as the free end, and are fixed to and supported on the connector body 73*e*1. On the other end sides of the four body side terminals 73*e*2, formed are curved sections that curve toward the ID chip 35 (toner container 32Y) side. That is, the body side terminals 73*e*2 curve toward the ID chip 35 like a knee (or a boomerang). The curved sections of the body side terminals 73*e*2 are sections that functions as contact points with the metallic pads 35*a***.

In accompany with the mounting operation of the cap section 34Y (the toner container 32Y) on the cap receiving section 73, the curved section of the body side terminal **73*e*2 comes in contact with nearly the central section of the metallic pad 35*a* in the longitudinal direction. Then, when the mounting operation of the cap section 34Y further proceeds, the ID chip 35 (the substrate 35*b*) approaches to the connector 73*e* side, the body side terminal 73*e*2 is deformed so that the curved section of the body side terminal 73*e*2 get close to the first virtual straight line S1 while being pressed by the metallic pad 35*a* and elastically deformed (a state in which a curved knee stretches). That is, in accompany with the mounting operation of the cap section 34Y, the curved section of the body side terminal 73*e*2 slides toward the left in FIG. 29 from the central section in the longitudinal direction (approaches the first virtual straight line S1) while gradually increasing contact pressure on the metallic pad 35*a***.

Through the above described configuration, even if the position of the cap section 34Y (the metallic pad **35*a*) in the longitudinal direction (the Y direction) is misaligned with the cap receiving section 73 (the body side terminal 73*e*2) depending on whether or not a degree of dimensions accuracy or a degree of assembly accuracy of an associated component is high or low (a dimension variation), the contact failure between the body side terminal 73*e*2 and the metallic pad 35*a* can be prevented with a high degree. Finally, since the body side terminal 73*e*2 and the metallic pad 35*a* come in contact with each other near the position where the positioning pin 73*e*3 is engaged with the notch 35*b*1 (near the first virtual straight line S1), the distance between the positioning section and the connect section can be reduced. As a result, a degree of accuracy of the contact position between the body side terminal 73*e*2 and the metallic pad 35*a*** increases.

Further, in the present first embodiment, the plurality of metallic pads **35*a*** are disposed in line in the arrangement direction that is the vertical direction.

As a result, the positioning direction of the cap section 34Y in the cap receiving section 73 (the arrangement direction of the positioning pins 73*a* and 73*b* and the positioning holes 34*a* and 34*b*) is the same as the positioning direction of the connector 73*e* and the substrate 35*b* (the arrangement direction of the positioning pin 73*e*3 and the notch 35*b*1), and thus the contact failure between the body side terminal 73*e*2 and the metallic pad 35*a* is difficult to occur.

Referring to FIG. 21, the positioning holes 34*a* and 34*b* of the cap section 34Y are formed at positions apart from each other in the vertical direction to sandwich the ID chip 35 (the information storage device). A third virtual straight line S3 that connects the centers of the two positioning holes 34*a* and 34*b* is configured to be parallel to the first virtual straight line S1 that connects the two positioning notches 35*b*1.

As described above, since the ID chip 35 is disposed be fixed between the first positioning hole 34*a* (the main reference) and the second positioning hole 34*b* (the sub reference), the position of the ID chip 35 with respect to the connector 73*e* of the cap receiving section 73 is decided with a high degree of accuracy. Thus, the communication failure caused by position misalignment between the connector 73*e* and the ID chip 35 can be suppressed. Particularly, since the positioning direction of the cap section 34Y in the cap receiving section 73 (the arrangement direction of the positioning pins 73*a* and 73*b* and the positioning holes 34*a* and 34*b*) is the same as the positioning direction of the connector 73*e* and the substrate 35*b* (the arrangement direction of the positioning pin 73*e*3 and the notch 35*b*1), the positioning operation of the toner container 32Y on the image forming apparatus body 100 contributes to making it easier to position of the substrate 35*b* on the connector 73*e*. As a result, there is an effect in that the contact failure between the body side terminal 73*e*2 and the metallic pad 35*a* is difficult to occur.

Further, a procedure in which components of the bottle receiving section 72 and the cap receiving section 73 are concerned with the cap section 34Y when the mounting operation of the toner container 32Y on the toner container storage unit 70 proceeds is as follows.

First, the cap section 34Y slides on the bottle receiving surface 72*a*, and thereafter, the guide rail section 34*e* of the cap section 34Y is fitted into the engaged groove 73*m* of the cap receiving section 73, the lateral protrusion 34*c* of the cap section 34Y is fitted into the lateral groove 73*h* and the groove section 73*r*1 of the cap receiving section 73, and the posture of the cap section 34Y in the cap receiving section 73 in the vertical and horizontal directions is restricted. At this time, shaking of the cap section 34Y before being inserted into the cap receiving section 73 is prevented by the cap section sandwiching member 73*r*. The first positioning hole 34*a* of the cap section 34Y is fitted into the main reference pin 73*a* of the cap receiving section 73, and so positioning of the main reference is performed. Thereafter, the second positioning hole 34*b* of the cap section 34Y is fitted into the sub reference pin 73*b* of the cap receiving section 73, and so main and sub positioning is completed. Further, while the positioning is being completed, the contact state between the stopper section 34*d*22 of the shutter member 34*d* of the cap section 34Y and the contact section 34*n*5 is released by the stopper release urging section 72*b*, and the postures of the shutter member 34*d* and the cap section 34Y in the cap receiving section 73 are decided by a body side shutter closing mechanism (not shown). In this state, the opening operation of the shutter member 34*d* is performed. The toner discharge opening W opened in the cap section 34Y is communicated with the toner feeding opening 73*w* of the cap receiving section 73. The notch 35*b*1 of the ID chip 35 of the cap section 34Y is engaged with the positioning pin 73*e*3 of the connector 73*e* of the apparatus body 100, the position of the ID chip 35 in the cap section 34Y is decided, and the plurality of metallic pads 35*a* of the ID chip 35 come in contact with the plurality of body side terminals 73*e*2 of the connector 73*e*, respectively, with a high degree of certainty. Thus, setting of the cap section 34Y (the toner container 32Y) in the cap receiving section 73 (the toner container storage unit 70) is completed. At this time, the gear 33*c* of the container body 33Y meshes with the driving gear 81 of the apparatus body 100.

Meanwhile, when extracting (removing) the toner container 32Y from the toner container storage unit 70 (the cap receiving section 73), the procedure reverse to the procedure at the time of mounting is performed.

As described above, in the image forming apparatus according to the present first embodiment, as the user performs one action of moving the toner container 32Y in the longitudinal direction while gripping the gripping section 33*d* (excluding the opening/closing operation of the body cover), the opening/closing operation of the toner discharge opening W by the shutter member 34*d* is also performed in conjunction with the operation, and the mounting operation and the removing operation of the toner container 32Y is completed.

Further, in the toner container 32Y according to the present first embodiment, the toner discharge opening W having the comparatively large opening area size is disposed downward in the vertical direction, and so the toner can be discharged such that it falls directly from the toner discharge opening W by its own weight.

Further, since the toner container 32Y is not placed from above the toner container storage unit 70 (the apparatus body 100) but attached to or detached from the front surface of the toner container storage unit 70 (the apparatus body 100), a degree of freedom of the layout above the toner container storage unit 70 increases. For example, even when a scanner (a document reading section) is disposed directly above the toner feeding device, operability or workability at the time of attachment/detachment of the toner container 32Y does not deteriorate.

Further, since the toner container 32Y is disposed in the apparatus body 100 such that the longitudinal direction is the horizontal direction, it does not have any influence on the overall layout of the image forming apparatus body 100 in the height direction. The toner capacity of the toner container 32Y increases, and so the replacement frequency can be reduced.

As described above, in the present first embodiment, the contact-type ID chip 35 (the information storage device) is held on the holding member 34*k* (the holding section) to be movable on the virtual plane that is substantially orthogonal to the movement direction in which the metallic pads 35*a* (terminals) approach and come in contact with the body side terminals 73*e*2. Thus, even when the contact-type ID chip 35 (the information storage device) is installed in the toner container 32Y (the removable device) installed removably on the image forming apparatus body 100, the contact failure caused by the positioning failure with the body side terminals 73*e*2 of the connector 73*e* of the image forming apparatus body 100 is difficult to occur.

Second Embodiment

Figure 32:
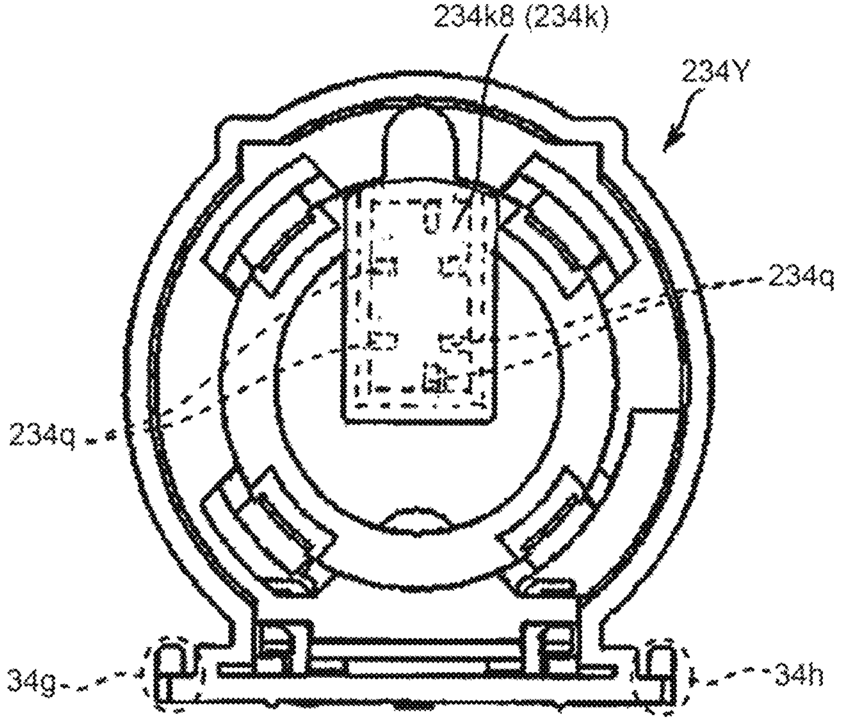
FIG. 32 is a back view illustrating a cap section in the toner container of FIG. 31.
Figure 33:
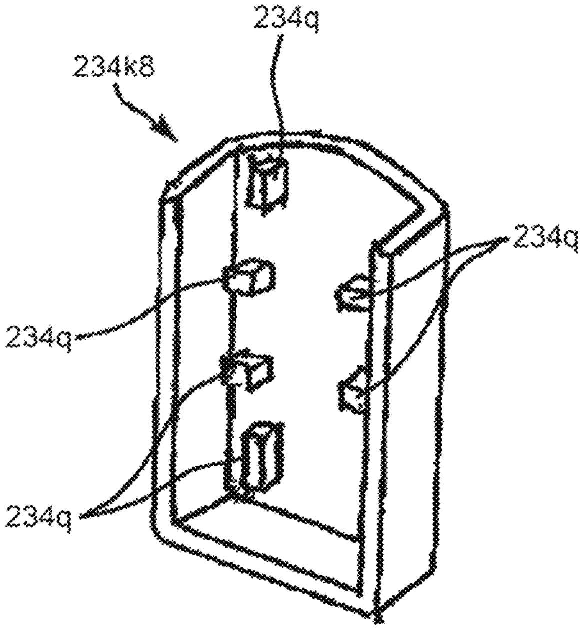
FIG. 33 is a perspective view illustrating a holding cover engaged with a holding member.

A second embodiment of the present invention will be described in detail with reference to FIGS. 31 to 33.

Figure 31:
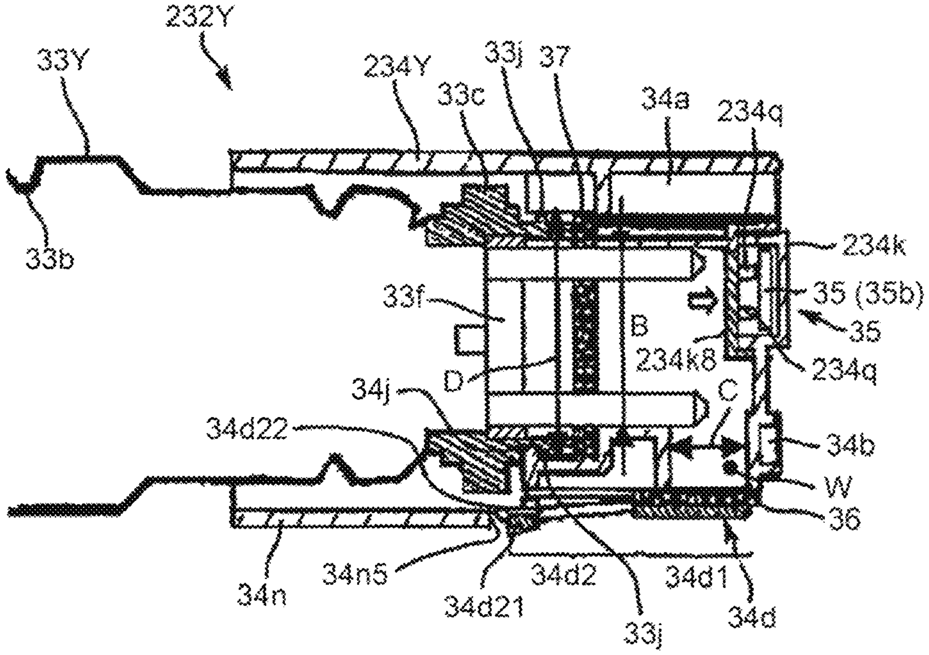
FIG. 31 is a schematic cross sectional view illustrating a toner container according to a second embodiment.

FIG. 31 is a schematic cross sectional view illustrating a toner container 232Y according to the present second embodiment. FIG. 32 is a back view illustrating a cap section 234Y of a toner container 232Y. FIG. 33 is a perspective view illustrating a holding cover 234*k*8 that is fitted into a holding member 234*k*.

The toner container 232Y according to the present second embodiment is different from the first embodiment in configuration of the holding member 234*k* in a holding mechanism for holding the information storage device.

Similarly to the first embodiment, the toner container 232Y according to the present second embodiment includes the container body 33Y and a cap section 234Y. The ID chip 35 as the information storage device is removably installed in the cap section 234Y.

In the cap section 234Y according to the present second embodiment, the holding member 234*k* in which the opening 34*k*2 exposing part of the ID chip 35 (the metallic pads 35*a* and the notch 35*b*1) is formed is integrally formed.

The ID chip 35 is inserted into from the inner side of the cap section 234Y in a direction of an arrow in FIG. 31 and set at the position of the holding member 234*k*. In the state in which the ID chip 35 is set at the position of the holding member 234*k*, the holding cover 234*k*8 is inserted into from the inner side of the cap section 234Y in the direction of the arrow in FIG. 31 and fitted into the holding member 234*k* (the state of FIG. 32).

In the holding cover 234*k*8, a pedestal section 234*q* that is fitted into the holding member 234*k* is disposed so as not to come in contact with the substrate 35*b*.

Further, the holding cover 234*k*8 is tightly installed without a clearance with the inner wall of the cap section 234Y so as to prevent the toner leaking from the toner container 232Y from sticking to the ID chip 35.

Even in the present second embodiment, the ID chip 35 (the substrate 35*b*) is held in the holding member 234*k* (and the holding cover 234*k*8) to be movable on the XZ plane.

As described above, similarly to the first embodiment, even in the present second embodiment, the contact-type ID chip 35 (the information storage device) is held on the holding member 234*k* (the holding section) to be movable on the virtual plane that is substantially orthogonal to the movement direction in which the metallic pads 35*a* (terminals) approach and come in contact with body side terminals 73*e*2. Thus, even when the contact-type ID chip 35 (the information storage device) is installed in the toner container 232Y (the removable device) installed removably on the image forming apparatus body 100, the contact failure caused by the positioning failure with the body side terminals 73*e*2 of the connector 73*e* of the image forming apparatus body 100 is difficult to occur.

Third Embodiment

A third embodiment of the present invention will be described in detail with reference to FIG. 34.

Figure 34:
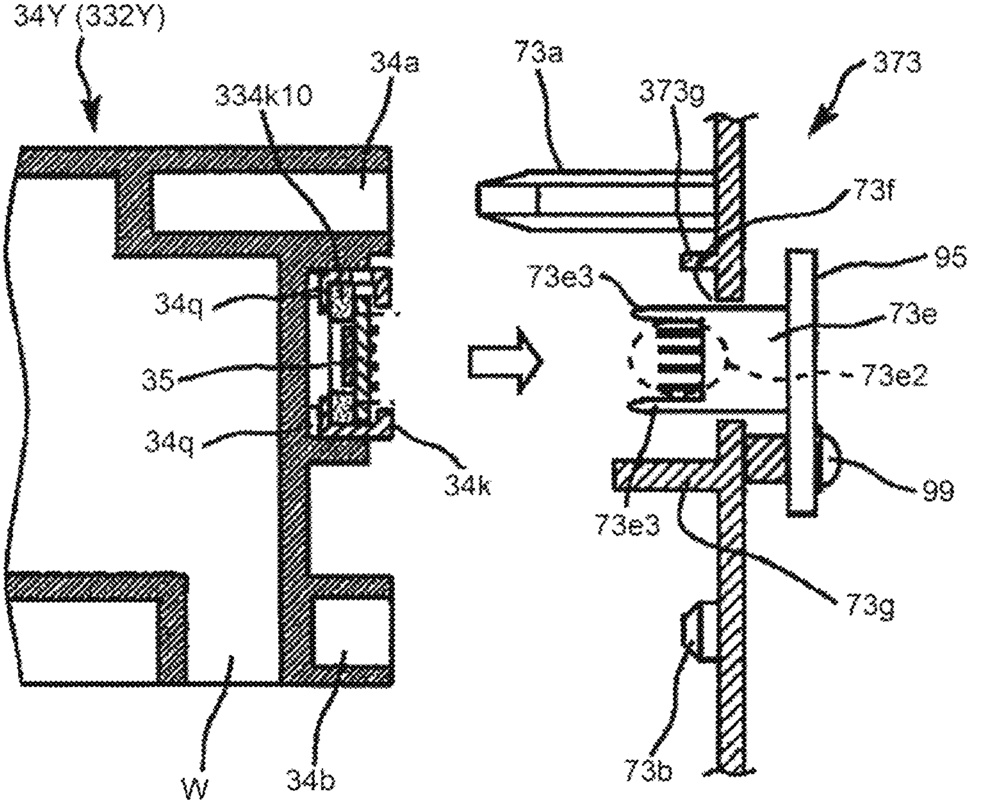
FIG. 34 is a schematic view illustrating a state in which an information storage device of a toner container according to a third embodiment is set to a connector of a cap receiving section.

FIG. 34 is a schematic view illustrating a state in which the information storage device 35 of a toner container 332Y according to the present third embodiment is set to the connector 73*e* of the cap receiving section 73. FIG. 34 is a view corresponding to FIG. 27 in the first embodiment.

The present third embodiment is different from the first embodiment in that a cushion material 334*k*10 is installed inside the holding member 34*k* and a configuration of a wall section 373*g* of a cap receiving section 373 is different.

Similarly to the above embodiments, a toner container 332Y according to the present third embodiment includes a container body 33Y and the cap section 34Y. The ID chip 35 as the information storage device is removably installed in the cap section 34Y. Further, the ID chip 35 is held in the holding member 34*k* to be movable in the XZ plane.

In the present third embodiment, the cushion material 334*k*10 is disposed between the inner wall (the second facing section 34*k*5) of the holding member 34*k* and the substrate 35*b*. The cushion material 334*k*10 is made of an elastic material such as foamed polyurethane, and a low frictional material adheres to a section facing the substrate 35*b*. Thus, it is possible to alleviate damage occurring in the substrate 35*b* when the positioning pin 73*e*3 is engaged with the notch 35*b*1 without hindering movement of the ID chip (the substrate 35*b*) in the XZ plane.

In the present third embodiment, the wall section 373*g* of the cap receiving section 373 is installed to surround four sides of the connector 73*e*. In order to cope with it, the concave section for avoiding interference with the wall section 373*g* is formed in the cap section 34Y. By disposing the wall section 373*g* as described above, even if the toner is scattered from the vicinity of the toner discharge opening W of the toner container 332Y to the outside, the scattered toner is difficult to stick directly to the connector 73*e* or the ID chip 35. Thus, the contact failure (the communication failure) between the connector 73*e* (the body side terminal 73*e*2) and the ID chip 35 (the metallic pad 35*a*) caused by the scattered toner can be prevented.

As described above, similarly to the above embodiments, even in the present third embodiment, the contact-type ID chip 35 (the information storage device) is held on the holding member 34*k* (the holding section) to be movable on the virtual plane that is substantially orthogonal to the movement direction in which the metallic pads 35*a* (terminals) approach and come in contact with body side terminals 73*e*2. Thus, even when the contact-type ID chip 35 (the information storage device) is installed in the toner container 332Y (the removable device) installed removably on the image forming apparatus body 100, the contact failure caused by the positioning failure with the body side terminals 73*e*2 of the connector 73*e* of the image forming apparatus body 100 is difficult to occur.

Fourth Embodiment

A fourth embodiment of the present invention will be described in detail with reference to FIG. 35.

Figure 35:
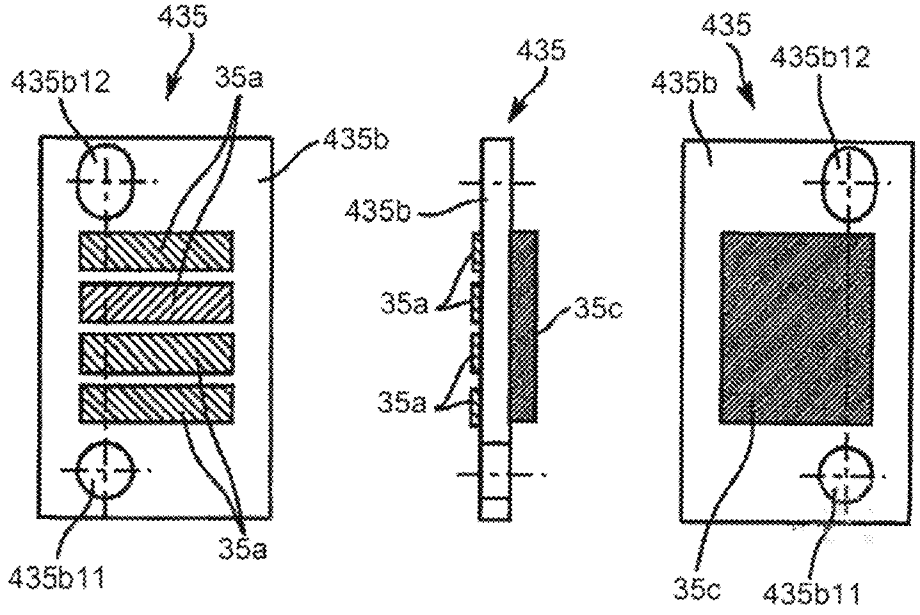
FIG. 35 is a three-plane view illustrating a substrate of an information storage device according to a fourth embodiment.

FIG. 35 is a three-plane view illustrating a substrate 435*b* of an information storage device 435 according to the present fourth embodiment. FIG. 35 is a view corresponding to FIGS. 14A and 14B in the first embodiment.

Similarly to the above embodiments, a toner container (432Y) according to the present fourth embodiment also includes the container body 33Y and the cap section 34Y. The ID chip 435 as an information storage device is removably installed in the cap section 34Y. Further, the ID chip 435 is held in the holding member 34*k* to be movable in the XZ plane.

In a substrate 435*b* of the ID chip 435 according to the present third embodiment, instead of the positioning notch 35*b*1 in the above embodiments, positioning holes 435*b*11 and 435*b*12 are disposed. In accompany with the mounting operation of the toner container (432Y), the substrate 435*b* freely moves in the XZ plane, and the positioning holes 435*b*11 and 435*b*12 are engaged with the positioning pins 73*e*3 of the connector 73*e*. Specifically, edges (or inner surfaces) of the holes 435*b*11 and 435*b*12 come in contact with the positioning pins 73*e*3, and movement of the substrate 435*b* is restricted. Thus, the contact failure caused by the positioning failure between the plurality of metallic pads 35*a* and the body side terminals 73*e*2 of the connector 73*e* is difficult to occur.

In the present fourth embodiment, in view of the fact that the substrate 435*b* is positioned at the lower side of the holding member 34*k* due to the weight of the substrate 435*b* directly before the positioning holes 435*b*11 and 435*b*12 are engaged with the positioning pins 73*e*3, the circular hole 435*b*11 is formed in the lower section of the substrate 435*b*, and the elliptical hole 435*b*12 is formed in the upper section of the substrate 435*b*. The hole 435*b*11 in the lower section is picked up by the positioning pin 73*e*3, and so the substrate 435*b* is raised, and the positioning pin 73*e*3 is smoothly inserted into the other elliptical hole (the hole 435*b*12). If the hole in the lower section is the elliptical hole and the hole in the upper section is the circular hole, the substrate 435*b* may not be raised by the positioning pin 73*e*3, and the positioning pin 73*e*3 may be difficult to be inserted into the circular hole in the upper portion.

In the present fourth embodiment, the two positioning holes 435*b*11 and 435*b*12 are formed in the substrate 35*b* of the ID chip 35. On the other hand, in the substrate 435*b* of the ID chip 435, one may be formed of the positioning holes 435*b*11 (or 435*b*12), and the other may be formed of the positioning notch 35*b*1 (that has been used in the above embodiments). Even in this case, the same effect as in the present fourth embodiment can be obtained.

As described above, similarly to the above embodiments, even in the present fourth embodiment, the contact-type ID chip 435 (the information storage device) is held on the holding member 34*k* (the holding section) to be movable on the virtual plane that is substantially orthogonal to the movement direction in which the metallic pads 35*a* (terminals) approach and come in contact with body side terminals 73*e*2. Thus, even when the contact-type ID chip 435 (the information storage device) is installed in the toner container (the removable device) installed removably on the image forming apparatus body 100, the contact failure caused by the positioning failure with the body side terminals 73*e*2 of the connector 73*e* of the image forming apparatus body 100 is difficult to occur.

Fifth Embodiment

A fifth embodiment of the present invention will be described in detail with reference to FIGS. 36 to 41.

Figure 36:
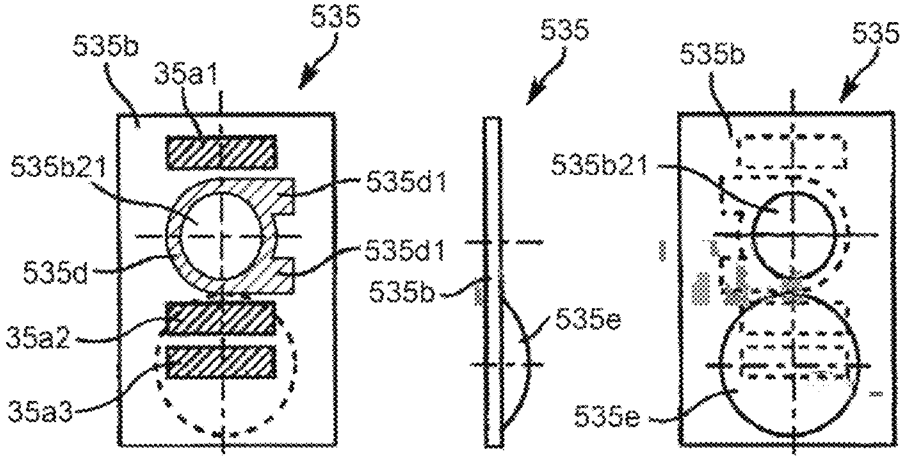
FIG. 36 is a three-plane view illustrating a substrate of an information storage device according to a fifth embodiment.
Figure 37:
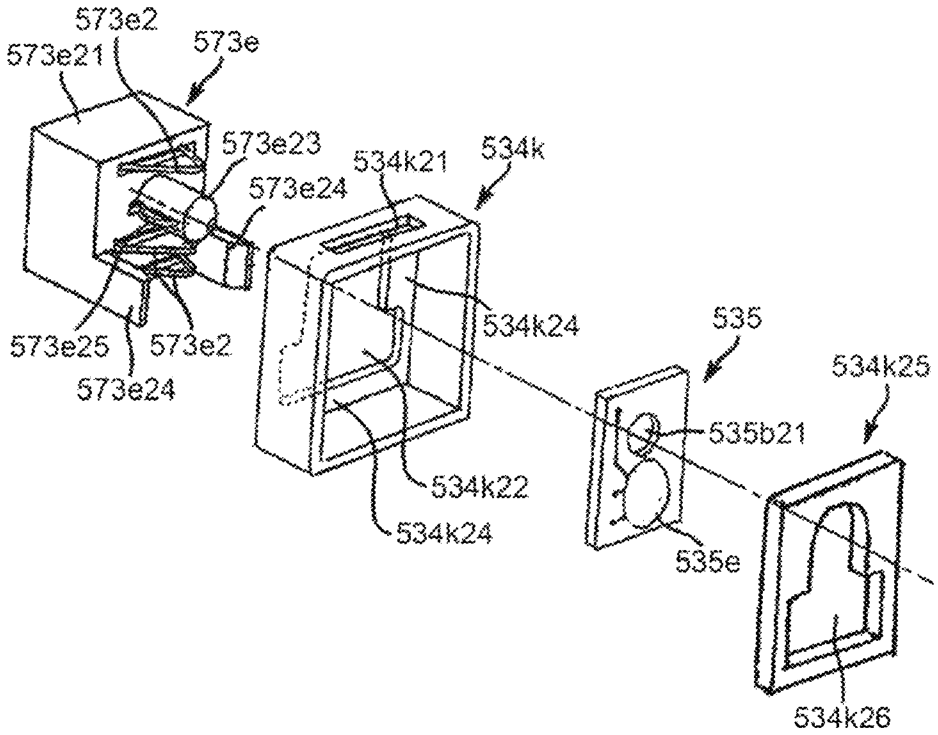
FIG. 37 is a perspective view illustrating an information storage device, a holding member, and a connector.
Figure 38:
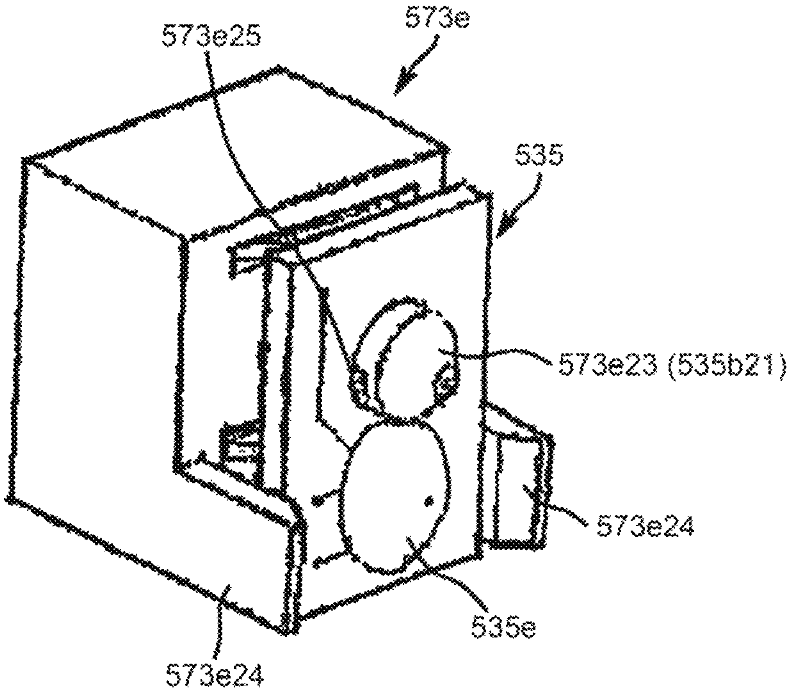
FIG. 38 is a perspective view illustrating a state in which an information storage device is engaged with a connector.
Figure 39A:
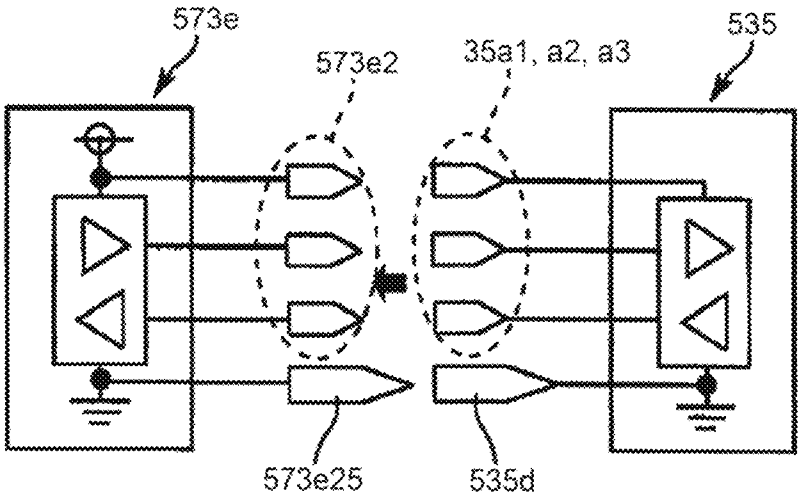
FIGS. 39A and 39B are schematic views illustrating an electric circuit of an information storage device and an electric circuit of a connector.
Figure 39B:
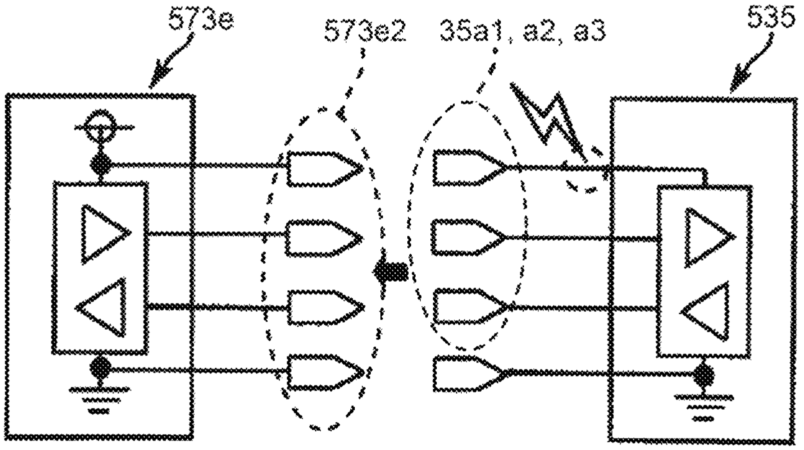
Figure 40A:
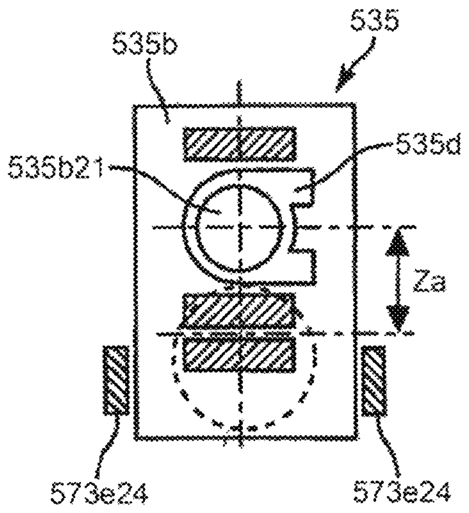
FIGS. 40A and 40B are front views illustrating an information storage device.
Figure 40B:
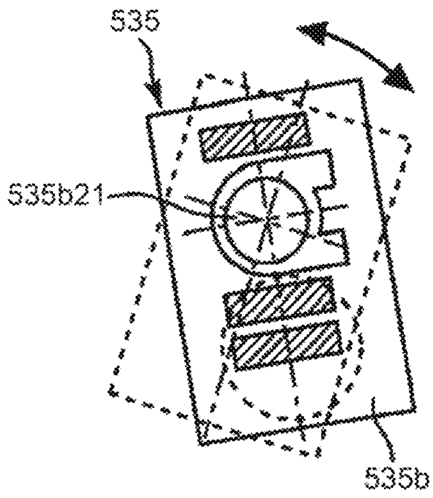
Figure 41:
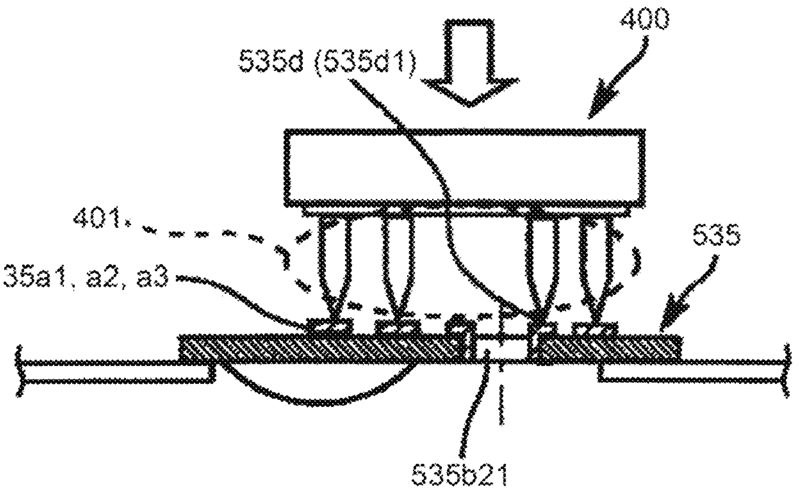
FIG. 41 is a view illustrating an information storage device in an inspection process.

FIG. 36 is a three-plane view illustrating a substrate of an information storage device 535 according to the present fifth embodiment and is a view corresponding to FIG. 29 in the first embodiment. FIG. 37 is a perspective view illustrating the information storage device 535, a holding member 534*k* (534*k*25), and a connector 573*e* and is a perspective view illustrating a relative positional relation of the three members 534*k* (534*k*25), 535, and 573*e*. FIG. 38 is a perspective view illustrating a condition in which the information storage device 535 is engaged with the connector 573*e*. FIGS. 39A and 39B are circuit diagrams illustrating an electric circuit of the information storage device 535 and an electric circuit of the connector 573*e*. FIG. 40A is a front view illustrating a condition in which the information storage device 535 is held on the connector 573*e*, and FIG. 40B is a front view illustrating a condition in which the information storage device 535 is rotating on a positioning hole 535*b*21. FIG. 41 is a view illustrating the information storage device 535 that comes in contact with a probe 400 in an inspection process when manufactured in a factory.

The present fifth embodiment is different from the first to fourth embodiments in that only one positioning hole 535*b*21 is formed in the substrate 535*b* of the information storage device 535, and the positioning hole 535*b*21 is disposed between a plurality of rectangular metallic pads 35*a*1, 35*a*2, and 35*a*3 (metallic pads).

Referring to FIG. 36, the ID chip 535 as the information storage device according to the present fifth embodiment has the positioning hole 535*b*21 that is formed at the upper position in the vertical direction further than the gravity center of the substrate 535*b*. An earth metallic terminal 535*d* is disposed on an inner surface of the hole 535*b*21 and around the hole 535*b*21. In the present fifth embodiment, the metallic terminal 535*d* formed on the surface of the substrate 535*b* includes two protruding sections 535*d*1 that are formed to extend from a rink-like section in the horizontal direction.

Further, the rectangular metallic pad 35*a*1 is installed above the positioning hole 535*b*21 in the vertical direction, and the two rectangular metallic pads 35*a*2 and 35*a*3 are installed below the positioning hole 535*b*21 in the vertical direction.

Further, on the back side of the substrate 535*b* (the side facing the cap section 34Y), a protection member 535*e* that is made of a resin material having a substantially hemispherical shape or a shape of an inverted pan such as epoxy and covers the information storage unit is disposed. In the present fifth embodiment, although it depends on the shape of the substrate 535*b* or the configuration/arrangement of the back surface such as the protection member 535*e*, by disposing the hole 535*b*21 above the protection member 535*e* that may include the information storage unit such an integrated circuit (IC) thereinside and is a heaviest component, a positional relation in which the hole 535*b*21 is installed vertically above the gravity center of the ID chip 535 is implemented. Specifically, referring to FIG. 40A, the ID chip 535 (the information storage device) according to the present fifth embodiment is formed so that the center position of the positioning hole 535*b*21 is at the distance Za above the gravity center of the ID chip 535.

Referring to FIG. 37, the connector 573*e* includes a connector body 573*e*21 that is made of resin and is a hollow box, and a positioning pin 573*e*23 (a positioning protruding section) that is a hollow cylinder and having a tapered tip is disposed on the connector body 573*e*21 to stand in the horizontal direction. A body side earth terminal 573*e*25 (an earth terminal) is installed in the positioning pin 573*e*23. The body side earth terminal 573*e*25 is a plat-like (or linear) metallic member, partially stored in the hollow section of the positioning pin 573*e*23 formed integrally with a connector 573*e*21, and has a curved section that is exposed from a slit-like opening formed in part of the circumferential surface of the hollow cylinder and protrudes from the cylindrical outer circumferential surface. Further, one body side terminal 573*e*2 is installed vertically above the positioning pin 573*e*23 (the body side earth terminal 573*e*25), and two body side terminals 573*e*2 are installed vertically below the positioning pin 573*e*23 (the body side earth terminal 573*e*25). The body side terminals 573*e*2 are plat-like (or linear) metallic members and are formed almost in the same manner as in the above embodiments except that the installation position is different.

Further, swing preventing members 573*e*24 as a pair of guiding members protrude from the right and left sides of the positioning pin 573*e*23. The guiding members include a pair of plates whose tips have inner tapered surfaces facing each other and the guide the both sides of the ID chip 535 to be upright.

Similarly to the above embodiments, the holding member 534*k* (the holding section) is fixed to a toner container (532Y) and positioned between the connector 573*e* and the ID chip 535. The holding member 534*k* has almost the same function (a function for movably holding the ID chip 35) as in the above embodiments. Referring to FIG. 37, the holding member 534*k* according to the present fifth embodiment has a first facing section 534*k*24 that is configured to be linearly symmetrical on an center axis in the vertical direction and is formed to cover an area from two upper corners of the ID chip 535 to both sides of the hole 535*b*21. The holding member 534*k* is formed to cover the lower section of the substrate 535*b* further than the lowest metallic pad 35*a*3, and through the above described configuration, the ID chip 535 is prevented from falling from the holding member 534*k*.

Further, in the holding member 534*k*, the first facing section 534*k*24 including an area facing the four body side terminals 573*e*2 and 573*e*25 of the connector 573*e* is formed of an opening. Particularly, in the holding member 534*k*, formed is an opening 534*k*22 that is opened up to a section corresponding to a pair of swing preventing members 573*e*24. At the time of mounting of the toner container 532Y, the positioning pin 573*e*23 is inserted into the opening 534*k*22, and thereafter the pair of swing preventing members 573*e*24 (the pair of guiding members) is also inserted into the holding member 534*k* through the opening 534*k*22.

A second facing section 534*k*25 of a flat plate form facing the back surface of the ID chip 535 (the side of the holding member 535*e*) is fixed to the holding member 534*k* by adhesion or a snap fit (not shown). The second facing section 534*k*25 includes a opening 534*k*26 similarly to the opening 534*k*22 and so can avoid interference with the holding members 535*e* or the inserted swing preventing member 573*e*24. Meanwhile, when the positioning pin 573*e*23 is inserted into the hole 535*b*21 of the ID chip 535, the ID chip 535 is pushed, but since the second facing section 534*k*25 supports the substrate 535*b* from the rear side, the contact condition between the terminals can be maintained.

FIG. 38 is a schematic perspective view illustrating the condition in which positioning of the connector 573*e* and the ID chip 535 at the apparatus body 100 side is completed. The condition is that the toner container 532Y according to the fifth embodiment is mounted on the apparatus body 100, and the body side terminals 573*e*2 and 573*e*25 are connected with the abovementioned metallic pads 35*a*1 to 35*a*3 and the earth terminal 535*d*. In FIG. 38, for the sake of easy understanding, the holding member 534*k* (534*k*25) between the connector 573*e* and the ID chip 535 and the metallic pads 35*a*1 to 35*a*3 are omitted.

When mounting the toner container 532Y on the image forming apparatus body, the main and subordinate positioning holes 34*a* and 34*b* of the cap section 534Y are fitted into the main and subordinate positioning pins 73*a* and 73*b* of the cap receiving section 73, and positioning of the cap section 534Y is performed. This mounting operation is the same as the mounting operation of the first embodiment. After the position of the cap section 534Y is decided, the hole 535*b*21 of the ID chip 535 is fitted into the positioning pin 573*e*23 to be picked up by the tapered tip of the positioning pin 573*e*23 of the connector 573*e*. As a result, the position of the ID chip 535 in the horizontal direction and the vertical direction is decided at the same time. Further, as illustrated in FIG. 40A, the swing preventing members 573*e*24 (the pair of guiding members) of the connector 573*e* that includes the pair of plates are inserted into the lower edge portions that are at both right and left sides of the substrate 535*b* and at the lower area further than the center of the hole 535*b*21. At this time, it is a possible case that the posture of the ID chip is misaligned as illustrated in FIG. 40B. Even in this case, if the inner tapered surfaces of the plates comes in contact with the lower edge portions, it causes the substrate 535*b* to rotate in a direction for having the posture to be vertical by the action of the gravity center, and the misalignment of the posture in the rotation direction (rotation in a direction of an arrow illustrated in FIG. 40B) is corrected (it becomes a condition of FIG. 40A). Thus, positioning of the ID chip 535 is completed. At this time, part of the earth terminal 535*d* of the ID chip 535 (a section corresponding to the inner surface of the hole 535*b*21) comes in contact with the body side earth terminal 573*e*25 of the positioning pin 573*e*23 illustrated in FIG. 38, and the ID chip 535 is earthed (conduction). Further, after the earth is connected the three metallic pads 35*a* (35*a*1, 35*a*2, and 35*a*3) of the ID chip 535 also come in contact with the three body side terminals 573*e*2 of the connector 573*e*, respectively, and so information can be transmitted between the ID chip 535 and the body side connector 573*e* (the apparatus body 100).

As described above, in the present fifth embodiment, a high-accuracy positioning mechanism is implemented by an inexpensive configuration by adding various ideas such as the following ideas (1) to (5).

(1) It is only one positioning hole 535*b*21 for ID chip 535 to need to be positioned. Thus, the drill processing time of the substrate 535*b* in the manufacturing become shorter than two positioning holes type's ID chip, and the manufacturing cost can be reduced.

(2) The body side earth terminal 573*e*25 is integrally installed on the side circumferential surface of the positioning pin 573*e*23. Thus, the distance between the positioning pin 573*e*23 and the body side earth terminal 573*e*25 can become real zero (0), and a degree of position accuracy of the earth terminal 535*d* with respect to the body side terminal 573*e*25 can increase.

(3) In the mounting completion condition of FIG. 38, the positional relation between the positioning hole 535*b*21 and the curved sections of the body side terminals 573*e*2 is adjusted so as to match the hole center of the hole 535*b*21 with the line that connects the curved sections (connection sections) of the three body side terminals 573*e*2 at the connector 573*e* side. Thus, the distance in the horizontal direction from the hole 535*b*21 as the positioning section to the contact sections can be reduced to nearly 0 mm. As a result, when the three metallic pads 35*a*1, 35*a*2, and 35*a*3 come in contact with the body side terminals 573*e*2, a degree of position accuracy is improved.

(4) A plurality of metallic pads 35*a*1, 35*a*2, and 35*a*3 are lined, and the positioning hole 535*b*21 is arranged at either of two spaces formed between two of the three lined pads. Thus, compared to another arrangement type's ID chip in which the hole is disposed at the lower side or the upper side outside a row of the plurality of metallic pads 35*a*1, 35*a*2, and 35*a*3, the distance (that corresponds to the arm length of the pendulum) from the center of the positioning hole 535*b*21 to the farthest metallic pad 35*a* can be reduced. Specifically, on the another type, the arm length becomes the distance corresponding to the three metallic pads from the hole center. However, in the present fifth embodiment, the arm length can be the distance corresponding to the two metallic pads. Since the arm length of the pendulum is short, even if the parallelism of the farthest metallic pad 35*a* on the body side terminal 73*e*2 is misaligned due to, for example, variability in the mass production, the misalignment can be suppressed to a minimum.

(5) When a user stores the toner container in some space out of the image forming apparatus, an alien substance may enter the holding member 534*k* and so the nipping position between the ID chip 535 and the facing sections 534*k*24 and 534*k*25 may remain misaligned. On this problem, in the present fifth embodiment, the positional relation between the hole 535*b*21 and the gravity center of the ID chip 535 is improved. The hole 535*b*21 is arranged vertically above the gravity center of the ID chip 535. Thus, when the pair of the swing preventing members 573*e*24 is inserted below the hole 535*b*21 that is the rotation center, the substrate 535*b* contacts with the tapered tips of the swing preventing member 573*e*24. Then, the posture of the ID chip 535 is urged to rotate in the vertical direction by the force of gravity and is corrected to be upright. As a result, even if there is one positioning hole 535*b*21, a degree of position accuracy of the plurality of metallic pads 35*a*1, 35*a*2, and 35*a*3 on the plurality of body side terminals 573*e*2 can be increased at the same time.

Figure 87:
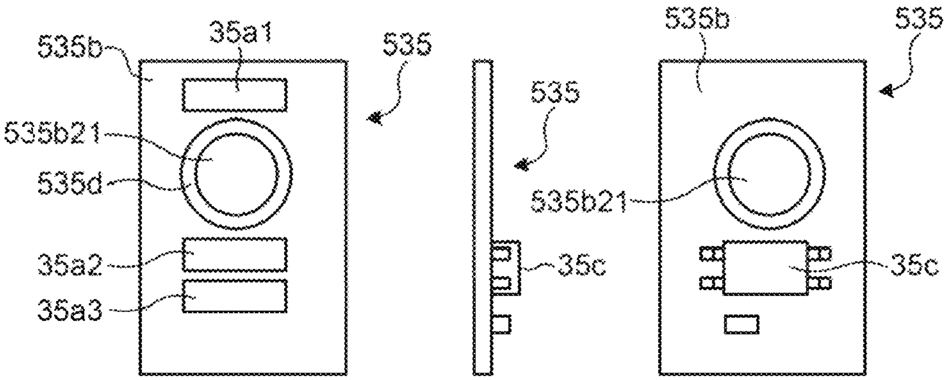
FIG. 87 is a three-plane view illustrating an alternative of the substrate illustrated in FIG. 36.

Depending on a number of produced planned to be made, there is a possibility that it is determined that the conduction inspection device has a margin in durability. In this case, inspection can be conducted using a inspection device having a configuration similar to the connector of the image forming apparatus body 100, i.e. by inserting a conduction probe into the hole in which the earth terminal 535*d* is formed. In this case, as in a modification of the ID chip illustrated in FIG. 87, a circular earth terminal that does not include the protruding sections 535*d*1 may be employed. The same also applies to a case in which a manufacturing method in which the conduction inspection is omitted based on improvement in production process is employed. With this modification, the area of the metallic members can be reduced and the manufacturing cost can be reduced. In FIG. 87, the ID chip is illustrated assumed as being of a type in which no protection member is provided on the IC circuit on the back surface and, therefore, the IC circuit is exposed. If the manufacturing environment, etc. allows absence of the protection member, such an ID chip is useful for cost reduction. Although any layout is available so long as the IC circuit keeps out from both the right-and-left areas for smooth sliding, it is preferable to arrange a relatively large IC in a lower section so that the center of gravity is located at a lower position.

Figure 88A:
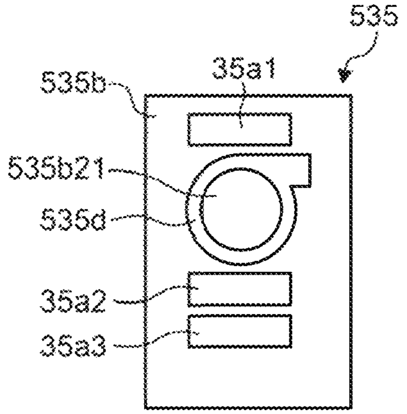
FIGS. 88A to 88C are plane views illustrating further alternatives of the substrate illustrated in FIG. 36.
Figure 88B:
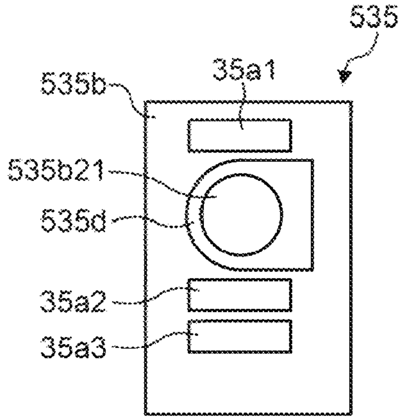
Figure 88C:
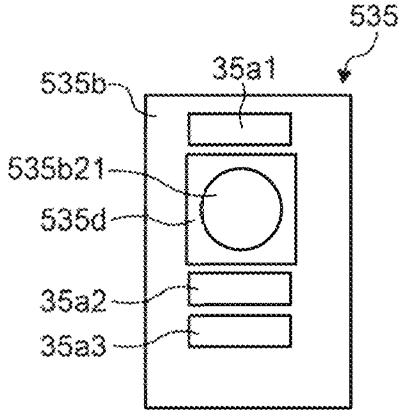

Moreover, if the earth conduction probe is of one pin, it is allowable to provide, as illustrated in FIG. 88A, one protruding section with which the earth prove 401 comes in contact. For easy earth inspection, the modification illustrated in FIG. 88B that has a size-increased probe contacting section may be employed. This is useful in particular in a case of manual inspection. The modification illustrated in FIG. 88C that has not a circular frame but a square frame may also be employed. Any of the modifications of FIGS. 88A, 88B, and 88C are designed freely so long as the outer circumferential area of the terminal formed in the hole keeps out from both the right-and-left sliding areas. The back surfaces of the ID chips of FIGS. 88A, 88B, and 88C can be either covered by the protection member or uncovered.

As described in the above described ideas (1) to (5), each of the five ideas can provide each function effect, and even if an inexpensive configuration in which the area size of the metallic pad 35*a* becomes minimal is employed, it is possible to highly increase a degree of positioning accuracy between the plurality of terminals 35*a*1, 35*a*2, and 35*a*3 and 535*d* including the earth terminal at the ID chip 535 and the plurality of body side terminals 573*e*2 and 573*e*25.

Further, in the present fifth embodiment, the ideas and function effects different from ones described above will be described.

Firstly, each of the metallic pads 35*a*1, 35*a*2, and 35*a*3 are described. The metallic pad 35*a*1, which is at the highest level, receives a clock signal for communication control. While a serial communication method that is low-speed but low-cost because of sequential data transfer is employed and an I2C (Inter-Integrated Circuit) is employed as a serial bus, The metallic pad 35*a*1 forms a signal line to which a serial clock (SCL) is input when the signal line is connected to the body side connector. The metallic pad 35*a*1 corresponds to a terminal to which a clock-signal is input. Because a clock signal flows in one way, it is expected that the possibility that the ID chip 535 breaks down if to a short circuit occurs between the metallic pad 35*a*1 and a later-described Vcc (the power supply or the metallic pad 35*a*3) than between the other terminals and the Vcc. Therefore, to prevent break down of the ID chip 535, the metallic pad 35*a*1 is arranged more distant from the Vcc. This is because the possibility of bread down is lower if a short circuit occurs between the metallic pad 35*a*1 and the GND (the earth terminal 535*d*).

The metallic pad 35*a*2 also employs a serial communication method, employing an I2C as a serial bus, and forms a signal line to which serial data (SDA) is input/output when the signal line is connected to the body side connector. Because this pad has a bidirectional input/output mechanism, the possibility that the ID chip 535 breaks down due to a short circuit is lower than the possibility due to the one-way input metallic pad 35*a*1.

The metallic pad 35*a*3 forms a power input portion (Vcc) to which a 5V voltage or a 3.3V voltage is input when it is connected to the body side connector. To decrease the risk of break down of the entire device due to a short circuit between the power supply and the GND, the serial-data input terminal (the metallic pad 35*a*2) is arranged between the GND (the earth terminal 535*d*) and the serial-clock input terminal (the metallic pad 35*a*1). As illustrated in FIG. 36, the Vcc or the metallic pad 35*a*3 overlaps with the protection member 535*e* that is on the back side of the ID chip in such a manner that the substrate 535*b* is between them; therefore, the metallic pad 35*a*3 is close to an IC driving circuit included in the protection member 535*e*. With this arrangement, a short and thick line can be used as a power-supply line, which enables stable power-supply operations (=suppression of malfunction due to noises).

Secondly, ideas for earth are described. In the mounting operation of the toner container 532Y, the earth terminal 535*d* of the ID chip 535 comes in contact with the body side earth terminal 573*e*25 of the positioning pin 573*e*23 (the connector 573*e*), and then the three metallic pads 35*a*1, 35*a*2, and 35*a*3 of the ID chip 535 start to come in contact with the three body side terminals 573*e*2 of the connector 573*e*. That is, in the detaching operation of the toner container 532Y, contact between the three metallic pads 35*a*1, 35*a*2, and 35*a*3 of the ID chip 535 and the three body side terminals 573*e*2 of the connector 73*e* is released, and then the earth terminal 535*d* of the ID chip 535 is released from the contact condition with (separated from) the body side earth terminal 573*e*25 of the positioning pin 573*e*23 (the connector 573*e*). Specifically, referring to FIG. 39A, the body side earth terminal 573*e*25 in the connector 573*e* has the contact start position closer to the ID chip 535 side than the three body side terminals 573*e*2.

Through the above described configuration, in the mounting operation of the toner container 532Y, the metallic pads 35*a*1, 35*a*2, and 35*a*3 always start to be connected with the body side terminals 573*e*2 in the condition in which the ID chip 535 is earthed, and in the detaching operation of the toner container 532Y, the metallic pads 35*a*1, 35*a*2, and 35*a*3 always start to be separated from (released from the contact condition with) the body side terminals 573*e*2 in the condition in which the ID chip 535 is earthed. Thus, an electric circuit at the ID chip 535 is prevented from being not earthed and so becoming an electrically floating condition, and so the ID chip 535 is difficult to be electrically damaged.

In detail, when the electric circuit at the ID chip 535 is not earthed and becomes an electrically floating condition, the electrical circuit becomes a condition that is earthed with very large impendence. If static electricity, which is generated when the metallic pads 535*a* come in contact with or are separated from the body side terminals 573*e*2, slightly flows to the electric circuit, a high voltage that is the same as impedance is applied to the current is generated. The high voltage causes insulation breakdown inside the IC in the ID chip 535, and thus the IC is broken. This problem easily occurs when the contact start positions of the three body side terminals 573*e*2 and the body side earth terminal 573*e*25 on the ID chip 535 are formed at the same position, with respect to the connector 573*e*, as illustrated in FIG. 39B.

On the other hand, in the present fifth embodiment, the curved section of the body side earth terminal 573*e*25 exposed from the slit-like opening of the positioning pin 573*e*23 is disposed to be closer to the ID chip 535 than the curved section of the body side terminal 73*e*2 that most protrudes to the ID chip 535 side. Thus, since the earth is first connected, and at the time of separation and the earth is lastly disconnected at the time of contact, the impedance is always theoretically zero, and even if static electricity flows to the inside of the electric circuit, insulation breakdown inside the IC is prevented.

Further, in the ID chip 535 (the information storage device) according to the present fifth embodiment, the two protruding sections 535*d*1 are disposed on part of the outer circumference of the earth terminal 535*d* as described above with reference to FIG. 36.

Since the protruding sections 535*d*1 are disposed on the front surface of the substrate 535*b* of the ID chip 535 as described above, in the inspection process (a process of inspecting whether or not the ID chip 535 is defective) at the time of manufacturing in a factory, an operation of contacting a conduction inspection probe can be easily performed. In detail, as illustrated in FIG. 41, leading ends of a plurality of probes 401 of a conduction inspection device 400 are pressed downward against the metallic pads 35*a* and the earth terminal 535*d* of the ID chip 535 placed on an inspection table. At this time, since the protruding section 535*d*1 of the earth terminal 535*d* has an area that can sufficiently come in contact with the leading ends of the probes 401, a conduction inspection failure caused by a contact failure of the probes 401 can be prevented. Further, since conduction inspection is performed by pressing the leading end sections of the probes 401 downward against the earth terminal 535*d* (the protruding section 535*d*1), compared to when conduction inspection is performed by inserting the probes 401 into the hole 535*b*21, a resistance characteristic of the probes 401 that are repetitively used for inspection can be improved, and a problem in that the hole 535*b*21 of the ID chip 535 wears by conduction inspection can be prevented.

In a surplus space broadening in a wedge form between the annular earth terminal 535*d* and the rectangular metallic pad 35*a*1, 35*a*2, the protruding section 535*d*1 has a horizontal direction boundary (boundary line) that comes in contact with the annular outer circumference and is disposed to be parallel to the metallic pads 35*a*1, 35*a*2, and 35*a*3. Thus, the protruding section 535*d*1 does not protrude in the vertical direction, the protruding section 535*d*1 can be prevented from protruding to the left and sliding areas of the substrate 535*b* that slides against the first facing section 534*k*24 (protruding in the horizontal direction). As a result, the size of the substrate 535*b* does not increase, and at the time of manufacturing, it is possible to obtain as many substrates 535*b* as possible from a substrate material having the standard size. Further, the cost of the ID chip 535 can be suppressed from increasing.

As described above, similarly to the above embodiments, even in the present fifth embodiment, the contact-type ID chip 535 (the information storage device) is held on the holding member 534*k* (the holding section) to be movable on the virtual plane that is substantially orthogonal to the movement direction in which the metallic pads 35*a*1, 35*a*2, and 35*a*3 (terminals) approach and come in contact with body side terminals 573*e*2. Thus, even when the contact-type ID chip 535 (the information storage device) is installed in the toner container 532Y (the removable device) installed removably on the image forming apparatus body 100, the contact failure caused by the positioning failure with the body side terminals 573*e*2 of the connector 573*e* is difficult to occur.

Further, in the present fifth embodiment, even when the contact-type ID chip 535 (the information storage device) is installed in the toner container 532Y (the removable device) installed removable on the image forming apparatus body 100, since the earth terminal 535*d* that is engaged with the body side earth terminal 573*e*25 formed in the positioning pin 573*e*23 (the protruding section) of the connector 573*e* (the image forming apparatus body 100) is formed in one hole 535*b*21 formed in the substrate 535*b* of the ID chip 535, the ID chip 535 is difficult to be electrically damaged.

Sixth Embodiment

A sixth embodiment of the present invention will be described in detail with reference to FIGS. 42A to 47C.

Figure 42A:
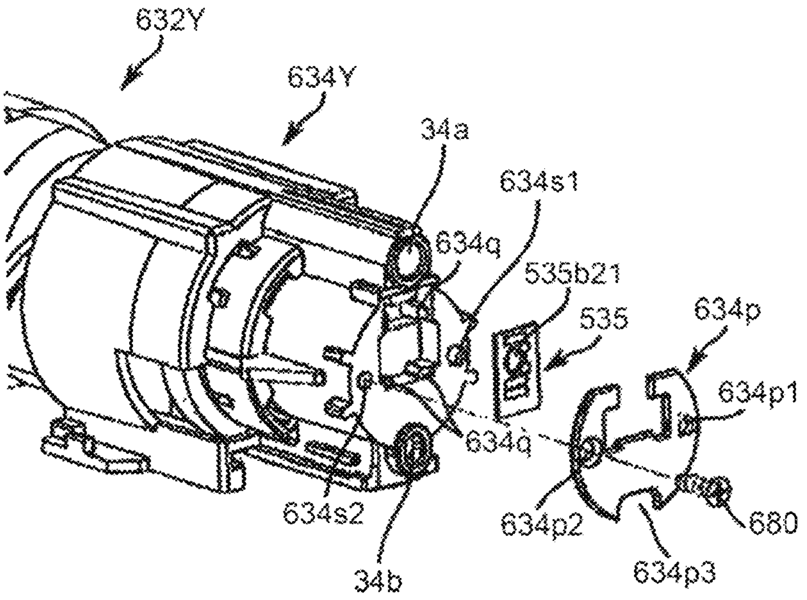
FIGS. 42A and 42B are perspective views illustrating a toner container according to a sixth embodiment.
Figure 42B:
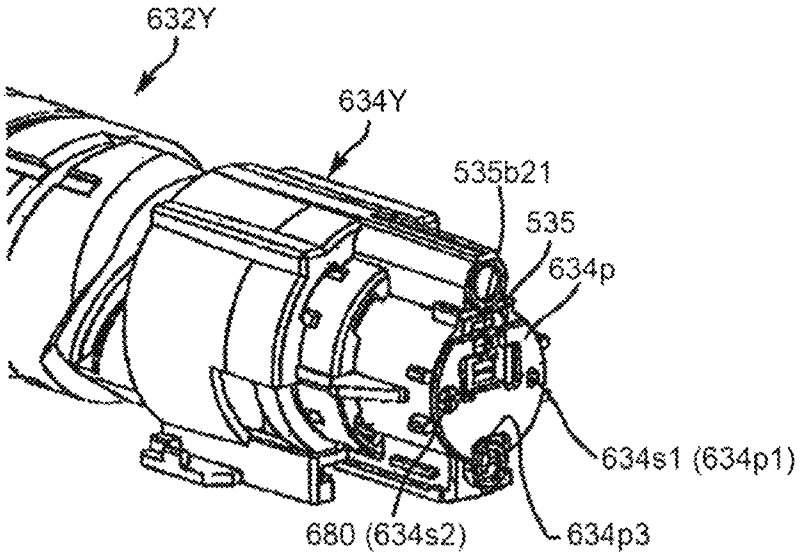
Figure 43:
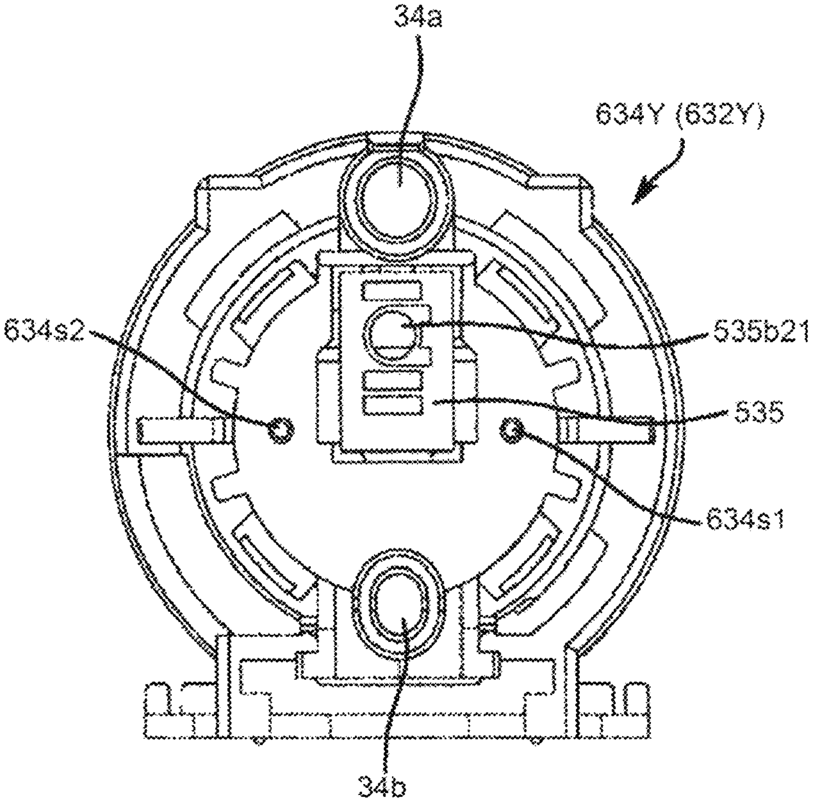
FIG. 43 is a front view illustrating a toner container in which a face plate is not installed.
Figure 44:
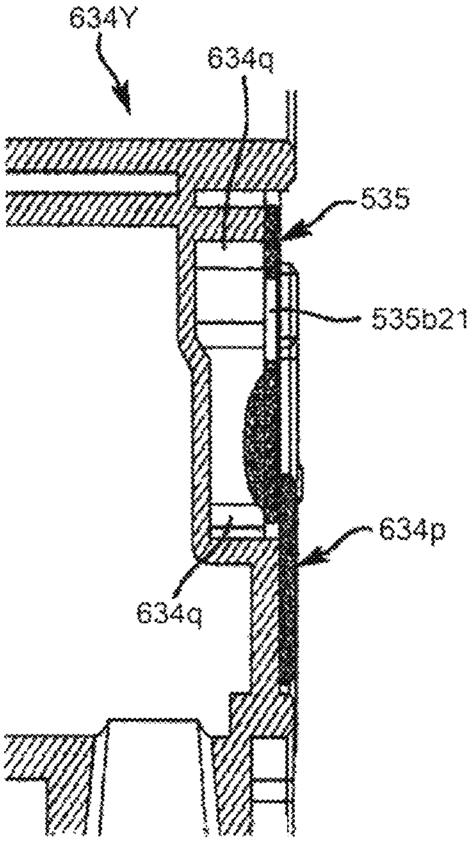
FIG. 44 is a cross sectional view illustrating a toner container in which an information storage device and a face plate are installed.
Figure 45:
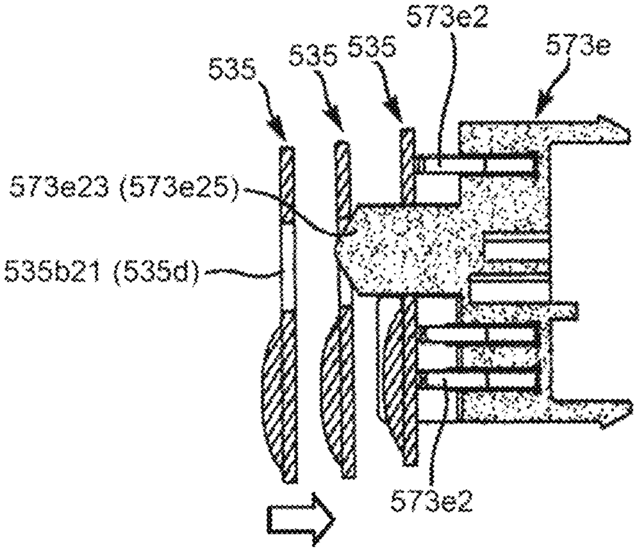
FIG. 45 is a view illustrating a state in which an information storage device is being inserted into a connector.

FIGS. 42A and 42B are perspective views illustrating a toner container 632Y according to a sixth embodiment. Particularly, FIG. 42A is an exploded view illustrating a state in which the ID chip 535 described in the fifth embodiment is not mounted, and FIG. 42B is a view illustrating a state in which the ID chip 535 is mounted. FIG. 43 is a front view illustrating the toner container 632Y in which a face plate 634*p* is not installed and is a view corresponding to FIG. 21 in the first embodiment. FIG. 44 is a cross-sectional view illustrating a main part of the toner container 632Y in which the ID chip 535 and the face plate 634*p* are installed. FIG. 45 is a view illustrating a state in which the ID chip 535 is inserted into the connector 573*e*.

In the present sixth embodiment, the ID chip 535 as the information storage device is the same as in the fifth embodiment. The present sixth embodiment is different from the fifth embodiment in that the ID chip 535 is loosely held in a concave section disposed in a cap section 634Y and movably covered by the face plate 634*p*, and the remaining configuration is the same as in the fifth embodiment.

Similarly to the above embodiments, the toner container 632Y according to the present sixth embodiment also includes the container body 33Y and the cap section 634Y. The ID chip 535 as the information storage device is removably installed in the cap section 634Y.

Referring to FIGS. 42A and 42B, in the present sixth embodiment, the ID chip 535 is not installed in the cap section 534Y in a state in which it is loosely inserted into the holding member 534*k*, and the falling prevention face plate 634*p* is screw-coupled to the cap section 634Y in a state in which the ID chip 535 is loosely held in the concave section (in which a pedestal section 634*q* is formed) formed in the cap section 634Y.

In detail, referring to FIG. 42A and FIG. 43, the concave section for holding the ID chip 535 to be movable in the XZ plane is formed on the end surface of the cap section 634Y. In the concave section, formed is the pedestal section 634*q* that comes in surface contact with part of the ID chip 535. In the state in which the ID chip 535 is loosely held in the concave section of the cap section 634Y, the face plate 634*p* for preventing the ID chip 535 from falling from the concave section is attached. Referring to FIG. 42B, FIG. 43, and FIG. 44, the face plate 634*p* is screw-coupled to come in contact with part of the substrate 35*b* of the ID chip 35 in the state in which the metallic pads 35*a*1, 35*a*2, and 35*a*3, the positioning hole 535*b*21 (the earth terminal 535*d*), and the like of the ID chip 535 formed similarly to the fifth embodiment are exposed.

In further detail, in the cap section 634Y, a positioning pin 634*s*1 for positioning the face plate 634*p* is formed on the right side of the concave section, and a screw hole 634*s*2 for screw-fixing the face plate 634*p* is formed on the left of the concave section with the concave section interposed therebetween. Meanwhile, in the face plate 634*p*, a positioning hole 634*p*1 is formed at the position corresponding to the positioning pin 634*s*1, and a hole 634*p*2 through which a screw 680 passes is formed at the position corresponding to the screw hole 634*s*2. In the lower section of the face plate 634*p*, a contact section 634*p*3 that comes in contact with the outer circumferential edge of the second positioning hole 34*b* and functions as a rotation stopper is formed. The position of the face plate 634*p* with respect to the cap section 634Y is decided by the positioning hole 634*p*1 and the contact section 634*p*3 for rotation stopping. The screw 680 is screwed into the screw hole 634*s*2 formed in the cap section 634Y through the hole 634*p*2 formed in the face plate 634*p*, and so the face plate 634*p* is fixed to the cap section 634Y. Thus, the ID chip 535 does not fall from the cap section 634Y and is held on the cap section 634Y to be movable in the XZ plane. Referring to FIG. 45, similarly to the fifth embodiment, in accompany with the mounting operation of the toner container 632Y, the positioning hole 535*b*21 (the earth terminal 535*d*) of the ID chip 535 is engaged with the positioning pin 573*e*23 (the body side earth terminal 573*e*25) of the connector 573*e* of the apparatus body 100, thereafter the body side terminal 573*e*2 of the connector 573*e* comes in contact with the metallic pads 35*a*1, 35*a*2, and 35*a*3 of the ID chip 535, and so electrical contact between the connector 573*e* and the ID chip 535 is completed. In this case, since the ID chip 535 in the cap section 634Y of the toner container 632Y is held to be movable in the XZ plane, similarly to the above embodiments, the contact failure caused by the positioning failure with the body side terminals 73*e*2 and 573*e*25 of the connector 573*e* of the apparatus body 100 is difficult to occur. In the normal state, the ID chip 535 remains down to the lower side of the concave section of the cap section 534Y due to gravity, and the center position of the hole 535*b*21 of the ID chip 535 is misaligned downward on the axial center position of the positioning pin 573*e*23 like the most left one among the three ID chips 535 illustrated in FIG. 45.

Then, when the mounting operation of the toner container 632Y starts and the ID chip 535 comes in contact with the positioning pin 573*e*23, the ID chip 535 moves upward (in the Z direction) (is scooped up) such that the hole 535*b*21 follows the tapered leading end section of the positioning pin 573*e*23, the hole 535*b*21 is fitted into the positioning pin 573*e*23, and finally the body side terminals 573*e*2 comes in contact with the metallic pads 35*a*1, 35*a*2, and 35*a*3.

In the present sixth embodiment, the face plate 634*p* has been fixed (screw-coupled) to the cap section 34Y by the screw 680.

Figure 46A:
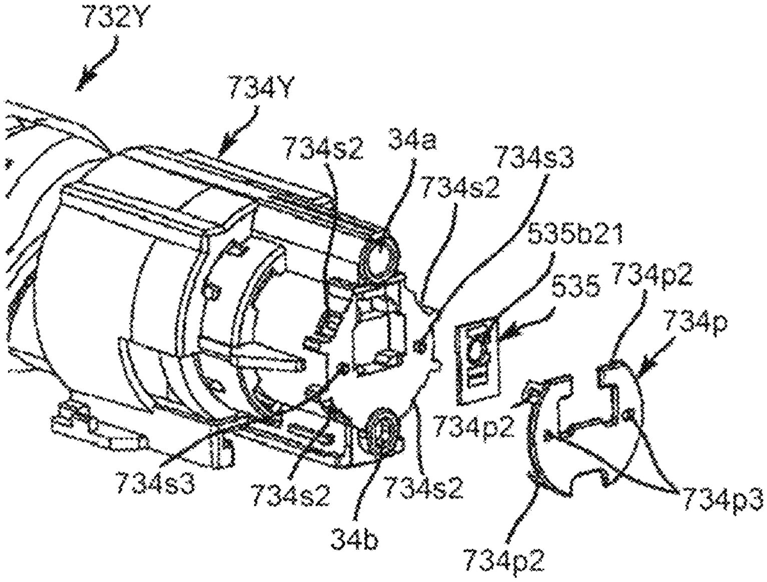
FIGS. 46A and 46B are perspective views illustrating a toner container of another form.
Figure 46B:
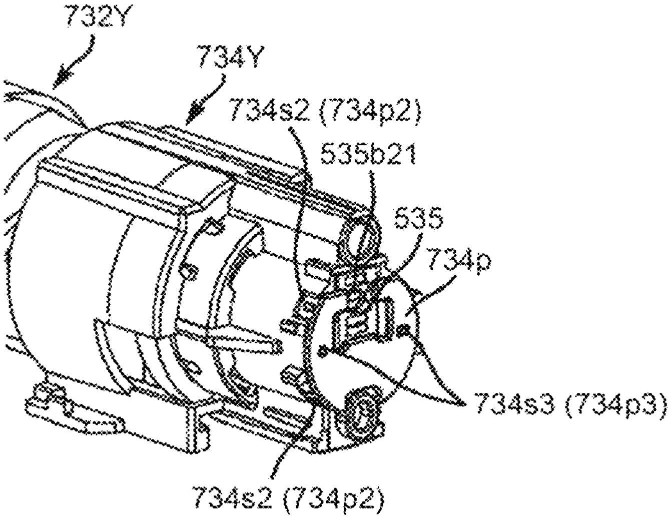

On the other hand, as illustrated in FIGS. 46A and 46B, a face plate 734*p* may be fixed to a cap section 734Y by snap fit fixing. In detail, as illustrated in FIG. 46A, a plurality of snap fit fixing engaging section 734*p*2 are formed on the outer circumferential section of the face plate 734*p*, and snap fit fixing engaged sections 734*s*2 are formed at the positions of the cap section 734Y corresponding thereto. As illustrated in FIG. 46B, in the state in which the ID chip 535 is loosely inserted into the concave section of the cap section 734Y, the face plate 734*p* is snap fit-fixed to the cap section 734Y. In further detail, while aligning a hole 734*p*3 formed in the face plate 734*p* with a positioning boss section 734*s*3 formed in the cap section 734Y, the engaging section 734*p*2 of the face plate 734*p* is engaged with the engaged section 734*s*2 of the cap section 734Y, and the face plate 734*p* is positioned and fixed to the cap section 734Y. Even in the case of this configuration, the same effect as in the sixth embodiment can be obtained.

Further, in the present sixth embodiment, since replacement can be made again even after the face plate 634*p* (or the face plate 734*p* illustrated in FIGS. 46A and 46B) is assembled, the toner container can be manufactured by a procedure in which the toner container and the face plate manufactured by a foreign partner company are first imported, and then, within the country, after or before a process of filling the toner container with the toner, the ID chip 535 purchased from another company is assembled, and toner information is input to the ID chip 535. Thus, the manufacturing process of the toner container can be effectively performed.

Further, a recycling process of collecting the used toner container from the market and filling the toner again after cleaning it may be performed by a procedure of replacing the ID chip 535 or removing the ID chip 535 from the toner container, rewriting information, and mounting the ID chip 535 on the cap section again. Thus, the reusing process of the toner container can be effectively performed.

Figure 47A:
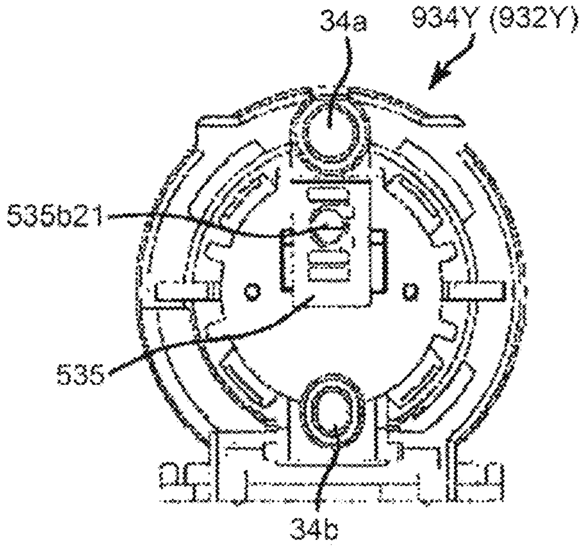
FIGS. 47A to 47C are views illustrating a toner container of another form.
Figure 47B:
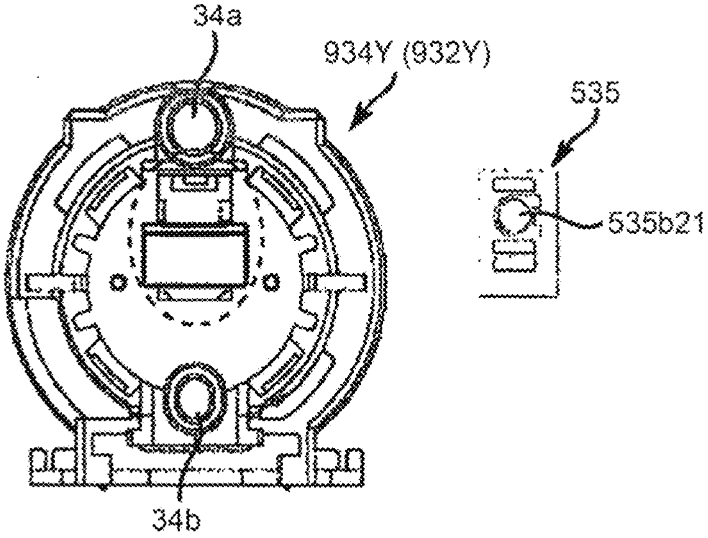
Figure 47C:
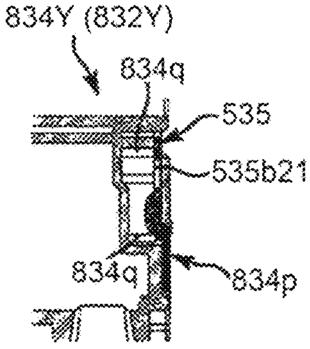

However, referring to FIG. 47C (that is a cross-sectional view illustrating a cap section 834Y on which the ID chip 535 is mounted), when it is desired to increase a assembly strength between a face plate 834*p* and a cap section 834Y without needing to remove the ID chip 535, only the positioning boss 734*s*3 (for example, see FIGS. 46A and 46B) may be disposed in the cap section without disposing the shape for screw coupling or the shape for snap fitting. Then, after the ID chip 535 and the face plate 834*p* are assembled in the cap section 834Y, the leading end of the positioning boss 734*s*3 may be thermally molten to fix the face plate 834*p* to the cap section 834Y, or an adhesive may be coated between the face plate 834*p* and the cap section 834Y to fix the face plate 834*p* to the cap section 834Y.

As described above, in the present sixth embodiment, the contact-type ID chip 535 (the information storage device) is held on the cap section 634Y, 734Y, or 834Y to be movable on the virtual plane that is substantially orthogonal to the movement direction in which the metallic pads 35*a*1, 35*a*2, and 35*a*3 (terminals) approach and come in contact with body side terminals 573*e*2. Thus, even when the contact-type ID chip 535 (the information storage device) is installed in the toner container 632Y, 732Y, or 832Y (the removable device) installed removably on the image forming apparatus body 100, the contact failure caused by the positioning failure with the body side terminals 573*e*2 of the connector 573*e* of the image forming apparatus body 100 is difficult to occur.

Further, even in the present sixth embodiment, similarly to the fifth embodiment, even when the contact-type ID chip 535 (the information storage device) is installed in the toner container 632Y (the removable device) installed removably on the image forming apparatus body 100, since the earth terminal 535*d* engaged with the body side earth terminal 573*e*25 formed in the positioning pin 573*e*23 (the protruding section) of the connector 573*e* (the image forming apparatus body 100) is formed in one hole 535*b*21 formed in the substrate 535*b* of the ID chip 535, the ID chip 535 is difficult to be electrically damaged.

FIGS. 47A and 47B are views illustrating a toner container 932Y of another embodiment. Particularly, FIG. 47A is a front view illustrating a cap section 934Y on which the ID chip 535 is mounted, and FIG. 47B is a front view illustrating the cap section 934Y and the ID chip 535 before the ID chip 535 is mounted. In the toner container 932Y illustrated in FIGS. 47A and 47B, unlike the above embodiments, the ID chip 535 (the information storage device) is fixed to and held on the cap section 934Y (held to be immovable in the XZ direction). Specifically, a concave section of the cap section 934Y (a section encircled by a dotted line in FIG. 47B) is formed in a shape according to an outer circumferential shape of the ID chip 535 so that the ID chip 535 can be fitted thereinto (fitted thereinto within a dimension variation range by a fitting tolerance of about 0.3 mm at maximum even if shaken). In this case, unlike the above embodiments, the ID chip 535 cannot move in the XZ plane, but the function effects of the ideas (1) to (4) among the five ideas (1) to (5) described in the fifth embodiment can be obtained. That is, since one positioning hole 535*b*21 in which the earth terminal 535*d* is formed is installed in the ID chip 535, the effects described in the fifth embodiment can be obtained.

Seventh Embodiment

A seventh embodiment of the present invention will be described in detail with reference to FIGS. 48 and 49.

Figure 48:
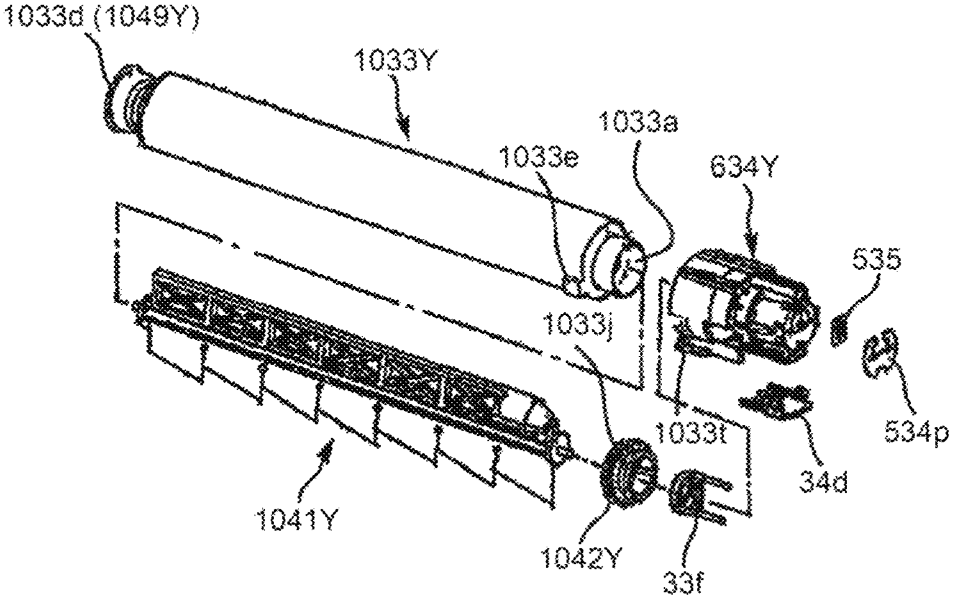
FIG. 48 is an exploded perspective view illustrating a toner container according to a seventh embodiment.

FIG. 48 is an exploded perspective view illustrating a toner container 1032Y according to the seventh embodiment. FIG. 49 is a cross-sectional view illustrating the toner container 1032Y.

The toner container according to the present seventh embodiment is different from the above embodiments in which the container body 33Y is rotatably held on the toner container storage unit 70 in that a container body 1033Y is combined with any one of the cap sections 634Y, 734Y, 834Y, and 934Y illustrated in the sixth embodiment and non-rotatably held on the toner container storage unit 70 together with the cap section.

Figure 49:
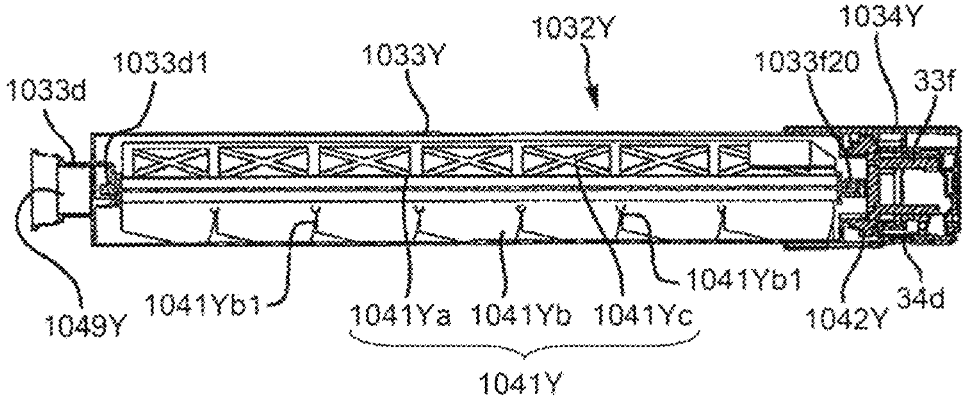
FIG. 49 is a cross sectional view illustrating the toner container of FIG. 48.

Referring to FIGS. 48 and 49, similarly to the above embodiments, the toner container 1032Y according to the present seventh embodiment mainly includes the container body 1033Y (the bottle body) and the cap section 634Y installed on the head section thereof (or the cap section 734Y, 834Y, or 934Y of another form). Hereinafter, the cap section according to the present seventh embodiment will be described using the cap section 634Y described with reference to FIGS. 42A and 42B in the sixth embodiment.

Unlike the above embodiments, in the toner container 1032Y according to the present seventh embodiment, the container body 1033Y (the bottle body) is fixed to the cap section 634Y by a fixing method, for example, it adheres to (fuses with) or is engaged with the cap section 634Y (the bottle cap). That is, the container body 1033Y is non-rotatably fixed to the cap section 634Y.

Unlike the above embodiments, in the container body 1033Y according to the present seventh embodiment, a helical protrusion is not formed on the circumferential surface thereof. Further, the gear 33*c* in the above embodiments is not integrally formed with the container body 1033Y, and a gear member 1042Y is installed rotatably on the container body 1033Y and the cap section 634Y together with the agitating member 33*f*. Inside the container body 1033Y, unlike the above embodiments, a conveying member 1041Y for conveying the toner stored in the container body 1033Y toward the opening A is formed such that one end thereof is fixed to the gear 1042Y, and the other end thereof is rotatably supported on a bearing 1033*d*1 of the container body 1033Y which will be described later.

The cap section 634Y has almost the same configuration as in the fifth embodiment except that it non-rotatably adheres to or is fixed to the container body 1033Y.

The agitating member 33*f* has almost the same configuration, form, and function as in the above embodiments except that it is not fixed to the container body 1033Y but held only on the gear 1042Y.

A further detailed description will be made with reference to FIGS. 48 and 49.

Referring to FIG. 48, even in the seventh embodiment, on the other end side of the container body 1033Y in the longitudinal direction (the side opposite to one end side, at which the cap section 634Y is installed, in the longitudinal direction and an end section at the rear side in the mounting direction on the apparatus body 100), disposed is a gripping section 1033*d* gripped by the user when the attaching/detaching operation of the toner container 1032Y is performed. In the gripping section 1033*d*, a through hole communicating with the inside and outside of the container body 1033Y is formed, and a cover member 1049Y that is formed of deformable flexible resin such as polypropylene or polyethylene is removably installed in the through hole. The cover member 1049Y is used when filling the inside of the toner container 1032Y (the container body 1033Y) with the toner (or cleaning), for example, at the time of manufacturing or recycling. The cover member 1049Y is removed from the container body 1033Y when filling the toner (cleaning) and mounted to the container body 1033Y after filling of the toner is completed.

Referring to FIG. 49, the conveying member 1041Y installed inside the container body 1033Y is formed such that a thin flexible agitating member 1041Yb formed of a material such as mylar (a trade name: a polyester film) adheres to a shaft section 1041Ya, and an agitator member 1041Yc is formed at the opposite side. In the shaft section 1041Ya of the conveying member 1041Y, an end section at one end side in the longitudinal direction is engaged with and fixed to a connection section 1033*f*20 installed at the position of the rotation center of the agitating member 33*f*. An end section at the other side in the longitudinal direction is rotatably supported on the bearing section 1033*d*1 (which is a base section of the gripping section 1033*d* and formed in a section stuck into the container body 1033Y). In the state in which the container body 1033Y and the cap section 634Y are non-rotatably held on the toner container storage unit 70, the agitating member 33*f* receives driving force from the driving unit 91 and rotates together with the gear member 1042Y, and so the conveying member 1041Y connected with the agitating member 33*f* at the position of the connection section 1033*f*20 also rotates. Thus, the toner stored in a container body 1044Y is agitated by agitating force of the agitator member 1041Yc installed in the conveying member 1041Y, and the toner stored in the container body 1033Y is conveyed toward the cap section 1034Y by conveying force of the flexible agitating member 1041Yb installed in the conveying member 1041Y in the shaft direction.

The flexible agitating member 1041Yb of the conveying member 1041Y includes cutouts 1041Yb1 formed at a plurality of positions (in the present seventh embodiment, six positions) in the longitudinal direction. Thus, in accompany with rotation of the conveying member 1041Y, the leading end of the flexible agitating member 1041Yb (the free end side that is not supported on the shaft section 1041Ya) comes in sliding contact with the inner circumferential surface of the container body 1033Y, and the flexible agitating member 1041Yb rotates in the appropriately twisted and bent state, so that the toner stored in the container body 1033Y is agitated and conveyed toward the right side in FIG. 49 in the shaft direction.

As described above, even in the toner container 1032Y according to the present seventh embodiment, similarly to the above embodiments, the toner is discharged from the toner discharge opening W of the cap section 1034Y.

Here, the gear member 1042Y is rotatably attached to the container body 1033Y.

In detail, a gear engaging section (a claw section snap fitted into) (not shown) formed in the gear member 1042Y is caught in a flange section (in which a protrusion 1033*e* which will be described later is formed) formed to make one round around the outer circumferential surface of a bottle mouth section 1033*a* of the container body 1033Y, and so the gear member 1042Y is rotatably held on the container body 1033Y. Further, a gear section (a spur gear) is formed on the outer circumferential surface of the gear member 1042Y, and when the toner container 1032Y is set to the apparatus body 100, the gear section meshes with the driving gear 81 of the apparatus body 100.

A seal material is disposed between the gear member 1042Y and the end surface of the bottle mouth section 1033*a* so as to prevent the toner from leaking to the outside of the toner container 1032Y. The seal material is made of a foamed elastic material such as foamed polyurethane, formed in an annular shape to be bitten into the end surface of the bottle mouth section 1033*a*, and adheres to the gear member 1042Y. When the gear member 1042Y is set to the container body 1033Y, the seal material is pressed against the opening end surface of the bottle mouth section 1033*a*, and so a sealing characteristic between both members 1033Y and 1042Y is secured.

The gear member 1042Y is not fixed to the cap section 1034Y but rotatably held on the claw section 34*j* of the cap section 634Y. A method of holding the gear member 1042Y on the cap section 634Y is similar to the method of holding the cap section 34Y on the bottle mouth section 33*a* of the container body 33Y described in the above embodiments. That is, the claw section 34*j* of the cap section 634Y is engaged with a flange-like engaged protruding section 1033*j* disposed to make one round around the outer circumference of the gear member 1042Y, and the gear member 1042Y is rotatably supported on the cap section 1034Y. Through the above described configuration, the container body 1033Y is connected with the cap section 634Y via the gear 1042Y. Further, in order to prevent the container body 1033Y from rotating on the cap section 634Y, the protrusion 1033*e* formed near the bottle mouth section 1033*a* of the container body 1033Y is fitted into a notch groove 1034*t* formed on the side surface of the cap section 634Y to play a role of a rotation stopper.

Further, in the cap section 634Y, a cap seal made of a foamed elastic material adheres to a section where the end surface of the gear member 1042Y (the end surface at the side opposite to the container body 1033Y side) is pressed. Thus, the toner leak from between the gear member 1042Y and the cap section 634Y can be prevented.

The agitating member 33*f* is attached to the inner surface of the gear member 1042Y. Further, the shaft section 1041Ya (the end section at one end side) of the conveying member 1041Y is connected to the connection section 1033*f*20 of the agitating member 33*f* as described above.

As described above, even in the present seventh embodiment, similarly to the above embodiments, the contact-type ID chip 535 (the information storage device) is held on the cap section 634Y to be movable on the virtual plane that is substantially orthogonal to the movement direction in which the metallic pads 35*a*1, 35*a*2, and 35*a*3 (terminals) approach and come in contact with body side terminals 573*e*2. Thus, even when the contact-type ID chip 535 (the information storage device) is installed in the toner container 1032Y (the removable device) installed removably on the image forming apparatus body 100, the contact failure caused by the positioning failure with the body side terminals 573*e*2 of the connector 573*e* of the image forming apparatus body 100 is difficult to occur.

Further, in the present seventh embodiment, the cap section 634Y described, for example, with reference to FIGS. 42A and 42B in the sixth embodiment has been used as the cap section of the toner container, but as the cap section of the toner container in the present seventh embodiment, the cap section 734Y described with reference to FIGS. 46A and 46B in the sixth embodiment may be used, the cap section 834Y described with reference to FIG. 47C in the sixth embodiment may be used, or the cap section 934Y described with reference to FIGS. 47A and 47B in the sixth embodiment may be used.

Further, even in the present seventh embodiment, similarly to the fifth and sixth embodiments, even when the contact-type ID chip 535 (the information storage device) is installed in the toner container (the removable device) installed removably on the image forming apparatus body 100, since the earth terminal 535*d* engaged with the body side earth terminal 573*e*25 formed in the positioning pin 573*e*23 (the protruding section) of the connector 573*e* (the image forming apparatus body 100) is formed in one hole 535*b*21 formed in the substrate 535*b* of the ID chip 535, the ID chip 535 is difficult to be electrically damaged.

Eighth Embodiment

An eighth embodiment of the present invention will be described in detail with reference to FIGS. 50 to 51B.

Figure 50:
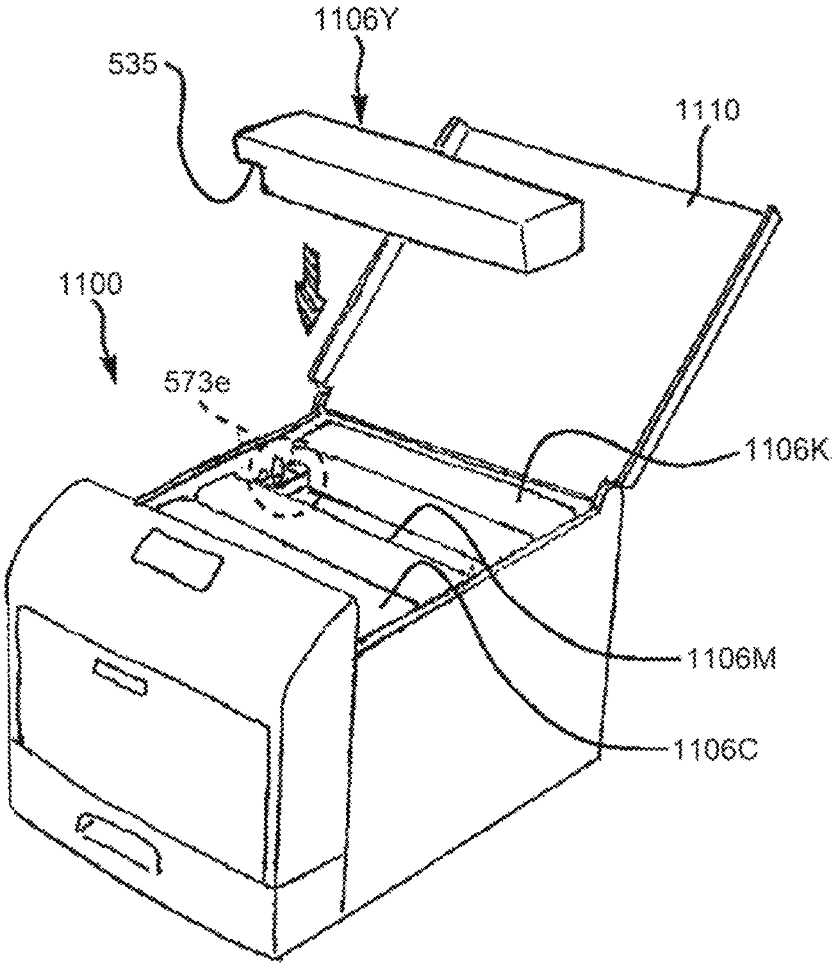
FIG. 50 is a perspective view illustrating an image forming apparatus according to an eighth embodiment.
Figure 51A:
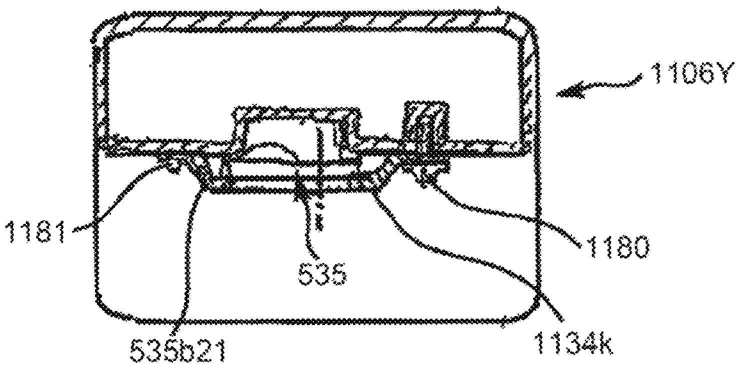
FIGS. 51A and 51B illustrate toner cartridges installed in the image forming apparatus of FIG. 50.
Figure 51B:
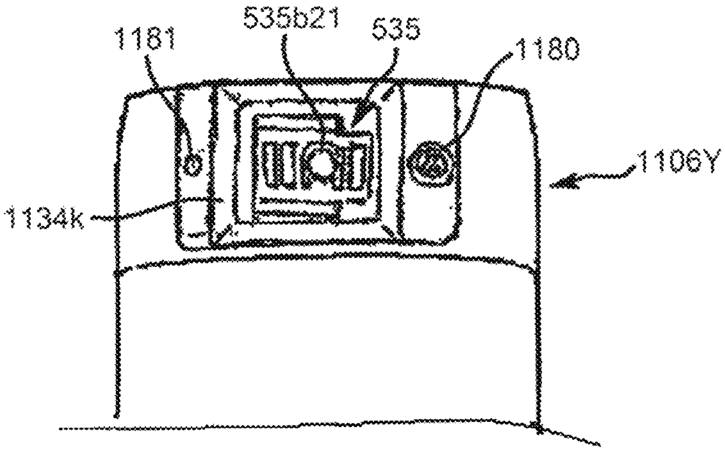

FIG. 50 is an exploded perspective view illustrating an image forming apparatus 1100 according to the eighth embodiment. FIG. 51A is a cross-sectional view illustrating part of a toner cartridge 1106Y installed in the image forming apparatus, and FIG. 51B is a bottom view illustrating part of the toner cartridge 1106Y. In FIGS. 50 to 51B, a toner discharge mechanism and a positioning mechanism for having the toner cartridge to operate are omitted.

The image forming apparatus 1100 according to the present eighth embodiment is different from those according to the above embodiments in which the toner container 532Y, 632Y, 732Y, 832Y, 932Y, or 1032Y in which the ID chip 535 is installed is mounted on the apparatus body 100 in the horizontal direction, where the longitudinal direction is the mounting direction in that the toner cartridge 1106Y in which the ID chip 535 is installed is mounted on the apparatus body 1100 from above.

Referring to FIG. 50, the image forming apparatus 1100 according to the present eighth embodiment is configured so that toner cartridges 1106Y, 1106M, 1106C, and 1106K as four removable devices are attached or detached from above. FIG. 50 illustrates the state in which the three toner cartridges 1106M, 1106C, and 1106K except the yellow toner cartridge 1106Y have been mounted on the apparatus body 1100.

The toner cartridges 1106Y, 1106M, 1106C, and 1106K are attached to or detached from an installation section of the apparatus body 1100 in the state in which a body cover 1110 (a body door) is opened as illustrated in FIG. 50.

Meanwhile, the toner cartridges 1106Y, 1106M, 1106C, and 1106K include an opening with a shutter that is disposed at the position of the lower side facing the developing device and store toner of corresponding color (one-component developer) thereinside. Referring to FIGS. 51A and 51B, on the lower surfaces of the end sections of the toner cartridges 1106Y, 1106M, 1106C, and 1106K in the longitudinal direction, the ID chip 535 (the information storage device) is movably held by a holding member 1134*k* in the horizontal plane direction (the paper surface direction of FIG. 51B).

The holding member 1134*k* is screw-coupled to the toner cartridge 1106Y to come in contact with part of the substrate 535*b* of the ID chip 535 in the state in which the metallic pads 35*a*1, 35*a*2, and 35*a*3, the positioning hole 535*b*21 (the earth terminal 535*d*), and the like of the ID chip 535 that is the same as that in the fifth embodiment are exposed. In detail, the hole of the holding member 1134*k* is combined with a boss section 1181 formed in the end section of the toner cartridge 1106Y, a screw 1180 is screwed into a screw hole formed at the opposite side with the ID chip 535 interposed between the boss section 1181 of the toner cartridge 1106Y and the hole formed in the holding member 1134*k*, and the holding member 1134*k* is fixed to the toner cartridge 1106Y. Thus, the ID chip 535 does not fall from the toner cartridge 1106Y and is held to be movable in the horizontal plane. Referring to FIG. 50, in accompany with the mounting operation of the toner cartridge 1106Y from above on the apparatus body 1100, the positioning pin 573*e*23 (the body side earth terminal 573*e*25) of the connector 573*e* installed in the installation section of the apparatus body 1100 is fitted into the positioning hole 535*b*21 (the earth terminal 535*d*) of the ID chip 535. Thereafter, the body side terminal 73*e*2 of the connector 573*e* comes in contact with the metallic pads 35*a*1, 35*a*2, and 35*a*3 of the ID chip 535, and electrical contact between the connector 573*e* and the ID chip 535 is completed. In this case, since the ID chip 535 in the toner cartridge 1106Y is held to be movable in the horizontal plane, similarly to the above embodiments, the contact failure caused by the positioning failure with the body side terminals 73*e*2 and 573*e*25 of the connector 573*e* of the apparatus body 1100 is difficult to occur.

As described above, in the present eighth embodiment, the contact-type ID chip 535 (the information storage device) is held on the toner cartridge 1106Y to be movable on the virtual plane that is substantially orthogonal to the movement direction in which the metallic pads 35*a*1, 35*a*2, and 35*a*3 (terminals) approach and come in contact with body side terminals 573*e*2. Thus, even when the contact-type ID chip 535 (the information storage device) is installed in the toner cartridge 1106Y (the removable device) installed removably on the image forming apparatus body 1100, the contact failure caused by the positioning failure with the body side terminals 73*e*2 of the connector 573*e* of the image forming apparatus body 1100 is difficult to occur.

Further, even in the present eighth embodiment, similarly to the fifth to seventh embodiments, even when the contact-type ID chip 535 (the information storage device) is installed in the toner cartridge 1106Y (the removable device) installed removably on the image forming apparatus body 1100, since the earth terminal 535*d* engaged with the body side earth terminal 573*e*25 formed in the positioning pin 573*e*23 (the protruding section) of the connector 573*e* (the image forming apparatus body 1100) is formed in one hole 535*b*21 formed in the substrate 535*b* of the ID chip 535, the ID chip 535 is difficult to be electrically damaged.

Ninth Embodiment

A ninth embodiment of the present invention will be described in detail with reference to FIGS. 52 and 53.

Figure 52:
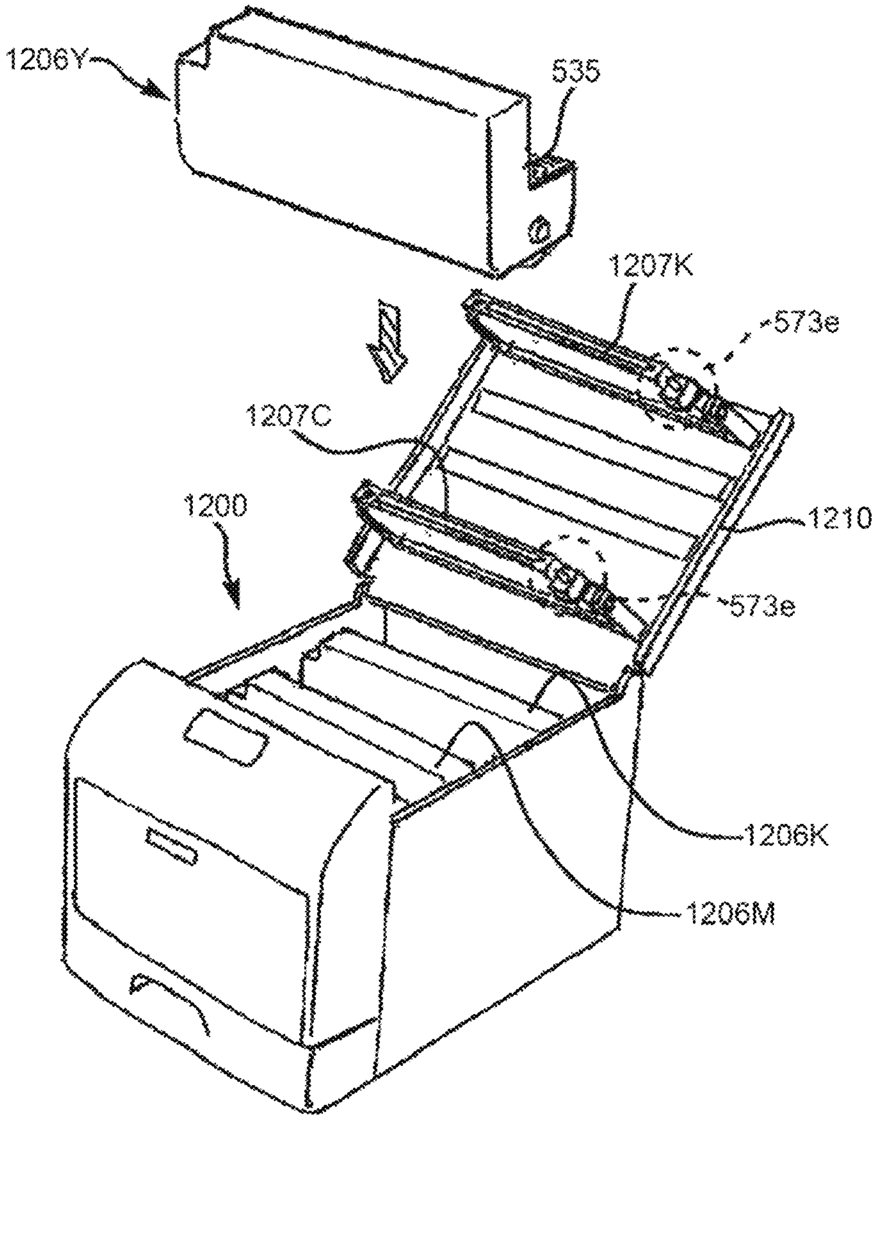
FIG. 52 is a perspective view illustrating an image forming apparatus according to a ninth embodiment.

FIG. 52 is a perspective view illustrating an image forming apparatus according to the ninth embodiment and is a view corresponding to FIG. 50 in the eighth embodiment. FIG. 53 is a schematic view illustrating a state in which the connector 573*e* is connected to the ID chip 535 in accompany with a closing operation of a body cover 1210 of an apparatus body 1200.

The image forming apparatus 1200 according to the present ninth embodiment is different from those according to the eighth embodiment in that the ID chip 535 is installed on an upper surface of a process cartridge 1206Y rather than the toner cartridge, and the connector 573*e* is installed in a body cover 1210 of the apparatus body 1200.

Referring to FIG. 52, the image forming apparatus 1200 according to the present ninth embodiment is configured so that process cartridges 1206Y, 1206M, 1206C, and 1206K as four removable devices are attached or detached from above. FIG. 52 illustrates the state in which the three process cartridges 1206M, 1206C, and 1206K except the yellow process cartridge 1206Y have been mounted on the apparatus body 1200.

The process cartridges 1206Y, 1206M, 1206C, and 1206K are attached to or detached from an installation section of the apparatus body 1200 in the state in which the body cover 1210 (the body door) is opened as illustrated in FIG. 52. Here, in the present ninth embodiment, in the body cover 1210, LED units 1207Y, 1207M, 1207C, and 1207K for performing an exposure process are installed at the positions corresponding to the four process cartridges 1206Y, 1206M, 1206C, and 1206K, respectively (in FIG. 52, the two LED units 1207Y and 1207M are omitted). Referring to FIG. 53, when the body cover 1210 is closed, the LED unit 1207Y moves to face the positioning of the photosensitive drum 1201Y for an electrostatic latent image in the process cartridge 1206Y.

Meanwhile, in each of the process cartridges 1206Y, 1206M, 1206C, and 1206K, the photosensitive drum, the charging unit, the developing unit, and the cleaning unit are integrally formed, and toner of corresponding color (one component developer) is stored inside the developing unit. Referring to FIG. 52, on the upper surfaces of the end sections of the process cartridges 1206Y, 1206M, 1206C, and 1206K in the longitudinal direction, the ID chip 535 (the information storage device) is held by the holding member (not shown) (or the face plate) to be movable in the horizontal plane direction (the vertical direction and the left-right direction in the paper plane of FIG. 53).

The holding member is screw-coupled to an outer cover of the process cartridge 1206Y to come in contact with part of the substrate 535*b* of the ID chip 535 in the state in which the metallic pads 35*a*1, 35*a*2, and 35*a*3, the positioning hole 535*b*21 (the earth terminal 535*d*), and the like of the ID chip 535 that is formed similarly to that in the fifth embodiment are exposed. Thus, the ID chip 535 does not fall from the process cartridge 1206Y and is held to be movable in the horizontal plane. Referring to FIG. 52, in accompany with the mounting operation of the process cartridge 1206Y from above on the apparatus body 1200 (the mounting operation in accompany with the closing operation of the body cover 1210), the positioning pin 573*e*23 (the body side earth terminal 573*e*25) of the connector 573*e* installed in the body cover 1210 is fitted into the positioning hole 535*b*21 (the earth terminal 535*d*) of the ID chip 535. Thereafter, the body side terminal 73*e*2 of the connector 573*e* comes in contact with the metallic pads 35*a*1, 35*a*2, and 35*a*3 of the ID chip 535, and electrical contact between the connector 573*e* and the ID chip 535 is completed. In this case, since the ID chip 535 in the process cartridge 1206Y is held to be movable in the horizontal plane, similarly to the above embodiments, the contact failure caused by the positioning failure with the body side terminals 573*e*2 and 573*e*25 of the connector 573*e* of the apparatus body 1200 is difficult to occur.

Figure 53:
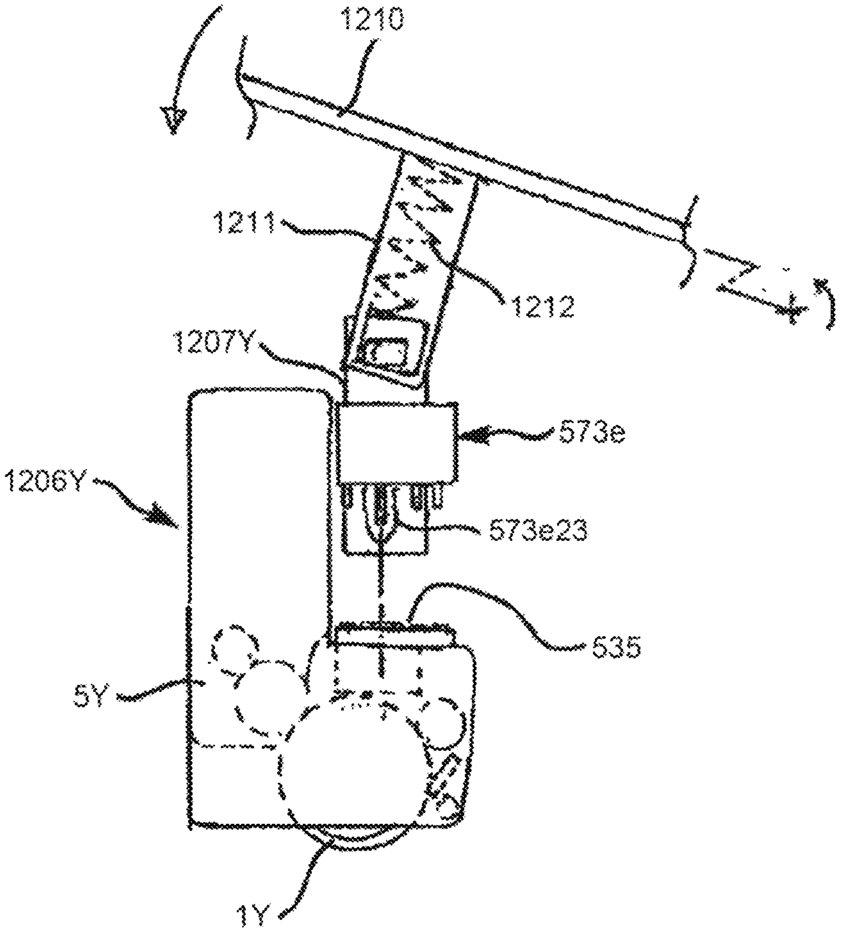
FIG. 53 is a schematic view illustrating a state in which a connector is connected to an information storage device in the image forming apparatus of FIG. 52.

Further, in the present ninth embodiment, referring to FIG. 53, the LED unit 1207Y (having an end section in which the connector 573*e* is installed) is installed to be rotatable (swingable) on the body cover 1210 clockwise or counterclockwise in FIG. 53 via a support arm 1211. The LED unit 1207Y is urged by a compression spring 1212 installed inside the support arm 1211. When the body cover 1210 is closed to mount the four LED units on the process cartridges by the swing function and the urging force against the process cartridge side, as illustrated in FIG. 53, the LED unit 1207Y shakes the neck along the wall surface of the process cartridge 1206Y and is guided to a predetermined position. At the same time, the connector 573*e* also moves to approach the ID chip 535 and is positioned similarly to the fifth to eighth embodiments. Thus, due to the urging force of the compression spring 1212, the connector 573*e* comes in contact with the ID chip 535 of the process cartridge 1206Y mounted on the installation section of the apparatus body 1200 with appropriate force.

As described above, in the present ninth embodiment, the contact-type ID chip 535 (the information storage device) is held on the process cartridge 1206Y to be movable on the virtual plane that is substantially orthogonal to the movement direction in which the metallic pads 35*a*1, 35*a*2, and 35*a*3 (terminals) approach and come in contact with body side terminals 573*e*2. Thus, even when the contact-type ID chip 535 (the information storage device) is installed in the process cartridge 1206Y (the removable device) installed removably on the image forming apparatus body 1200, the contact failure caused by the positioning failure with the body side terminals 573*e*2 of the connector 573*e* of the image forming apparatus body 1200 is difficult to occur.

Further, in the present ninth embodiment, even when the contact-type ID chip 535 (the information storage device) is installed in the process cartridge 1206Y (the removable device) installed removably on the image forming apparatus body 1200, since the earth terminal 535*d* engaged with the body side earth terminal 573*e*25 formed in the positioning pin 573*e*23 (the protruding section) of the connector 573*e* (the image forming apparatus body 1200) is formed in one hole 535*b*21 formed in the substrate 535*b* of the ID chip 535, the ID chip 535 is difficult to be electrically damaged.

Tenth Embodiment

A tenth embodiment of the present invention will be described in detail with reference to FIGS. 54 and 55.

Figure 54:
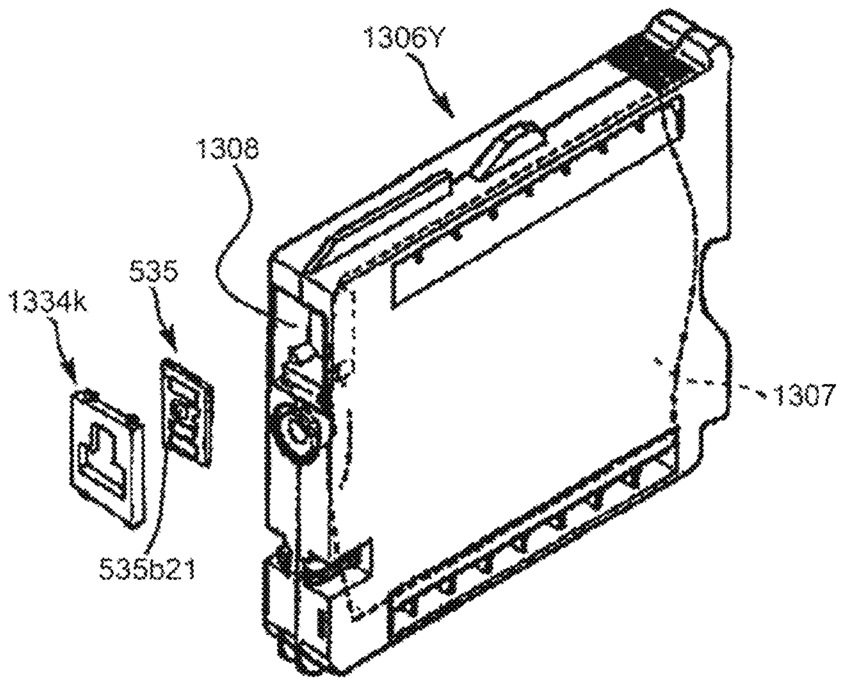
FIG. 54 is a perspective view illustrating an ink cartridge according a tenth embodiment.

FIG. 54 is a perspective view illustrating an ink cartridge 1306Y (a developer container) according to the tenth embodiment. FIG. 55 is a front view illustrating an inkjet printer 1300 as an image forming apparatus in which ink cartridges 1306Y, 1306M, 1306C, and 1306K are installed.

The image forming apparatus 1300 according to the present tenth embodiment is different from those according to the above embodiments in that the ink cartridge 1306Y having the side surface on which the ID chip 535 is installed is mounted on the apparatus body 1300 from the side.

Figure 55:
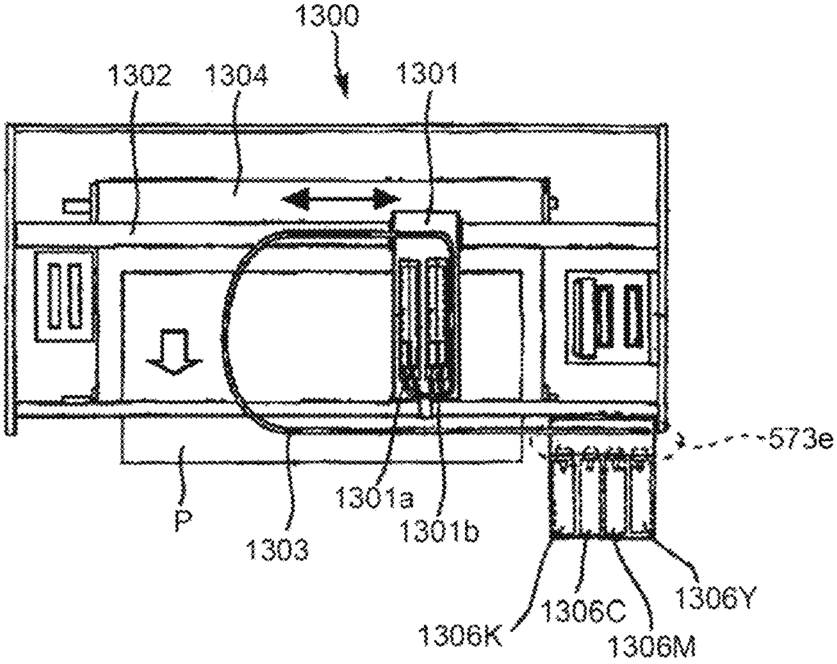
FIG. 55 is a top view illustrating an image forming apparatus in which the ink cartridge of FIG. 54 is installed.

Referring to FIG. 55, the image forming apparatus 1300 (the inkjet printer) according to the present tenth embodiment includes a carriage 1301 that includes recording heads 1301*a* and 1301*b* and moves in a direction of an double-headed arrow, a guide lock 1302, a supply tube 1303 that supplies ink from the ink cartridges 1306Y, 1306M, 1306C, and 1306K of respective colors to a sub tank of the carriage 1301, a conveying belt 1304 for conveying a recording medium P in a direction of an arrow, and the like. The ink cartridges 1306Y, 1306M, 1306C, and 1306K of respective colors (the removable devices) are removably installed on an installation section disposed in the end section of the apparatus body 1300 (installation having the vertical direction in FIG. 55 as the attaching/detaching direction).

Further, a main configuration of an image forming apparatus 300 is the same as stated in, for example, Japanese Patent Application Laid-open No. 2010-234801 and has been well known, and thus a detailed description thereof will not be repeated.

Referring to FIG. 54, in the ink cartridge 1306Y (an ink bag 1307 is stored thereinside) as the removable device, the ID chip 535 (the information storage device) held on a holding member 1334*k* to be movable in the XZ direction is installed on a concave section 1308 formed on the side surface thereof.

The holding member 1334*k* and the ID chip 535 have a configuration similar to those in the fifth embodiment. That is, the holding member 1334*k* is fitted into the concave section 1308 of the ink cartridge 1306Y in the state in which the metallic pads 35*a*1, 35*a*2, and 35*a*3, the positioning holes 535*b*21 (the earth terminal 535*d*), and the like of the ID chip 535 are exposed. Thus, the ID chip 535 does not fall from the ink cartridge 1306Y and is held on the holding member 1334*k* to be movable in the XZ plane. Referring to FIG. 54, in accompany with the mounting operation on the apparatus body 1300, the positioning pin 573*e*23 (the body side earth terminal 573*e*25) of the connector 573*e* installed in the apparatus body 1300 is fitted into the positioning hole 535*b*21 (the earth terminal 535*d*) of the ID chip 535. Thereafter, the body side terminal 73*e*2 of the connector 573*e* comes in contact with the metallic pads 35*a*1, 35*a*2, and 35*a*3 of the ID chip 535, and electrical contact between the connector 573*e* and the ID chip 535 is completed. In this case, since the ID chip 535 in the ink cartridge 1306Y is held to be movable in the XZ plane, similarly to the above embodiments, the contact failure caused by the positioning failure with the body side terminals 573*e*2 and 573*e*25 of the connector 573*e* of the apparatus body 1300 is difficult to occur.

As described above, in the present tenth embodiment, the contact-type ID chip 535 (the information storage device) is held on the ink cartridge 1306Y through the holding member 1334*k* to be movable on the virtual plane that is substantially orthogonal to the movement direction in which the metallic pads 35*a*1, 35*a*2, and 35*a*3 (terminals) approach and come in contact with body side terminals 573*e*2. Thus, even when the contact-type ID chip 535 (the information storage device) is installed in the ink cartridge 1306Y (the removable device) installed removably on the image forming apparatus body 1300, the contact failure caused by the positioning failure with the body side terminals 573*e*2 of the connector 573*e* of the image forming apparatus body 1300 is difficult to occur.

Further, even in the present tenth embodiment, even when the contact-type ID chip 535 (the information storage device) is installed in the ink cartridge 1306Y (the removable device) installed removably on the image forming apparatus body 1300, since the earth terminal 535*d* engaged with the body side earth terminal 573*e*25 formed in the positioning pin 573*e*23 (the protruding section) of the connector 573*e* (the image forming apparatus body 1300) is formed in one hole 535*b*21 formed in the substrate 535*b* of the ID chip 535, the ID chip 535 is difficult to be electrically damaged.

Eleventh Embodiment

An eleventh embodiment of the present invention will be described in detail with reference to FIGS. 56 to 58.

Figure 56:
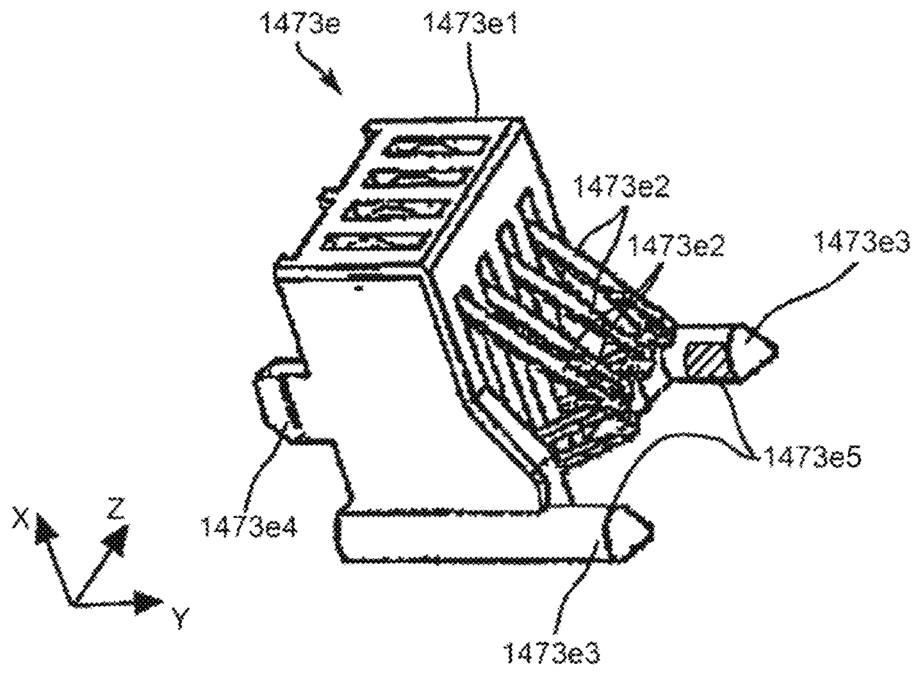
FIG. 56 is a perspective view illustrating a connector of an image forming apparatus according to the tenth embodiment.

FIG. 56 is a perspective view illustrating a connector 1473*e* of an image forming apparatus according to the tenth embodiment and is a view corresponding to FIG. 16 according to the first embodiment. FIG. 57 is a three-plane view illustrating an ID chip 1435 as an information storage device that comes in contact with the connector 1473*e* of FIG. 56 and is a view corresponding to FIG. 29 according to the first embodiment. FIG. 58 is a three-plane view illustrating an ID chip 1535 as an information storage device of another form and is a view corresponding to FIG. 35 according to the fourth embodiment.

The eleventh embodiment is different from the first and fourth embodiments in that a body side earth terminal 1473*e*5 is installed in a positioning pin 1473*e*3 of the connector 1473*e*, and a metallic earth terminal 1435*d* or 1535*d* (an earth terminal) that comes in contact with the body side earth terminal 1473*e*5 is installed in the ID chip 1435 or 1535.

Referring to FIG. 56, in the image forming apparatus according to the present eleventh embodiment, similarly to the first embodiment, installed is the connector 1473*e* that includes a connector body 1473*e*1, four body side terminals 1473*e*2, two positioning pins 1473*e*3 (positioning protruding sections), a snap fit 1473*e*4, and the like.

In the connector 1473*e* according to the present eleventh embodiment, the body side terminal 1473*e*5 (the earth terminal) is installed inside the positioning pin 1473*e*3 (a section that comes in contact with a notch 1435*b*1 of the ID chip 1435 or a hole 1535*b*11).

Figure 57:
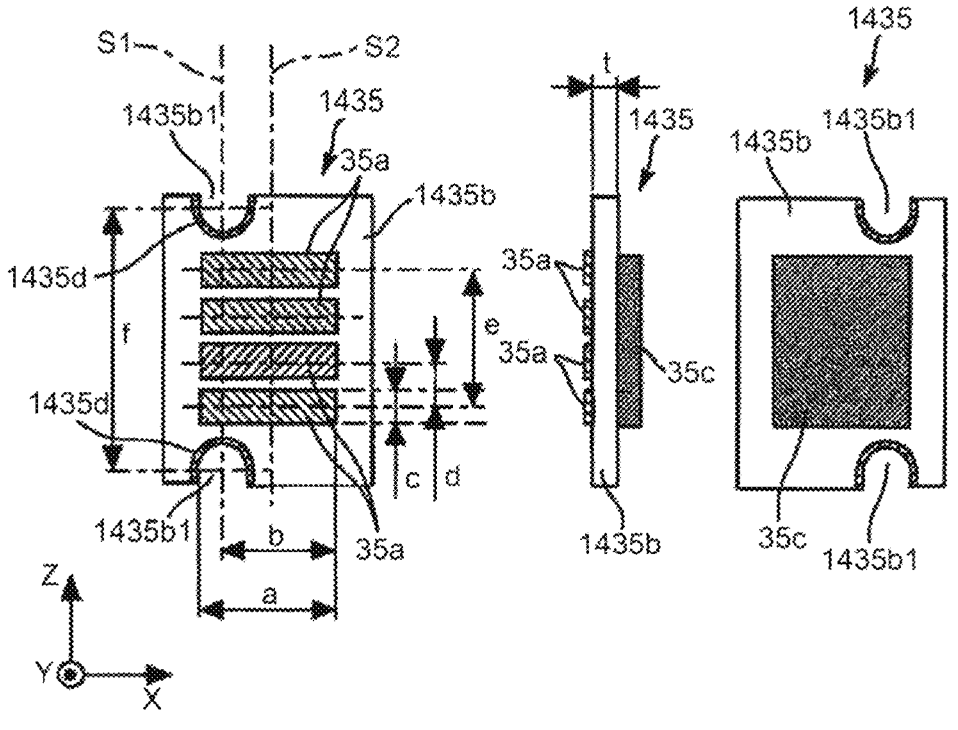
FIG. 57 is a three-plan view illustrating an information storage device that comes in contact with the connector of FIG. 56.

Meanwhile, referring to FIG. 57, in the ID chip 1435 (the substrate 1435*b*) according to the present eleventh embodiment, the metallic earth terminal 1435*d* (the earth terminal) is installed on the inner surface of the two notches 1435*b*1 and around the two notches 1435*b*1.

Through the above described configuration, in the mounting operation of the toner container, the earth terminal 1435*d* of the ID chip 1435 comes in contact with the body side earth terminal 1473*e*5 (for example, see FIG. 56) of the positioning pin 1473*e*3 (the connector 1473*e*), and then the fourth metallic pads 35*a* of the ID chip 1435 start to come in contact with the four body side terminals 1473*e*2 of the connector 1473*e*. That is, in the detaching operation of the toner container, contact between the four metallic pads 35*a* of the ID chip 1435 and the four body side terminals 1473*e*2 of the connector 1473*e* is released, and then the earth terminal 1435*d* of the ID chip 1435 is released from the contact state with (separated from) the body side earth terminal 1473*e*5 of the positioning pin 1473*e*3 (the connector 1473*e*). Specifically, the body side earth terminal 1473*e*5 in the connector 1473*e* has the contact start position closer to the ID chip 1435 side than the four body side terminals 1473*e*2.

Through the above described configuration, in the mounting operation of the toner container, the metallic pads 35*a* always start to be connected with the body side terminals 1473*e*2 in the state in which the ID chip 1435 is earthed, and in the detaching operation of the toner container, the metallic pads 35*a* always start to be separated from (released from the contact state with) the body side terminals 1473*e*2 in the state in which the ID chip 1435 is earthed. Thus, an electric circuit at the ID chip 1435 is prevented from being not earthed and so becoming an electrically floating state, and so the ID chip 1435 is difficult to be electrically damaged.

Figure 58:
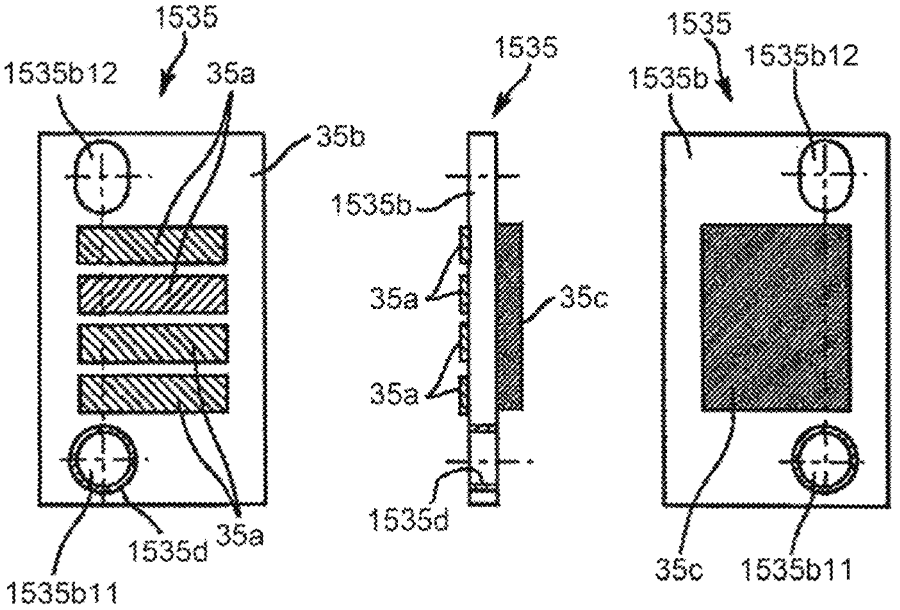
FIG. 58 is a three-plane view illustrating an information storage device of another form.

Further, similarly to a relation between the ID chip according to the first embodiment and the ID chip according to the fourth embodiment, the ID chip 1435 illustrated in FIG. 57 may be replaced with the ID chip 1535 illustrated in FIG. 58.

In detail, referring to FIG. 58, in the ID chip 1535, a metallic earth terminal 1535*d* (an earth terminal) is installed on the inner surface of one positioning hole 1535*b*11 and around the positioning hole 1535*b*11.

Through the above described configuration, in the mounting operation of the toner container, the earth terminal 1535*d* of the ID chip 1535 comes in contact with the body side earth terminal 1473*e*5 (for example, see FIG. 56) of the positioning pin 1473*e*3 (the connector 1473*e*), and then the four metallic pads 35*a* of the ID chip 1535 start to come in contact with the four body side terminals 1473*e*2 of the connector 1473*e*. That is, in the detaching operation of the toner container, contact between the four metallic pads 35*a* of the ID chip 1535 and the four body side terminals 1473*e*2 of the connector 1473*e* is released, and then the earth terminal 1535*d* of the ID chip 1535 is released from the contact state with (separated from) the body side earth terminal 1473*e*5 of the positioning pin 1473*e*3 (the connector 1473*e*). Specifically, the body side earth terminal 1473*e*5 in the connector 1473*e* has the contact start position closer to the ID chip 1535 side than the four body side terminals 1473*e*2.

Through the above described configuration, in the mounting operation of the toner container, the metallic pads 35*a* always start to be connected with the body side terminals 1473*e*2 in the state in which the ID chip 1535 is earthed, and in the detaching operation of the toner container, the metallic pads 35*a* always start to be separated from (released from the contact state with) the body side terminals 1473_e_2 in the state in which the ID chip 1535 is earthed. Thus, an electric circuit at the ID chip 1535 is prevented from being not earthed and so becoming an electrically floating state, and so the ID chip 1535 is difficult to be electrically damaged.

As described above, even in the present eleventh embodiment, the contact-type ID chip 1435 or 1535 (the information storage device) is held on the holding member 34_k_ (the holding section) to be movable on the virtual plane that is substantially orthogonal to the movement direction in which the metallic pads 35_a_ (terminals) approach and come in contact with the body side terminals 1473_e_2.

Thus, even when the contact-type ID chip 1435 or 1535 (the information storage device) is installed in the toner container (the removable device) installed removably on the image forming apparatus body, the contact failure caused by the positioning failure with the body side terminals 1473_e_2 of the connector 1473_e_ of the image forming apparatus body is difficult to occur.

As described above, in the present eleventh embodiment, even when the contact-type ID chip 1435 or 1535 (the information storage device) is installed in the toner container (the removable device) installed removably on the image forming apparatus body 100, since the earth terminal 1435_d_ or 1535_d_ engaged with the body side earth terminal 1473_e_5 formed in the positioning pin 1473_e_3 (the protruding section) of the connector 1473_e_ (the image forming apparatus body 100) is formed in the notch 1435_b_1 or the hole 1535_b_11 formed in the substrate 1435_b_ or 1535_b_ of the ID chip 1435 or 1535, the ID chip 1435 or 1535 is difficult to be electrically damaged.

Twelfth Embodiment

A twelfth embodiment of the present invention will be described in detail with reference to FIGS. 59 to 62.

Figure 59:
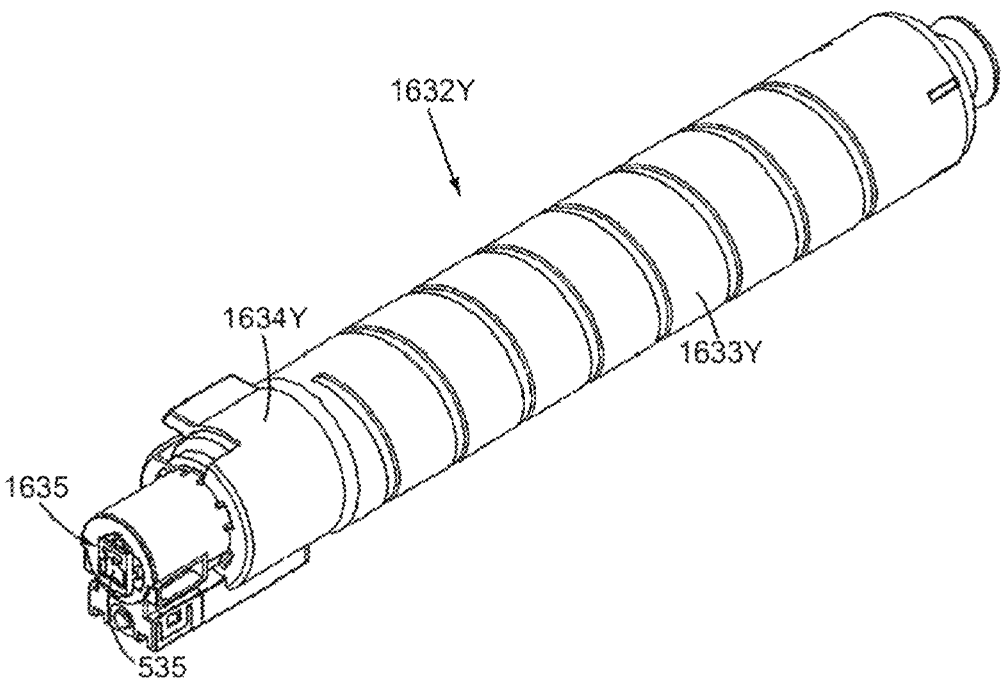
FIG. 59 is a perspective view illustrating a toner container according to a twelfth embodiment.

FIG. 59 is a perspective view illustrating a toner container 1632Y as a removable device according to the twelfth embodiment. The toner container 1632Y includes a container body 1633Y having the same configuration as the container body 33Y, a cap section 1634Y that covers a toner discharge opening (not shown) formed in the container body 1633Y from the outer side, an ID chip as an information storage device attached to the leading end of the cap section 1634Y, and a holding mechanism 1635 that holds the ID chip. For example, the ID chip 535 described in the fifth embodiment may be used as the ID chip.

The toner container 1632Y relates to a toner container attachable to and detachable from a toner feeding device of a toner suction conveying type disclosed in Japanese Patent No. 4396946 or U.S. Pat. No. 7,835,675. That is, except for the ID chip, the holding mechanism, and a communication method of the ID chip, the toner container and the toner feeding device disclosed in the relevant patent are employed. The relevant patent is referred to in connection with a positioning configuration, which allows attachment and detachment, disposed in both the toner container and the feeding device, a configuration for driving the container body, and the like. The difference between the toner container of the present embodiment and the toner container of Japanese Patent No. 4396946 or U.S. Pat. No. 7,835,675 will be described later. The toner feeding device of the present embodiment is different from the toner feeding device of Japanese Patent No. 4396946 or U.S. Pat. No. 7,835,675 in that the former employs a contact type communication method, whereas the latter employs a non-contact type communication method (a so-called RFID method). Thus, as the body side connector of the former, the connector 573_e_ of FIGS. 37, 38, and 45 described with reference to the fifth embodiment is disposed at a position facing the toner container cap end surface of the toner feeding device of Japanese Patent No. 4396946 or U.S. Pat. No. 7,835,675.

Figure 60:
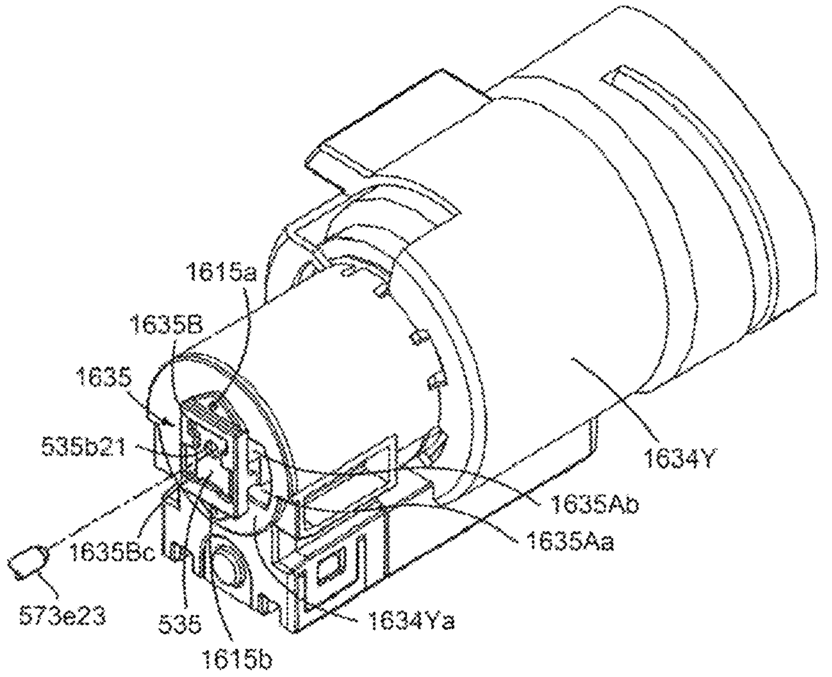
FIG. 60 is an enlarged perspective view illustrating configurations of an information storage device and a holding member according to the twelfth embodiment.

As illustrated in FIG. 60, the positioning hole 535_b_21 described above is formed in the ID chip 535, and, for example, the positioning pin 573_e_23 of the connector installed in the apparatus body described above is inserted into the positioning hole 535_b_21.

The holding mechanism 1635 includes a holding section 1635A that holds the ID chip 535 in a movable manner in the XZ direction and a holding cover 1635B as a cover member that is removably fitted into the holding section 1635A.

Figure 61:
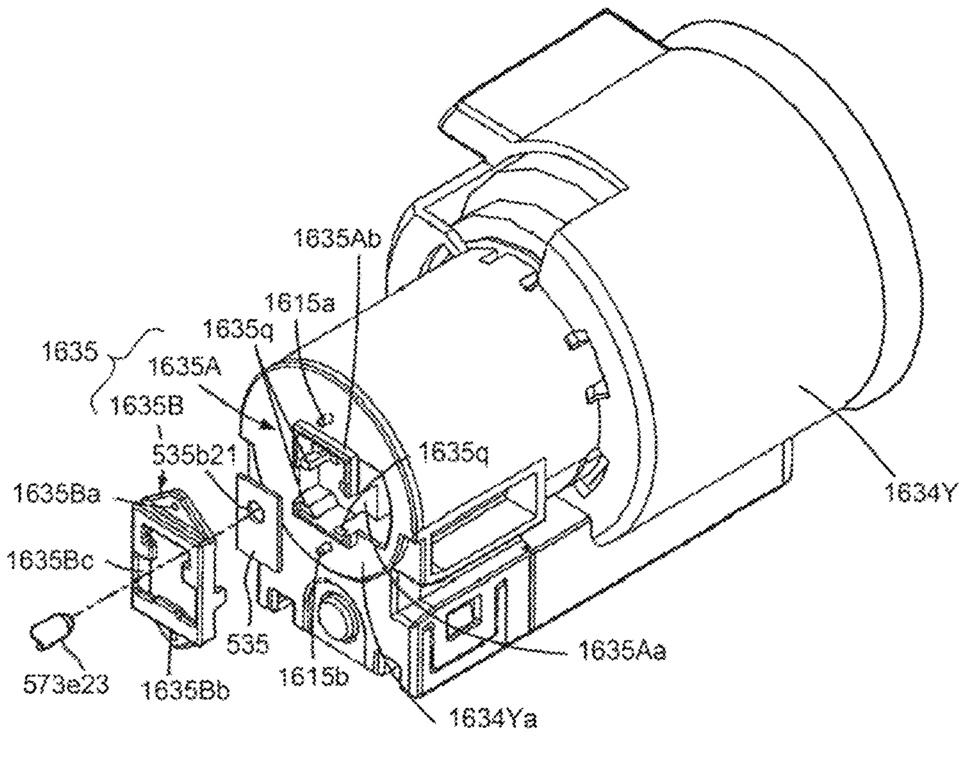
FIG. 61 is an exploded perspective view illustrating the configurations of the information storage device and the holding member according to the twelfth embodiment.

As illustrated in FIG. 61, the holding section 1635A includes a concave section 1635Aa formed on an ID chip mounting surface 1634Ya that is vertically flat and formed at the leading end of the cap section 1634Y, a pedestal section 1635_q_, formed in the concave section 1635Aa, in which the ID chip 535 is installed, and an ID chip installation wall section 1635Ab of a substantially frame shape formed to surround the concave section 1635Aa and the pedestal section 1635_q_ from the outer side. The ID chip installation wall section 1635Ab is formed to protrude outward from the ID chip mounting surface 1634Ya further than the pedestal section 1635_q_. The ID chip installation wall section 1635Ab has a size capable of storing the ID chip 535 having an outward rectangular form and holds the ID chip 535 in a movable manner in the XZ direction when the ID chip 535 is placed. That is, the ID chip 535 is installed in the pedestal section 1635_q_ but not fixed to the cap section 1634Y. When installed in the pedestal section 1635_q_, the ID chip 535 is installed with a clearance with the ID chip installation wall section 1635Ab that is formed to surround the ID chip 535 from the outer side.

On the ID chip mounting surfaces 1634Ya, positioning bosses 1615_a_ and 1615_b_ for mounting the holding cover 1635B are formed to protrude from the ID chip mounting surface 1634Ya. The positioning bosses 1615_a_ and 1615_b_ are integrally formed with the cap section 1634Y by resin.

The holding cover 1635B is mounted on and fixed to the holding section 1635A by a melt-fixing method (for example, heat calking) described below, with the ID chip being disposed in the holding section 1635A. A central section of the holding cover 1635B is provided with an opening 1635Bc that allows a contact point (not shown) and the positioning hole 535_b_21 of the ID chip 535 to be exposed to the outside and allows the connector terminal (not shown) of the connector and the positioning pin 573_e_23 to be inserted therethrough. The holding cover 1635B is configured to sandwich the IC chip 535 set inside the ID chip installation wall section 1635Ab together with the ID chip installation wall section 1635Ab so that the ID chip 535 does not separate. Above and below the opening 1635Bc of the holding cover 1635B, mounting holes 1635Ba and 1635Bb are formed at positions corresponding to the positioning bosses 1615_a_ and 1615_b_.

In this configuration, when mounting the ID chip 535 on the cap section 1634Y, the back surface of the ID chip 535 comes in contact with the pedestal section 1635_q_ so that its position in a depth direction is determined. Along this, up, down, left and right positioning is done by the surrounding thanks to the ID chip installation wall section 1635Ab. The holding cover 1635B is superimposed on the ID chip installation wall section 1635Ab in a direction facing the ID chip installation wall section 1635Ab, and the positioning bosses 1615_a_ and 1615_b_ are inserted into the mounting holes

1635Ba and 1635Bb. Thus, the ID chip 535 is positioned in a state covered by the holding cover 1635B, and mounted and held on the cap section 1634Y. In this state, the ID chip 535 is installed on the ID chip mounting surface 1634Ya of the cap section 1634Y but is not fixed directly to the cap section 1634Y. That is, the ID chip 535 is mounted to the cap section 1634Y through the ID chip installation wall section 1635Ab formed on the ID chip mounting surface 1634Ya.

The present embodiment features a fixing method between the holding cover 1635B and the cap section 1634Y. In the present embodiment, a melt-fixing method is employed as a fixing method of the holding cover 1635B and the cap section 1634Y.

Figure 62:
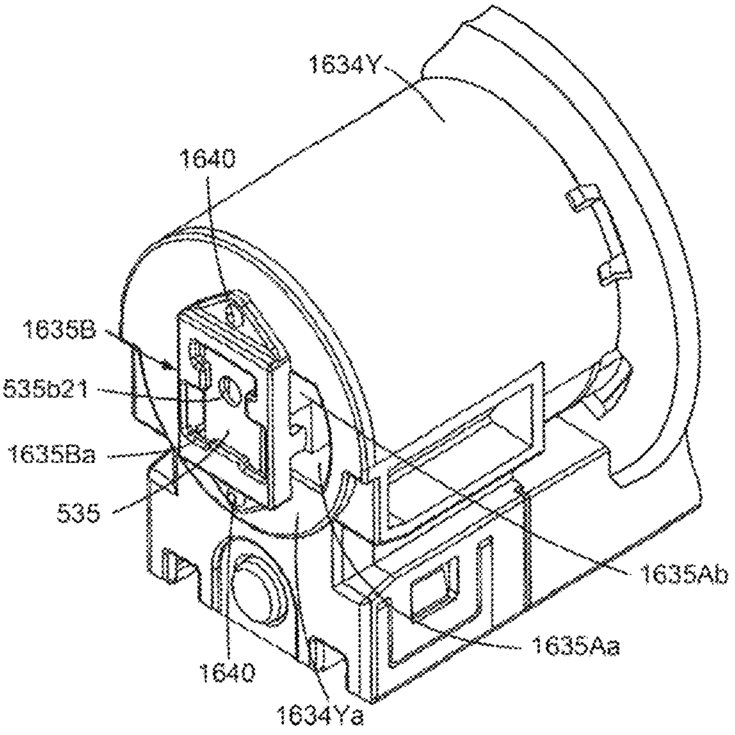
FIG. 62 is an enlarged perspective view illustrating a fixing state between the information storage device and the holding member according to the twelfth embodiment.

Since the holding cover 1635B is held such that the positioning bosses 1615*a* and 1615*b* formed at the cap section 1634Y side are inserted into the mounting holes 1635Ba and 1635Bb as described above, in the present embodiment, as illustrated in FIG. 62, the holding cover 1635B is fixed to the cap section 1634Y by heat calking. In FIG. 62, a reference numeral 1640 represents a calking section (a fixing section). For example, the positioning bosses 1615*a* and 1615*b* illustrated in FIG. 61 have the size protruding from the mounting holes 1635Ba and 1635Bb. The positioning bosses 1615*a* and 1615*b* are heated by a heating member such as a heatable iron, and the calking section 1640 is formed by crushing and thermally deforming the bosses while melting them by heat. Accordingly, the holding cover 1635B can be fastened to and fixed to the cap section 1634Y.

In the present embodiment, as the fixing method between the holding cover 1635B and the cap section 1634Y, fixing by heat calking has been described, but as the fixing method between the holding cover 1635B and the cap section 1634Y, another melt-fixing method such as ultrasonic welding may be used, and a resin melting method not limited to the present embodiment.

Thirteenth Embodiment

Figure 63:
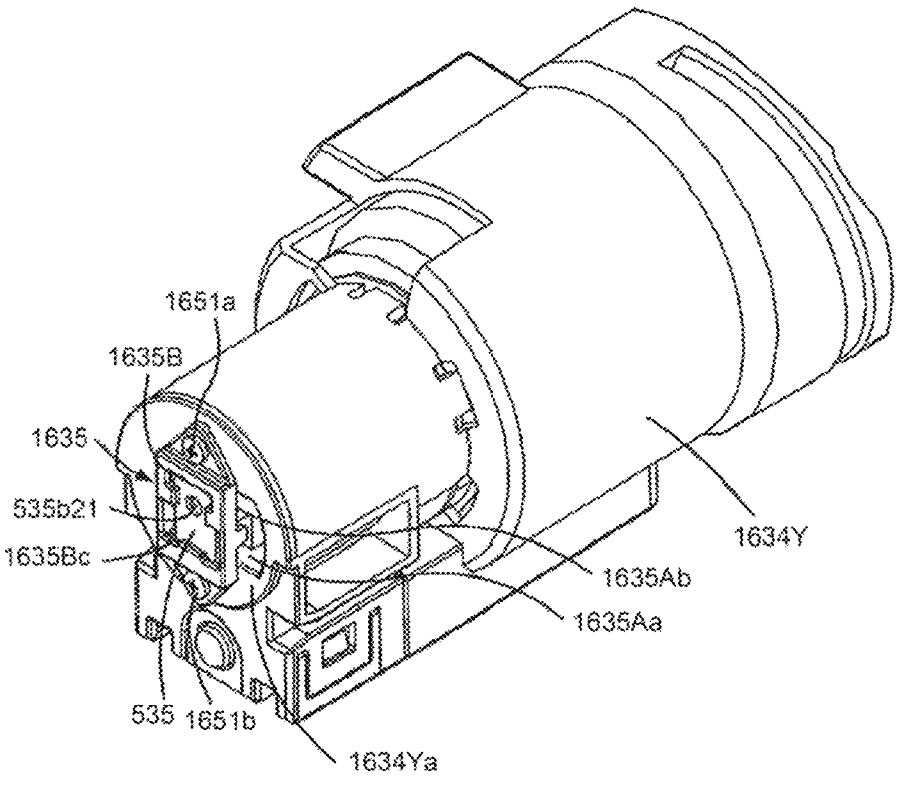
FIG. 63 is an enlarged perspective view illustrating a fixing state between an information storage device and a holding member according to a thirteenth embodiment.
Figure 64:
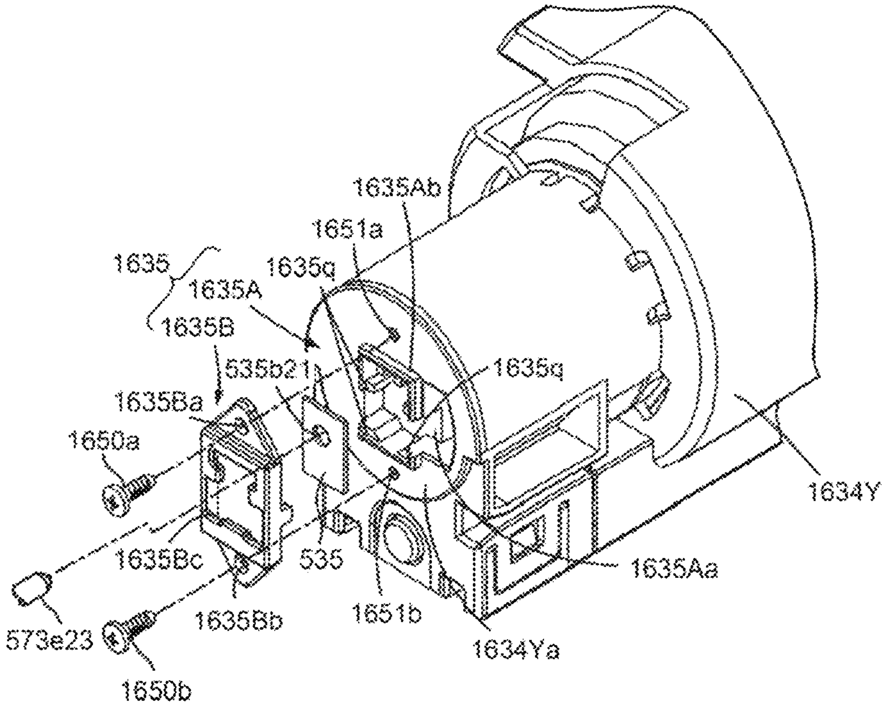
FIG. 64 is an enlarged perspective view illustrating configurations of the information storage device and the holding member according to the thirteenth embodiment.

A thirteenth embodiment will be described in detail with reference to FIGS. 63 and 64.

In the present embodiment, the holding cover 1635B is not fixed by a process such as heat calking but fixed by a fastening method using a fastening member. The remaining sections of the toner container and the form of the toner feeding device are the same as in the twelfth embodiment. In present embodiment, the holding cover 1635B is fixed to the cap section 1634Y such that fastening members 1650*a* and 1650*b* are inserted into the mounting holes 1635Ba and 1635Bb formed in the holding cover 1635B that allows the positioning bosses 1615*a* and 1615*b* to be inserted into and screwed into the ID chip mounting surface 1634Ya. For example, when the screw fixing is performed using a self-tap screw that creates a screw groove in an opposing hole at the same time when it is screwed into the opposing hole as the fastening members 1650*a* and 1650*b*, all you have to do is to form a tubular pilot hole (corresponding to 1651*a* and 1651*b* of FIG. 64) in the ID chip mounting surface 1634Ya.

As another embodiment, for example, there is a case in which the holding cover 1635B is fixed to the cap 1634Y without the ID chip being held therein and then the resultant product is shipped from a toner container manufacturing factory, and then in another factory, the holding cover 1635B is removed, the ID chip is set inside, and the holding cover 1635B is fixed again to the cap 1634Y, or there is a case of recycling the used toner container. In this case, if attachment/detachment of the holding cover 1635B is repeated within a certain range, the above described tubular pilot hole is preferable. However, if five or six times, or more times of attachments/detachments are expected and the stability of fastening force on each occasion should be considered, it is preferable that screw holes 1651*a* and 1651*b* are formed in advance in the ID chip mounting surface 1634Ya, and fixing is performed by screwing screws into the screw holes 1651*a* and 1651*b* through the mounting holes 1635Ba and 1635Bb so as to correspond to the pitch of the screw holes 1651*a* and 1651*b* as fastening members 1650*a* and 1650*b*, as illustrated in FIG. 64. In the present embodiment, the fastening members 1650*a* and 1650*b* are fixed at two positions below and above the holding cover 1635B but may be fixed at one position, or more positions then the above. Further, the fastening members 1650*a* and 1650*b* may be mounted at the left and right sides rather than the upper and lower sides of the holding cover 1635B, and are not limited in terms of number and position to the present embodiment.

Fourteenth Embodiment

Figure 65:
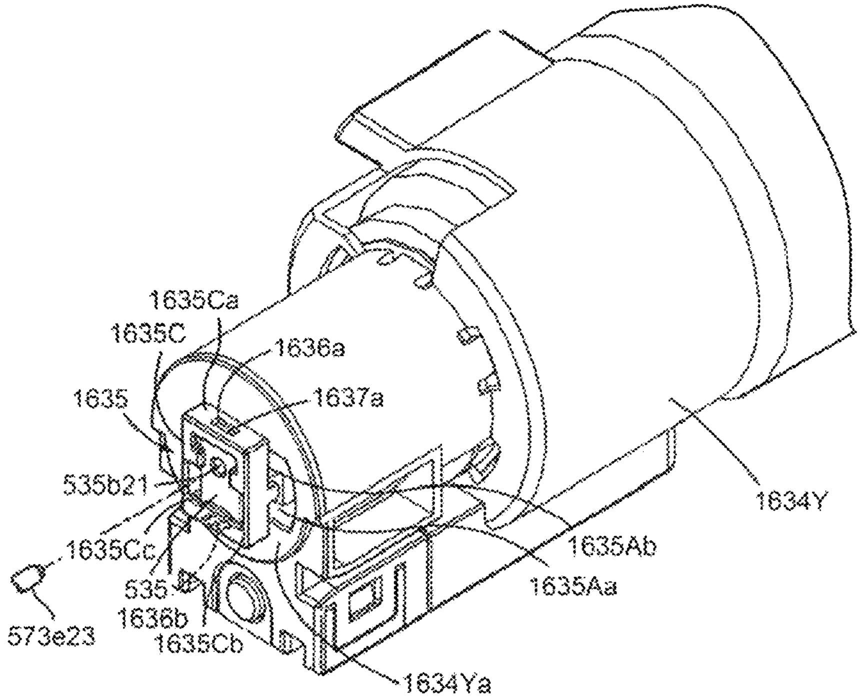
FIG. 65 an enlarged perspective view illustrating a fixing state between an information storage device and a holding member according to a fourteenth embodiment.

A fourteenth embodiment of the present invention will be described in detail with reference to FIGS. 65 and 66.

In the present embodiment, the holding cover is characterized in that it is not fastened to and fixed to the cap section 1634Y by the process such as heat calking or the fastening member but fixed by a fitting method using a claw member. The remaining sections of the toner container and the form of the toner feeding device are the same as those in the twelfth embodiment.

A holding cover 1635C according to the present embodiment basically has the same function as the holding cover 1635B. Specifically, the mounting holes 1635Ba and 1635Bb are eliminated from the holding cover 1635B, and instead hook sections 1636*a* and 1636*b* that pass through up to an opening 1635Cc formed at a central section are formed in an upper section 1635Ca and a lower section 1635Cb. Like the opening 1635Bc, the opening 1635Cc allows the contact point (not shown) and the positioning hole 535*b*21 of the ID chip 535 to be exposed to the outside and allows the connector terminal (not shown) of the connector and the positioning pin 573*e*23 to be pass therethrough.

Figure 66:
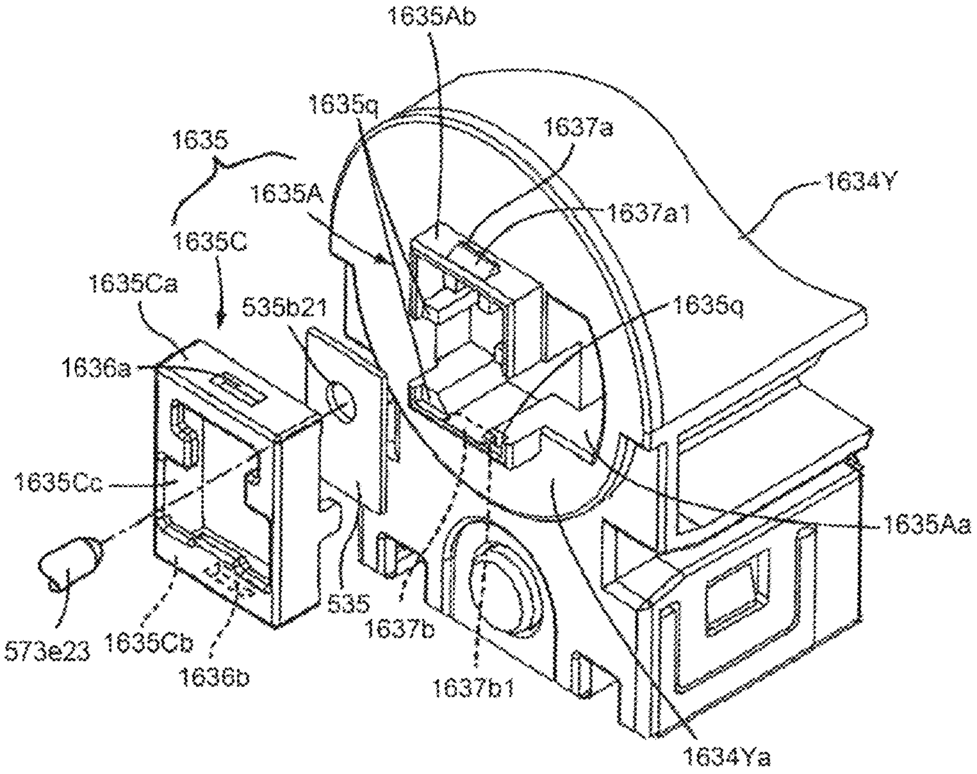
FIG. 66 is an enlarged perspective view illustrating configurations of the information storage device and the holding member according to the fourteenth embodiment.

In the present embodiment, the cap section 1634Y, as illustrated in FIG. 66, is provided with claw sections 1637*a* and 1637*b* as engaging sections that enter the inside of the hook sections 1636*a* and 1636*b* and engage with the hook sections 1636*a* and 1636*b*. In the present embodiment, the claw sections 1637*a* and 1637*b* are formed to be disposed respectively on the upper section and the lower section of the ID chip installation wall section 1635Ab covered with the holding cover 1635C. The claw sections 1637*a* and 1637*b* have inclined surfaces 1637*a*1 and 1637*b*1 formed at the insertion side and are configured so as to guide the holding cover 1635C to the tops of the claw sections 1637*a* when the holding cover 1635C is aligned and mounted.

With this configuration, when the ID chip 535 is set in the ID chip installation wall section 1635Ab and the holding cover 1635C is moved toward the ID chip installation wall section 1635Ab so as to be superimposed on the ID chip installation wall section 1635Ab, the claw section 1637*a* formed in the ID chip installation wall section 1635Ab that becomes the cap section 1634Y side enters the inside of the hook sections 1636*a* and 1636*b* formed in the holding cover 1635C, and the holding cover 1635C can be fixed to the cap section 1634Y by fitting between both sides.

In the present embodiment, the hook sections 1636*a* and 1636*b* are fitted into the claw sections 1637*a* and 1637*b* at the two positions of the upper and lower sections of the holding cover 1635C, but they may be fitted at the left and right sections or at the upper, lower, left, and right sections of the holding cover 1635C instead of the upper and lower sections. The fitting position and number are not limited to the present embodiment.

In the thirteenth and fourteenth embodiments, the method of fastening or fitting the holding cover 1635C to be attached to or detached from the cap section 1634Y has been described. However, as another fixing method, for example, the cover member may be fixed to the ID chip installation wall section 1635Ab by an adhesive. In this case, the cover member preferably has adhesive force sufficient not to fall off at the time of detachment of the toner container 1632Y from the apparatus body, and a kind of an adhesive and an adhesion area are not particularly limited.

In the twelfth to fourteenth embodiments, even in any embodiment, even when the ID chip 535 that is the contact-type information storage device is installed in the toner container 1632Y, the contact failure caused by the unsatisfactory positioning relative the terminal of the connector of the apparatus body is difficult to occur.

Fifteenth Embodiment

In the toner container according to any one of the first to seventh embodiments, part of the inventive (the shutter mechanism) for solving the above described third problem will be described in detail once again as a fifteenth embodiment.

The stopper release urging section 72*b* in FIG. 5 will be described with reference to FIG. 18 and the subsequent figures. The stopper release urging section 72*b* is a section used to open the toner discharge opening W by displacing the shutter 34*d* disposed in the cap section 34Y from the closed state to the open state in conjunction with the insertion (mounting) operation of the developer storage containers 32Y, 32M, 32C, and 32K. The stopper release urging section 72*b* is configured with a trapezoidal rib that protrudes upward from the upper surface of the bottle receiving surface 72*a* toward the shutter.

Meanwhile, FIGS. 18 and 20 illustrate the entire configuration of the developer storage containers 32Y, 32M, 32C, and 32K (see FIG. 18) and the details of the cap section 34Y disposed in the container (see FIG. 20).

In FIG. 18, the developer storage container 32Y mainly includes the container body 33Y (the bottle body) and the cap section 34Y (the bottle cap) disposed at the head thereof. Further, the ID chip 35 as the information storage device or the like is detachably installed in the cap section 34Y of the developer storage container 32Y.

Among the sections described above, the configuration illustrated in FIG. 20 is used at the position where the ID chip 35 is installed so that the ID chip 35 can be mounted.

On the leading end surface of the cap section 34Y, as illustrated in FIG. 20, the first and second positioning holes 34*a* and 34*b* that can be engaged with the first and second positioning pins (not shown) disposed in the cap receiving section 73 are disposed at the two positions in the longitudinal direction (the vertical direction).

Figure 67:
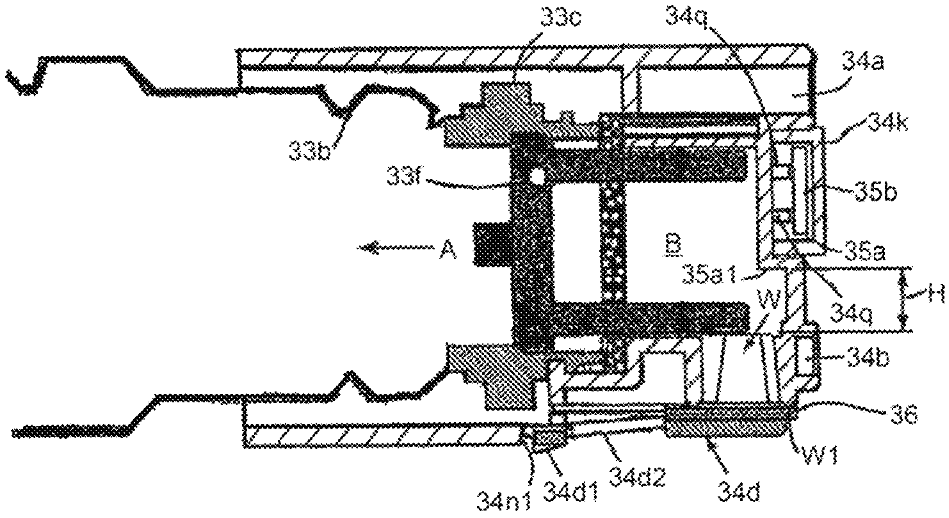
FIG. 67 is a cross sectional view illustrating a cap section illustrated in FIG. 18.
Figure 68:
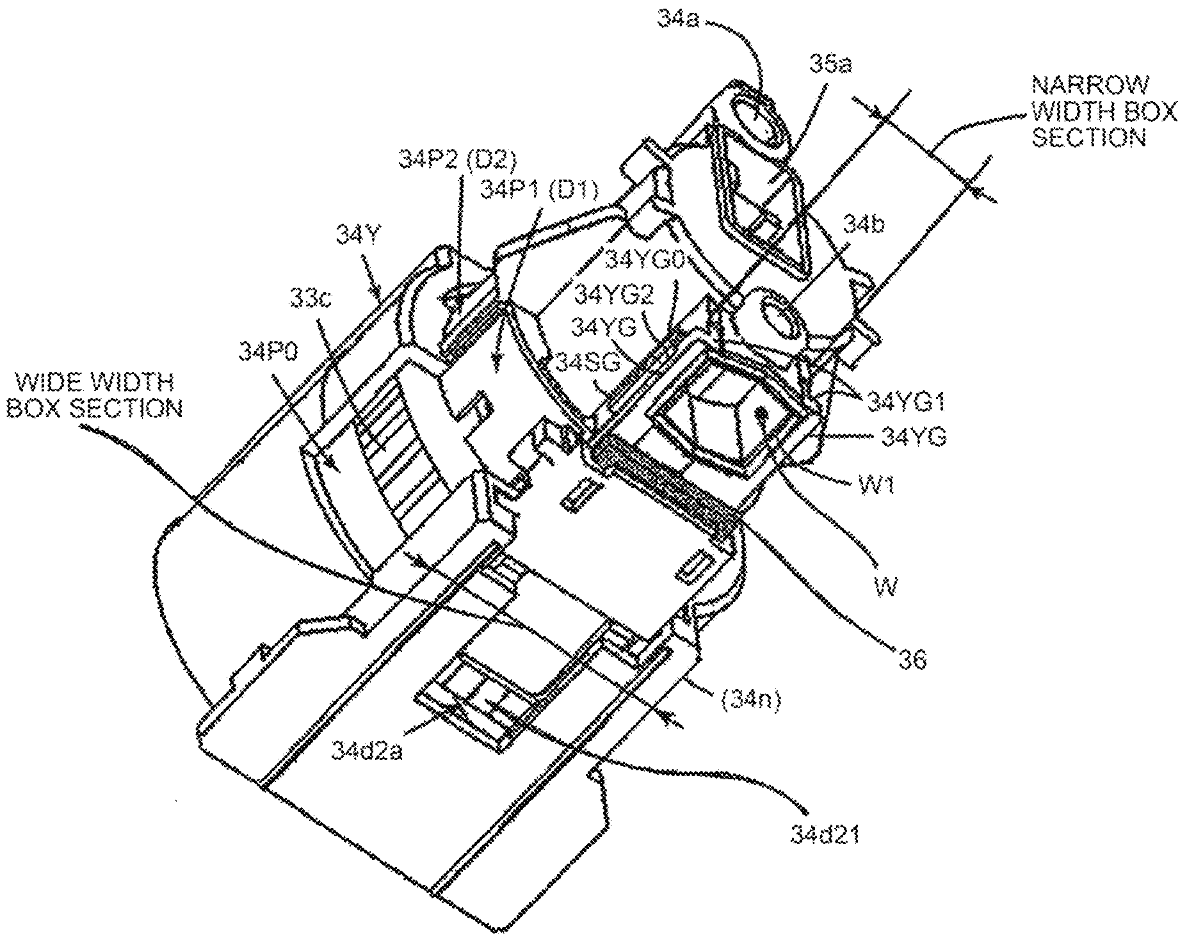
FIG. 68 is a perspective view, viewed from a bottom surface of a shutter, for explaining a configuration of a shutter used in a cap section illustrated in FIG. 18.

Between the first and second positioning holes 34*a* and 34*b*, formed is a rectangular concave section 34*t* that has a shape connectable with the connector disposed at the developer storage container storage unit 70 (see FIG. 5) and extends in the vertical direction as illustrated in FIGS. 67 and 68. Inside the concave section, as illustrated in FIG. 67, the holding member 34*k* to which the ID chip is attachable is mounted. A reference numeral 33*f* illustrated in FIG. 67 represents the agitating member having an agitating section positioned inside the cap, and the agitating member rotates in conjunction with the gear 33*c* which will be described later.

Figure 70A:
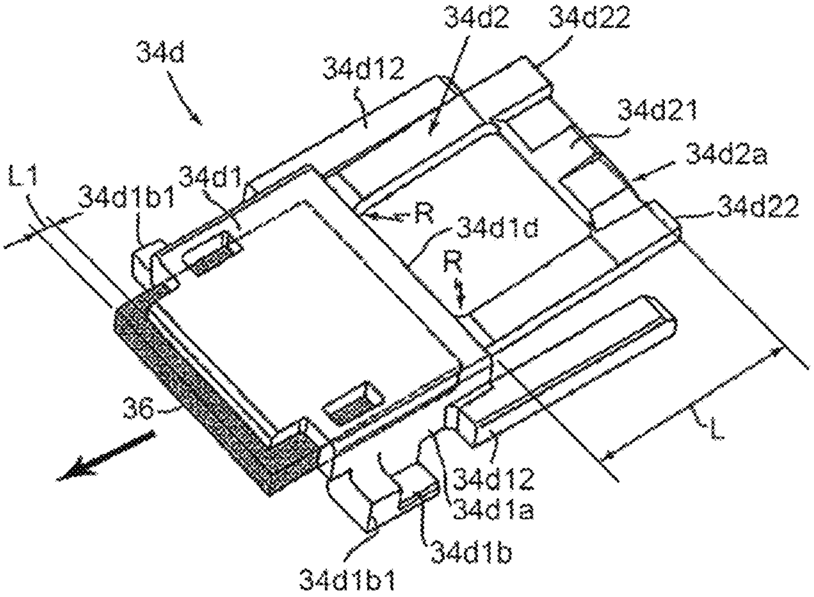
FIGS. 70A to 70C are views for explaining a configuration of the shutter illustrated in FIGS. 69A and 69B.

The mounting position of the holding member 34*k* is vertically higher than the position of the toner discharge opening W that is opened or closed by the shutter 34*d* which will be described later with reference to FIGS. 70A to 70C (in FIG. 67, for convenience, the position having the height H between a bottom section 34*t*1 of the concave section 34*t* and the toner discharge opening W), and thus the holding member 34*k* is separated from the toner discharge opening W. Further, a convex wall is disposed at a circumferential edge of the rectangular concave section. Thus, obtained is the state in which part of the concave section 34*t* is difficult to be superimposed on part of the toner discharge opening W in the transverse direction. That is, the bottom section 34*t*1 of the concave section 34*t* does not get close to the toner discharge opening W. Thus, part of the toner discharge opening W is prevented from being filled with the bottom section 34*t*1, and discharging of the toner is not inhibited. Further, even when the toner leaks and is scattered from the toner discharge opening W of the developer storage container 32Y to the outside, the scattered toner does not reach the connector against its own weight, and the scattered toner is blocked by the convex wall. Thus, the contact failure caused when the toner sticks to the connector can be prevented, and the occurrence of the communication failure can be prevented. The concave section 34*t* is disposed at the first positioning hole 34*a* side.

Meanwhile, in the head section of the container body 33Y illustrated in FIG. 20, as illustrated in FIG. 67, the gear 33*c* integrally rotating together with the container body 33Y and the opening A are disposed at one end side in the longitudinal direction (the left-right direction in FIG. 67).

The opening A is disposed on the head section positioned at the front side when the container body 33Y is mounted and allows the toner stored in the container body 33Y to be discharged toward a hollow space section B inside the cap section 34Y.

Further, as the toner is consumed at the image forming apparatus body side, toner conveyance (rotation driving of the container body 33Y) from the inside of the container body 33Y to the hollow space B inside the cap section 34Y is appropriately performed.

Next, the configuration of the cap section 34Y of the developer storage container 32Y will be described below with reference to FIGS. 20, 67, and 68.

In the cap section 34Y of the developer storage container 32Y, installed are the ID chip 35 (the information storage device), the shutter member 34*d*, and the shutter seal 36.

As illustrated in FIG. 68, the cap section 34Y has a structure in which roughly a cylindrical body in which the outer diameter and the inner diameter decreases from the container body 33Y side toward the shutter member 34*d* side in three stages (large, medium, and small) is combined with a box section, disposed at the bottom, in which the width in the horizontal direction decreases in two stages (wide width and narrow width). The cap section 34Y includes an insertion section including the large diameter section and the medium diameter section of the cylindrical section and the wide width box section 34*n*.

In the large diameter section of the cap section 34Y, a cut-out hole 34P0 formed such that part of the outer circumference is removed is disposed, and as illustrated in FIG. 68, part of the teeth of the gear 33*c* is exposed to the outside.

In the insertion section, in FIG. 68, a circumferential section 34P1 adjacent to the cut-out hole 34P0 in the shaft direction has the outer diameter smaller than a circumferential section 34P2 that is not adjacent to the cut-out hole 34P0 in the circumferential direction. In FIG. 68, for convenience, D1 and D2 representing the outer diameters are attached to the reference numerals of the circumferential sections 34P1 and 34P2, and the relation between the outer diameters is D1<D2.

As described above, the circumferential section adjacent to the cut-out hole 34P0 of the insertion section in the shaft direction has the outer diameter smaller than other sections, and thus the teeth surface of the gear engaged with the gear 33*c*, which is exposed to the outside through the cut-out hole 34P0, in the shaft direction becomes difficult to interfere with the insertion section outer circumference. As a result, the engagement operation of the gear 33*c* with the gear moving in the shaft direction can be smoothly performed without being disturbed by part of the insertion section.

Figure 81:
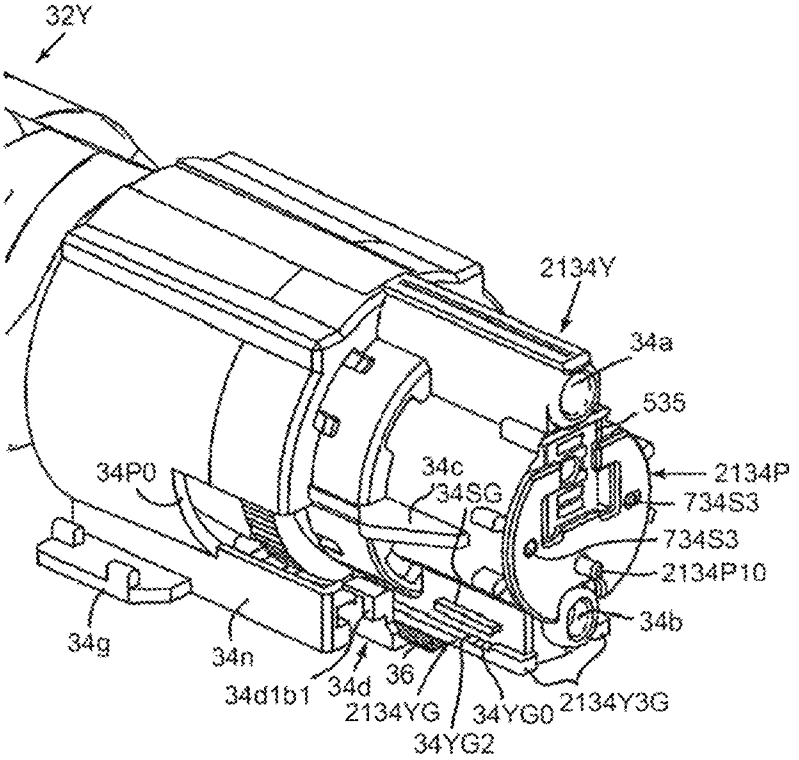
FIG. 81 is a perspective view viewed from a front left side in an insertion direction of the cap illustrated in FIG. 80.

Further, in FIG. 68 and FIG. 81 illustrating a seventeenth embodiment, which will be described later, that is a modification in which a main part is shared with the configuration illustrated in FIG. 68, a reference numeral 34YG0 represents a retaining section configured by a step section at the leading end side of a guide rail 34YG. The retaining section 34YG0 is a section that is hit by a slide protruding section 34*d*1*c* (see FIGS. 70A to 70C) disposed at the shutter 34*d* side so that the shutter 34*d* cannot move forward further, thereby retaining the shutter 34*d* as will be described later.

As illustrated in detail in FIG. 81, an upper rail rib 34SG that is at a predetermined distance from the guide rail 34YG and parallel to the guide rail 34YG is disposed above the guide rail 34YG. The upper rail rib 34SG prevents a sandwiching section of a body side shutter closing mechanism 73*d* (see FIG. 72) illustrated in FIG. 72 and drawings subsequent thereto from entering between the cylindrical circumferential surface of the cap 34Y and the guide rail 34YG.

On the upper surface of the guide rail 34YG, a shutter protruding section 34YG2 including a protruding section is disposed at the position that the shutter 34*d* reaches before hitting the retaining section 34YG0 (see FIG. 81). The shutter protruding section 34YG2 is used as a section for restricting movement of the shutter 34*d* when the shutter 34*d* is in the closed state.

An insertion/removal (attachment/detachment) operation of the developer storage container 33Y can be performed by the user gripping the gripping section disposed on the rear side end section of the container body 33Y in the insertion (mounting) direction as indicated by a reference numeral 33*d* in FIG. 18.

Figure 69A:
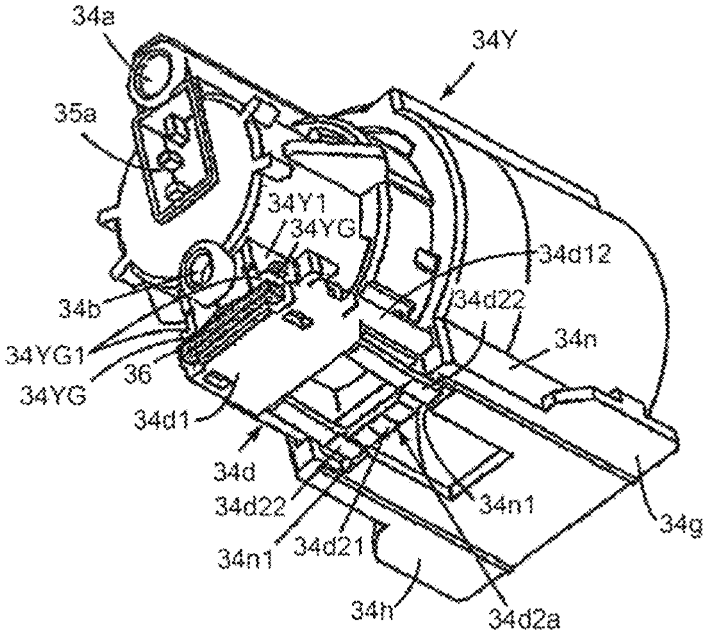
FIGS. 69A and 69B are views, corresponding to FIG. 18, for explaining an opening/closing state of a shutter illustrated in FIGS. 69A and 69B.
Figure 69B:
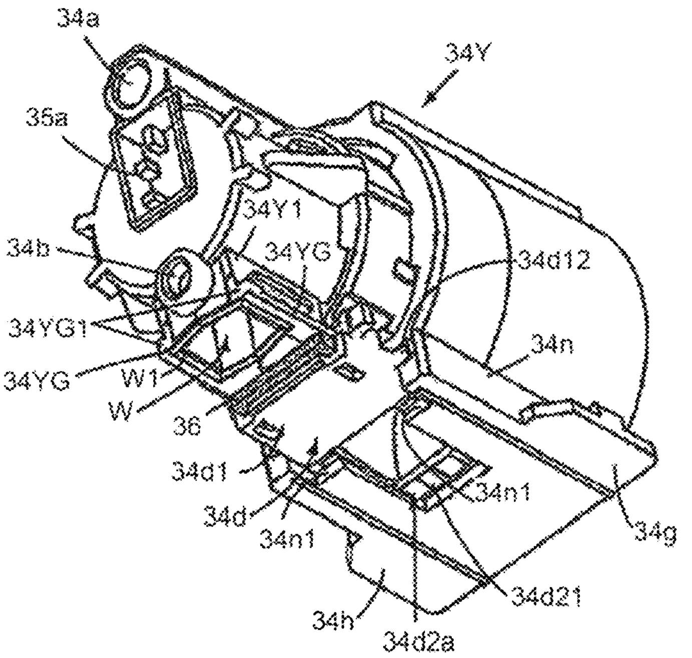

A narrow width box section 34Y1 is formed in the small diameter cylindrical section of the cap section 34Y, and inside the box section 34Y1, as illustrated in FIG. 69B, the toner discharge opening W for discharging (falling by its own weight) the toner, discharged from the opening A of the container body 33Y to the lower side in vertical direction, that is, to the container outside is disposed to communicate with the hollow space section B illustrated in FIG. 67.

As illustrated in FIG. 69B, the toner discharge opening W is formed in a hexagonal shape that is one of polygonal shapes and has a predetermined flow passage area and communicates the lower side circumferential surface of the space B inside the small diameter cylindrical section with the toner discharge opening W (discharge opening). Thus, the toner discharged to the space B inside the small diameter cylindrical section of the cap section 34Y from the opening A of the container body 33Y falls from the toner discharge opening W of the hexagonal cylindrical shape by its own weight and then is smoothly discharged to the container outside (the toner tank section 61Y).

In the toner discharge opening W, as illustrated in FIGS. 67 and 69B, a rib W1 protruding toward a seal material 36 of the shutter 34*d* which will be described later is formed along the opening circumferential edge. The rib W1 has a function of folding and riding up the end section of the seal material 36 which will be described later, a function of improving adhesion of the seal material 36 by coming in press contact with a section other than the end section, and a function of damming the toner that is about to leak from the toner discharge opening W.

In FIGS. 69A and 69B, in the bottom section of the narrow width box section 34Y1 disposed in the lower section of the cap section 34Y, the shutter 34*d* for performing opening and closing of the toner discharge opening W in conjunction with the attaching/detaching operation of the developer storage container 32Y on the developer storage container storage unit 70 is held to be slidingly movable.

The shutter 34*d* is a feature section of the present invention and has the following configuration which will be described with reference to FIGS. 70A and 70B. In addition, FIG. 70A is a perspective view in which the shutter 34*d* is viewed from the bottom surface side, and FIG. 70B is a perspective view in which the shutter 34*d* is viewed from the top surface.

The shutter 34*d* is made of a resin material such as polystyrene and mainly includes a plate-like main shutter section 34*d*1 and a shutter deforming section 34*d*2 that protrudes the main shutter section 34*d*1, is thinner in thickness than the main shutter section 34*d*1, and has elasticity.

In the main shutter section 34*d*1, vertical wall 34*d*1*a* standing at both side end sections of a plate section and a pair of shutter sliders 34*d*12 having a protruding objects protruding from the vertical walls are disposed.

The vertical walls 34*d*1*a* includes a pair of slide protruding sections 34*d*1*c* that are disposed at the inner side surfaces of the vertical walls to protrude facing each other and L-shaped engaged protruding sections 34*d*1*b* that are disposed on the outer side surfaces at the side opposite to the slide protruding sections 34*d*1*c*.

The engaged protruding section 34*d*1*b* is shaped such that a plate section extending in the shutter moving direction is present on the upper surface, and a protrusion 34*d*1*b*1 engaged with a sandwiching section which will be described later extends downward from a section positioned in the front side of the plate section in an insertion direction of the developer storage container.

The shutter slider 34*d*12 includes a pair of prismatic sections that is disposed to protrude from the surface of the same side as the engaged protruding section 34*d*1*b* of the vertical wall 34*d*1*a* and extends toward the rear side in the direction of closing the toner discharge opening W of the shutter 34*d* indicated by an arrow.

Figure 70B:
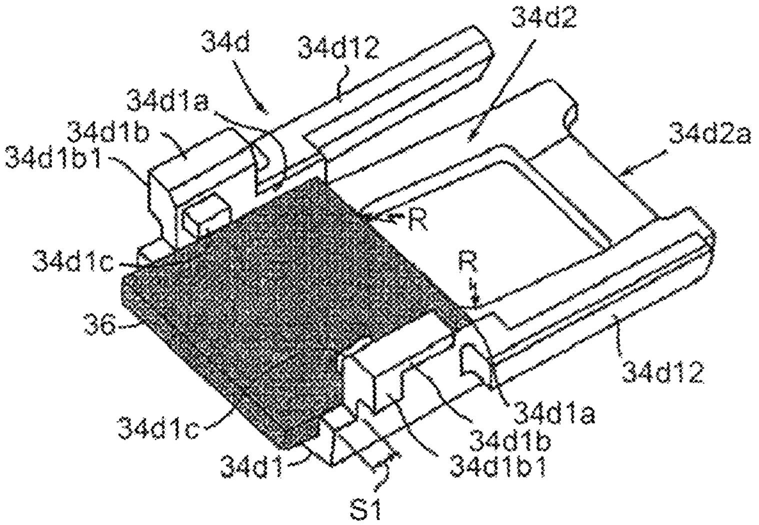

In the present embodiment, as illustrated in FIG. 70B, the protrusion 34*d*1*b*1 disposed in the engaged protruding section 34*d*1*b* is disposed at the position offset from the front end surface of the main shutter section 34*d*1 (the position where a section corresponding to a distance indicated by a symbol S1 in FIG. 70B is removed). As will be described in FIG. 72 and drawings subsequent thereto, the protrusion 34*d*1*b*1 is used as a section for preventing interference when one of sandwiching sections 73*d*2 (see FIG. 72) disposed in a body side shutter closing mechanism 73*d* starts to turn.

In the shutter 34*d*, the shutter deforming section 34*d*2 is configured in a cantilever shape, and an inner side angular section of a base station connected to the main shutter section 34*d*1 is formed of an arc-like curvature-shaped section (a shape indicated by symbol R in FIGS. 70A and 70B) and functions to avoid stress concentration when deflectively deformed.

Figure 70C:
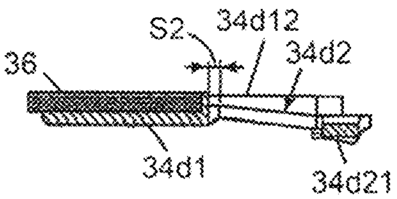

Further, the shutter deforming section 34*d*2 is formed such that part of the base end positioned at the main shutter section 34*d*1 side becomes a horizontal surface (a section indicated by symbol S2 in FIG. 70C), and the remaining section is inclined from the leading end of the horizontal surface as illustrated in FIG. 70C in which the engaged protruding section 34*d*1*b* is omitted. In this configuration, unlike when the inclined base end of the shutter deforming section 34*d*2 is directly connected with the main shutter section 34*d*1, it is possible to avoid stress from being concentrated at the connection position between the inclined base end of the shutter deforming section 34*d*2 and the main shutter section 34*d*1 when the base end side of the shutter deforming section 34*d*2 oscillates.

The shutter deforming section 34*d*2 is configured with a cantilever shaped piece section (a section having the length indicated by symbol L in FIG. 70A) extending to the rear side in the insertion direction of the developer storage container as the base end of the main shutter section 34*d*1. The shutter deforming section 34*d*2 is inclined such that it goes downward from the base end side to the rear side in the insertion direction.

The free ends of the shutter deforming section 34*d*2 are integrated by a connecting plate section 34*d*2*a* that bridges them laterally. In the central section of the connecting plate section 34*d*2*a* in the bridging direction, a stopper release section 34*d*21 is disposed to face the stopper release urging section 72*b* (see FIG. 5) that is configured with a trapezoidal rib disposed at the cap receiving section 73 side. On both sides in the bridging direction, as will be described later, disposed are stopper sections 34*d*22 for fixing the shutter 34*d* so as to prevent careless opening of the toner discharge opening W.

The stopper release section 34*d*21 is formed to have a triangular cross section. By running on the stopper release urging section 72*b* (see FIG. 5) disposed at the cap receiving section 73 side, the stopper release section 34*d*21 changes the shutter deforming section 34*d*2 from an inclined state to a horizontal state, so that engagement between the stopper section 34*d*22 and an engaging end surface 34*n*1 (see FIGS. 69A and 69B) positioned in the wide width box section 34*n* that is present on the bottom of the cap section 34Y can be released. Thus, the shutter 34*d* can move in the direction of opening or closing the toner discharge opening W.

The engaging end surface 34*n*1 positioned in the wide width box section 34*n* is disposed as a section for restricting movement of the shutter 34*d* in the direction of opening the toner discharge opening W in the state in which the toner discharge opening W is closed.

Figure 71A:
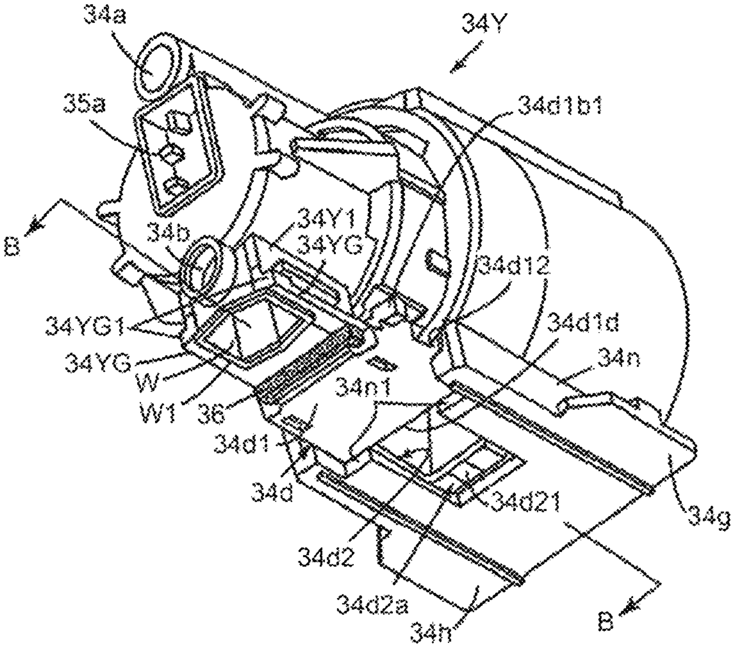
FIGS. 71A to 71C are views illustrating an opening state of the shutter illustrated in FIGS. 70A to 70C and a cross section of the state.
Figure 71B:
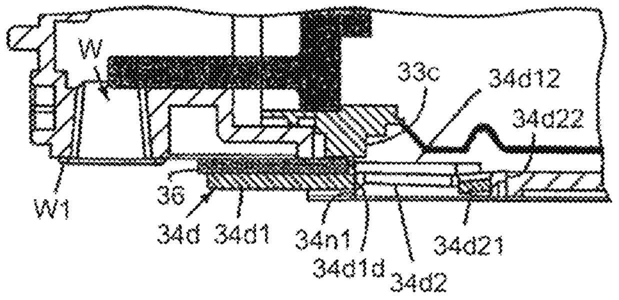
Figure 71C:
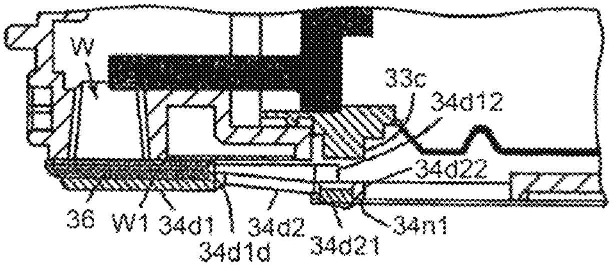

FIGS. 71B and 71C are views for explaining the relation between the engaging end surface 34*n*1 and the stopper section 34*d*22 at the shutter deforming section 34*d*2 side. At the time of closing of the toner discharge opening W illustrated in FIG. 71C, since the shutter deforming section 34*d*2 at the shutter 34*d* side in the inclined state as the initial state, the stopper section 34*d*22 positioned at the inclined free end faces the engaging end surface 34*n*1, and the shutter 34*d* cannot move independently. Thus, the state in which the toner discharge opening W is not carelessly opened is maintained.

Further, as illustrated in FIGS. 69B and 71B, when the shutter 34*d* has moved in the direction of opening the toner discharge opening W, the front end 34*d*1*d* of the main shutter section 34*d*1 in the moving direction comes in contact with the engaging end surface 34*n*1, and thus the moving position of the main shutter section 34*d*1 can be specified. FIG. 71C illustrates the case in which the shutter 34*d* has moved in the direction of closing the toner discharge opening W. In this case, the free end section of the shutter deforming section 34*d*2 becomes inclined, and so the stopper section 34*d*22 positioned at the free end section comes in face contact with the engaging end surface 34*n*1. Thus, movement of the shutter 34*d* is stopped unless the stopper release section 34*d*21 is pushed up.

The seal material 36 is composed of a rectangular parallelepiped body attached to the main shutter section 34*d*1. As the seal material 36 hits against the rib W1 illustrated in FIG. 67, the end section is folded and rides up, and a section other than the end section comes into press contact with the rib W1 and thus is deflectively deformed toward the toner discharge opening W in the fractional contact state. The seal material 36 is an elastic seal made of a flexible material. As the material, a high-density microcell urethane sheet is employed in view of sliding property and elasticity of the surface.

The seal material 36 has the length (the length indicated by symbol L1 in FIG. 70A) at which the leading end in the direction of closing the toner discharge opening W by the shutter 34*d* protrudes to the outer side further than the leading end of the main shutter section 34*d*1. The protruding leading end section is a section that easily rides up when hitting against the rib W1 disposed at the circumferential edge of the toner discharge opening W.

The shutter 34*d* is stored inside the wide width box section 34*n* positioned in the lower portion of the large diameter cylindrical section of the cap section 34Y and slidably moves.

In the wide width box section 34*n*, among four wall surfaces disposed at the side surface, two wall surfaces facing in the longitudinal direction (the shaft direction of the cap section cylinder) are opened. Particularly, since the wall surface is partially left on the corner at the bottom side, an opening extending in the horizontal direction is formed on most of the wall surface at the toner discharge opening W side. The opening is formed such that two surfaces of the side surface and the bottom surface at the toner discharge opening W side in the longitudinal direction of the wide width box section 34*n* are cut out.

Meanwhile, in FIGS. 20, 68, 69A, 69B, and 71A, lateral protrusions 34*c* for restricting the posture of the cap section 34Y in the rotation direction in the image forming apparatus body 100 (the cap receiving section 73) are formed on both side sections of the cap section 34Y, respectively.

The lateral protrusions 34*c* are positioned on both sides in a right angle direction in the same plane as a column direction of the positioning holes 34*a* and 34*b* in the circumferential surface of the medium diameter cylindrical section, has a triangular shape in a planar view, and has the top section at the position away from the circumferential surface of the medium diameter cylindrical section from the head section of the cap section 34Y to the rear side.

In the inclined surface of the lateral protrusion 34*c*, a rising edge angle of an inclined piece positioned behind the top section is larger than a rising edge angle of an inclined piece positioned at the head section side of the cap section 34Y ahead of the top section.

The inclined piece at the head section is disposed at the cap receiving section 73 side and can move while contacting the lateral protrusions 34*c* with a thrusting member (not shown) that is subject to tucking behavior by urging of elastic force. That is, if a section having a small inclined angle, so-called inclined plane, faces the thrusting member when thrusting toward the thrusting member, the inclined plane can enter with respect to the thrusting member without any resistance. If the top section of the inclined plane goes beyond the thrusting member, the inclined surface at the rear side is engaged with the thrusting member, movement resistance from the thrusting member abruptly decreases directly after going beyond the thrusting member, and a feeling of resistance when fitted into the thrusting member, so-called click feeling, is caused.

In the present embodiment, of the inclined pieces of the later protrusion, the angle of the inclined piece at the head section side is set to 30□, and the angle of the inclined piece at the rear side is set to 45□.

In FIGS. 20, 68, 69A, 69B, and 71A to 71C, reference numerals 34*g* and 34*h* are convex sections that are disposed on both ends of the bottom section of the cap section 34Y and are for securing incompatibility of the developer storage container 32Y (the developer storage container).

The convex sections 34*g* and 34*h* are sections for judging whether or not the mounting operation of the developer storage container 32Y on the developer storage container storage unit 70 is correct. If a fitting state on a fitting section (not shown) disposed at the developer storage container storage unit 70 side is normal, the developer storage container, in which toner of predetermined color is stored, specified at a predetermined position is mounted at that position, and it is judged that it has been correctly mounted. Thus, it is possible to prevent an erroneous operation, so-called erroneous setting, in which color of toner stored in the developer storage container is not mounted in a predetermined mounting section.

Meanwhile, the shutter 34*d* can be maintained in the state in which the toner discharge opening W is closed by the body side shutter closing mechanism 73*d* illustrated in FIGS. 72 to 75D. The body side shutter closing mechanism 73*d* is disposed to solve a problem in that the toner container 32Y is extracted from the apparatus body 100 while the toner discharge opening W is not completely closed, for example, at the time of replacement of the developer storage container.

Figure 72:
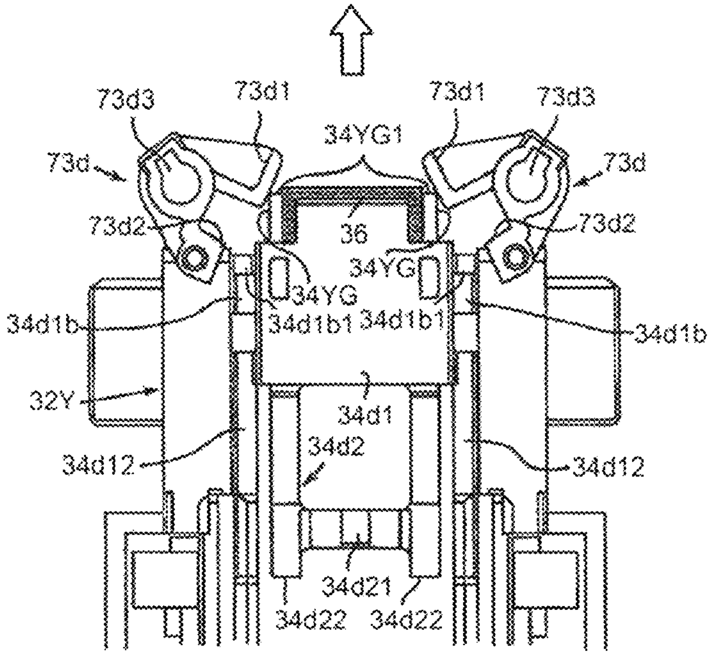
FIG. 72 is a plane view for explaining a relation between a body side shutter closing mechanism and a shutter.

In FIG. 72, the body side shutter closing mechanism 73*d* (a shutter sandwiching mechanism) is disposed at the bottom section inside the cap receiving section 73 and at the upstream side of the toner discharge opening W in the mounting direction of the developer storage container 32Y.

In FIG. 72, the body side shutter closing mechanism 73*d* is a pair of horseshoe shaped members disposed to face each other in the left-right direction of FIG. 72 and is configured to be rotatable on a support shaft 73*d*3 in which a torsion coil spring is installed.

The body side shutter closing mechanism 73*d* (the shutter sandwiching mechanism) includes a first sandwiching section 73*d*1 formed on one end side and a second sandwiching section 73*d*2 formed on the other end side.

Figure 73:
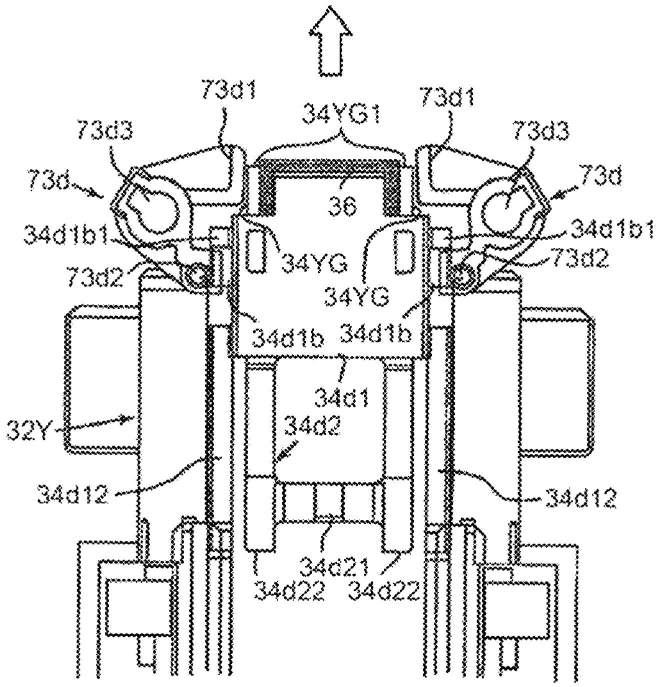
FIG. 73 is a plane view illustrating a state of the body side shutter closing mechanism illustrated in FIG. 72.

In the sandwiching sections, at the time of the opening/closing operation of the shutter 34*d* in the developer storage container 32Y, the engaged protruding section 34*d*1*b* of the shutter 34*d* is sandwiched by the second sandwiching members 73*d*2, and a vertical surface (the surface where an outgoing line leading end section of symbol 34YG in FIG. 73 is positioned) of the guide rail 34YG (see FIGS. 68, 69A, 69B, and 71A to 71C) of the cap section 34Y is sandwiched by the first sandwiching members 73*d*1 (the state illustrated in FIG. 73). At the time of the opening/closing operation of the shutter 34*d*, the postures of the shutter 34*d* of the cap receiving section 73 and the cap section 34Y are decided, and thus the opening/closing operation can be smoothly performed.

Figure 74:
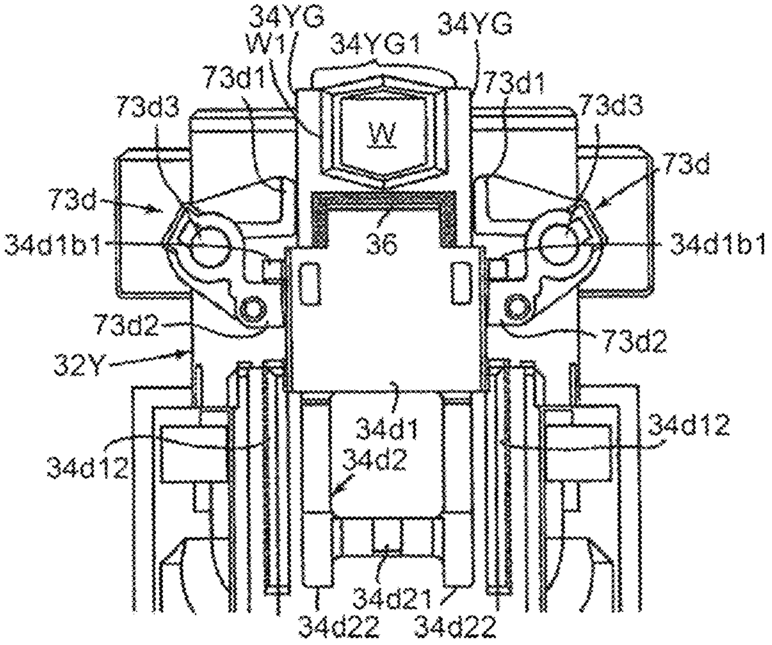
FIG. 74 is a plane view illustrating a state of the body side shutter closing mechanism that has changed from the state illustrated in FIG. 73.

FIGS. 72 to 74 are views illustrating an operation of the body side shutter closing mechanism 73*d* (the shutter sandwiching mechanism) when opening or closing the shutter 34*d*.

At the time of the opening operation of the shutter 34*d*, as illustrated in FIG. 72, in accompany with the mounting operation of the developer storage container 32Y in a white arrow direction, the first sandwiching members 73*d*1 first come in contact with a leading end 34YG1 (see FIGS. 68, 69A, 69B, and 71A to 71C) of the guide rail 34YG of the shutter 34*d*, and then, as will be described later, the second sandwiching members 73*d*2 come in contact with the protrusions 34*d*1*b*1 positioned in the engaged protruding sections 34*d*1*b* of the shutter 34*d*.

As illustrated in FIG. 73, when the mounting operation of the developer storage container 32Y proceeds in the white arrow direction, the body side shutter closing mechanism 73*d* (the shutter sandwiching mechanism) rotates on a support shaft section 73*d*3.

When the body side shutter closing mechanism 73*d* rotates, the first sandwiching members 73*d*1 sandwich the vertical surfaces (the surfaces where an outgoing line leading end section of symbol 34YG in FIG. 73 is positioned) of the guide rails 34YG of the cap section 34Y, and the second sandwiching members 73*d*2 sandwich the side wall surfaces by coming in face contact with the side wall surfaces of the main shutter section 34*d*1 where the base ends of the engaged protrusion 34*d*1*b* are positioned while being engaged with the protrusions 34*d*1*b*1 positioned in the engaged protruding section 34*d*1*b* of the shutter 34*d*.

Thereafter, even though not shown, the shutter 34*d* comes in contact with the wall section formed around the toner feeding opening at the cap receiving section 73 side and so stops movement in the mounting direction. Then, the vertical surface of the guide rail 34YG is sandwiched by the first sandwiching sections 73*d*1, and movement of the shutter 34*d* in the cap receiving section 73 is restricted (the shutter 34*d* does not absolutely move in the longitudinal direction).

In the state in which movement of the shutter 34*d* is restricted, when the developer storage container 32Y moves in the mounting direction, the shutter 34*d* whose movement in the mounting direction is stopped moves in a direction relative to movement of the cap section 34Y in the mounting direction. Further, when the cap section 34Y moves to the front side in the mounting direction further than the shutter 34*d* whose movement is stopped, the toner discharge opening W is opened as illustrated in FIG. 74.

At this time, as illustrated in FIG. 74, the vertical surfaces of the cap section 34Y are sandwiched by first sandwiching members 73*d*1, and the protrusions 34*d*1*b*1 positioned in the engaged protruding section 34*d*1*b* of the shutter 34*d* are engaged by second sandwiching members 73*d*2. Since the opening operation of the shutter 34*d* is performed in the state in which the shutter 34*d* is sandwiched, the postures of the shutter 34*d* and the cap section 34Y in the cap receiving section 73 are decided, and thus the opening/closing operation can be smoothly performed.

Meanwhile, when extracting (separating) the developer storage container 32Y from the developer storage container storage unit 70 (the cap receiving section 73), the operation is performed in a procedure reverse to the mounting procedure. That is, the operation of the body side shutter closing mechanism 73*d* (the shutter sandwiching mechanism) accompanying with the closing operation of the shutter 34*d* is performed in order of FIGS. 74, 73, and 72.

The seal state of the seal member 36 on the toner discharge opening W at the time of the opening/closing operation of the shutter will be described in connection with the movement position of the shutter 34*d* with reference to FIGS. 75A to 75D.

Figure 75A:
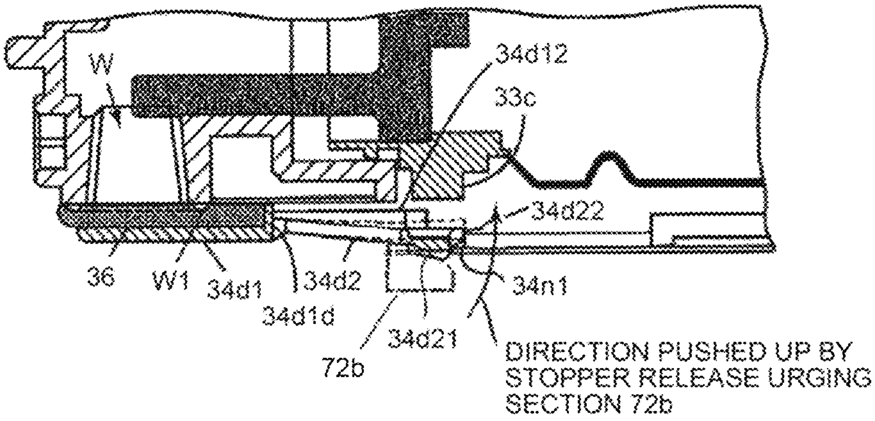
FIGS. 75A to 75D are views for explaining a positional relation between a toner discharge opening and a shutter and a sealing state of a seal material.

FIG. 75A illustrates the state in which the toner discharge opening W of the cap 34 is closed by the shutter 34*d*. In this state, since the developer storage container is not loaded on the cap receiving section 73, the shutter 34*d* closes the toner discharge opening W. Since the seal material 36 is in press contact with the rib W1 positioned at the circumferential edge of the toner discharge opening W, the state in which the shutter 34*d* is in close contact with the toner discharge opening W is maintained. A dotted line in FIG. 75A represents the state in which the stopper release section 34*d*21 of the shutter 34*d* is pushed up by the stopper release urging section 72*b* at the cap receiving section 73 side. The shutter deforming section 34*d*2 is deflectively deformed from the inclined state to the horizontal state. The stopper section 34*d*22 positioned at the free end of the shutter deforming section 34*d*2 is released from engagement with the engaging end surface 34*n*1 positioned in the wide width box section 34*n* that is at the bottom side of the cap section 34Y as illustrated in FIGS. 69A and 69B.

Figure 75B:
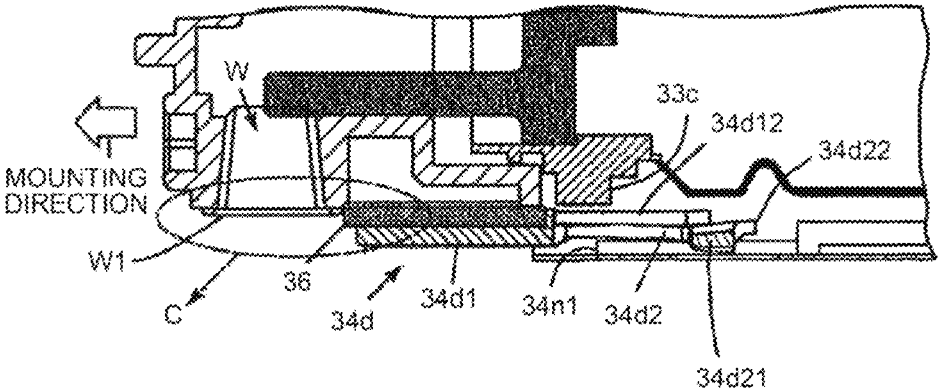

Thus, as described in FIGS. 72 to 74, it can move up to the position where the engaged protruding section 34*d*1*b* at the shutter 34*d* side is sandwiched by the second sandwiching members 73*d*2 of the body side shutter closing mechanism 73*d*. As described in FIG. 72, movement of the shutter 34*d* in the mounting direction is restricted, whereas the cap section 34Y can move in the mounting direction, so that the toner discharge opening W is opened, and the state of FIG. 75B is obtained. FIG. 75B illustrates the state in which the developer storage container is inserted toward the cap receiving section 73.

Figure 75C:
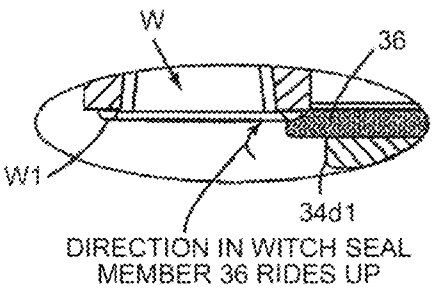

FIG. 75C illustrates a state of a section indicated by symbol C in FIG. 75B, that is, a state directly before the toner container starts an removing operation from the main body, and the shutter 34*d* starts to close the toner discharge opening W during the operation. In FIG. 75C, when the shutter 34*d* further moves in the direction of closing the toner discharge opening W, the corner (a ridgeline section) of the seal material 36 at the leading end side hits against the rib W1 positioned at the circumferential edge of the toner discharge opening W and so gets caught (ride up) between the rib W1 and the upper seal surface.

Figure 75D:
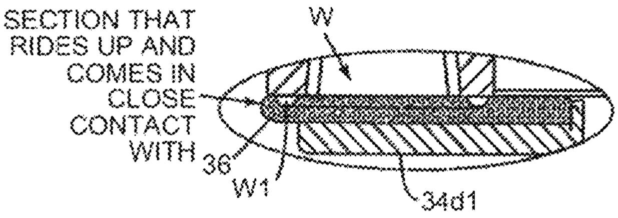

FIG. 75D illustrates the state in which the toner discharge opening is completely closed by the shutter 34*d*. At the time of closing completion, the corner of the seal material 36 at the leading end side gets caught in and comes in close contact with the rib W1 side. The leading end surface of the seal material 36 is pulled by the caught ridgeline section and deformed, and rides up to cover the contact section between the rib W1 and the seal material 36 when the cap section 34Y is viewed from the front.

As a result, since the toner discharge opening W is sealed by the seal material 36 until the developer storage container is completely mounted, the toner can be prevented from carelessly leaking from the toner discharge opening W.

The shutter mechanism according to the present fifteenth embodiment is the invention for solving the above mentioned third problem. In the present embodiment, by the configuration in which the rib W1 is disposed on the circumferential edge for the toner discharge opening W used as the existing component and the configuration of the seal material 36 having a section that gets caught by hitting against the rib W1 for the seal material used as the existing component, adhesion on the toner discharge opening increases without adding any other component, and so leak of the toner can be prevented with a high degree of certainty.

Particularly, since the toner discharge opening W has the hexagonal shape, the leading end of the seal material 36 concentratedly receives a load causing turning-up and is easily turned up, and turning-up can be caused while alleviating sliding resistance in the entire end section in continuity with the top section of the hexagon on which the load is concentrated. Thus, adhesion on the entire circumferential edge of the toner discharge opening W can be secured.

Sixteenth Embodiment

Next, an embodiment in which an ID chip as another invention is mounted in the developer storage container according to the fifteenth embodiment will be described.

Figure 76A:
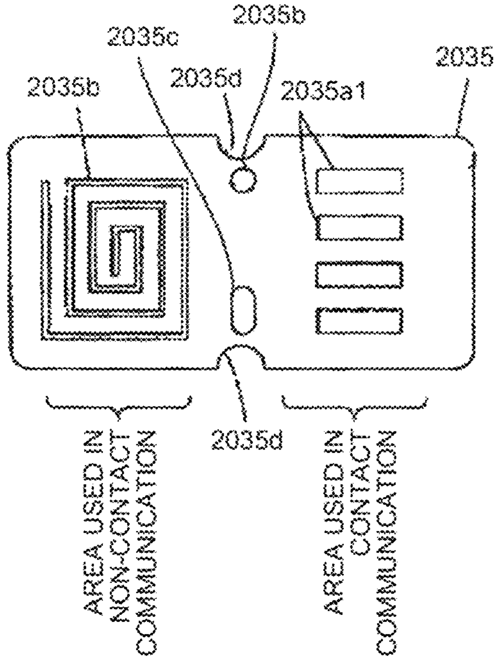
FIGS. 76A and 76B are views illustrating a configuration of an information storage device used in a sixteenth embodiment.
Figure 76B:
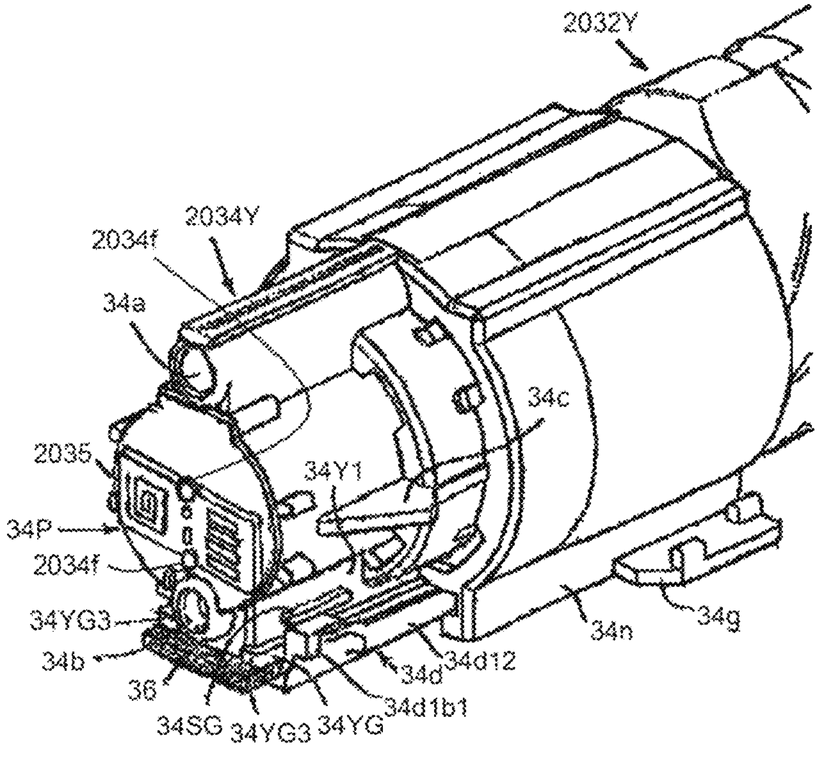

In the present embodiment, a connector, at the cap receiving side, to which an electrical connection relation with an ID chip 2035 illustrated in FIGS. 76A and 76B is set increases matching of the connection position, and the contact failure by the toner at the connection position is prevented. A description will be made in connection with this configuration.

FIGS. 76A and 76B are front views illustrating a configuration of the ID chip 2035 and a toner container 2032Y in which the ID chip 2035 is mounted. In the same figure, the ID chip 2035 is configured such that, with respect to on a central section of a rectangular terminal plate body, a terminal 2035*a* is provided at the right, and a non-contact type communication area (an antenna section) 2035*b* such as a wireless type is provided at the left (see FIG. 76A). Since both the contact-type and the non-contact type are provided, there are the following merits. For writing on the ID chip in an assembly or toner filling process in a toner container factory, toner information or the like is written in the ID chip by non-contact communication during an assembly line operation. Thus, the manufacturing speed can be remarkably improved, and thus an inexpensive toner container having a low manufacturing cost can be produced. Meanwhile, inside the image forming apparatus, an inexpensive non-contact type electronic substrate can be employed in a body side communication device, thereby contributing to the cost reduction of the image forming apparatus.

Next, a mounting configuration of the ID chip on the toner container according to the sixteenth embodiment will be described. The ID chip 2035 has semicircular notches 2035*d* on a central section. As illustrated in FIG. 76B, the ID chip 2035 is held on the leading end surface of a cap section 2034Y of the toner container 2032Y to be slightly movable in the horizontal direction that is the longitudinal direction. As the holding method, the ID chip 2035 is sandwiched and held between two flange pins 2034*f*, which are disposed at nearly the center of the relevant leading end surface, at the positions of the notches 2035*d*. A gap between the two flange pins 2034*f* is larger than the shortest width between the two notches 2035*d*, and so the ID chip 2035 is held on the cap section 2034Y with a backlash.

Figure 77:
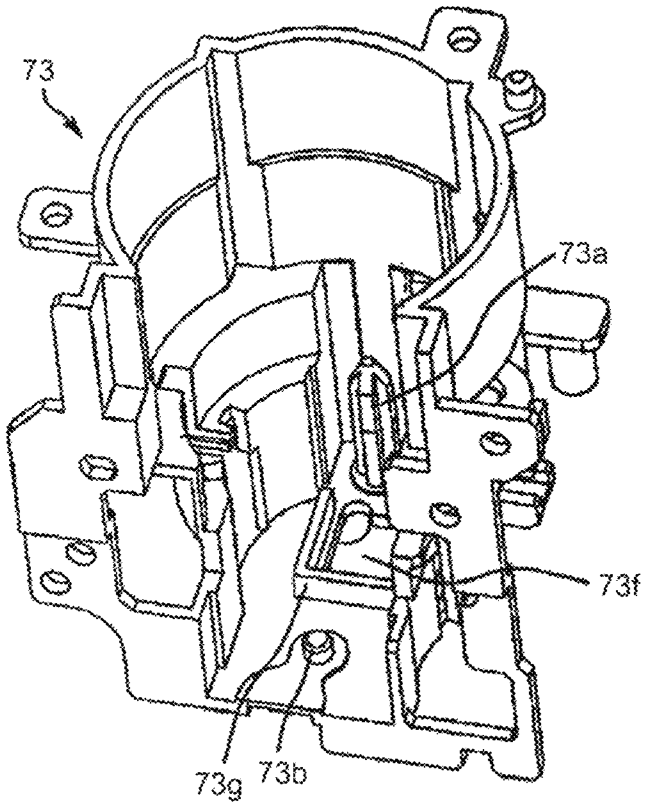
FIG. 77 is a perspective view of a cap receiving side that becomes part of an electrical connection section with an information storage device.

Meanwhile, in a cap receiving section 2073 of the developer storage container storage unit 70, as will be described later, a through hole 2073*f* that exposes a connector 2073*e* (that is not shown in FIG. 77 for convenience) used as an electrical connection section on the ID chip 2035 and a wall section 2073*g* are disposed as illustrated in FIG. 77.

The wall section 2073*g* is a section for shielding a surrounding area of the connector 2073*e* which will be described later, and when the connector 2073*e* which will be described later is exposed through the through hole 2073*f*, the wall section 2073*g* blocks the toner from entering the connector 2073*e*.

The through hole 2073*f* is a place that allows the connector 2073*e* disposed in a common electric substrate which will be described in FIG. 78 to be exposed and face the ID chip 2035.

Figure 78:
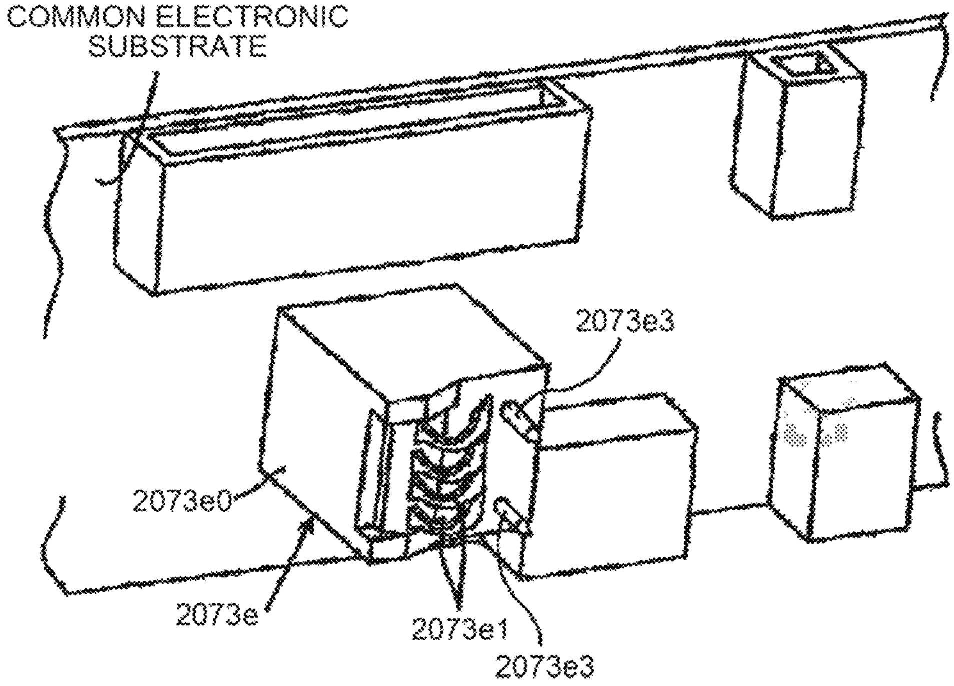
FIG. 78 is a perspective view illustrating a common electronic substrate including a shutter connected with an information storage device.

FIG. 78 is a view illustrating a configuration of the connector 2073*e* disposed in the common electric substrate. In the same figure, the connector 2073*e* includes a plurality of terminal plates 2073*e*1 disposed in a connector body 2073*e*0. As the terminal plate 2073*e*1, used is a bent flexible metallic plate having excellent conductivity.

In the connector 2073*e*, disposed is a configuration for performing positioning at the time of contact with the ID chip 2035, which will be described below.

In FIG. 78, on a surrounding area of the terminal plate 2073*e*1 disposed in the connector 2073*e* or part thereof, the wall section 2073*g* illustrated in FIG. 77 is disposed, and on part of the wall section 2073*g*, formed are positioning pins 2073*e*3 that are fittable into positioning holes 2035*b* and 2035*c* (see FIGS. 76A and 76B) disposed at the ID chip 2035 side.

Figure 79:
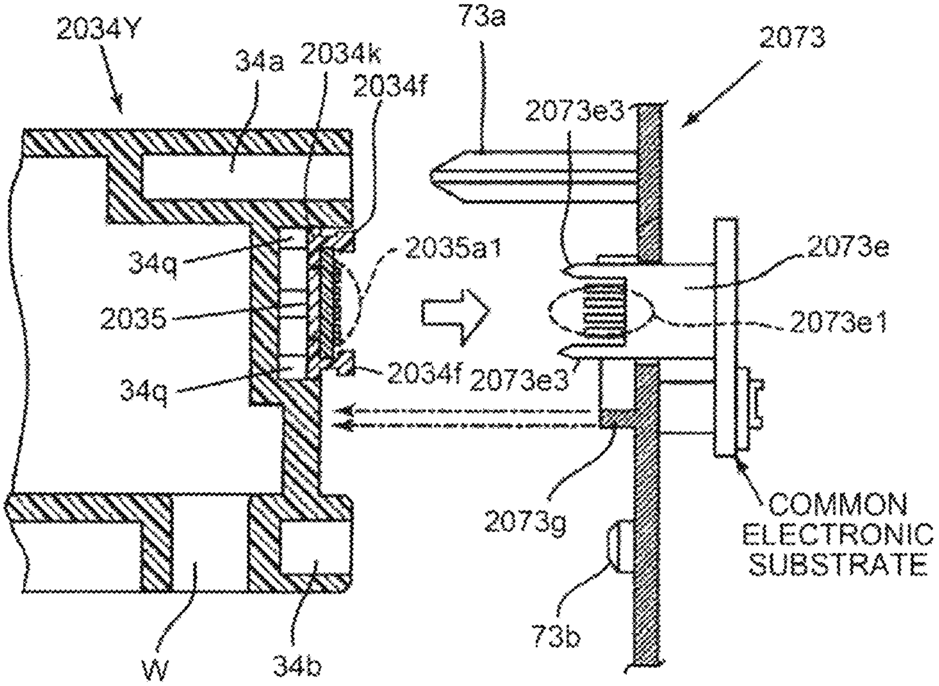
FIG. 79 is a view for explaining a connection state between the information storage device used in the sixteenth embodiment and a connector at a cap receiving section side.

The positioning holes 2035*b* and 2035*c* are for contact-positioning with the terminal plates 2073*e*1 at the connector 2073*e* on the terminal 2035*a* at the ID chip 2035 side. In order to make it easier to fit the positioning pin 2073*e*3 into, one is formed of a round hole, and the other is formed of an elongate hole. In FIG. 79 which will be described later, the flange pin 2034*f* is fixed to a concave section 2035*a* and protrudes from a holding member 2034*k*. A reference numeral 34*q* represents a pedestal of the holding member 2034*k*.

The connector 2073*e* at the common electric substrate side is connected with the ID chip 2035 in a state illustrated in FIG. 79. In FIG. 79, when the cap section 2034Y of the developer storage container is inserted into a cap receiving section 2073, the positioning pins 73*a* and 73*b* at the cap receiving section 2073 side are inserted into the positioning holes 34*a* and 34*b* at the cap section 2034Y, and so the cap section 2034Y is positioned in the cap receiving section 2073.

When the cap section 2034Y is further inserted, the positioning pins 2073*e*3 of the connector 2073*e* moves inside the positioning holes 2035*b* and 2035*c* at the ID chip 2035 side, and so the position of terminals 2035*a*1 at the ID chip 2035 side matches with the position of the terminal plates 2073*e*1 at the connector 2073*e*, thereby preventing the contact failure caused by position mismatching.

As the cap section 2034Y is inserted, the wall section 2073*g* positioned around the connector 2073*e* covers not only a surrounding area of the connector but also a surrounding area of the ID chip 2035 as indicated by an alternate long and two short dashes line in FIG. 79. Further, the ID chip 2035 is installed at the upper position away from the toner discharge opening W. Thus, it is possible to prevent the toner scattered from the toner discharge opening W from sticking to the contact position between the terminals.

Seventeenth Embodiment

Next, a toner container in which both techniques of the shutter configuration mentioned in the toner container according to the fifteenth embodiment and the ID chip 535 according to the fifth embodiment are mounted will be described as a seventeenth embodiment.

A target configuration is a configuration related to the body side shutter closing mechanism 73*d* that has been described in FIGS. 73 to 75D.

Figure 80:
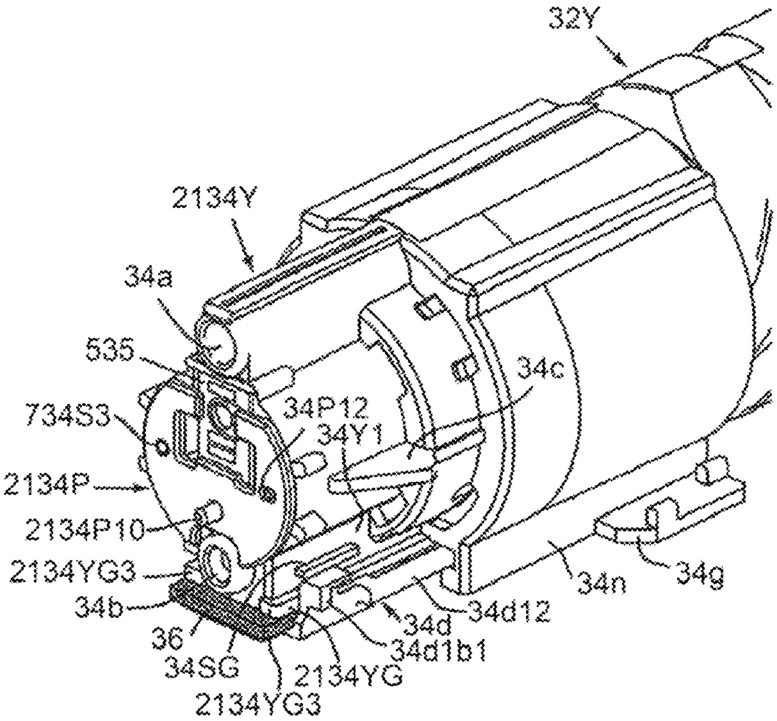
FIG. 80 is a perspective view, viewed from a front right side in an insertion direction of a cap in the state in which a shutter is closed, for explaining a modification related to a configuration of a cap section according to a seventeenth embodiment.

FIG. 80 is a perspective view viewed from the front right side in an insertion direction of a cap 2134Y in the state in which the shutter 34*d* is closed, and FIG. 81 is a perspective view viewed from the front left side in the insertion direction of the cap 2134Y in the state in which the shutter 34*d* is opened. These figures are different from the previous drawings in the following points.

In FIG. 80, unlike the configuration illustrated in FIG. 67, a front cover 2134P for preventing falling of the ID chip 535 loaded into the concave section 34*t* is disposed on the front surface of the cap 2134Y.

Figure 82:
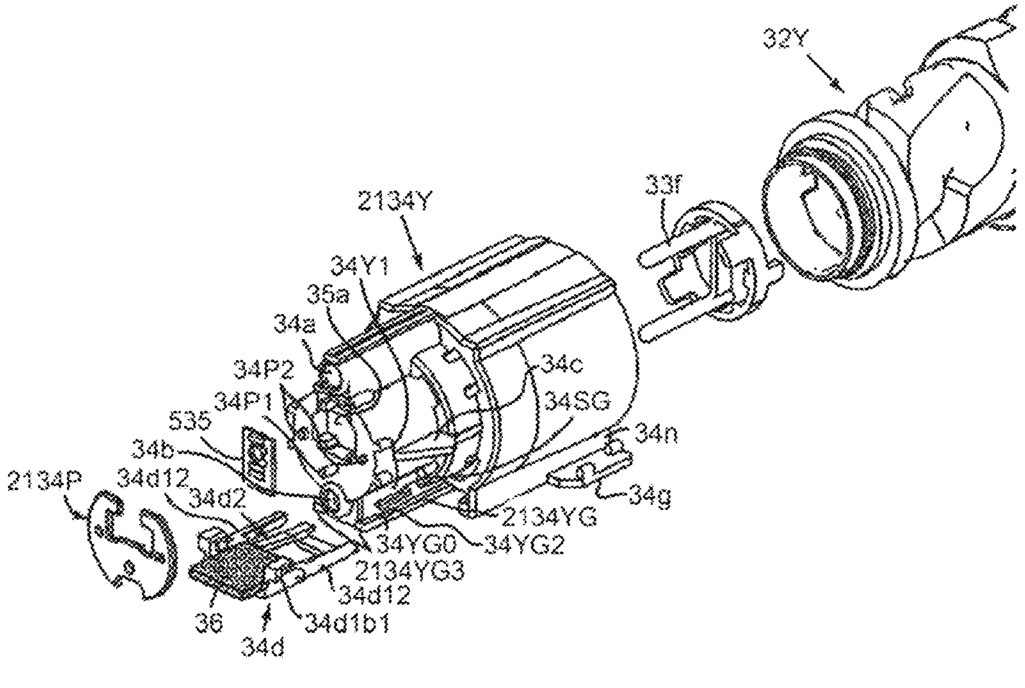
FIG. 82 is an exploded perspective view of the cap section illustrated in FIG. 80.

A configuration for mounting the front cover 2134P includes a heat calking pin 2134P10 disposed, on the front surface of the cap 2134Y, below the front surface center and a pair of main and sub reference pins 734S3 that are disposed at the positions different from the heat calking pin 2134P10 while sandwiching the concave section 34*t* as illustrated in FIG. 82. After the front surface cover 2134P is fixed, the heat calking pin 2134P10 becomes a state in which the leading end is crushed by a jig while being heated, but a non-crushed state is illustrated in FIGS. 82 to 86.

In the front surface cover 2134P, holes into which the pins 2134P10 and 734S3 are inserted and an opening that exposes part of the ID chip 535 to the outside are formed, respectively.

By fitting the main reference pin 734S3 and the sub reference pin 734S3 into and inserting the heat calking pin 2134P10 into, the front surface cover 2134P is positioned in the state in which the ID chip 535 is exposed to the outside. The heat calking pin 2134P10 is heated and compressed, so that the front surface cover 2134P is fixed to the front surface of the cap 2134Y.

In the holes, at the front surface cover 2134P side, into which the pins are fitted, one of the reference pins is a round hole, and the other is an elongate hole, a longitudinal direction of which is horizontal. Further, the insertion hole of the heat calking pin 2134P10 has the diameter slightly larger than the heat calking pin 2134P10.

By the fixing state, even if the toner container 2132Y is inserted into or separated from the toner container storage unit, the ID chip 535 does not fall off, and communication or electrical connection of the ID chip exposed to the outside through the opening can be performed.

Meanwhile, a structure related to the body side shutter closing mechanism 73*d* includes a guide rail 2134YG disposed at the side surface of the narrow width box 34Y1 of the cap 2134Y.

The guide rail 2134YG has a configuration different from the guide rail 34YG illustrated, for example, in FIG. 68. As illustrated in FIGS. 80 and 81, the guide rail 2134YG includes a protruding section 2134YG3 that is configured to protrude to the front side further than the leading end surface of the narrow width box section 34Y1 and have a protruding portion rounding toward the central side. The protruding sections 2134YG3 are symmetrically disposed on both sides of the narrow width box 34Y1.

Figure 83:
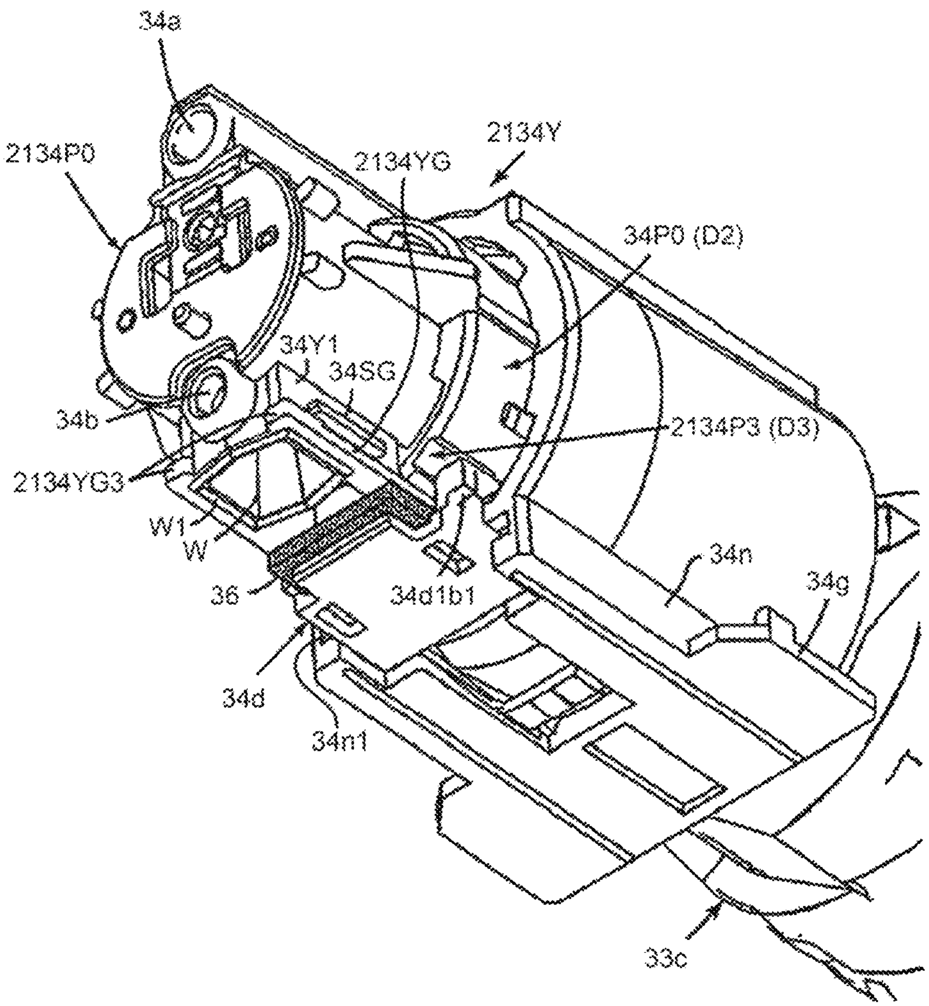
FIG. 83 is a perspective view illustrating a modification of a main part of the cap section illustrated in FIG. 80.

Further, as a configuration different from the configurations of the above embodiments, as illustrated in FIG. 83, at the position (the position indicated by a reference numeral 2134P3) facing the engaged protruding section 34*d*12*b* of the shutter 34*d* in the circumferential surface of the medium diameter cylindrical section 34Y2, formed is a concave section that has the outer diameter smaller than the outer diameter of the medium diameter cylindrical section 34Y2. The circumferential surface 2134P3 that forms the concave section is configured not to interfere with turning of a sandwiching member 73*d*2 disposed in the body side shutter closing mechanism 73*d* illustrated in FIG. 72.

Figure 84:
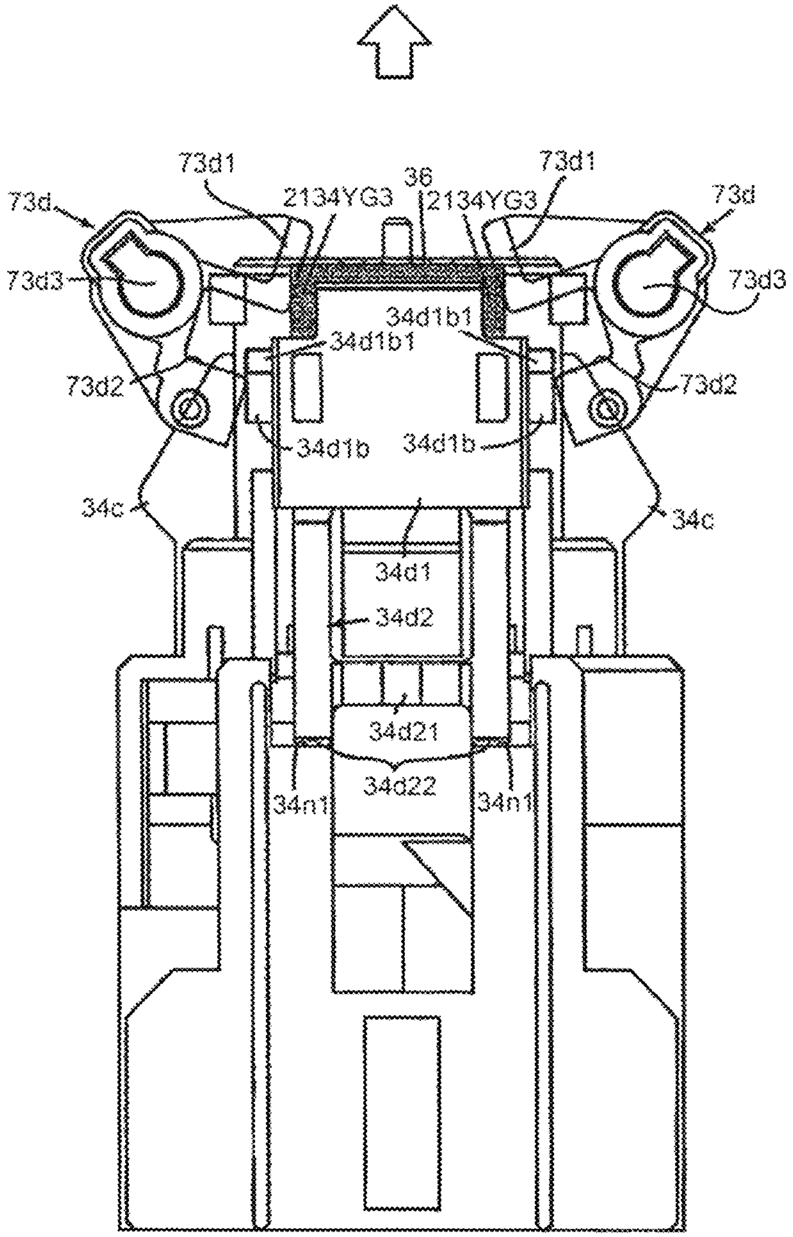
FIG. 84 is a plane view for explaining an aspect of a body side shutter closing mechanism targeting on the cap section illustrated in FIG. 80.
Figure 85:
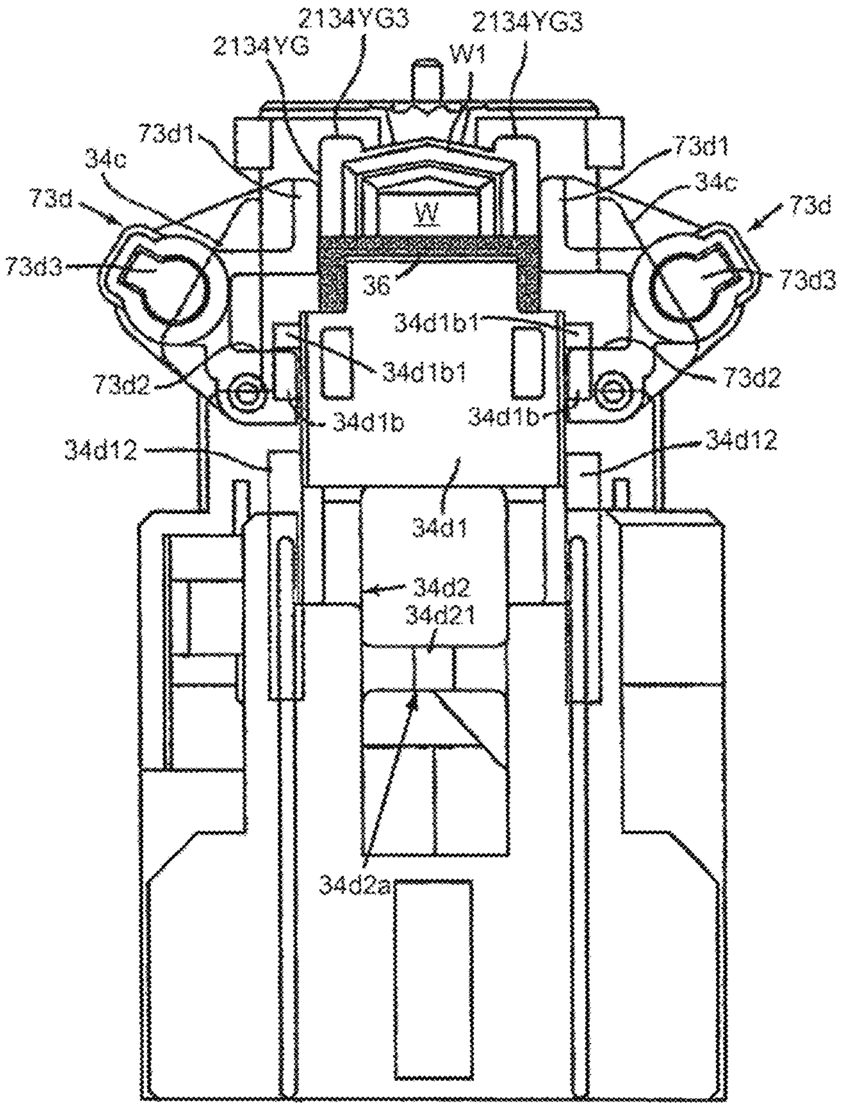
FIG. 85 is a plane view illustrating the body side shutter closing mechanism illustrated in FIG. 84.
Figure 86:
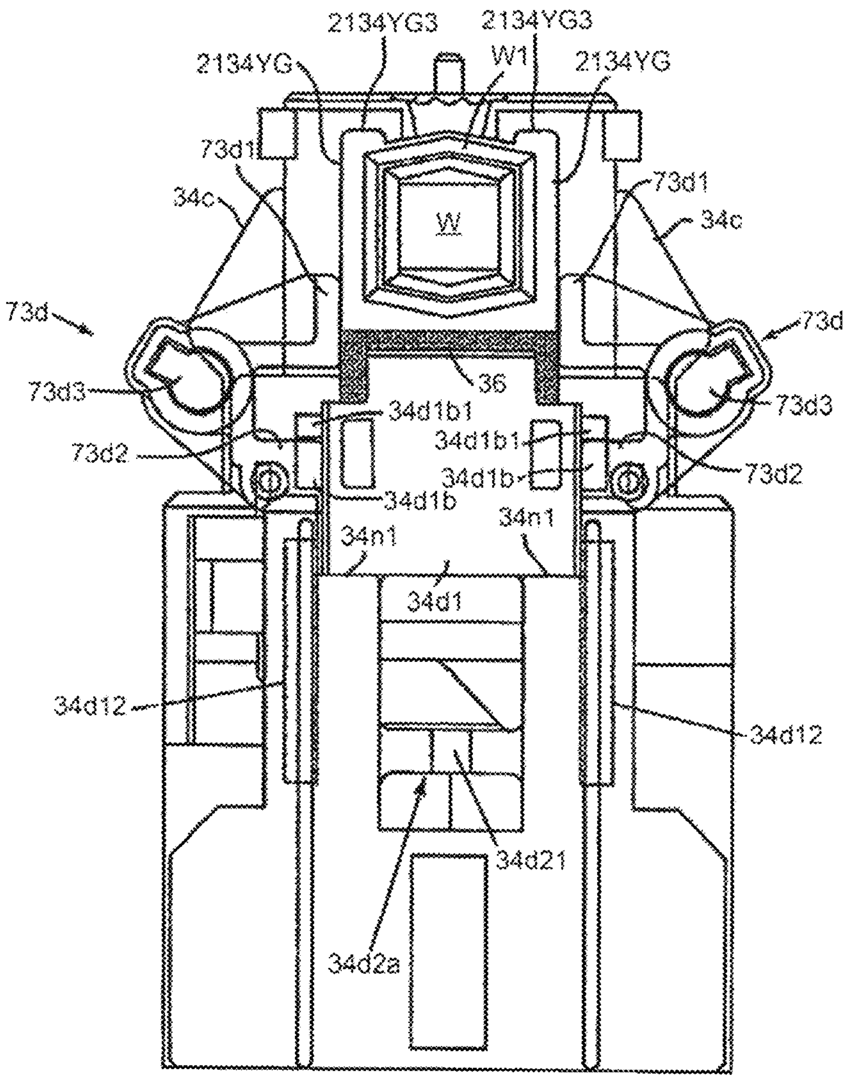
FIG. 86 is a plane view illustrating a state of the body side shutter closing mechanism that has changed from the state illustrated in FIG. 85.

In this configuration, when the cap 2134Y is loaded on the cap receiving section 73 of the apparatus body in the same procedure as illustrated in FIGS. 72 to 74, the cap 2134Y is sandwiched by the body side shutter closing mechanism 73*d*. FIGS. 84 to 86 are views corresponding to FIGS. 72 to 74 illustrating the loading state of the cap section 34Y used in the above configuration.

At the time of the opening operation of the shutter 34*d*, first, as illustrated in FIG. 84, in accompany with the mounting operation of the developer storage container 32Y in the white arrow direction, the first sandwiching members 73*d*1 come in contact with the protruding sections 2134YG3.

Thereafter, as illustrated in FIG. 85, when the mounting operation of the developer storage container 32Y proceeds in the white arrow direction, the body side shutter closing mechanism 73*d* (the shutter sandwiching mechanism) is pushed by the protruding sections 2134YG3 and so rotates on the support shaft section 73*d*3.

When the body side shutter closing mechanism 73*d* rotates, the first sandwiching members 73*d*1 sandwich the vertical surfaces of the guide rails 2134YG continuing from the protruding section 2134YG3, and the second sandwiching members 73*d*2 sandwich the side wall surfaces of the main shutter section 34*d*1 while being engaged with the protrusions 34*d*1*b*1 positioned in the engaged protruding section 34*d*1*b* of the shutter 34*d*.

Thereafter, the shutter 34*d* comes in contact with the wall section (not shown) formed around the toner feeding opening at the cap receiving section 73 side and so stops movement in the mounting direction. At this time, the vertical surfaces of the guide rails 2134YG are sandwiched by the first sandwiching sections 73*d*1.

In the state in which movement of the shutter 34*d* is stopped, when the toner container 2132Y moves in the mounting direction, the shutter 34*d* whose movement in the mounting direction is stopped relatively moves when viewed from the cap section 2134Y, and the narrow width box section 34Y12 of the cap section 2134Y moves to the front side in the mounting direction further than the shutter member 34*d*. By the relative movement, as illustrated in FIG. 86, the toner discharge opening W is opened.

At this time, as illustrated in FIG. 74, the vertical surfaces of the cap section 2134Y are sandwiched by the first sandwiching members 73*d*1, and the protrusions 34*d*1*b*1 positioned in the engaged protruding section 34*d*1*b* of the shutter 34*d* are engaged by the second sandwiching members 73*d*2. Since the opening operation of the shutter 34*d* is performed in the state in which the shutter 34*d* is sandwiched, the postures of the shutter 34*d* and the cap section 2134Y in the cap receiving section 73 are decided, and thus the opening/closing operation of the shutter 34*d* can be smoothly performed.

Meanwhile, when extracting (separating) the developer storage container 2132Y from the developer storage container storage unit 70 (the cap receiving section 73), the operation is performed in a procedure reverse to the mounting procedure. That is, the operation of the body side shutter closing mechanism 73*d* (the shutter sandwiching mechanism) accompanying with the closing operation of the shutter 34*d* is performed in order of FIGS. 86, 85, and 84.

In the configuration illustrated in FIG. 81, since the protruding section 2134YG3 that is present at the front end of the guide rail 2134YG protrudes to the front side further the front surface of the narrow width box section 34Y12, turning start timing of the body side shutter closing mechanism 73*d* is delayed. That is, since the protruding section 2134YG3 protrudes from the front surface of the narrow width box section 34Y12 to the outside, when the cap section 2134Y is extracted, a time period when turning of the first sandwiching section 73*d*1 is stopped by the protruding section 2134YG3 is lengthier, and the shutter 34*d* remains sandwiched for a longer time compared to when the protruding section 2134YG3 is not disposed.

When the cap section 2134Y moves in the extracting direction, since the first sandwiching section 73*d*1 faces the engaged protruding section 34*d*1 of the shutter 34*d*, the non-turnable state is maintained. For this reason, a protrusion amount of the protruding section 2134YG3 is set so that the body side shutter closing mechanism 73*d* can be maintained in the non-turnable state until the shutter 34*d* is completely closed, and sandwiching of the guide rail 2134YG by the first sandwiching section 73*d*1 can be released when the shutter 34*d* completely closes the toner discharge opening W.

Since the engaged protruding sections 34*d*1*b* at the shutter 34*d* side are sandwiched by the second sandwiching sections 73*d*2 until the toner discharge opening W is completely closed by the shutter 34*d*, when the cap 34Y moves in the extracting direction, the shutter 34*d* traverses the toner discharge opening W in the sandwiched state and so closes the toner discharge opening W.

Next, a description will be made in connection with features of the toner used in the developer feeding device as follows.

As the toner contained in the toner containers 32Y, 32M, 32C, and 32K, toner formed so that the following relations hold true:

$$3 \square Dv \square 8 \quad (1)$$

$$1.00 \square Dv/Dn \square 1.40 \quad (2),$$

where Dv (μm) represents a volume-average particle diameter, and Dn (μm) represents a number-average particle diameter. A toner particle is selected according to an image pattern in the developing process and excellent image quality is maintained, and satisfactory developing capability is maintained even if the toner is agitated for a long time in the developing device. Moreover, the toner can be efficiently and reliably conveyed without blocking the toner supply path.

The volume average particle diameter and the number average particle diameter of toner can be measured by using a typical device such as a Coulter Counter type particle diameter distribution measuring device: Coulter Counter-TA-II (manufactured by Coulter Electronics Limited); or Coulter Multisizer II (manufactured by Coulter Electronics Limited).

Furthermore, in the present embodiment, as toner contained in the developer storage containers 32Y, 32M, 32C, and 32K, used is substantially spherical toner that is formed so that a shape factor SF-1 is in a range of 100 to 180 and a shape factor SF-2 is in a range of 100 to 180. As a result, high transfer efficiency is maintained, and reduction in cleaning performance is suppressed. Moreover, the toner can be efficiently and reliably conveyed without blocking the toner supply path such as the tube 71.

Here, the shape factor SF-1 represents the sphericity of the toner particle and obtained by the following equation.

$$SF\text{-}1=(M2/S)\times(100\square/4)$$

In the above equation, M is the maximum particle diameter (the largest particle diameter in uneven particle diameters) in a project plane of the toner particle, and S is a project area of the toner particle. Therefore, the toner particle whose shape factor SF-1 is 100 is perfectly spherical, and the degree of sphericity lowers as it becomes greater than 100.

The shape factor SF-2 represents irregularity of the toner particle and obtained by the following equation.

$$SF\text{-}2=(N2/S)\times(100/4\square)$$

In the above equation, N is the circumferential length in the project plane of the toner particle, and S is the project area of the toner particle. Therefore, the toner particle whose shape factor SF-2 is 100 has no irregularity and the irregularity becomes larger as it becomes greater than 100.

The shape factor SF-1 and the shape factor SF-2 are obtained by photographing the toner particle by a scanning electron microscope "S-800" (manufactured by Hitachi, Ltd.) and analyzing the photograph of the toner particle by an image analyzer "LUSEX3" (manufactured by Nireco Corp.).

In the first to eight embodiments and the eleventh to seventeenth embodiments, only toner (one component developer) is contained in the toner container (designated as 32Y, 32M, 32C, and 32K) as the developer container. However, as for an image forming apparatus that appropriately supplies the developing device with a two component developer composed of toner and a carrier, the two component developer can be contained in the toner container (the developer container). Even in these cases, the same effects as in the above embodiments can be obtained.

In the first to eight embodiments and the eleventh to seventeenth embodiments, some or all of image forming units 6Y, 6M, 6C, and 6K can be replaced with process cartridges. Even in this case, the same effects as in the above embodiments can be obtained.

Further, in the first to sixth embodiments and the eleventh to seventeenth embodiments, by rotatably configuring the container body 33Y, a configuration has been made to convey the toner contained in the container body 33Y toward the opening A. On the other hand, as in the seventh embodiment described with reference to FIGS. 48 and 49, the toner contained in the container body 1033Y may be conveyed toward the opening A such that the container body 1033Y is configured to be non-rotatably held on the toner container storage unit 70 together with the cap section 1034Y, and a conveying member (for example, a conveying member that includes a plurality of conveying blade members installed on a shape section and rotates in a predetermined direction) that conveys the toner toward the opening A inside the container body 1033Y is installed. Even in this case, the same effects as in the above embodiments can be obtained.

Further, in the above embodiments, in the substrate (designated as 35*b* or 535*b*) of the ID chip (designated as 35 or 535), a plurality of metallic pads 35*a* have been arranged in line in the vertical direction so that the position in the longitudinal direction is not misaligned. On the other hand, in the substrate of the ID chip, a plurality of metallic pads 35*a* may be arranged in the vertical direction so that the position in the longitudinal direction is alternately misaligned in a zigzag form. In this case, in order to conform to the metallic pads 35*a* arranged in the zigzag form, a plurality of body side terminals (designated as 73*e*2 or 573*e*2) in the connector (designated as 73*e* or 573*e*) are also arranged in the zigzag form. Even in this case, the same effects as in the above embodiments can be obtained.

Furthermore, in the above embodiments, the present invention has been applied to the ID chip (the information storage device) disposed in the toner container 32Y (the developer container) or the like as the removable device removably installed on the image forming apparatus body 100 or the like. However, the application of the present invention is not limited thereto, and the present invention can be applied even to any other removable device removably installed on the image forming apparatus body 100 or the like as long as the information storage device is installed in the removable device similarly to the above embodiments. For example, in the image forming apparatus 100 illustrated in FIG. 1, even when the information storage device is installed in the process cartridges 6Y, 6M, 6C, and 6K as the removable device, the fixing device 20 (the fixing unit) as the removable device, the intermediate transfer unit 15 as the removable device, or the like, the present invention can be applied to each of them similarly to the above embodiments. Even in these cases, the same effects as in the above embodiments can be obtained.

The present invention is not limited to the above embodiments, and it is obvious that the above embodiment can be appropriately changed in addition to what have been suggested in the above embodiments. Further, the number, the position, the shape, and the like of component members are not limited to the above embodiments and may be changed to the number, the position, the shape, and the like suitable for implementing the present invention.

In the present disclosure, there is another invention corresponding to the fifteenth to seventeenth embodiments for solving the third problem. This can be summarized in the form of claims as follows.

1. A developer storage container removably installed in an image forming apparatus body, comprising:

a cap section provided with a toner discharge opening configured to discharge toner in a vertical direction, outside the developer storage container; and a shutter that is held on the cap section and is configured move along an outer surface of the cap section to open and close the toner discharge opening wherein, a seal material that is deformable and made of a flexible material is disposed on a surface of the shutter, the surface facing the toner discharge opening, and wherein when the shutter moves in a direction in which the shutter moves to close the toner discharge opening, a leading end of the seal material in the direction is rolled up toward the toner discharge opening so that the leading end comes into close contact with a circumferential edge of the toner discharge opening.

What is claimed is:

1. A toner container, comprising:

a shutter to open and close a toner discharge opening of the toner container; and a slide portion to hold the shutter slidable relative to the toner discharge opening and parallel to an attaching direction in which the toner container attaches to an image forming apparatus, wherein the shutter includes:

a slider which slides in the slide portion, and an elastic seal sandwiched between the toner discharge opening and a main portion of the shutter, and the elastic seal is compressed when the shutter closes the toner discharge opening.

2. The toner container according to claim 1, wherein the shutter further includes a stopper to regulate a slide movement of the shutter when the toner container is outside of the image forming apparatus.

3. The toner container according to claim 2, wherein the shutter further includes an inclined surface, the inclined surface is inclined relative to the attaching direction, and the inclined surface contacts to the image forming apparatus, during installation of the toner container to the image forming apparatus, to deform the stopper to release a regulation of the slide movement.

4. The toner container according to claim 2, wherein the stopper includes a contact surface, which contacts a portion of the toner container excluding the shutter, to regulate the slide movement of the shutter, and the contact surface is disposed outside of the toner discharge opening in a direction orthogonal to the attaching direction.

5. The toner container according to claim 1, wherein the shutter further includes the main portion and a stopper, the elastic seal is attached on the main portion, the elastic seal faces and seals the toner discharge opening, and the elastic seal is not attached on the stopper.

6. The toner container according to claim 5, wherein the stopper is integrally connected to an upstream side, in the attaching direction, of the main portion of the shutter.

7. The toner container according to claim 6, wherein the elastic seal is attached to a downstream side, in the attaching direction, of the main portion of the shutter.

8. An image forming apparatus, comprising:

the toner container according to claim 5; and a toner container receiving connector to receive the toner container.

9. An image forming apparatus, comprising:

the toner container according to claim 1; and a toner container receiving connector to receive the toner container.

10. A toner container, comprising:

a shutter to open and close a toner discharge opening of the toner container; and a slide portion to hold the shutter slidable relative to the toner discharge opening and parallel to an attaching direction in which the toner container attaches to an image forming apparatus, wherein the shutter includes:

a main portion, an inclined surface inclined relative to the attaching direction, a slider which slides in the slide portion, an elastic seal sandwiched between the toner discharge opening and the main portion, and a stopper to regulate a slide movement of the shutter when the toner container is outside of the image forming apparatus, the elastic seal is compressed when the shutter closes the toner discharge opening, the inclined surface contacts to the image forming apparatus, during installation of the toner container to the image forming apparatus, to deform the stopper to release a regulation of the slide movement, the elastic seal is attached on the main portion, the elastic seal faces and seals the toner discharge opening, and the elastic seal is not attached on the stopper.

11. An image forming apparatus, comprising:

the toner container according to claim 10; and a toner container receiving connector to receive the toner container.

12. A toner container, comprising:

a shutter mechanism to open and close a toner discharge opening of the toner container; and a slidably holding member portion to hold the shutter mechanism such that the shutter mechanism is slidable relative to the toner discharge opening and parallel to an attaching direction in which the toner container attaches to an image forming apparatus, wherein the shutter mechanism includes:

a touching and sliding member for touching and sliding in the slidably holding member, a sealing member for sealing between the toner discharge opening and the shutter mechanism, the sealing member being compressed when the shutter mechanism closes the toner discharge opening, and a regulating mechanism to regulate a slide movement of the shutter mechanism when the toner container is outside of the image forming apparatus.

13. The toner container according to claim 12, wherein the regulating mechanism includes a contact surface which contacts a portion of the toner container excluding the shutter mechanism to regulate the slide movement of the shutter mechanism.

14. The toner container according to claim 13, wherein the contact surface is disposed outside of the toner discharge opening in a direction orthogonal to the attaching direction.

15. An image forming apparatus, comprising:

the toner container according to claim 12; and a toner container receiving connector to receive the toner container.

* * * * *